(12) United States Patent
Shirasuka et al.

(10) Patent No.: US 8,837,641 B2
(45) Date of Patent: Sep. 16, 2014

(54) DIGITAL BROADCAST RECEIVER

(75) Inventors: Keiichi Shirasuka, Tokyo (JP); Soichiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/814,955

(22) PCT Filed: Oct. 17, 2011

(86) PCT No.: PCT/JP2011/073818
§ 371 (c)(1),
(2), (4) Date: Feb. 8, 2013

(87) PCT Pub. No.: WO2012/056926
PCT Pub. Date: May 3, 2012

(65) Prior Publication Data
US 2013/0136212 A1 May 30, 2013

(30) Foreign Application Priority Data

Oct. 26, 2010 (JP) ................................. 2010-239783
Mar. 18, 2011 (JP) ................................. 2011-061114

(51) Int. Cl.
*H04L 27/06* (2006.01)
*H04N 21/438* (2011.01)
*H04L 27/00* (2006.01)
*H04N 5/46* (2006.01)
*H04N 5/44* (2011.01)

(52) U.S. Cl.
CPC ............ *H04L 27/00* (2013.01); *H04N 21/4383* (2013.01); *H04N 5/46* (2013.01); *H04N 5/4401* (2013.01)
USPC ........... 375/340; 375/295; 375/265; 375/253; 375/263; 375/316; 375/324; 375/240.01

(58) Field of Classification Search
USPC ......... 375/340, 295, 265, 253, 263, 316, 324, 375/340.01
See application file for complete search history.

(56) References Cited

U.S. PATENT DOCUMENTS

| 6,630,964 B2 * | 10/2003 | Burns et al. .................... 348/554 |
| 6,738,949 B2 * | 5/2004 | Senda et al. ................... 714/796 |
| 7,313,208 B2 * | 12/2007 | Frahm et al. .................. 375/350 |

(Continued)

FOREIGN PATENT DOCUMENTS

| JP | 2003-333441 A | 11/2003 |
| JP | 2005-45508 A | 2/2005 |

(Continued)

*Primary Examiner* — Kabir A Timory
(74) *Attorney, Agent, or Firm* — Birch, Stewart, Kolasch & Birch, LLP

(57) ABSTRACT

The present invention provides a digital broadcast receiver which reduces the time needed for channel scans by performing efficient channel scanning when broadcasts in a plurality of broadcast protocols are received. As a first phase channel scan, a first controller and a second controller divide a plurality of channels included in an overlapping frequency band of a first broadcast protocol and a second broadcast protocol, and execute parallel channel scans. After the first phase channel scan, the first controller scans channels in which electrical signals generated from electromagnetic waves received by a second tuner in the first phase channel scan could not be demodulated by a second demodulator, and the second controller scans channels in which electrical signals generated from electromagnetic waves received by a first tuner could not be demodulated by a first demodulator.

14 Claims, 60 Drawing Sheets

(56) References Cited

U.S. PATENT DOCUMENTS

| | | | |
|---|---|---|---|
| 2002/0172277 A1* | 11/2002 | Choi et al. | 375/240.01 |
| 2003/0099303 A1* | 5/2003 | Birru et al. | 375/265 |
| 2007/0222900 A1 | 9/2007 | Yamaguchi et al. | |

FOREIGN PATENT DOCUMENTS

| | | |
|---|---|---|
| JP | 2006-13945 A | 1/2006 |
| JP | 2006-186516 A | 7/2006 |
| JP | 2007-258875 A | 10/2007 |
| JP | 2008-99028 A | 4/2008 |
| JP | 2009-164989 A | 7/2009 |
| JP | 2009-171038 A | 7/2009 |
| JP | 2010-16779 A | 1/2010 |
| JP | 2010-88081 A | 4/2010 |
| JP | 2010-141420 A | 6/2010 |
| JP | 2010-252072 A | 11/2010 |
| JP | 2010-258718 A | 11/2010 |

* cited by examiner

DIGITAL BROADCAST RECEIVER

TECHNICAL FIELD

The present invention relates to a digital broadcast receiver.

BACKGROUND ART

Broadcasting is becoming increasingly digital in all countries, but in a receiver that receives a digital broadcast, in order to receive the digital broadcast, it is necessary to execute a channel scan in a pre-assigned digital broadcast frequency band.

As a technique for shortening the time needed for channel scanning in a receiver that receives a digital broadcast, there is the technique described in Patent Reference 1. Patent Reference 1 describes a receiver with a plurality of front ends (tuners and demodulators); in order to complete a channel scan quickly, the frequency band in which the channel scan is to be performed is divided into subbands, and the front ends perform channel scans of the subbands in parallel.

In China, digital broadcasting is carried out by DTMB (Digital Terrestrial Multimedia Broadcast), which provides high-definition programs to fixed receivers, and by CMMB (China Multimedia Mobile Broadcasting) for mobile devices.

In Japan, 12-segment broadcasting to fixed receivers and 1-segment broadcasting to mobile devices are carried out by the ISDB-T (Integrated Services Digital Broadcasting-Terrestrial) system. In ISDB-T, the 12-segment and 1-segment broadcasts are both multiplexed into a signal physical channel. The 12-segment and 1-segment broadcasts can both be received with a single demodulator chip, because the demodulation system is the same for both in ISDB-T.

China's DTMB and CMMB are similar to the 12-segment and 1-segment broadcasts of ISDB-T in that they broadcast to fixed receivers and mobile receivers, but the DTMB and CMMB broadcast protocols and demodulation systems differ. Separate demodulator chips are therefore required for DTMB and CMMB. In addition, the demodulated DTMB stream is in the TS format but the demodulated CMMB stream is in the MF (Multiple Frame) format, so the filtering processes that extract compressed audio data and compressed video data from these streams differ between the two, and the broadcast wave information on the basis of which service lists are generated also differs.

The DTMB and CMMB digital broadcast systems share the same frequency band. DTMB is broadcast on physical channels 13 to 56; CMMB is broadcast on physical channels 13 to 48. The DTMB and CMMB center frequencies corresponding to the same physical channel number are identical. On physical channels identified by the same physical channel number, accordingly, either DTMB or CMMB is broadcast but not both.

First a brief description of DTMB will be given. Within a physical channel there is one TS, in which network and service broadcast wave information, program information, and so on are multiplexed in addition to the actual audio and video service data. PSI and SI are used in DTMB, and the compressed audio and video stream separation methods, the PSI and SI extraction methods, and so on are extremely close to those of the ISDB-T and DVB-T systems. The service list is therefore generated from information extracted in a PSI and SI channel scan, as in ISDB-T.

Next a brief description of CMMB will be given. A plurality of MFs are multiplexed within a physical channel, and the network and service broadcast wave information, program information, and so on differ from the DTMB system. The broadcast wave information is defined as a CIT (Control Information Table) and transmitted in its own MF. In the CIT, the network identifier, network name, transmission frequency, and so on are transmitted in a NIT (Network Information Table). Information relating services to MFs is included in a MCT (Multiple Configuration Table) in the CIT. The receiver extracts the CIT in a channel scan and generates a service list.

The DTMB and CMMB systems thus differ in regard to both front end processing in the tuner and demodulator and back end processing in which demultiplexing and decoding are performed, so it is necessary to provide a separate receiver for receiving each system.

If a receiver is configured to receive both the DTMB and CMMB systems, since the demodulator and demultiplexer for DTMB reception differ systematically from the demodulator and demultiplexer for DTMB reception, they are generally configured separately.

A channel scan must be carried out for the receiver to preset the broadcast services broadcast throughout the band; when a channel scan is carried out with the above general configuration, a DTMB mode and a CMMB mode are provided and the receiver carries out a channel scan of the broadcast protocol corresponding to each mode.

In this regard, since the receiver described in Patent Reference 1 is designed for a single broadcast protocol, when the receiver described in Patent Reference 1 carries out a channel scan of DTMB and CMMB broadcasts, if the DTMB broadcasts are processed by two front ends designed for the DTMB system, the time required for the DTMB channel scan can be reduced to half the time for a channel scan of the entire band with one front end. If the CMMB broadcasts are processed by two front ends designed for the CMMB system, the time required for the CMMB channel scan can also be reduced to half the time for a channel scan of the entire band with one front end.

PRIOR ART REFERENCES

Patent References

Patent Reference 1: Japanese Patent Application Publication No. 2003-233441 (paragraph 0049-0051 and FIG. 1)

SUMMARY OF THE INVENTION

Problems to be Solved by the Invention

Since the receiver described in Patent Reference 1 reduces the time required for a channel scan in a receiver that receives broadcasts in a single broadcast protocol, however, for broadcasts in a plurality of broadcast protocols, it cannot carry out a channel scan efficiently or shorten the time required for a channel scan.

An object of the present invention is therefore to provide a digital broadcast receiver that can carry out a channel scan efficiently and shorten the time needed for a channel scan when receiving broadcasts using a plurality of broadcast protocols.

Means for Solving the Problem

In a digital broadcast receiver for receiving broadcasts in a first broadcast protocol and a second broadcast protocol that use at least partly overlapping frequency bands, a digital broadcast receiver according to the present invention has a first tuner for receiving an electromagnetic wave and generating an electrical signal from the electromagnetic wave, a first demodulator for demodulating the electrical signal obtained from the first tuner and generating a first digital signal conforming to the first broadcast protocol, a first demultiplexer for separating first data including tuning information from the first digital signal, a first controller for controlling the first tuner, first demodulator, and first demultiplexer and executing a channel scan in the first broadcast protocol, a second tuner for receiving an electromagnetic wave and generating an electrical signal from the electromagnetic wave, a second demodulator for demodulating the electrical signal obtained from the second tuner and generating a second digital signal conforming to the second broadcast protocol, a second demultiplexer for separating second data including tuning information from the second digital signal, and a second controller for controlling the second tuner, second demodulator, and second demultiplexer and executing a channel scan in the second broadcast protocol. The first controller and the second controller divide between them a plurality of channels included in the overlapping frequency band of the first broadcast protocol and the second broadcast protocol and execute channel scans in parallel as a first phase channel scan. In the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present. Also in the first phase channel scan, the second controller executes a channel scan in the second broadcast protocol and generates, from information indicating reception status from the second tuner and the second demodulator, a second scan use channel list indicating channels in which a broadcast wave not belonging to the second broadcast protocol is likely to be present. After the first phase channel scan, the first controller executes a channel scan in the first broadcast protocol on the channels indicated in the second scan use channel list, and the second controller executes a channel scan in the second broadcast protocol on the channels indicated in the first scan use channel list.

Effects of the Invention

According to the present invention, in reception of broadcasts using a plurality of broadcast protocols, channel scans can be carried out efficiently and the time needed for channel scanning can be shortened.

MODE FOR CARRYING OUT THE INVENTION

First Embodiment

Figure 1:
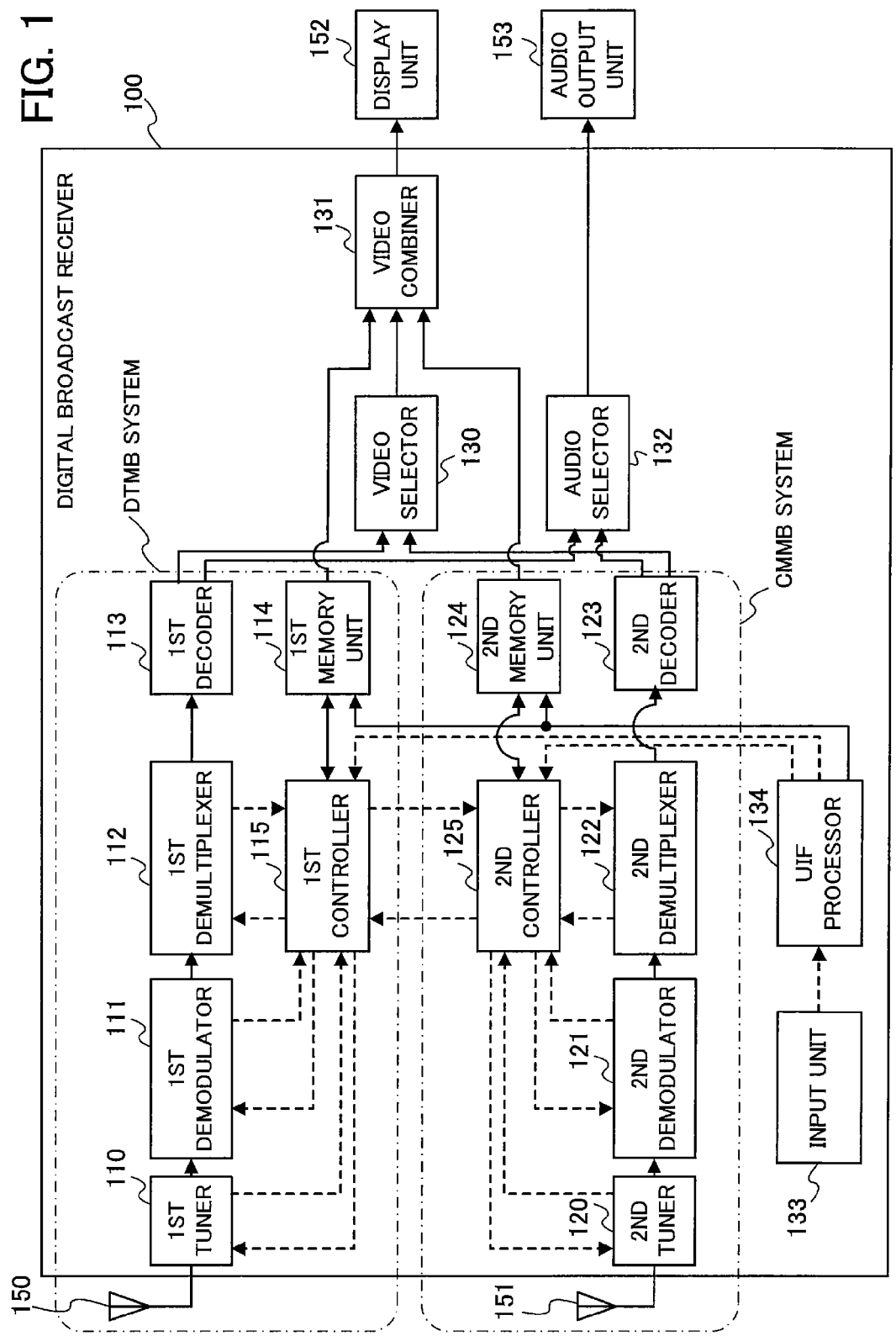
FIG. 1 is a block diagram schematically showing the configuration of a digital broadcast receiver according to a first embodiment.

FIG. 1 is a block diagram schematically showing the configuration of a digital broadcast receiver 100 according to the first embodiment. As shown in f1, the digital broadcast receiver 100 comprises a first tuner 110, a first demodulator 111, a first demultiplexer 112, a first decoder 113, a first memory unit 114, a first controller 115, a second tuner 120, a second demodulator 121, a second demultiplexer 122, a second decoder 123, a second memory unit 124, a second controller 125, a video selector 130, a video combiner 131, an audio selector 132, an input unit 133, and a user interface processor (referred to below as a UIF processor) 134. A first antenna 150 is connected to the first tuner 110. The first antenna 150, first tuner 110, first demodulator 111, first demultiplexer 112, first decoder 113, first memory unit 114, and first controller 115 form a DTMB section for receiving DTMB broadcasts, DTMB being the first broadcast protocol. A second antenna 151 is connected to the second tuner 120. The second antenna 151, second tuner 120, second demodulator 121, second demultiplexer 122, second decoder 123, second memory unit 124, and second controller 125 form a CMMB section for receiving CMMB broadcasts, CMMB being the second broadcast protocol.

The first tuner 110 receives an electromagnetic wave through the first antenna 150, generates an electrical signal from the electromagnetic wave, and sends the signal to the first demodulator 111. In a channel scan, the first tuner 110 tunes to the frequency of a physical channel designated in a command given by the first controller 115, determines the received level of the electromagnetic wave received in the physical channel, and notifies the first controller 115 of its determination.

The first demodulator 111 demodulates the electrical signal received from the first tuner 110, generates a first digital signal, and sends this signal to the first demultiplexer 112. The format of the first digital signal depends on the broadcast protocol. Here, the first demodulator 111 outputs a DTMB TS as the first digital signal. In a channel scan, the first demodulator 111 demodulates the electrical signal supplied from the first tuner 110 and notifies the first controller 115 whether frame lock has been achieved.

The receiver may have a plurality of first antennas 150, and the first tuner 110 and first demodulator 111 may perform diversity processing on the electromagnetic waves received through the antennas and output a single TS.

The first demultiplexer 112 separates the compressed video data and compressed audio data of a specified service from the demodulated first digital signal and supplies the separated data to the first decoder 113. The first demultiplexer 112 also separates first data including tuning information from the demodulated first digital signal and supplies the separated data to the first controller 115. The first demultiplexer 112 here separates PSI and SI as first data by filtering and supplies them to the first controller 115.

The first decoder 113 decodes the compressed video data and compressed audio data obtained from the first demultiplexer 112. The first decoder 113 supplies the decoded video signal to the video selector 130 and the decoded audio signal to the audio selector 132.

The first memory unit 114 stores information needed to scan the channels in the first broadcast protocol and the second broadcast protocol and information needed to receive services broadcast in the first broadcast protocol.

Figure 2:
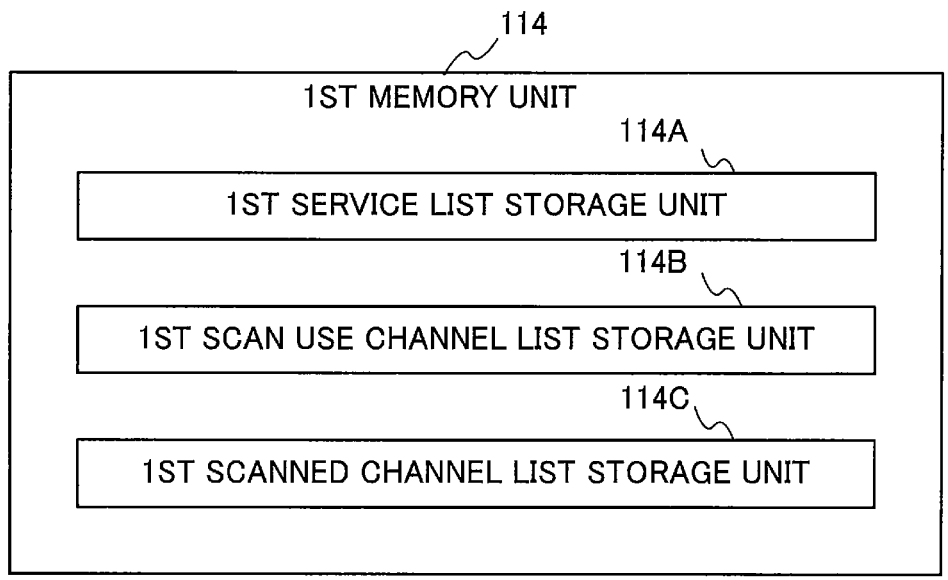
FIG. 2 is a block diagram schematically showing the configuration of the first memory unit in the first embodiment.

FIG. 2 is a block diagram schematically showing the configuration of the first memory unit 114. As shown in FIG. 2, the first memory unit 114 includes a first service list storage unit 114A, a first scan use channel list storage unit 114B, and a first scanned channel list storage unit 114C.

The first service list storage unit 114A stores a list of tuning information needed to receive services broadcast in the first broadcast protocol. For example, the first service list storage unit 114A stores a first service list of tuning information on a channel basis, including network information, TS information, and service information extracted by the first controller 115.

The first scan use channel list storage unit 114B stores a first scan use channel list which lists identification information (channel numbers, here) for identifying physical channels in which the received level of the electromagnetic wave received by the first tuner 110 in a channel scan is higher than a predetermined threshold but the electrical signal generated from the electromagnetic wave cannot be demodulated (frame lock is not achieved) by the first demodulator 111. For example, the first scan use channel list includes the channel numbers of physical channels in which, when a DTMB channel scan was executed, DTMB being the first broadcast protocol, the received level of the electromagnetic wave received in the physical channel was higher than a second threshold, the second threshold being the lowest received level at which stable viewing of a CMMB service is possible, CMMB being the second broadcast protocol, and the electrical signal generated from the electromagnetic wave could not be demodulated by the first demodulator 111.

The second threshold (B) is a value obtained by using the following formula (1).

$$B \text{ [dBm]} = C/N \text{ [dB]} + 10 \log(kTW) + \text{receiver noise figure [dB]} \quad (1)$$

In this formula (1), $10 \log(kTW)$ is a thermal noise index, k is the Boltzmann constant ($=1.38 \times 10^{-23}$ [JK$^{-1}$]), T is the measurement temperature (=300 [K]), W is the noise bandwidth (=8 [MHz]), and the base of the logarithm is 10.

If the bit error rate after the decoding of the inner code, which is an LDPC code, is not higher than $3 \times 10^{-6}$, a quasi-error-free state is generated after the decoding of the outer code, which is a Reed-Solomon code, and stable viewing of CMMB service becomes possible. The C/N (required C/N) here depends on the modulation method by which the CMMB service is transmitted and the LDPC coding rate. For example, in formula (1) C/N is:

2.7 dB when the CMMB modulation method is QPSK and the LDPC coding rate is 1/2;

5.1 dB when the CMMB modulation method is QPSK and the LDPC coding rate is 3/4;

8.6 dB when the CMMB modulation method is 16QAM and the LDPC coding rate is 1/2; and 12 dB when the CMMB modulation method is 16QAM and the LDPC coding rate is 3/4.

The receiver noise figure (NF) is a value obtained by using the formula (2) below.

$$NF = 10 \log(S_i/N_i) - 10 \log(S_o/N_o) \quad (2)$$

In formula (2), $S_i$ is the power level of the signal input to the first antenna 150, $N_i$ is the power level of noise input to the first antenna 150, $S_o$ is the power level of the signal output from the first demodulator 111, $N_o$ is the power level of noise output from the first demodulator 111, and the base of the logarithm is 10.

Since the value obtained by formula (1) depends on the modulation method by which the CMMB service is transmitted and the coding rate, it is preferable to use, as the second threshold, the lowest of the values calculated from the various combinations of the modulation method by which the CMMB service may be transmitted and the coding rate.

In GY/T220.7, which specifies technical requirements for CMMB reception terminals, the receiving sensitivity requirements are specified as follows:

When the BPSK modulation method is used with an LDPC coding rate of 1/2, the minimum receiving level of the received power should be −98 dBm;

When the BPSK modulation method is with an LDPC coding rate of 3/4, the minimum receiving level of the received power should be −96 dBm;

When the QPSK modulation method is used with an LDPC coding rate of 1/2, the minimum receiving level of the received power should be −95 dBm;

When the QPSK modulation method is used with an LDPC coding rate of 3/4, the minimum receiving level of the received power should be −92 dBm;

When the 16QAM modulation method is used with an LDPC coding rate of 1/2, the minimum receiving level of the received power should be −90 dBm;

When the 16QAM modulation method is used with an LDPC coding rate of 3/4, the minimum receiving level of the received power should be −86 dBm.

Therefore, a value selected from these minimum receiving levels may be used as the second threshold. For example, the second threshold may be −98 dBm, which is the lowest among the minimum receiving levels. Alternatively, since the combinations generally used for MFs carrying CMMB services are the QPSK modulation method with an LDPC coding rate of 1/2 and the 16QAM modulation method with an LDPC coding rate of 1/2, the second threshold may be −95 dBm, which is lower than the minimum receiving levels corresponding to these general combinations.

As described above, the second threshold is the value calculated by the formula (1) or a value selected from the minimum received signal power levels specified in the standard, and indicates the minimum received power level required to receive a service in the second broadcast protocol.

The first scanned channel list storage unit 114C stores a first scanned channel list listing identification information (channel numbers, in this case) for identifying physical channels which have already been scanned by the first tuner 110, first demodulator 111, first demultiplexer 112, and first controller 115.

Referring again to FIG. 1, the first controller 115 controls the processing for scanning channels in the first broadcast protocol and the processing for receiving broadcasts in the first broadcast protocol. For example, the first controller 115 may execute DTMB channel scans in a first phase, a second phase, and a third phase. In the first-phase DTMB channel scan, the first controller 115 executes a channel scan in a predetermined first order on physical channels that have not yet been scanned by the second controller 125, among the physical channels included in the range of overlap of the frequency band used by (assigned to) broadcasts in the first broadcast protocol and the frequency band used by broadcasts in the second broadcast protocol. In the second-phase DTMB channel scan, the first controller 115 scans physical channels in which an electromagnetic wave was received with the power required by the second controller 125 but demodulation was impossible in the second broadcast protocol. In the third-phase DTMB channel scan, the first controller 115 scans physical channels included in the frequency band used in broadcasts of the first broadcast protocol but not included in the range of overlap of the frequency band used for broadcasts in the first broadcast protocol and the frequency band used for broadcasts in the second broadcast protocol.

The first controller 115 extracts tuning information from first data (PSI and SI) obtained from the first demultiplexer 112 and adds the extracted tuning information to a first service list stored in the first service list storage unit 114A of the first memory unit 114. For example, the first controller 115 extracts network information, including a network identification value (Network_ID) and the transmitting frequencies of the parent stations and relay stations included in the network, from the NIT. The first controller 115 also extracts TS information, including a TS identification value TS_ID (Transport_Stream_ID), from the NIT and PAT (Program Association Table). The first controller 115 further extracts a service identification value SVC_ID (Service_ID) from the SDT (Service Description Table), as information about the services multiplexed in the TS. The network information, TS information, and service information are tuning information needed to select a service and are extracted from the first digital signal in each physical channel in a channel scan.

The second tuner 120 receives an electromagnetic wave through the second antenna 151, generates an electrical signal, and sends the signal to the second demodulator 121. The second tuner 120 tunes to the frequency of the physical channel specified in a command obtained from the second controller 125 in a channel scan and notifies the second controller 125 of a decision on the received level of the electromagnetic wave received in the physical channel.

The second demodulator 121 performs demodulation and error correction on the electrical signal obtained from the second tuner 120, generates a second digital signal, and sends the signal to the second demultiplexer 122. The format of the second digital signal depends on the broadcast protocol. The second demodulator 121 here outputs the second digital signal in the CMMB MF format. In a channel scan, the second demodulator 121 demodulates the electrical signal supplied from the second tuner 120 and notifies the second controller 125 whether frame lock has been achieved.

A plurality of second antennas 151 may be included, and the second tuner 120 and second demodulator 121 may perform diversity processing on the electromagnetic waves received through the antennas and output a single MF stream.

The second demultiplexer 122 separates the compressed video data and compressed audio data of a specified service from the demodulated second digital signal and supplies the data to the second decoder 123. The second demultiplexer 122 also separates second data including tuning information from the demodulated second digital signal and supplies the separated second data to the second controller 125. The second demultiplexer 122 here separates the CIT as the second data and supplies it to the second controller 125.

The second decoder 123 decodes the compressed video data and compressed audio data obtained from the second demultiplexer 122. The second decoder 123 supplies the decoded video signal to the video selector 130 and the decoded audio signal to the audio selector 132.

The second memory unit 124 stores information needed to scan channels in the second broadcast protocol and the first broadcast protocol and information needed to receive services broadcast in the second broadcast protocol.

Figure 3:
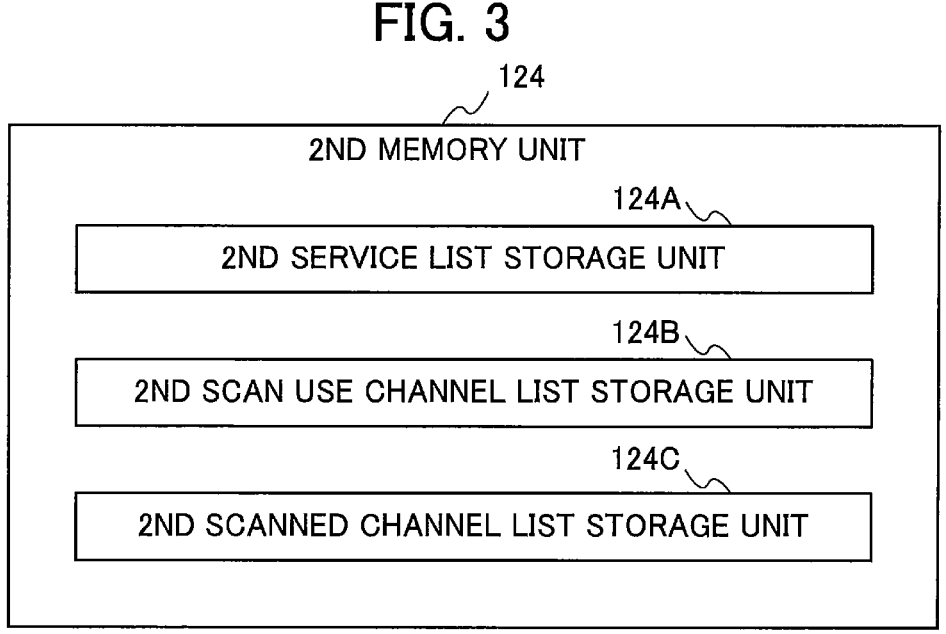
FIG. 3 is a block diagram schematically showing the configuration of the second memory unit in the first embodiment.

FIG. 3 is a block diagram schematically showing the configuration of the second memory unit 124. As shown in FIG. 3, the second memory unit 124 includes a second service list storage unit 124A, a second scan use channel list storage unit 124B, and a second scanned channel list storage unit 124C.

The second service list storage unit 124A stores a list of tuning information needed to receive services broadcast in the second broadcast protocol. For example, the second service list storage unit 124A stores a second service list of tuning information, including network information, MF information, and service information extracted by the second controller 125 for each channel.

The second scan use channel list storage unit 124B stores a second scan use channel list which lists identification information (channel numbers, here) for identifying physical channels in which the received level of the electromagnetic wave received by the second tuner 120 in a channel scan is higher than a predetermined threshold, but the electrical signal generated from the electromagnetic wave cannot be demodulated (frame lock is not achieved) by the second demodulator 121. For example, the second scan use channel list includes the channel numbers of physical channels for which the received level of the electromagnetic wave received in a physical channel on which a CMMB channel scan was executed, CMMB being the second broadcast protocol, is higher than a first threshold, which is the lowest received level at which stable viewing of a DTMB service is possible, DTMB being the first broadcast protocol, and the electrical signal generated from the electromagnetic wave cannot be demodulated by the second demodulator 121.

The first threshold (A) is a value obtained by using the following formula (3).

$$A \text{ [dBm]} = C/N \text{ [dB]} + 10\log(kTW) + \text{receiver noise figure [dB]} \quad (3)$$

In this formula (3), $10\log(kTW)$ is a thermal noise index, k is the Boltzmann constant ($=1.38\times10^{-23}$ [JK$^{-1}$]), T is the measurement temperature ($=300$ [K]), and W is the noise bandwidth ($=7.56$ [MHz]).

C/N is the C/N (necessary C/N), with respect to the bit error rate after decoding of the inner code (LDPC code), at which a quasi-error-free state can be generated after decoding of outer code (BCH code). This value depends on the modulation method and the LDPC coding rate.

The receiver noise figure is calculated by using formula (2). Here, $S_i$ is the power level of the signal input to the second antenna 151, $N_i$ is the noise level in the input to the second antenna 151, $S_o$ is the power level of the signal output from the second demodulator 121, $N_o$ is the noise power level in the output from the second demodulator 121, and the base of the logarithm is 10.

Since the value obtained by formula (3) depends on the modulation method with which the DTMB service is transmitted and the coding rate, it is preferable to use, as the first threshold, the lowest of the values calculated for the combinations of the modulation method with which the DTMB service is transmitted and the coding rate.

The first threshold may also be a value selected from the minimum receiving levels of the received power specified for the operation modes (transmission modes) in the DTMB standard. For example, the lowest value of the minimum receiving levels may be used as the first threshold. Alternatively, the lowest value of the minimum receiving levels specified for the modulation methods (such as 4QAM, 16QAM, 32QAM, or 64QAM) used in actual broadcasts may be used as the first threshold. The operation mode (transmission mode) here is determined by, for example, the combination of the number of carriers, forward error correction header bit rate, frame header mode, code cross interleaving option, and band.

As described above, the first threshold is a value calculated by formula (3) or a value selected from the minimum receiving levels of the received power specified by the standard, and indicates the minimum received power required to receive services in the first broadcast protocol.

The second scanned channel list storage unit 124C stores a second scanned channel list listing identification information (channel numbers, here) for identifying physical channels which have already been scanned by the second tuner 120, second demodulator 121, second demultiplexer 122, and second controller 125.

Referring again to FIG. 1, the second controller 125 controls the processing for scanning channels in the second broadcast protocol and the processing for receiving broadcasts in the second broadcast protocol. For example, the second controller 125 may execute a CMMB channel scan in the first phase and a CMMB channel scan in the second phase. In the first-phase CMMB channel scan, the second controller 125 executes a channel scan in a predetermined second order on physical channels that have not yet been scanned by the first controller 115, among the physical channels included in the range of overlap of the frequency band used by broadcasts in the first broadcast protocol and the frequency band used in broadcasts in the second broadcast protocol. The second order is the reverse of the first order used by the first controller 115 in controlling the channel scan. In the second-phase CMMB channel scan, the second controller 125 scans physical channels in which the first controller 115 decided that demodulation in the first broadcast protocol was impossible even though the received power requirement was met.

The second controller 125 extracts tuning information from the CIT obtained from the second demultiplexer 122 and adds the extracted tuning information to a second service list stored in the second service list storage unit 124A of the second memory unit 124. For example, the second controller 125 extracts a network identification value (Network_ID), the transmitting frequencies of parent stations and relay stations included in the network, and so on as network information from the NIT. The second controller 125 also extracts an MF identification value MF_ID (Multiple_Frame_ID) as MF information from an MCT (Multiplex_Configuration_Table). The second controller 125 further extracts a service identification value SVC_ID (Service_ID) from the MCT, as information about the services multiplexed in the MF. The network information, MF information, and service information are tuning information needed to select a service and are extracted from the second digital signal in each physical channel in a channel scan.

When a service broadcast in the DTMB system is viewed, the video selector 130 selects video signals from the first decoder 113 and outputs them to the video combiner 131. When a service broadcast in the CMMB system is viewed, the video selector 130 selects video signals from the second decoder 123 and outputs them to the video combiner 131. The video selector 130 switches the video signals to be selected in accordance with a command from the UIF processor 134, for example.

The video combiner 131 combines the video image on the screen indicated by a first service list screen signal or a second service list screen signal supplied from the UIF processor 134 with the video image of the video signal supplied from the video selector 130 and outputs a combined video signal to the display unit 152. The video combiner 131 may output the video signal of the screen indicated by the first service list screen signal or the second service list screen signal supplied from the UIF processor 134, instead of the video signal supplied from the video selector 130, to the display unit 152. If neither the first service list screen signal nor the second service list screen signal is supplied from the UIF processor 134, the video combiner 131 outputs the video signal supplied from the video selector 130 to the display unit 152.

When a service broadcast in the DTMB system is viewed, the audio selector 132 selects audio signals from the first decoder 113 and outputs them to the audio output unit 153. When a service broadcast in the CMMB system is viewed, the audio selector 132 selects audio signals from the second decoder 123 and outputs them to the audio output unit 153.

The input unit 133 receives input of commands from the user and outputs operation signals corresponding to the commands input from the user. The input unit 133 can be implemented by a remote controller, for example.

The UIF processor 134 receives operation signals from the input unit 133 and gives instructions corresponding to the operation signals to the components of the digital broadcast receiver 100. If an operation signal to display a first service list screen is received from the input unit 133, the UIF processor 134 obtains the first service list stored in the first service list storage unit 114A and generates a screen signal for the first service list screen from the obtained list. The UIF processor 134 then passes the generated screen signal through the first memory unit 114 to the video combiner 131. If an operation signal to display a second service list screen is received from the input unit 133, the UIF processor 134 obtains the second service list stored in the second service list storage unit 124A and generates a screen signal for the second service list screen from the obtained list. The UIF processor 134 then passes the generated screen signal through the second memory unit 124 to the video combiner 131.

The display unit 152 displays video based on the video signal obtained from the video combiner 131. The audio output unit 153 outputs audio based on the audio signal obtained from the audio selector 132.

The operation of the digital broadcast receiver 100 in the first embodiment in a channel scan will next be described in detail. When the digital broadcast receiver 100 is initialized, when the broadcast configuration changes, or when the receiver is mounted on a mobile device and moves from one service area to another service area, the digital broadcast receiver 100 in the first embodiment performs a channel scan and generates digital broadcast service lists for the DTMB and CMMB broadcast protocols.

Figure 4:
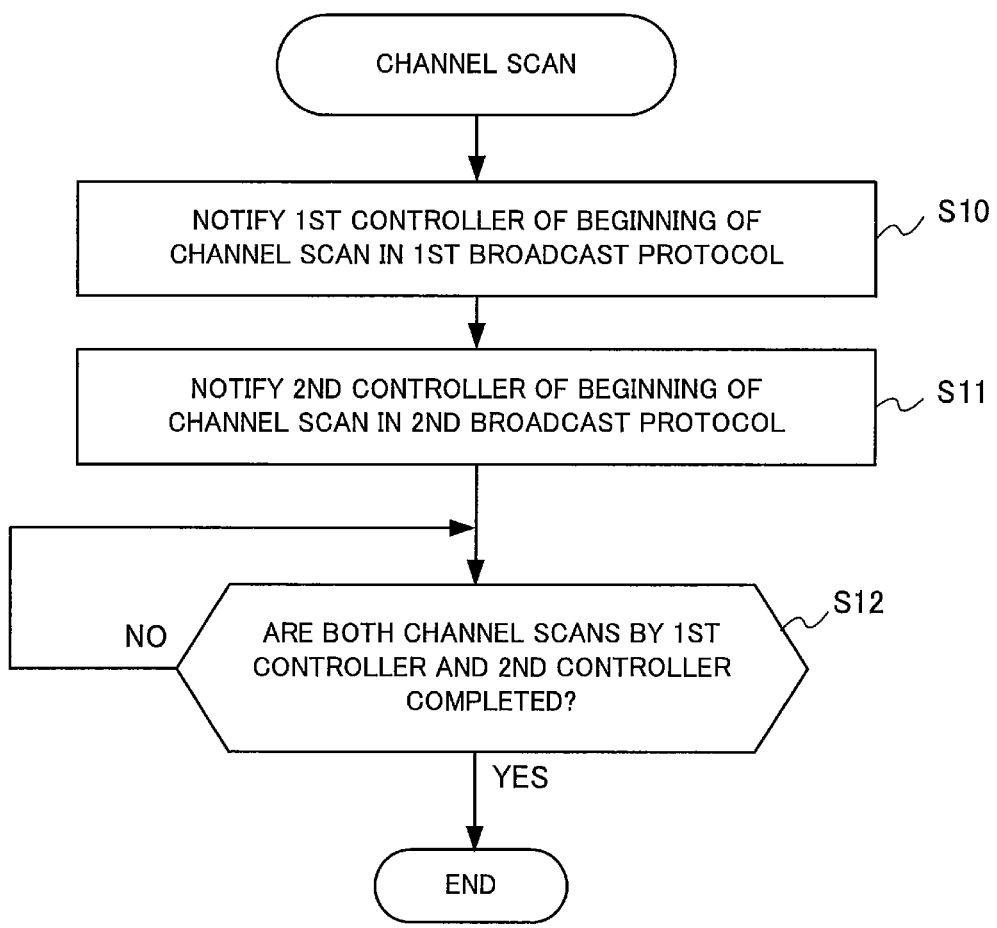
FIG. 4 is a flowchart illustrating processing performed by the UIF processor in the first embodiment when a channel scan is selected by a user operation.

FIG. 4 is a flowchart illustrating processing performed by the UIF processor 134 when a channel scan is selected by a user operation.

When an operation signal indicating a channel scan request is received from the input unit 133, the UIF processor 134 notifies the first controller 115 of the beginning of a channel scan in the first broadcast protocol (step S10).

The UIF processor 134 then notifies the second controller 125 of the beginning of a channel scan in the second broadcast protocol (step S11).

When the first controller 115 and second controller 125 are notified of the beginning of channel scans as described above, a DTMB channel scan controlled by the first controller 115 and a CMMB channel scan controlled by the second controller 125 are performed in parallel.

The UIF processor 134 waits until it receives notifications of the completion of both the channel scan by the first controller 115 and the channel scan by the second controller 125 (step S12). When the UIF processor 134 receives these notifications (YES in step S12), the processing ends. At the end of the processing, the UIF processor 134 may generate a video signal for a notification screen indicating the end of the channel scan processing, output the signal through the video combiner 131 to the display unit 152, and have the display unit 152 display the screen.

In FIG. 4, the second controller 125 is notified of the beginning of the channel scan (step S11) after the first controller 115 is notified of the beginning of the channel scan (step S10), but this order may be reversed.

Figure 5:
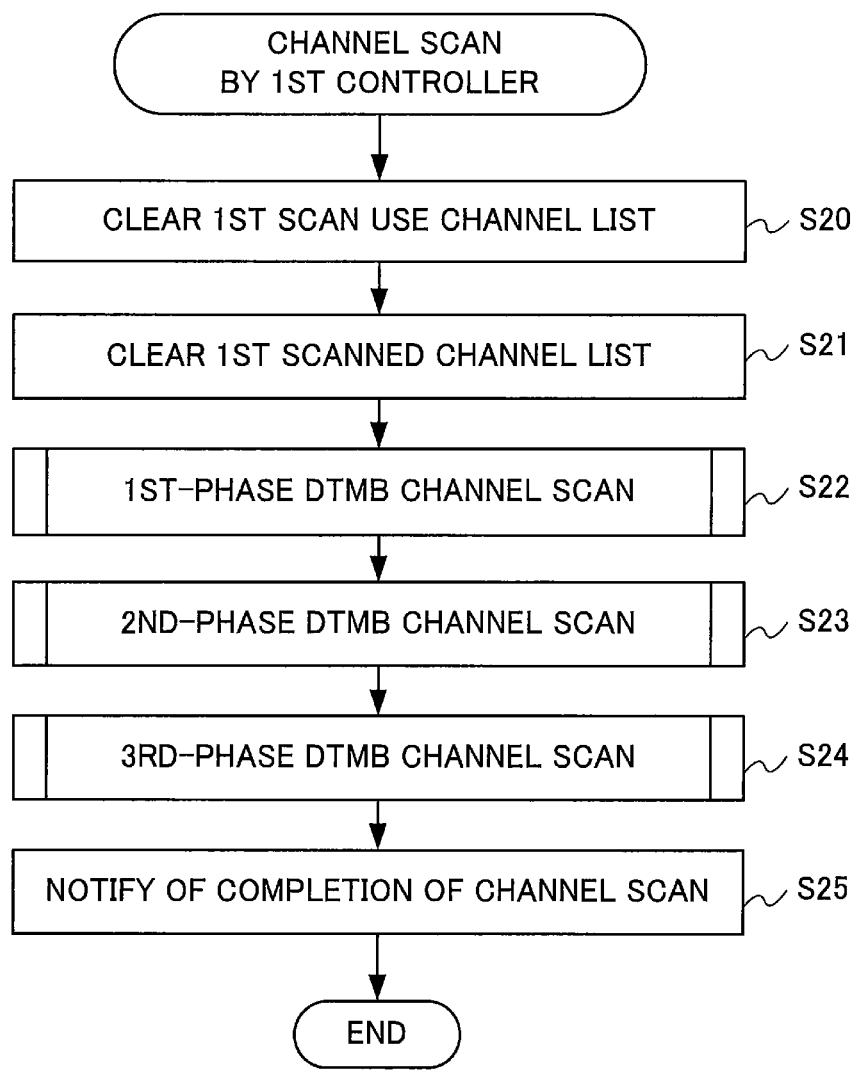
FIG. 5 is a flowchart illustrating channel scan processing performed by the first controller in the first embodiment.

FIG. 5 is a flowchart illustrating channel scan processing performed by the first controller 115. The first controller 115 starts the processing illustrated by the flowchart in FIG. 5 when it is notified of the beginning of the channel scan by the UIF processor 134, for example.

The first controller 115 clears (initializes) the first scan use channel list stored in the first scan use channel list storage unit 114B of the first memory unit 114 (step S20). For example, the first controller 115 erases all the channel numbers of physical channels stored in the first scan use channel list.

The first controller 115 then clears the first scanned channel list stored in the first scanned channel list storage unit 114C of the first memory unit 114 (step S21). For example, the first controller 115 erases all the channel numbers of physical channels stored in the first scanned channel list.

Figure 7:
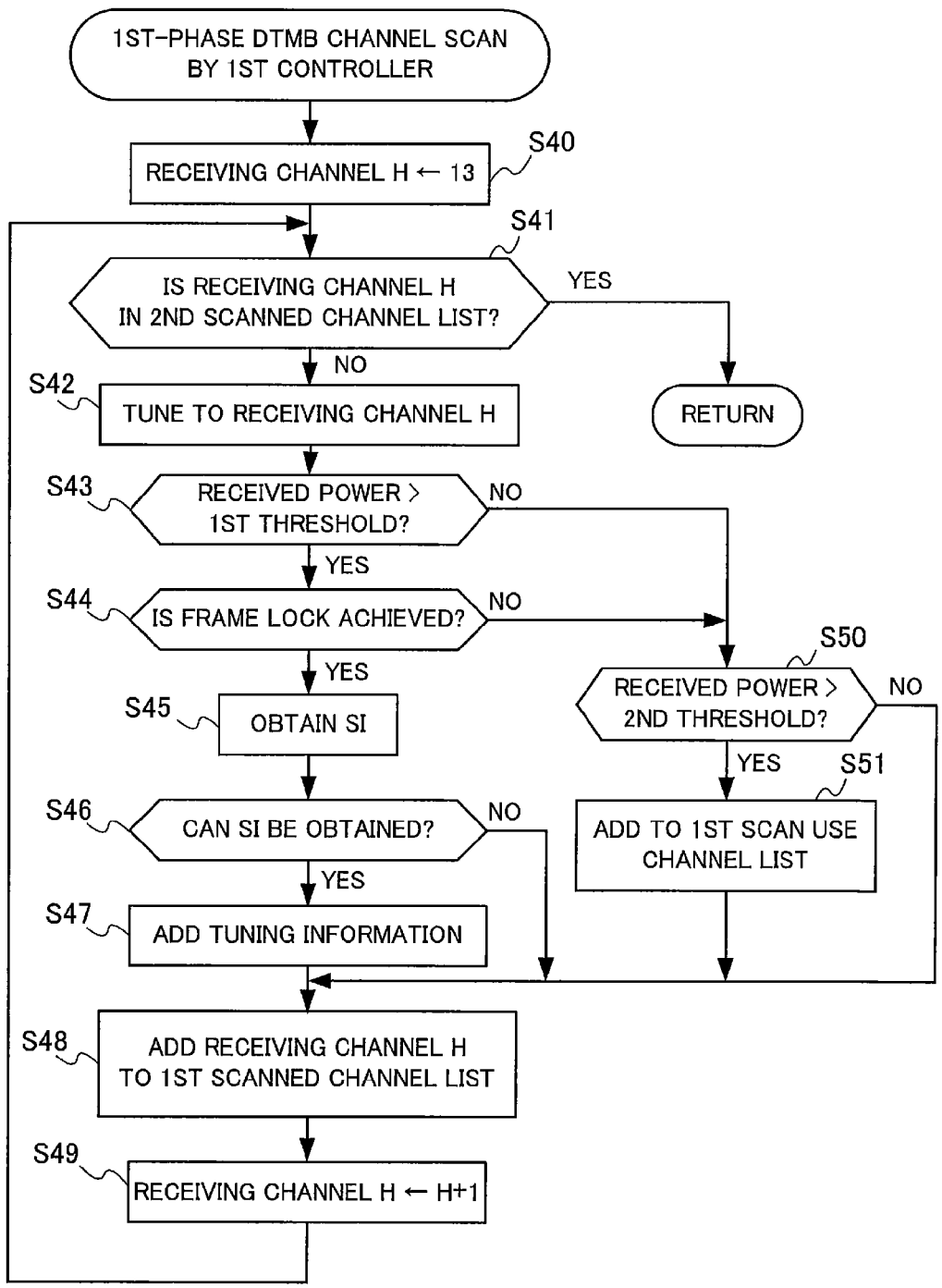
FIG. 7 is a flowchart illustrating a first-phase DTMB channel scan subroutine performed by the first controller in the first embodiment.

The first controller 115 then executes a first-phase DTMB channel scan (step S22). Details of this subroutine are illustrated in FIG. 7. The first controller 115 here scans the physical channels included in the range of overlap of the frequency band assigned to DTMB and the frequency band assigned to CMMB in ascending order, starting from the lowest channel number '13'. The first-phase DTMB channel scan ends when the physical channel selected for the next channel scan has already been scanned by the second controller 125.

Figure 9:
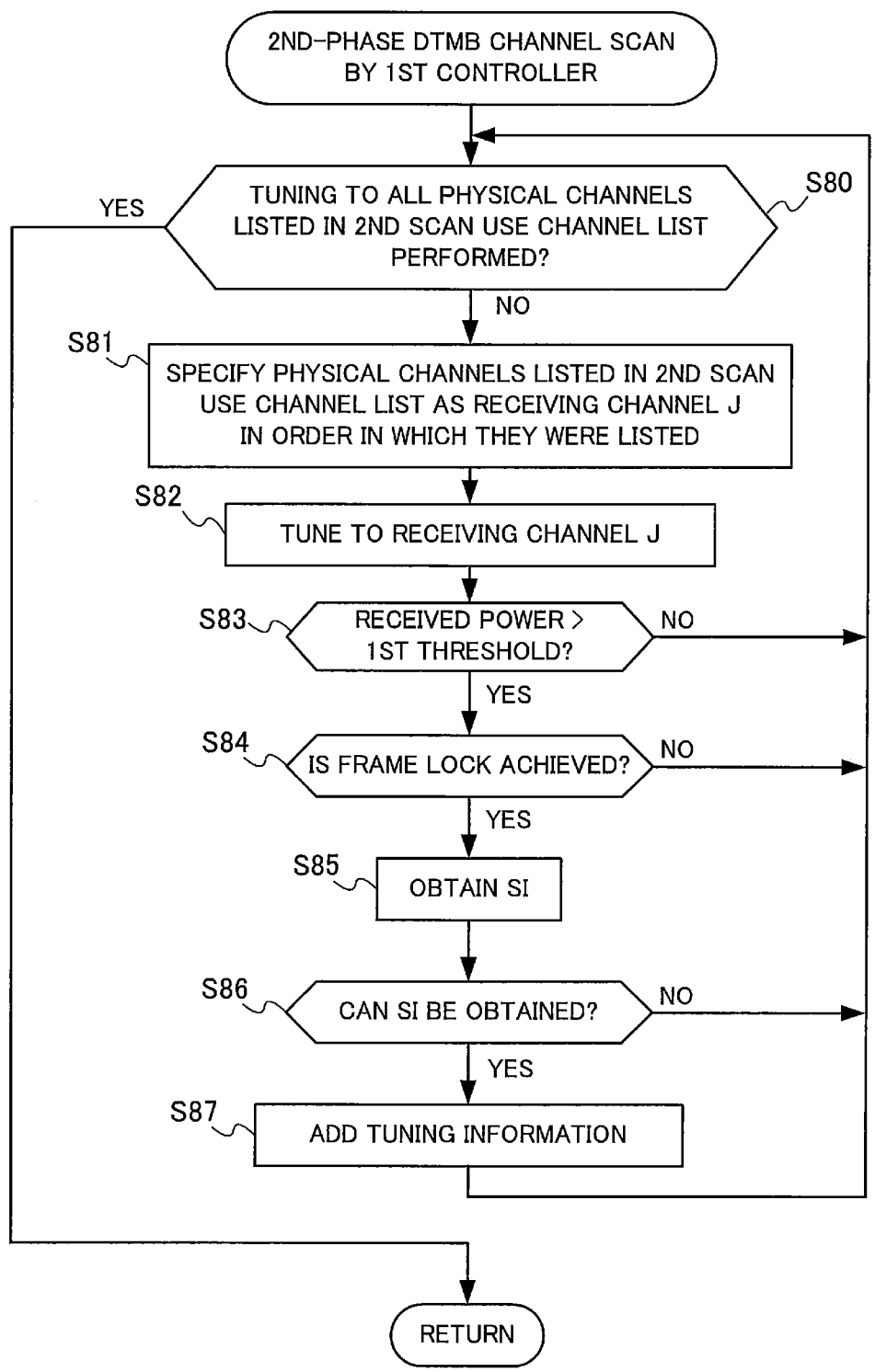
FIG. 9 is a flowchart illustrating a second-phase DTMB channel scan subroutine performed by the first controller in the first embodiment.

The first controller 115 then executes the second-phase DTMB channel scan (step S23). Details of this subroutine are illustrated in FIG. 9. The first controller 115 here scans the physical channels with channel numbers included in the second scan use channel list obtained from the second controller 125.

Figure 11:
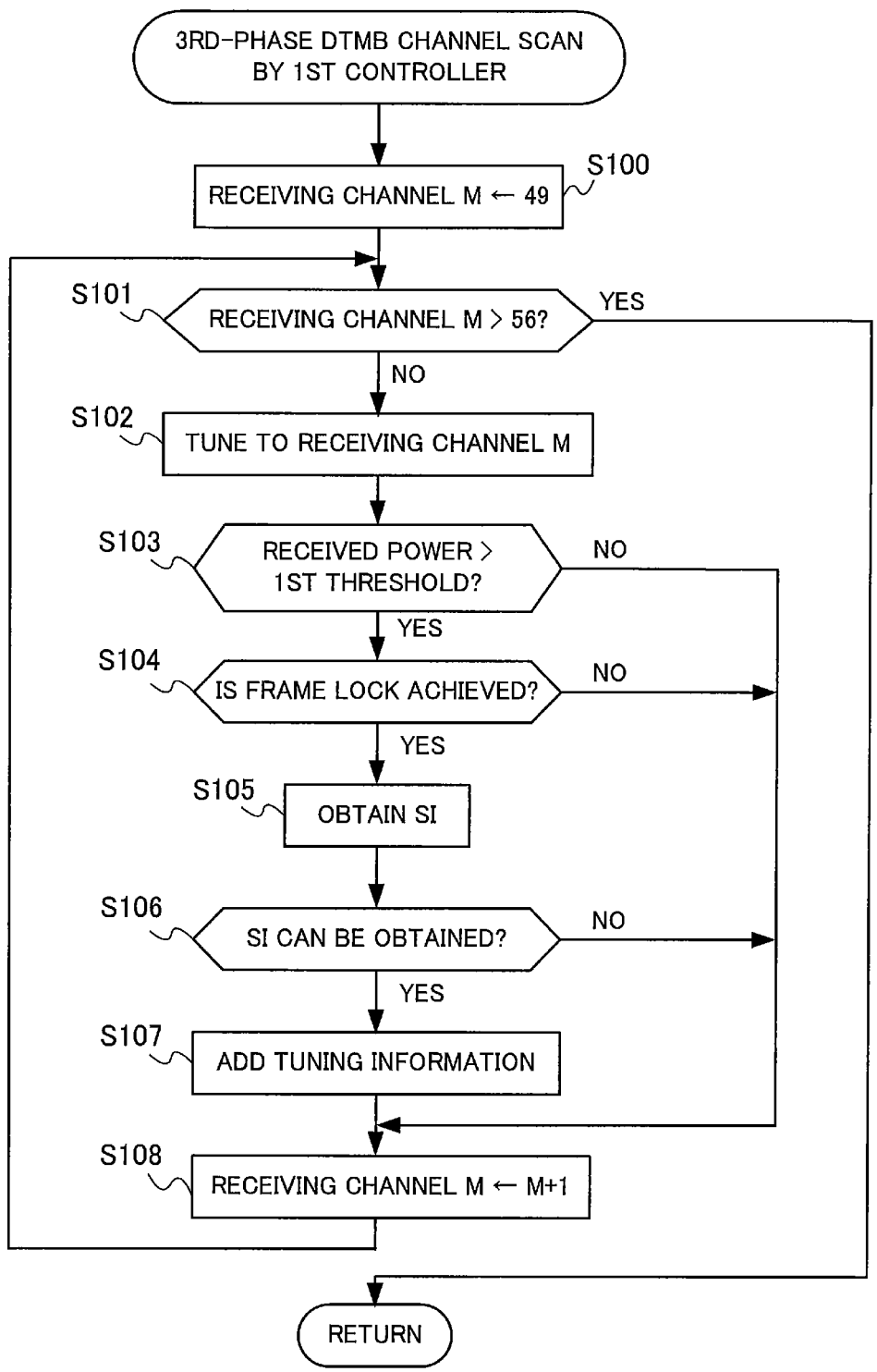
FIG. 11 is a flowchart illustrating a third-phase DTMB channel scan subroutine performed by the first controller in the first embodiment.

The first controller 115 then executes a third-phase DTMB channel scan (step S24). Details of this subroutine are illustrated in FIG. 11. The first controller 115 here scans the physical channels included in the part of the frequency band assigned to DTMB that does not overlap the frequency band assigned to CMMB.

When the third-phase DTMB channel scan ends, the first controller 115 notifies the UIF processor 134 of the completion of the channel scan (step S25).

Figure 6:
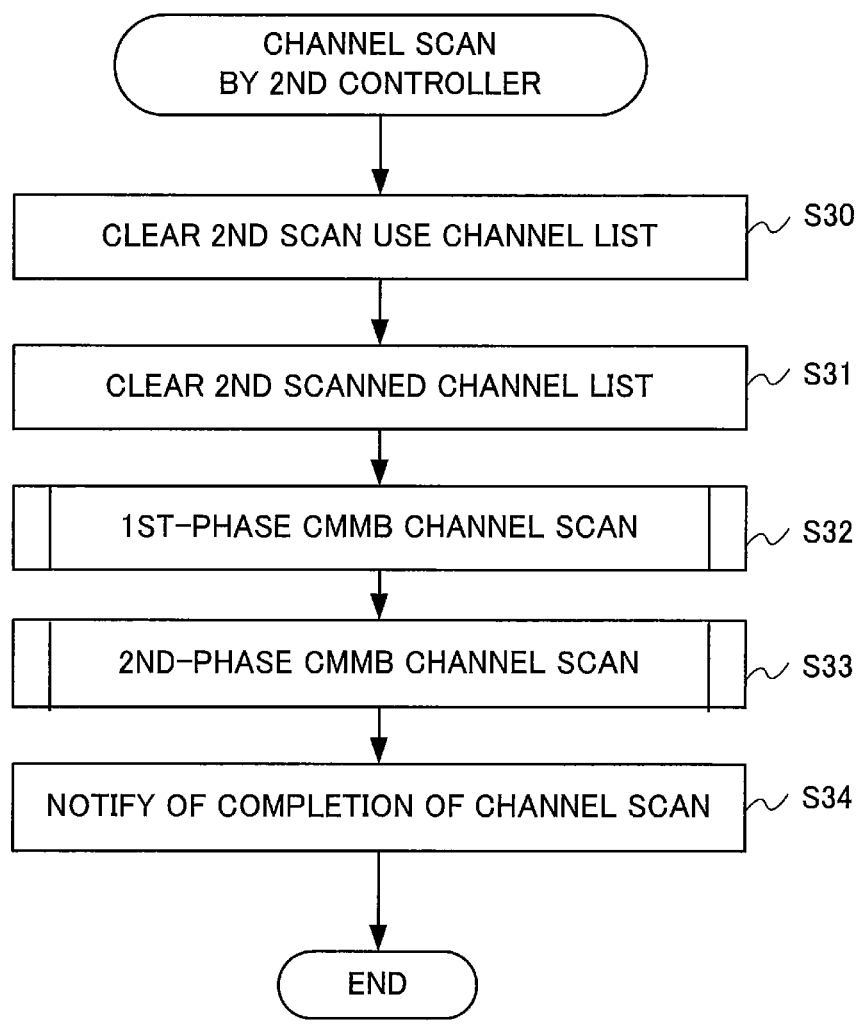
FIG. 6 is a flowchart illustrating channel scan processing performed by the second controller in the first embodiment.

FIG. 6 is a flowchart illustrating channel scan processing performed by the second controller 125. The second controller 125 starts the processing illustrated by the flowchart in FIG. 6 when it receives a notification of the beginning of a channel scan from the UIF processor 134, for example.

The second controller 125 clears the second scan use channel list stored in the second scan use channel list storage unit 124B of the second memory unit 124 (step S30). For example, the second controller 125 here erases all the channel numbers of the physical channels stored in the second scan use channel list.

The second controller 125 then clears the second scanned channel list stored in the second scanned channel list storage unit 124C of the second memory unit 124 (step S31). For example, the second controller 125 here erases all the channel numbers of the physical channels stored in the second scanned channel list.

Figure 8:
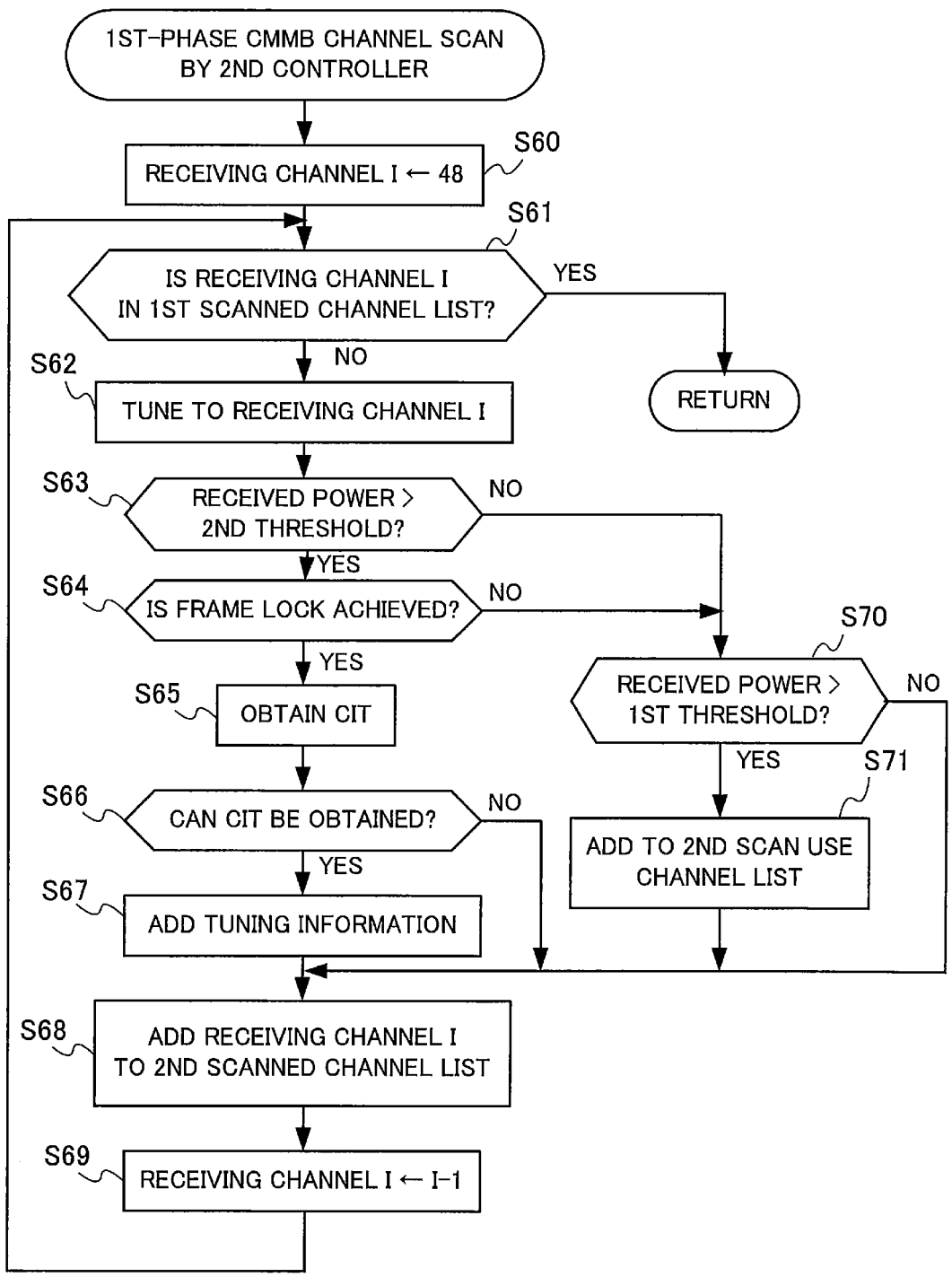
FIG. 8 is a flowchart illustrating a first-phase CMMB channel scan subroutine performed by the second controller in the first embodiment.

The second controller 125 then executes the first-phase CMMB channel scan (step S32). Details of this subroutine are illustrated in FIG. 8. The second controller 125 here scans physical channels included in the range of overlap of the frequency band assigned to DTMB and the frequency band assigned to CMMB in descending order, starting from the highest physical channel number '48'. The first-phase CMMB channel scan ends when the physical channel selected for the next channel scan has already been scanned by the first controller 115.

Figure 10:
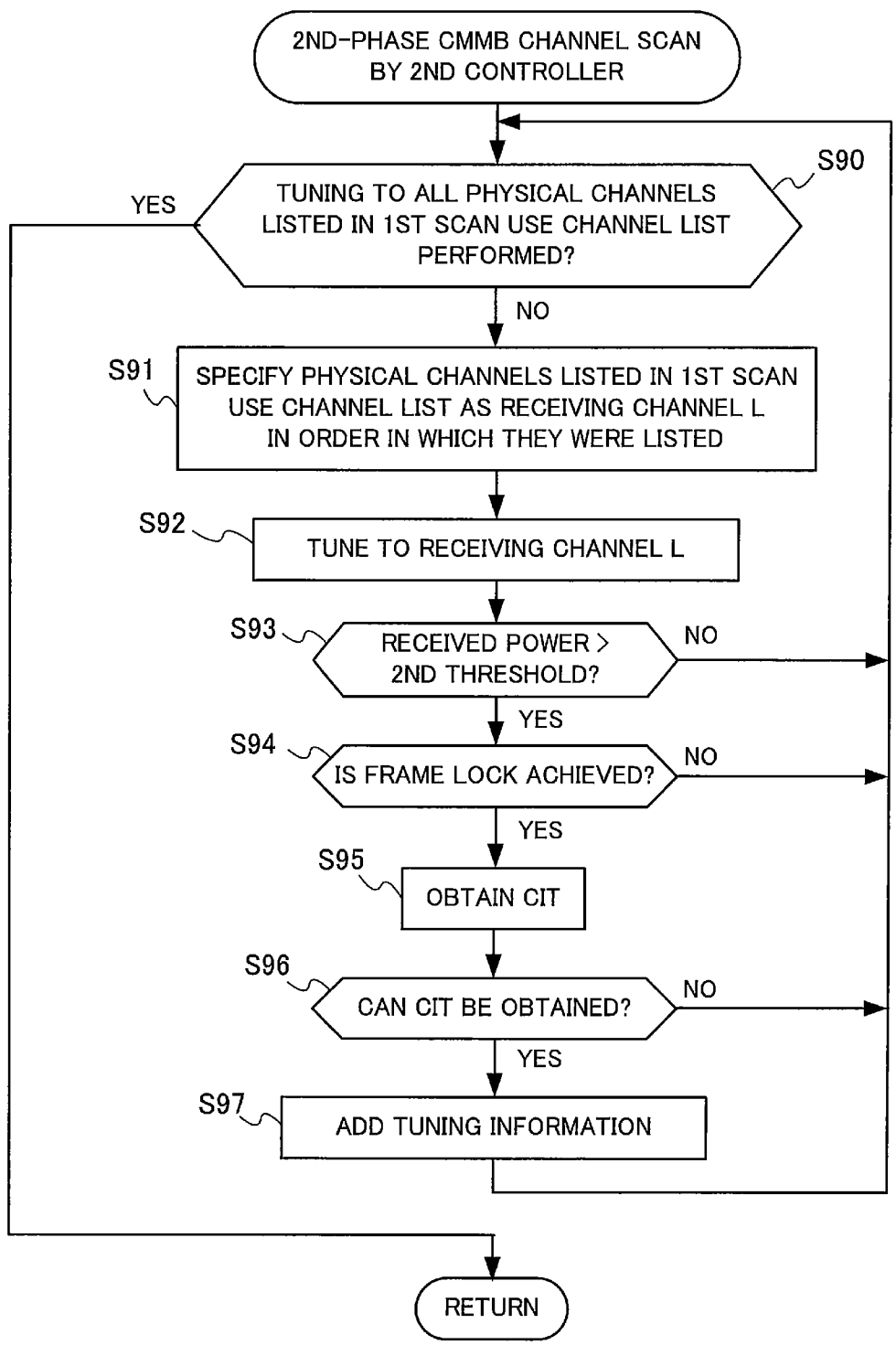
FIG. 10 is a flowchart illustrating a second-phase CMMB channel scan subroutine performed by the second controller in the first embodiment.

The second controller 125 then executes the second-phase CMMB channel scan (step S33). Details of this subroutine are illustrated in FIG. 10. The second controller 125 here scans the physical channels with channel numbers listed in the first scan use channel list obtained from the first controller 115.

When the second-phase CMMB channel scan ends, the second controller 125 notifies the UIF processor 134 of the completion of the channel scan (step S34).

FIG. 7 is a flowchart illustrating the first-phase DTMB channel scan subroutine performed by the first controller 115. The first controller 115 specifies the lowest channel number '13' as the initial value of a receiving channel variable H that indicates the physical channel to be scanned (step S40).

The first controller 115 then decides whether the receiving channel H to be scanned has already been scanned by the second controller 125 (step S41). For example, the first controller 115 obtains the second scanned channel list stored in the second scanned channel list storage unit 124C of the second memory unit 124 through the second controller 125 and decides whether receiving channel H is listed in the second scanned channel list. If receiving channel H is not included in the second scanned channel list (NO in step S41), the first controller 115 proceeds to step S42. If receiving channel H is included in the second scanned channel list (YES in step S41), the first controller 115 proceeds to step S23 in FIG. 5.

In step S42, the first controller 115 instructs the first tuner 110 to receive an electromagnetic wave in receiving channel H.

The first controller 115 then decides whether the received level of the electromagnetic wave received in the tuned receiving channel H is higher than the first threshold (step S43). The first controller 115 makes this decision by receiving from the first tuner 110 a notification of whether the received level of the electromagnetic wave is higher than the first threshold. If the receiving level of the electromagnetic wave received in receiving channel H is higher than the first threshold (YES in step S43), the first controller 115 proceeds to step S44. If the receiving level of the electromagnetic wave received in receiving channel H is not higher than the first threshold (NO in step S43), the first controller 115 proceeds to step S50. The first threshold indicates the lowest receiving level at which a DTMB service can be received and audio and video can be output, as described above.

In step S44, the first controller 115 decides whether the first demodulator 111 has successfully demodulated the electrical signal generated from the electromagnetic wave received by the first tuner 110 in receiving channel H. For example, the first controller 115 makes this decision by receiving from the first demodulator 111 a notification of whether it achieved frame lock by performing demodulation processing on the electrical signal. If demodulation succeeded (YES in step S44), the first controller 115 proceeds to step S45. If demodulation failed (NO in step S44), the first controller 115 proceeds to step S50.

If the first demodulator 111 has achieved frame lock, it is highly possible that a TS is being output from the first demodulator 111 to the first demultiplexer 112. The first controller 115 therefore instructs the first demultiplexer 112 to obtain the SI (step S45).

The first controller 115 then decides whether the first demultiplexer 112 has obtained the SI (step S46). If the SI has been successfully obtained (YES in step S46), the first controller 115 proceeds to step S47. If the SI cannot be obtained (NO in step S46), the first controller 115 proceeds to step S48.

In step S47, the first controller 115 adds the tuning information of the service extracted from the SI to the first service list stored in the first service list storage unit 114A of the first memory unit 114.

The first controller 115 then adds the scanned receiving channel H to the first scanned channel list stored in the first scanned channel list storage unit 114C of the first memory unit 114 (step S48).

Since the first controller 115 is scanning the physical channels in ascending order, it increments the receiving channel H by '1' (step S49) and returns to step S41.

After tuning to receiving channel H in step S43, if the received level of the electromagnetic wave is not higher than the first threshold (NO in step S43) or if frame lock is not achieved in step S44 (NO in step S44), the first controller 115 proceeds to step S50.

In step S50, the first controller 115 decides whether the received level of the electromagnetic wave received in receiving channel H is higher than a second threshold. The first controller 115 makes this decision by receiving from the first tuner 110 a notification of whether the received level of the electromagnetic wave is higher than the second threshold. If the received level of the electromagnetic wave received in receiving channel H is higher than the second threshold (YES in step S50), the first controller 115 proceeds to step S51. If the received level of the electromagnetic wave received in receiving channel H is not higher than the second threshold (NO in step S50), the first controller 115 proceeds to step S48.

In step S51, the first controller 115 adds receiving channel H to the first scan use channel list stored in the first scan use channel list storage unit 114B of the first memory unit 114.

As described above, the first controller 115 performs the first-phase DTMB channel scan in ascending order of channel numbers of physical channels, starting from '13'. When the first controller 115 decides in step S41 that the receiving channel H to be scanned has already been scanned by the second controller 125, it ends the first-phase DTMB channel scan.

In steps S43 and S50 in FIG. 7, the received level is compared with the first threshold and the second threshold in the first tuner 110. The first controller 115 may obtain the received level of the electromagnetic wave from the first tuner 110 and compare the received level with the first threshold and the second threshold.

The processing to obtain the SI and add the tuning information to the first service list is performed in steps S45 to S47 in FIG. 7. This processing may be executed at the timing shown in FIG. 7 or may be executed for all the services together after the entire channel scan is completed.

FIG. 8 is a flowchart illustrating the first-phase CMMB channel scan subroutine performed by the second controller 125. The second controller 125 performs the first-phase CMMB channel scan in parallel with the first-phase DTMB channel scan performed by the first controller 115. The second controller 125 specifies the highest channel number '48' of the physical channels as the initial value of a receiving channel variable I that indicates the physical channel to be scanned (step S60).

The second controller 125 next decides whether the receiving channel I to be scanned has already been scanned by the first controller 115 (step S61). For example, the second controller 125 obtains the first scanned channel list stored in the first scanned channel list storage unit 114C of the first memory unit 114 through the first controller 115 and checks whether receiving channel I is listed in the first scanned channel list. If receiving channel I is not listed in the first scanned channel list (NO in step S61), the second controller 125 proceeds to step S62. If receiving channel I is included in the first scanned channel list (YES in step S61), the second controller 125 proceeds to step S33 in FIG. 6.

In step S62, the second controller 125 instructs the second tuner 120 to receive an electromagnetic wave in receiving channel I.

The second controller 125 then decides whether the received level of the electromagnetic wave received in the tuned receiving channel I is higher than the second threshold (step S63). For example, the second controller 125 makes this decision by receiving from the second tuner 120 a notification of whether the received level of the electromagnetic wave is higher than the second threshold. If the received level of the electromagnetic wave received in receiving channel I is higher than the second threshold (YES in step S63), the second controller 125 proceeds to step S64. If the received level of the electromagnetic wave received in receiving channel I is not higher than the second threshold (NO in step S63), the second controller 125 proceeds to step S70. The second threshold indicates the minimum receiving level at which a CMMB service can be received and audio and video can be output, as described above.

In step S64, the second controller 125 decides whether the second demodulator 121 has successfully demodulated the electrical signal generated from the electromagnetic wave received by the second tuner 120 in receiving channel I. For example, the second controller 125 makes this decision by receiving from the second demodulator 121 a notification of whether it has achieved frame lock by performing demodulation processing on the electrical signal. If demodulation succeeded (YES in step S64), the second controller 125 proceeds to step S65. If demodulation failed (NO in step S64), the second controller 125 proceeds to step S70.

When the second demodulator 121 has achieved frame lock, it is highly possible that an MF stream is being output from the second demodulator 121 to the second demultiplexer 122. The second controller 125 therefore instructs the second demultiplexer 122 to obtain a CIT (step S65).

The second controller 125 then decides whether the second demultiplexer 122 has obtained the CIT (step S66). If the CIT has been successfully obtained (YES in step S66), the second controller 125 proceeds to step S67. If the CIT cannot be obtained (NO in step S66), the second controller 125 proceeds to step S68.

In step S67, the second controller 125 adds the tuning information of services extracted from the CIT to the second service list stored in the second service list storage unit 124A of the second memory unit 124.

The second controller 125 then adds the scanned receiving channel I to the second scanned channel list stored in the second scanned channel list storage unit 124C of the second memory unit 124.

Since the second controller 125 is scanning the physical channels in descending order, it decrements the receiving channel I by '1' (step S69) and returns to step S61.

After tuning to receiving channel I in step S63, if the received level of the electromagnetic wave is not higher than the second threshold (NO in step S63) or if frame lock is not achieved (NO in step S64), the second controller 125 proceeds to step S70.

In step S70, the second controller 125 decides whether the received level of the electromagnetic wave received in receiving channel I is higher than the first threshold. For example, the second controller 125 makes this decision by receiving from the second tuner 120 a notification of whether the received level of the electromagnetic wave is higher than the first threshold. If the received level of the electromagnetic wave received in receiving channel I is higher than the first threshold (YES in step S70), the second controller 125 proceeds to step S71. If the received level of the electromagnetic wave received in receiving channel I is not higher than the first threshold (NO in step S70), the second controller 125 proceeds to step S68.

In step S71, the second controller 125 adds receiving channel I to the second scan use channel list stored in the second scan use channel list storage unit 124B of the second memory unit 124.

The second controller 125 executes the first-phase CMMB channel scan in descending order of physical channels, starting from the highest channel number '48', as described above. When the second controller 125 decides in step S61 that the receiving channel I to be scanned has already been scanned by the first controller 115, the second controller 125 ends the first-phase CMMB channel scan.

In steps S63 and S70 in FIG. 8, the second tuner 120 compares the received level with the first threshold and the second threshold. The second controller 125 may obtain the received level of the electromagnetic wave received in receiving channel I from the second tuner 120 and compare it with the first threshold and the second threshold.

The processing to obtain the CIT and add tuning information to the second service list is performed in steps S65 to S67 in FIG. 8. This processing may be executed at the timing shown in FIG. 8, or may be executed for all the services together after all channel scans are completed.

FIG. 9 is a flowchart illustrating the second-phase DTMB channel scan subroutine performed by the first controller 115.

The first controller 115 obtains the second scan use channel list stored in the second scan use channel list storage unit 124B of the second memory unit 124 through the second controller 125 and decides whether tuning to all the physical channels with channel numbers listed in the second scan use channel list has been performed (step S80). If tuning to all the physical channels with channel numbers listed in the second scan use channel list has not been performed (NO in step S80), in other words, if the second scan use channel list includes the channel number of a physical channel tuning to which has not been performed, the first controller 115 proceeds to step S81. If tuning to all the physical channels with channel numbers included in the second scan use channel list has been performed (YES in step S80), in other words, if the second scan use channel list does not include the channel number of any physical channel tuning to which has not been performed, the first controller 115 proceeds to step S24 in FIG. 5.

In step S81, the first controller 115 obtains channel numbers from the second scan use channel list in the order in which they were listed (in other words, descending order of channel number) and specifies each channel number as a receiving channel variable J indicating a physical channel. That is, the channel number specified as receiving channel J in step S81 is the highest channel number of the physical channels that are listed in the second scan use channel list and have not yet been specified as receiving channel J in step S81. Although the channel numbers are specified here in the order in which they were listed, they may be specified as receiving channel J in a different order.

The first controller 115 then instructs the first tuner 110 to tune to the frequency corresponding to the physical channel indicated by receiving channel J (step S82).

The first controller 115 then decides whether the received level of the electromagnetic wave received in the tuned receiving channel J is higher than the first threshold (step S83). For example, the first controller 115 makes this decision by receiving from the first tuner 110 a notification of whether the received level of the electromagnetic wave is higher than the first threshold. If the received level of the electromagnetic wave received in receiving channel J is higher than the first threshold (YES in step S83), the first controller 115 proceeds to step S84. If the received level of the electromagnetic wave received in receiving channel J is not higher than the first threshold (NO in step S83), the first controller 115 returns to step S80.

In step S84, the first controller 115 decides whether the first demodulator 111 has successfully demodulated the electrical signal generated from the electromagnetic wave received by the first tuner 110 in receiving channel J. For example, the first controller 115 makes this decision by receiving from the first demodulator 111 a notification of whether it has achieved frame lock by performing demodulation processing on the electrical signal. If demodulation succeeded (YES in step S84), the first controller 115 proceeds to step S85. If demodulation failed (NO in step S84), the first controller 115 returns to step S80.

If the first demodulator 111 has achieved frame lock, it is highly possible that a TS is being output from the first demodulator 111 to the first demultiplexer 112. The first controller 115 therefore instructs the first demultiplexer 112 to obtain an SI (step S85).

The first controller 115 then decides whether the first demultiplexer 112 has obtained the SI (step S86). If the SI has been successfully obtained (YES in step S86), the first controller 115 proceeds to step S87. If the SI cannot be obtained (NO in step S86), the first controller 115 returns to step S80.

In step S87, the first controller 115 adds the tuning information of services extracted from the SI to the first service list stored in the first service list storage unit 114A of the first memory unit 114.

The first controller 115 executes a channel scan on the physical channels with channel numbers listed in the second scan use channel list, as described above. In other words, the physical channels scanned by the first controller 115 in the second-phase DTMB channel scan are limited to physical channels found as a result of the first-phase CMMB channel scan to have a received electromagnetic wave with the required received power even though demodulation was impossible in the CMMB system, so the need to scan all the physical channels scanned by the second controller 125 in the first-phase CMMB channel scan is eliminated, and an efficient channel scan can be performed.

In step S83 in FIG. 9, the received level is compared with the first threshold in the first tuner 110. The first controller 115 may obtain the received level of the electromagnetic wave received in receiving channel J from the first tuner 110 and compare the received level with the first threshold.

The processing to obtain the SI and add the tuning information to the first service list is performed in steps S85 to S87 in FIG. 9. This processing may be executed at the timing shown in FIG. 9 or may be executed for all the services together after the entire channel scan is completed.

FIG. 10 is a flowchart illustrating the second-phase CMMB channel scan subroutine performed by the second controller 125. The second controller 125 performs the second-phase CMMB channel scan in parallel with the second-phase DTMB channel scan performed by the first controller 115.

The second controller 125 obtains the first scan use channel list stored in the first scan use channel list storage unit 114B of the first memory unit 114 through the first controller 115 and decides whether tuning to all the physical channels listed in the first scan use channel list has been performed (step S90). If tuning to all the physical channels listed in the first scan use channel list has not been performed (NO in step S90), in other words, if the first scan use channel list includes a physical channel to which tuning has not been performed, the second controller 125 proceeds to step S91. If tuning to all the physical channels listed in the first scan use channel list has been performed (YES in step S90), in other words, if the first scan use channel list does not include any physical channel to which tuning has not been performed, the second controller 125 proceeds to step S34 in FIG. 6.

In step S91, the second controller 125 obtains channel numbers of physical channels from the first scan use channel list in the order in which they were listed (in other words, ascending order of channel number) and specifies each channel number as a receiving channel L, where L is a variable indicating the physical channel. That is, the channel number specified as receiving channel L in step S91 is the lowest channel number of the physical channels that are listed in the first scan use channel list and have not yet been specified as receiving channel L in step S91. Although the channel numbers are specified here in the order in which they were listed, they may be specified as the receiving channel L in a different order.

The second controller 125 then instructs the second tuner 120 to tune to the frequency corresponding to the physical channel indicated by receiving channel L (step S92).

The second controller 125 then decides whether the received level of the electromagnetic wave received in the tuned receiving channel L is higher than the second threshold (step S93). For example, the second controller 125 makes this decision by receiving from the second tuner 120 a notification of whether the received level of the electromagnetic wave is higher than the second threshold. If the received level of the electromagnetic wave received in receiving channel L is higher than the second threshold (YES in step S93), the second controller 125 proceeds to step S94. If the received level of the electromagnetic wave received in receiving channel L is not higher than the second threshold (NO in step S93), the second controller 125 returns to step S90.

In step S94, the second controller 125 decides whether the second demodulator 121 has successfully demodulated the electrical signal generated from the electromagnetic wave received by the second tuner 120 in receiving channel L. For example, the second controller 125 makes this decision by receiving from the second demodulator 121 a notification of whether it has achieved frame lock by performing demodulation processing on the electrical signal. If demodulation succeeded (YES in step S94), the second controller 125 proceeds to step S85. If demodulation failed (NO in step S94), the second controller 125 returns to step S90.

If the second demodulator 121 has achieved frame lock, it is highly possible that an MF stream is being output from the second demodulator 121 to the second demultiplexer 122. The second controller 125 therefore instructs the second demultiplexer 122 to obtain a CIT (step S95).

The second controller 125 then decides whether the second demultiplexer 122 has obtained the CIT (step S96). If the CIT has been successfully obtained (YES in step S96), the second controller 125 proceeds to step S97. If the CIT cannot be obtained (NO in step S96), the second controller 125 returns to step S90.

In step S97, the second controller 125 adds the tuning information of services extracted from the CIT to the second service list stored in the second service list storage unit 124A of the second memory unit 124.

The second controller 125 executes a channel scan on the physical channels with channel numbers listed in the first scan use channel list, as described above. In other words, the physical channels scanned by the second controller 125 in the second-phase CMMB channel scan are limited to physical channels found as a result of the first-phase DTMB channel scan to have a received electromagnetic wave with the required receiving level even though demodulation was impossible in DTMB, so the need to scan all the physical channels scanned by the first controller 115 in the first-phase DTMB channel scan is eliminated, and an efficient channel scan can be performed.

In step S93 in FIG. 10, the received level is compared with the second threshold in the second tuner 120. The second controller 125 may obtain the received level of the electromagnetic wave received in receiving channel L from the second tuner 120 and compare the received level with the second threshold.

The processing to obtain the CIT and add the tuning information to the second service list is performed in steps S95 to S97 in FIG. 10. This processing may be executed at the timing shown in FIG. 10 or may be executed for all the services together after the entire channel scan is completed.

FIG. 11 is a flowchart illustrating the third-phase DTMB channel scan subroutine performed by the first controller 115. Since the DTMB band in the first broadcast protocol ranges from channel 13 to channel 56, the first controller 115 executes a channel scan on channels 49 to 56, following the channels up to channel 48 that have been scanned in the second-phase channel scan, as a third-phase DTMB channel scan.

Since the first controller 115 performs the channel scan in ascending order, starting from channel 49, it specifies channel number '49' as the initial value of the receiving channel M, where M is a variable indicating the physical channel to be scanned (step S100).

The first controller 115 then decides whether a channel scan up to channel 56 has already been performed (step S101). For example, the first controller 115 makes this decision by checking whether the receiving channel M to be scanned is higher than the highest physical channel number '56' to be scanned. If the channel scan up to channel 56 has not yet been performed (NO in step S101), the first controller 115 proceeds to step S102. If the channel scan up to channel 56 has already been performed (YES in step S101), the first controller 115 proceeds to step S52 in FIG. 5.

In step S102, the first controller 115 instructs the first tuner 110 to tune to the frequency corresponding to the physical channel indicated by receiving channel M.

The first controller 115 then decides whether the received level of the electromagnetic wave received in the tuned receiving channel M is higher than the first threshold (step S103). For example, the first controller 115 makes this decision by receiving from the first tuner 110 a notification of whether the received level of the electromagnetic wave is higher than the first threshold. If the received level of the electromagnetic wave received in receiving channel M is higher than the first threshold (YES in step S103), the first controller 115 proceeds to step S104. If the received level of the electromagnetic wave received in receiving channel M is not higher than the first threshold (NO in step S103), the first controller 115 proceeds to step S108.

In step S104, the first controller 115 decides whether the first demodulator 111 has successfully demodulated the electrical signal generated from the electromagnetic wave received by the first tuner 110 in receiving channel M. For example, the first controller 115 makes this decision by receiving from the first demodulator 111 a notification of whether it has achieved frame lock by performing demodulation processing on the electrical signal. If demodulation succeeded (YES in step S104), the first controller 115 proceeds to step S105. If demodulation failed (NO in step S104), the first controller 115 proceeds to step S108.

If the first demodulator 111 has achieved frame lock, it is highly possible that a TS is being output from the first demodulator 111 to the first demultiplexer 112. The first controller 115 therefore instructs the first demultiplexer 112 to obtain an SI (step S105).

The first controller 115 then decides whether the first demultiplexer 112 has obtained the SI (step S106). If the SI has been successfully obtained (YES in step S106), the first controller 115 proceeds to step S107. If the SI cannot be obtained (NO in step S106), the first controller 115 proceeds to step S108.

In step S107, the first controller 115 adds the tuning information of services extracted from the SI to the first service list stored in the first service list storage unit 114A of the first memory unit 114.

Since the first controller 115 scans the physical channels in ascending order, it increments the receiving channel M by '1' (step S108) and returns to step S101.

The third-phase DTMB channel scan performed by the first controller 115 scans physical channels in ascending order, starting from channel number '49' as described above. When the first controller 115 decides in step S101 that the receiving channel M to be scanned already exceeds the highest channel number '56', it ends the third-phase DTMB channel scan.

In step S103 in FIG. 11, the received level is compared with the first threshold in the first tuner 110. The first controller 115 may obtain the received level of the electromagnetic wave received in receiving channel M from the first tuner 110 and compare the received level with the first threshold.

The processing to obtain the SI and add the tuning information to the first service list is performed in steps S105 to S107 in FIG. 11. This processing may be executed at the timing shown in FIG. 11 or may be executed for all the services together after the entire channel scan is completed.

Figure 12:
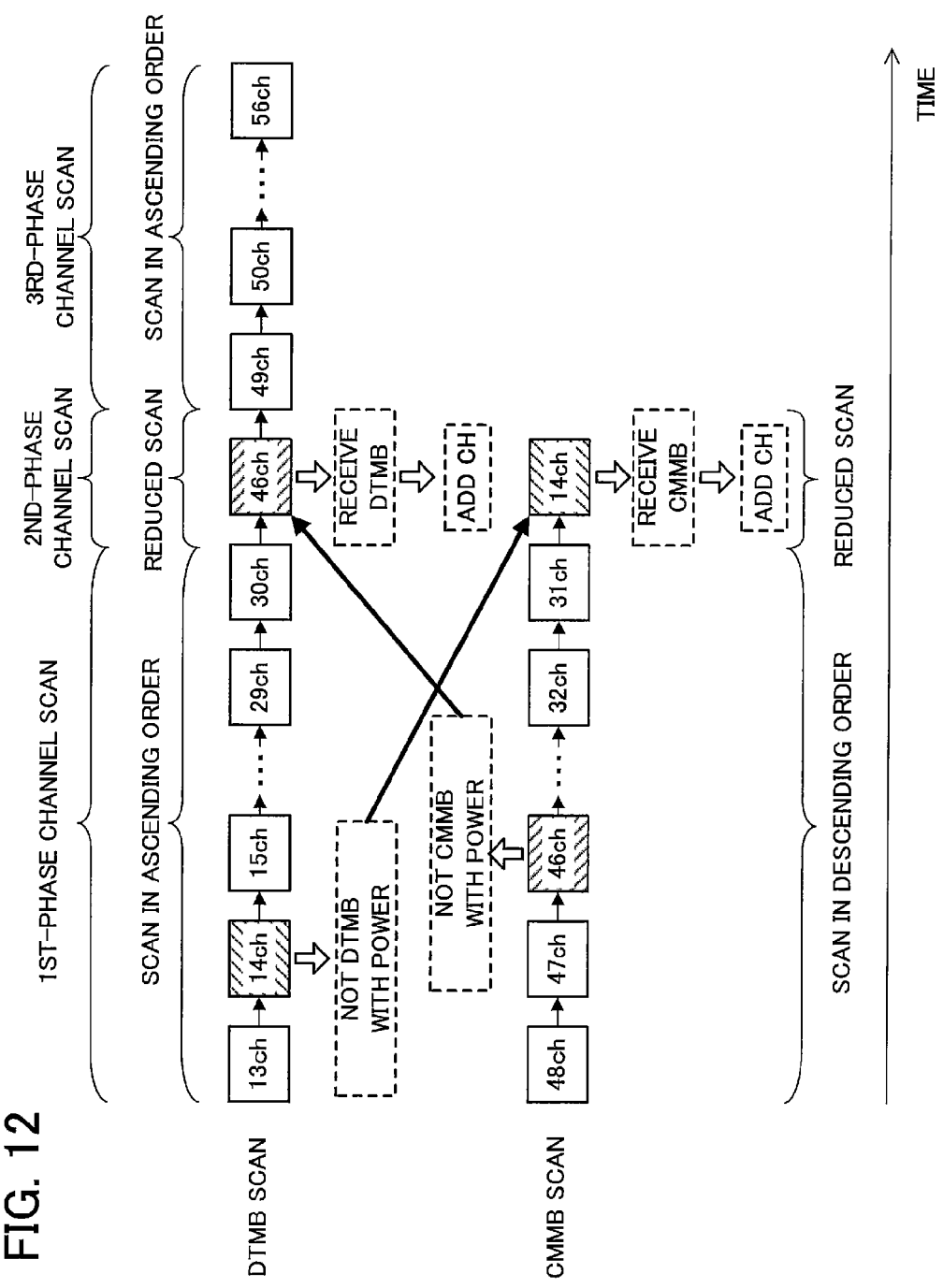
FIG. 12 is a schematic diagram used in describing the channel scan performed by the digital broadcast receiver according to the first embodiment.

FIG. 12 is a schematic diagram that will be used in describing the channel scan performed by the digital broadcast receiver 100. Time advances from left to right in FIG. 12, which shows the state in which a DTMB channel scan and a CMMB channel scan are started simultaneously. The first-phase channel scan includes the first-phase DTMB channel scan and the first-phase CMMB channel scan; the second-phase channel scan includes the second-phase DTMB channel scan and the second-phase CMMB channel scan; and the third-phase channel scan includes the third-phase DTMB channel scan.

In the DTMB channel scan, the first-phase DTMB channel scan, the second-phase DTMB channel scan, and the third-phase DTMB channel scan are executed in that order. In the CMMB channel scan, the first-phase CMMB channel scan and the second-phase CMMB channel scan are executed in that order.

In the first-phase DTMB channel scan, channels are scanned in ascending order, starting from channel 13; in the first-phase CMMB channel scan, channels are scanned in descending order, starting from channel 48. When the first-phase DTMB channel scan is completed up to channel 30 and the first-phase CMMB channel scan is completed down to channel 31, the conditions for ending the first-phase channel scans (step S41 in FIG. 7, step S61 in FIG. 8) are satisfied, and the first-phase channel scans have ended.

In the illustrated first-phase DTMB channel scan, the received level of the electromagnetic wave in channel 14 is higher than the second threshold, but frame lock was not achieved and demodulation failed. The first controller 115 therefore decides that the received electromagnetic wave is not a DTMB broadcast wave and adds channel 14 to the first scan use channel list (step S51 in FIG. 7).

In the illustrated first-phase CMMB channel scan, the received level of the electromagnetic wave in channel 46 is higher than the first threshold, but frame lock was not achieved and demodulation failed. The second controller 125 therefore decides that the received electromagnetic wave is not a CMMB broadcast wave and adds channel 46 to the second scan use channel list (step S71 in FIG. 8).

The channels scanned in the second-phase DTMB channel scan and the second-phase CMMB channel scan are limited to the channels in which the received level of the electromagnetic wave is higher than a predetermined threshold and the electrical signal generated from the electromagnetic wave could not be demodulated in the first-phase channel scan in the other protocol. In other words, the only channel scanned in the second-phase DTMB channel scan is channel 46, which was found in the first-phase CMMB channel scan to have an electromagnetic wave with a received level higher than the first threshold although the electrical signal generated from the electromagnetic wave could not be demodulated. If a DTMB broadcast wave is being transmitted in channel 46, the first demodulator 111 can perform demodulation, and the first controller 115 extracts tuning information and adds it to the first service list.

The only channel scanned in the second-phase CMMB channel scan is channel 14, which was found in the first-phase DTMB channel scan to have an electromagnetic wave with a received level higher than the second threshold although the electrical signal generated from the electromagnetic wave could not be demodulated. If a CMMB broadcast wave is being transmitted in channel 14, the second demodulator 121 can perform demodulation, and the second controller 125 extracts tuning information and adds it to the second service list.

A characteristic of the second-phase channel scans is that the scanned channels are limited to the channels found in the first-phase channel scan in the other protocol to have electromagnetic waves with received levels higher than given thresholds although the electrical signals generated from the electromagnetic waves could not be demodulated.

The CMMB channel scans now ends. The DTMB channel scan continues with the execution of the third-phase DTMB channel scan.

In the first-phase and second-phase channel scans, each channel from channel 13 to channel 48 is selected at least once in the DTMB or CMMB channel scan. In the third-phase DTMB channel scan, channels 49 to 56, which have not yet been selected, are scanned. When the channel scan up to channel 56 is completed, the entire channel scan ends.

As described above, the digital broadcast receiver 100 in the first embodiment includes a plurality of tuners, demodulators, and demultiplexers conforming to different broadcast protocols, and executes channel scans of the broadcast protocols in parallel, so the time required to execute the channel scans can be reduced.

In the digital broadcast receiver 100 in the first embodiment, the first controller 115 and second controller 125 execute respective first-phase channel scans by dividing between them the channels included in the range of overlap of the DTMB frequency band and the CMMB frequency band. In the course of the first-phase channel scans, the first controller 115 and second controller 125 record the channel numbers of physical channels in which the received level of the electromagnetic wave is higher than a predetermined threshold and the electrical signal generated from the electromagnetic wave cannot be demodulated. In the second-phase channel scans, the first controller 115 and second controller 125 scan just the channels the channel numbers of which were recorded in the other protocol. Therefore, the channel scan time can be reduced by a maximum factor of two, in comparison with the time that would be required for the first controller 115 and second controller 125 to just scan all the channels separately.

The digital broadcast receiver 100 in the first embodiment includes a plurality of tuners conforming to different broadcast protocols, and the tuners have a first threshold, which is the minimum receiving level at which services of the corresponding broadcast protocol can be viewed, and a second threshold, which is the receiving level at which services of the other broadcast protocol can be viewed. Each tuner decides in accordance with these thresholds whether the received level is adequate for viewing services of the corresponding broadcast protocol and also decides whether the received level is adequate for viewing services of the other broadcast protocol. Accordingly, a channel scan in one broadcast protocol can detect the channel numbers of physical channels likely to be carrying stably receivable broadcasts in the other broadcast protocol in the same band. For those physical channels that have already been scanned by the channel scan in the other broadcast protocol, the effort of re-checking the received level can be saved. Consequently, the channel scan time can be reduced. For example, step S83 in FIG. 9 and step S93 in FIG. 10 can be omitted.

A comparison between the threshold receiving level at which DTMB broadcasts for fixed receivers can be received and the threshold receiving level at which CMMB broadcasts for mobile receivers can be received indicates that the latter receiving level is lower. It can therefore be correctly decided whether broadcasts of the other protocol can be received by using two different thresholds.

Unlike the conventional technology that includes two sets of tuners and demodulators for receiving broadcasts in the same protocol, divides the channel scan band into two parts, and executes parallel channel scans, the digital broadcast receiver 100 in the first embodiment has only one tuner and one demodulator for receiving broadcasts in each protocol. Since the first controllers 115 and second controllers 125 conform to different broadcast protocols and work together to execute the channel scan, they can execute an efficient channel scan and can reduce the channel scan time.

In the digital broadcast receiver 100 in the first embodiment, the first threshold and the second threshold are the minimum received levels at which services of the corresponding broadcast protocols can be received. Accordingly, physical channels in which the received level is probably too low to view services can be exempted from the second-phase channel scans, and the time required to execute the second-phase channel scans can be reduced.

A plurality of modulation methods are commonly used in each broadcast protocol, and the minimum received level at which stable reception of the services is possible depends on the modulation method. Since the modulation method used in a given physical channel cannot be known before the broadcast wave is received, if the lowest value of the minimum receiving levels of anticipated modulation methods is used as the threshold, the service list created on the basis of the channel scan will include all receivable services.

Second Embodiment

Figure 13:
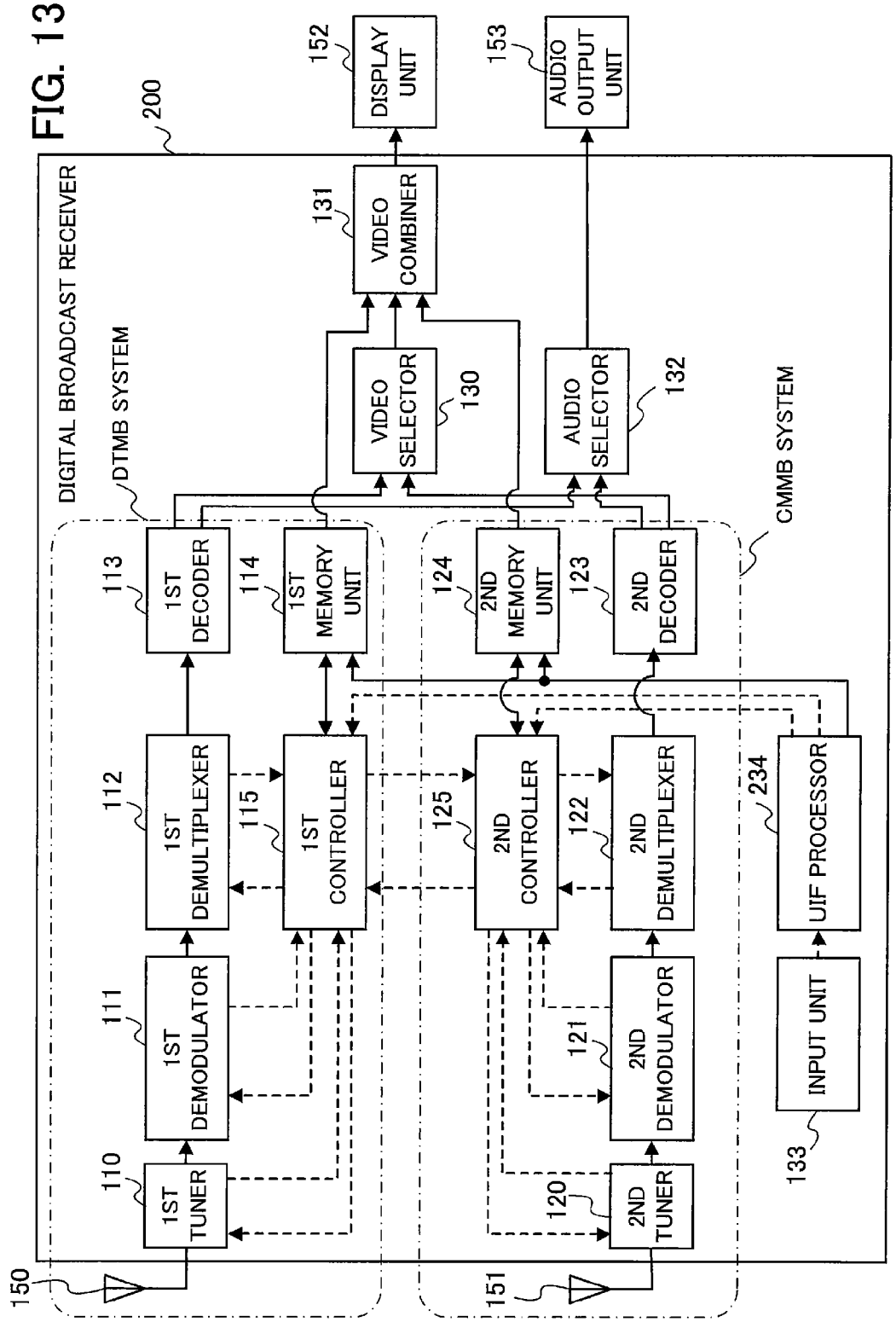
FIG. 13 is a block diagram schematically showing the configuration of a digital broadcast receiver according to a second embodiment.

FIG. 13 is a block diagram schematically showing the configuration of a digital broadcast receiver 200 according to a second embodiment. As shown in FIG. 13, the digital broadcast receiver 200 includes a first tuner 110, a first demodulator 111, a first demultiplexer 112, a first decoder 113, a first memory unit 114, a first controller 115, a second tuner 120, a second demodulator 121, a second demultiplexer 122, a second decoder 123, a second memory unit 124, a second controller 125, a video selector 130, a video combiner 131, an audio selector 132, an input unit 133, and a UIF processor 234. The digital broadcast receiver 200 in the second embodiment differs from the digital broadcast receiver 100 in the first embodiment in the processing in the UIF processor 234.

As in the first embodiment, the UIF processor 234 receives operation signals from the input unit 133 and gives instructions corresponding to the operation signals to the components of the digital broadcast receiver 200. If an operation signal to display a first service list screen or a second service list screen is received from the input unit 133, the UIF processor 234 obtains the first service list stored in the first service list storage unit 114A or the second service list stored in the second service list storage unit 124A and generates a screen signal for the first service list screen or the second service list screen from the obtained list, as in the first embodiment. The UIF processor 234 then passes the generated screen signal through the first memory unit 114 or second memory unit 124 to the video combiner 131.

Moreover, differing from the first embodiment, when the channel scan in the first broadcast protocol finishes, the UIF processor 234 obtains the first service list stored in the first service list storage unit 114A and generates a first service list screen signal from the obtained list. The UIF processor 234 sends the generated screen signal through the first memory unit 114 to the video combiner 131.

Further differing from the first embodiment, when the channel scan in the second broadcast protocol finishes, the UIF processor 234 obtains the second service list stored in the second service list storage unit 124A and generates a second service list screen signal from the obtained list. The UIF processor 234 sends the generated screen signal through the second memory unit 124 to the video combiner 131.

Figure 14:
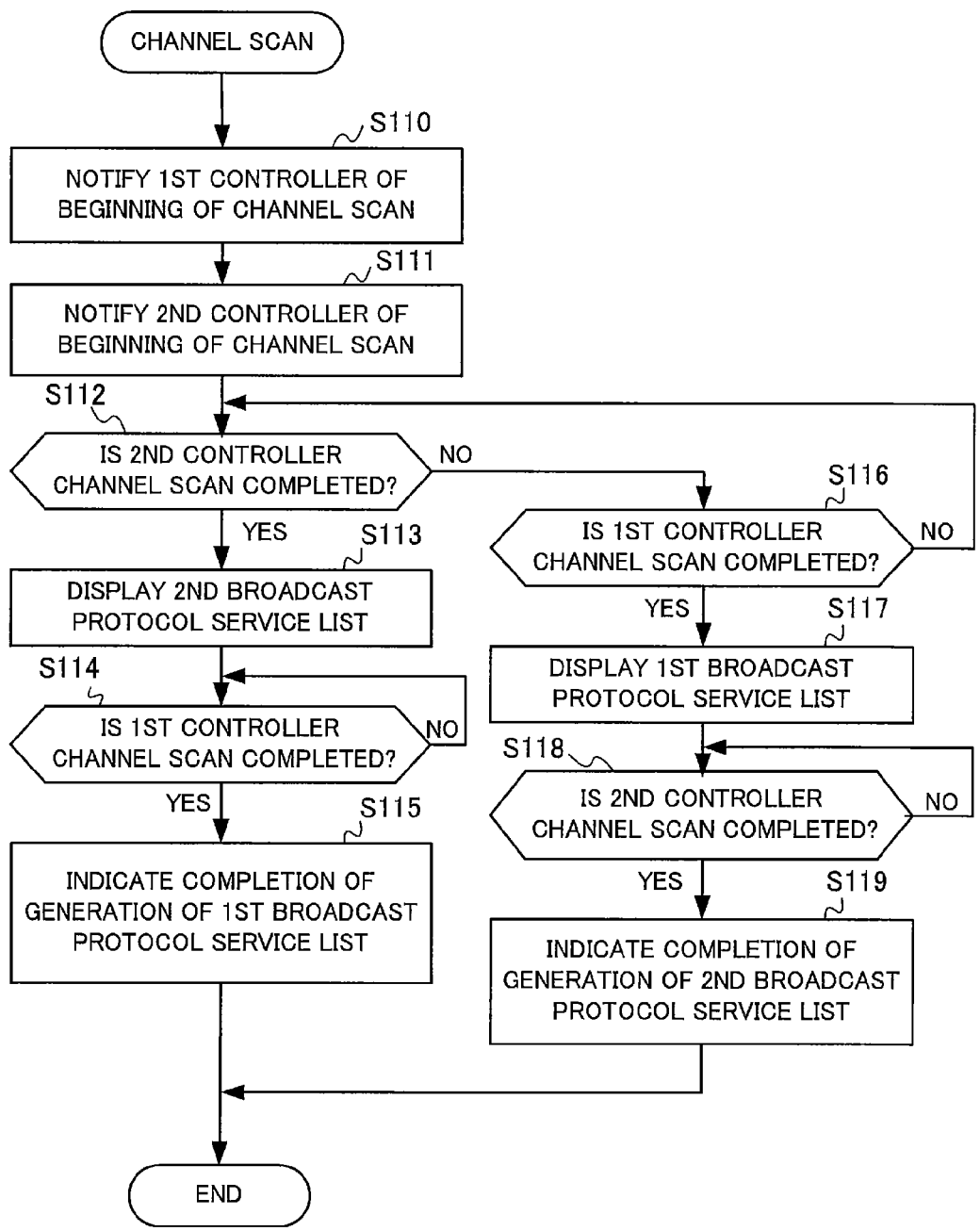
FIG. 14 is a flowchart illustrating processing performed by the UIF processor in the second embodiment when a channel scan is selected by a user operation.

FIG. 14 is a flowchart illustrating processing performed by the UIF processor 234 when a channel scan is selected by a user operation.

When an operation signal indicating a channel scan request is received from the input unit 133, the UIF processor 234 notifies the first controller 115 of the beginning of a channel scan (step S110). The DTMB channel scan executed by the first controller 115 is the same as described in the first embodiment.

The UIF processor 234 then notifies the second controller 125 of the beginning of a channel scan (step S111). The CMMB channel scan executed by the second controller 125 is the same as described in the first embodiment.

The UIF processor 234 next decides whether it has received a notification of completion of the CMMB channel scan from the second controller 125 (step S112). If the notification of completion of the CMMB channel scan has been received (YES in step S112), the UIF processor 234 proceeds to step S113. If the notification of completion of the CMMB channel scan has not been received (NO in step S112), the UIF processor 234 proceeds to step S116.

In step S113, the UIF processor 234 obtains the second service list stored in the second service list storage unit 124A, generates a second service list screen signal, and supplies the screen signal to the video combiner 131, to have the display unit 152 display the list.

In parallel with the processing in step S113, the first controller 115 executes a channel scan on physical channels, which have not yet been scanned. The first controller 115 here executes a channel scan on channels 49 to 56, for example, as a third-phase DTMB channel scan.

When the user tunes to a service displayed on the second service list screen, the UIF processor 234 gives instructions to the second controller 125, video selector 130, and audio selector 132 to select a CMMB service and to perform decoding and display.

The UIF processor 234 waits until a notification indicating the completion of the DTMB channel scan is received from the first controller 115 (step S114). When the notification indicating the completion of the DTMB channel scan is received (YES in step S114), the UIF processor 234 proceeds to step S115.

In step S115, the UIF processor 234 generates a screen signal for showing a message indicating the completion of generation of the first service list, supplies the screen signal to the video combiner 131, and has the display unit 152 display the message. If a CMMB service is being displayed, this type of message is displayed in a smaller size than the CMMB service screen by OSD (On-Screen Display). If a second service list is being displayed, the message is displayed together with an item by which the first service list display can be selected.

If a notification indicating the completion of the CMMB channel scan is not received in step S112 (NO in step S112), the UIF processor 234 proceeds to step S116.

In step S116, the UIF processor 234 decides whether a notification indicating the completion of the DTMB channel scan has been received from the first controller 115. If the notification indicating the completion of the DTMB channel scan has been received (YES in step S116), the UIF processor 234 proceeds to step S117. If the notification indicating the completion of the DTMB channel scan has not been received (NO in step S116), the UIF processor 234 returns to step S112. The target band of the CMMB channel scan is narrower than the target band of the DTMB channel scan, so steps S112 to S115 are usually executed. If the DTMB channel scan is completed earlier than the CMMB channel scan, steps S112 to S119 are executed.

In step S117, the UIF processor 234 obtains the first service list stored in the first service list storage unit 114A, generates a screen signal of the first service list screen, supplies the screen signal to the video combiner 131, and has the display unit 152 display the list. When the user tunes to a service displayed in the first service list screen, the UIF processor 234 gives instructions to the first controller 115, video selector 130, and audio selector 132 to select a DTMB service and to perform decoding and display.

The UIF processor 234 next waits until a notification indicating the completion of the CMMB channel scan is received from the second controller 125 (step S118). If the notification indicating the completion of the CMMB channel scan is received (YES in step S118), the UIF processor 234 proceeds to step S119.

In step S119, the UIF processor 234 generates a screen signal for displaying a message indicating the completion of generation of the second service list, gives the screen signal to the video combiner 131, and has the display unit 152 display the message. If a DTMB service has already been displayed, this type of message is displayed in a smaller size than the DTMB service screen by OSD. If a first service list is being displayed, the message is displayed together with an item by which the second service list display can be selected.

In the digital broadcast receiver 200 in the second embodiment, the display unit 152 displays a service list for the DTMB protocol or the CMMB protocol, in which a channel scan has been completed earlier. Since a service can be selected before a channel scan in the other protocol is completed, the user's wait time can be reduced.

Third Embodiment

Figure 15:
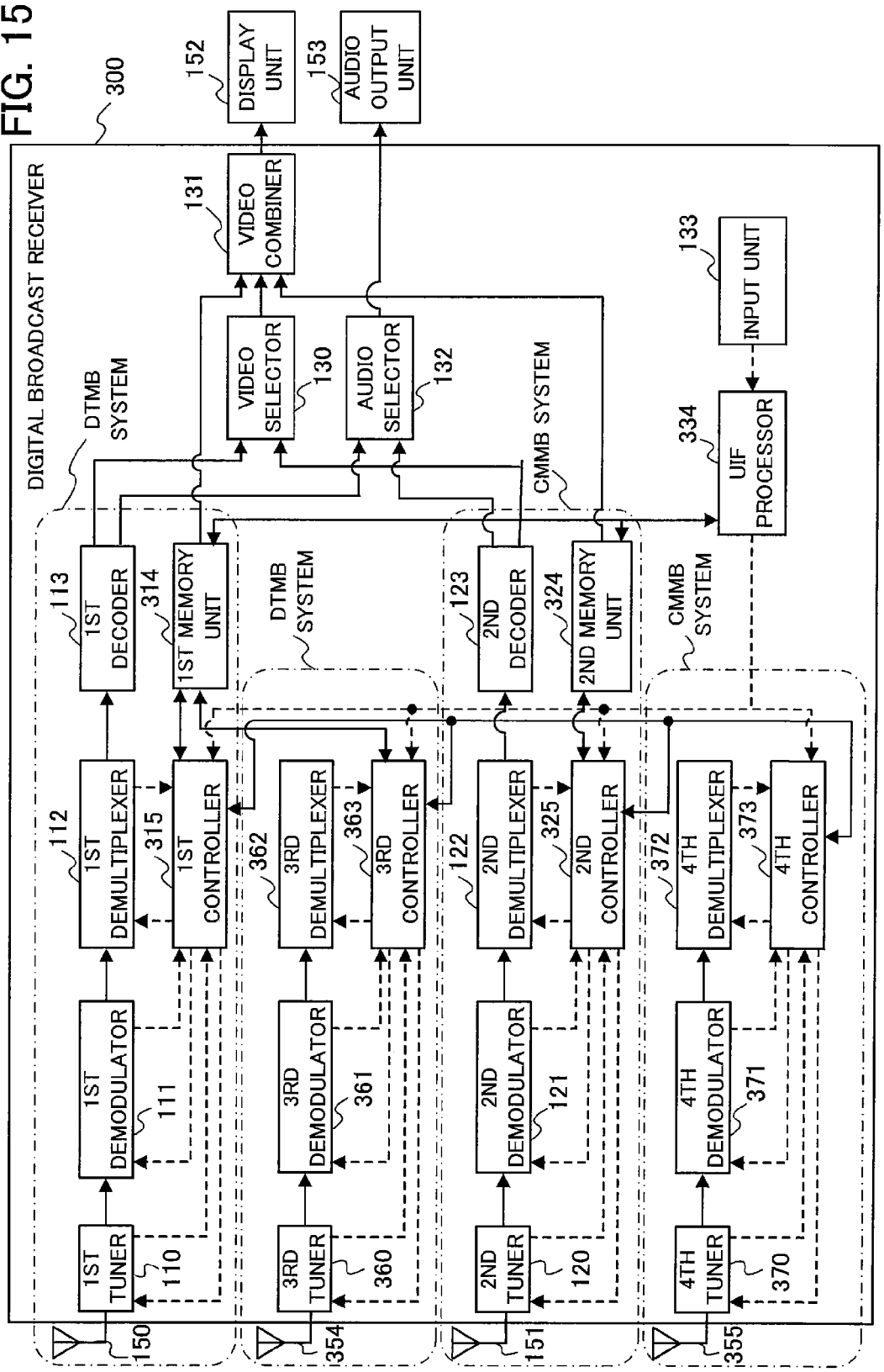
FIG. 15 is a block diagram schematically showing the configuration of a digital broadcast receiver according to a third embodiment.

FIG. 15 is a block diagram schematically showing the configuration of a digital broadcast receiver 300 according to a third embodiment. As shown in FIG. 15, the digital broadcast receiver 300 includes a first tuner 110, a first demodulator 111, a first demultiplexer 112, a first decoder 113, a first memory unit 314, a first controller 315, a second tuner 120, a second demodulator 121, a second demultiplexer 122, a second decoder 123, a second memory unit 324, a second controller 325, a video selector 130, a video combiner 131, an audio selector 132, an input unit 133, a UIF processor 334, a third tuner 360, a third demodulator 361, a third demultiplexer 362, a third controller 363, a fourth tuner 370, a fourth demodulator 371, a fourth demultiplexer 372, and a fourth controller 373. The digital broadcast receiver 300 in the third embodiment differs from the digital broadcast receiver 100 in the first embodiment in regard to control in the first controller 315 and second controller 325, in the information stored in the first memory unit 314 and second memory unit 324, and by further including the third tuner 360, third demodulator 361, third demultiplexer 362, third controller 363, fourth tuner 370, fourth demodulator 371, fourth demultiplexer 372, and fourth controller 373. A third antenna 354 is connected to the third tuner 360; the third antenna 354, third tuner 360, third demodulator 361, third demultiplexer 362, and third controller 363 form a DTMB section that scans channels in the DTMB broadcast protocol, DTMB being the first broadcast protocol. A fourth antenna 355 is connected to the fourth tuner 370; the fourth antenna 355, fourth tuner 370, fourth demodulator 371, fourth demultiplexer 372, and fourth controller 373 form a CMMB section that scans channels in the CMMB broadcast protocol, CMMB being the second broadcast protocol.

The first memory unit 314 stores information needed to execute channel scans in the first and second broadcast protocols and information needed to receive services broadcast in the first broadcast protocol.

Figure 16:
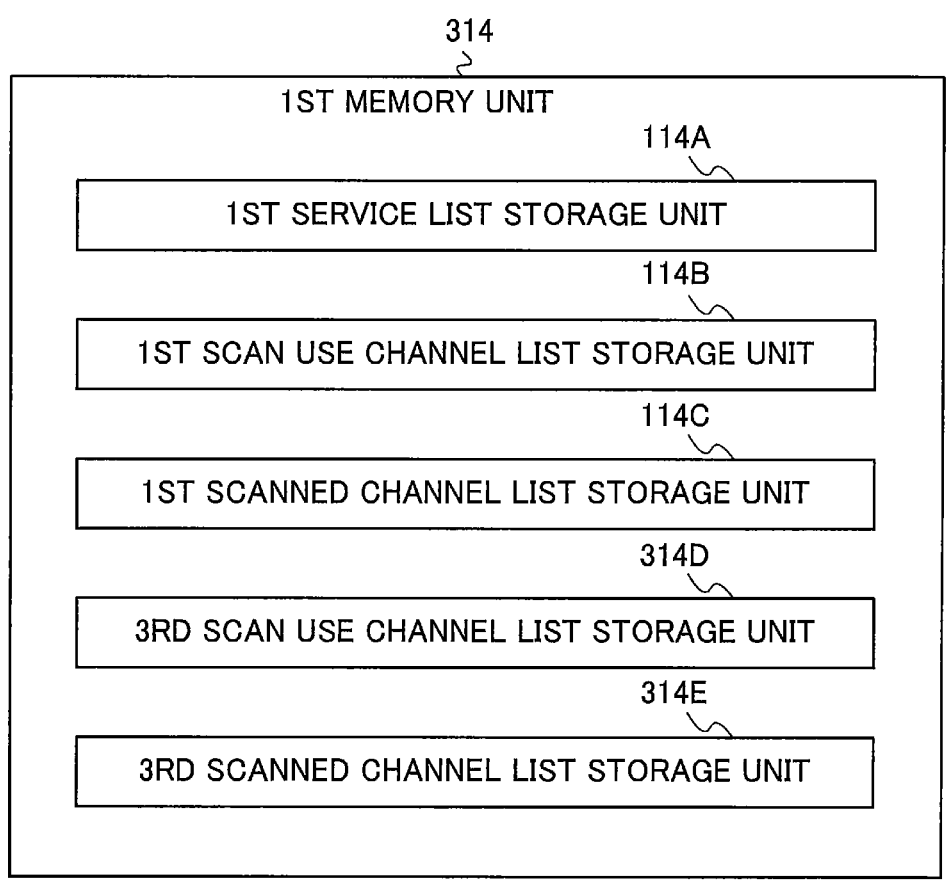
FIG. 16 is a block diagram schematically showing the configuration of the first memory unit in the third embodiment.

FIG. 16 is a block diagram schematically showing the configuration of the first memory unit 314. As shown in FIG. 16, the first memory unit 314 includes a first service list storage unit 114A, a first scan use channel list storage unit 114B, a first scanned channel list storage unit 114C, a third scan use channel list storage unit 314D, and a third scanned channel list storage unit 314E. The first memory unit 314 in the third embodiment differs from the first memory unit 114 in the first embodiment by including the third scan use channel list storage unit 314D and the third scanned channel list storage unit 314E.

The third scan use channel list storage unit 314D stores a third scan use channel list which lists identification information (channel numbers, here) for identifying physical channels in which the received power level of the electromagnetic wave received by the third tuner 360 in a channel scan is higher than a predetermined threshold but the electrical signal generated from the electromagnetic wave cannot be demodulated (frame lock is not achieved) by the third demodulator 361. For example, the third scan use channel list includes the channel numbers of physical channels in which, when a DTMB channel scan was executed, DTMB being the first broadcast protocol, the received level of the electromagnetic wave received in the physical channel was higher than a second threshold, and the electrical signal generated from the electromagnetic wave could not be demodulated by the third demodulator 361.

The third scanned channel list storage unit 314E stores a third scanned channel list listing identification information (channel numbers, in this case) for identifying physical channels which have already been scanned by the third tuner 360, third demodulator 361, third demultiplexer 362, and third controller 363.

Referring again to FIG. 15, the first controller 315 controls the processing for scanning channels in the first broadcast protocol and the processing for receiving broadcasts in the first broadcast protocol. For example, the first controller 315 may execute DTMB channel scans in a first phase, a second phase, and a third phase. In the first-phase DTMB channel scan, the first controller 315 and third controller 363 execute their channel scans in a predetermined first order by dividing between them the physical channels that have not yet been scanned by the second controller 325 and fourth controller 373, among the physical channels included in the range of overlap of the frequency band used by broadcasts in the first broadcast protocol and the frequency band used by broadcasts in the second broadcast protocol. In the second-phase DTMB channel scan, the first controller 315 and third controller 363 execute channel scans by dividing between them the physical channels in which an electromagnetic wave was received with the power required by the second controller 325 and fourth controller 373 but demodulation was impossible in the second broadcast protocol. In the third-phase DTMB channel scan, the first controller 315 and the third controller 363 execute channel scans by dividing between them the physical channels included in the frequency band used in broadcasts of the first broadcast protocol but not included in the range of overlap of the frequency band used for broadcasts in the first broadcast protocol and the frequency band used for broadcasts in the second broadcast protocol.

The first controller 315 extracts tuning information from first data (PSI and SI) obtained from the first demultiplexer 112 and adds the extracted tuning information to a first service list stored in the first service list storage unit 114A of the first memory unit 314.

The second memory unit 324 stores information needed to scan broadcasts in the second broadcast protocol and the first broadcast protocol.

Figure 17:
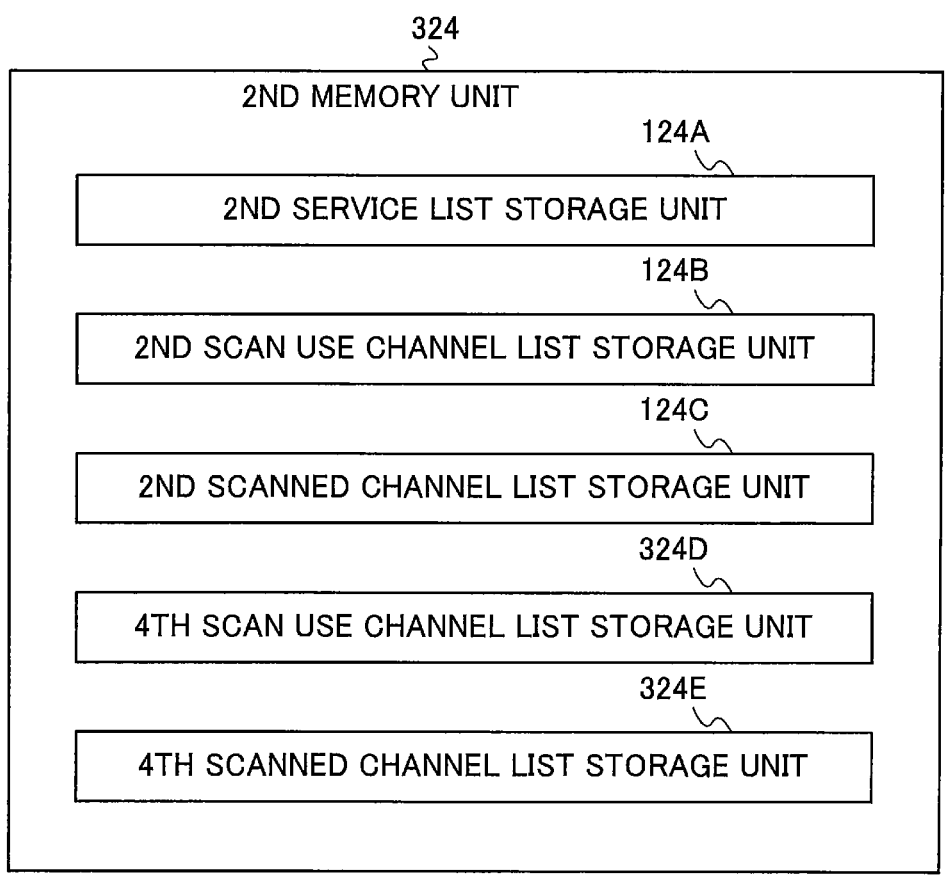
FIG. 17 is a block diagram schematically showing the configuration of the second memory unit in the third embodiment.

FIG. 17 is a block diagram schematically showing the configuration of the second memory unit 324. As shown in FIG. 17, the second memory unit 324 includes a second service list storage unit 124A, a second scan use channel list storage unit 124B, a second scanned channel list storage unit 124C, a fourth scan use channel list storage unit 324D, a fourth scanned channel list storage unit 324E. The second memory unit 324 in the third embodiment differs from the second memory unit 124 in the first embodiment by including the fourth scan use channel list storage unit 324D and the fourth scanned channel list storage unit 324E.

The fourth scan use channel list storage unit 324D stores a fourth scan use channel list which lists identification information (channel numbers, in this case) for identifying physical channels in which the received power level of the electromagnetic wave received by the fourth tuner 370 in a channel scan is higher than a predetermined threshold but the electrical signal generated from the electromagnetic wave cannot be demodulated (frame lock is not achieved) by the fourth demodulator 371. For example, the fourth scan use channel list includes the channel numbers of physical channels in which, when a CMMB channel scan was executed, CMMB being the second broadcast protocol, the received level of the electromagnetic wave received in the physical channel was higher than a first threshold, and the electrical signal generated from the electromagnetic wave could not be demodulated by the second demodulator 121.

The fourth scanned channel list storage unit 324E stores a fourth scanned channel list listing identification information (channel numbers, in this case) for identifying physical channels which have already been scanned by the fourth tuner 370, fourth demodulator 371, fourth demultiplexer 372, and fourth controller 373.

Referring again to FIG. 15, the second controller 325 controls the processing for scanning channels in the second broadcast protocol and the processing for receiving broadcasts in the second broadcast protocol. For example, the second controller 325 may execute CMMB channel scans in a first phase and a second phase. In the first-phase CMMB channel scan, the second controller 325 and fourth controller 373 execute their channel scans in a predetermined second order by dividing between them the physical channels that have not yet been scanned by the first controller 315 and third controller 363, among the physical channels included in the range of overlap of the frequency band used by broadcasts in the first broadcast protocol and the frequency band used by broadcasts in the second broadcast protocol. The second order is the reverse of the first order used by the first controller 315 in controlling the channel scan. In the second-phase CMMB channel scan, the second controller 325 and fourth controller 373 execute channel scans by dividing between them the physical channels in which an electromagnetic wave was received with the power required by the first controller 315 and third controller 363 but demodulation was impossible in the first broadcast protocol.

The second controller 325 extracts tuning information from second data (CIT) obtained from the second demultiplexer 122 and adds the extracted tuning information to a second service list stored in the second service list storage unit 124A of the second memory unit 324.

The UIF processor 334 receives operation signals from the input unit 133 and gives instructions corresponding to the operation signals to the components of the digital broadcast receiver 300. If an operation signal to start a channel scan is received from the input unit 133, the UIF processor 334 in the third embodiment notifies the first controller 315, second controller 325, third controller 363, and fourth controller 373 of the beginning of the channel scan. If an operation signal to display a first service list screen or a second service list screen is received from the input unit 133, the UIF processor 334 obtains the first service list stored in the first service list storage unit 114A or the second service list stored in the second service list storage unit 124A and generates a screen signal for the first service list screen or second service list screen from the obtained list. The UIF processor 334 then passes the generated screen signal to the video combiner 131.

The third tuner 360 receives an electromagnetic wave through the third antenna 354, generates an electrical signal, and sends the signal to the third demodulator 361. In a channel scan, the third tuner 360 tunes to the frequency of a physical channel designated in a command given by the third controller 363, determines the received level of the electromagnetic wave received in the physical channel, and notifies the third controller 363 of its determination.

The third demodulator 361 demodulates the electrical signal received from the third tuner 360, generates a first digital signal, and sends this signal to the third demultiplexer 362. The format of the first digital signal depends on the broadcast protocol. Here, the third demodulator 361 outputs a DTMB TS as the first digital signal. In a channel scan, the third demodulator 361 demodulates the electrical signal supplied from the third tuner 360 and notifies the third controller 363 whether frame lock has been achieved.

The receiver may have a plurality of third antennas 354, and the third tuner 360 and third demodulator 361 may perform diversity processing on the electromagnetic waves received through the antennas and output a single TS.

The third demultiplexer 362 separates first data including tuning information from the demodulated first digital signal and supplies the separated data to the third controller 363. The third demultiplexer 362 here separates PSI and SI as first data and supplies them to the third controller 363.

The third controller 363 controls the processing for scanning channels in the first broadcast protocol and the processing for receiving broadcasts in the first broadcast protocol. For example, the third controller 363 may execute DTMB channel scans in a first phase, a second phase, and a third phase. In the first-phase DTMB channel scan, the third controller 363 and first controller 315 execute a channel scan in a predetermined first order by dividing between them the physical channels that have not yet been scanned by the second controller 325 and fourth controller 373, among the physical channels included in the range of overlap of the frequency band used by broadcasts in the first broadcast protocol and the frequency band used by broadcasts in the second broadcast protocol. In the second-phase DTMB channel scan, the third controller 363 and first controller 315 execute a channel scan by dividing between them the physical channels in which an electromagnetic wave was received with the power required by the second controller 325 and fourth controller 373 but demodulation was impossible in the second broadcast protocol. In the third-phase DTMB channel scan, the third controller 363 and the first controller 315 execute a channel scan by dividing between them the physical channels included in the frequency band used in broadcasts of the first broadcast protocol but not included in the range of overlap of the frequency band used for broadcasts in the first broadcast protocol and the frequency band used for broadcasts in the second broadcast protocol.

The third controller 363 extracts tuning information from first data (PSI and SI) obtained from the third demultiplexer 362 and adds the extracted tuning information to a first service list stored in the first service list storage unit 114A of the first memory unit 314.

The fourth tuner 370 receives an electromagnetic wave through the fourth antenna 355, generates an electrical signal, and sends the signal to the fourth demodulator 371. The fourth tuner 370 tunes to the frequency of the physical channel specified in a command obtained from the fourth controller 373 in a channel scan and notifies the fourth controller 373 of a decision on the received level of the electromagnetic wave received in the physical channel.

The fourth demodulator 371 demodulates the electrical signal received from the fourth tuner 370, generates a second digital signal, and sends this signal to the fourth demultiplexer 372. The format of the second digital signal depends on the broadcast protocol. Here, the fourth demodulator 371 outputs a CMMB MF as the second digital signal. In a channel scan, the fourth demodulator 371 demodulates the electrical signal supplied from the fourth tuner 370 and notifies the fourth controller 373 whether frame lock has been achieved.

The receiver may have a plurality of fourth antennas 355, and the fourth tuner 370 and fourth demodulator 371 may perform diversity processing on the electromagnetic waves received through the antennas and output a single TF stream.

The fourth demultiplexer 372 separates second data including tuning information from the demodulated second digital signal and supplies the separated data to the fourth controller 373. The fourth demultiplexer 372 here separates CIT as second data and supplies them to the fourth controller 373.

The fourth controller 373 controls the processing for scanning channels in the second broadcast protocol and the processing for receiving broadcasts in the second broadcast protocol. For example, the fourth controller 373 may execute CMMB channel scans in a first phase and a second phase. In the first-phase CMMB channel scan, the fourth controller 373 and second controller 325 execute a channel scan in a predetermined second order by dividing between them the physical channels that have not yet been scanned by the first controller 315 and third controller 363, among the physical channels included in the range of overlap of the frequency band used by broadcasts in the first broadcast protocol and the frequency band used by broadcasts in the second broadcast protocol. The second order is the reverse of the first order used by the first controller 315 in controlling the channel scan. In the second-phase CMMB channel scan, the fourth controller 373 and second controller 325 execute a channel scan by dividing between them the physical channels in which an electromagnetic wave was received with the power required by the first controller 315 and third controller 363 but demodulation was impossible in the first broadcast protocol.

The fourth controller 373 extracts tuning information from second data (CIT) obtained from the fourth demultiplexer 372 and adds the extracted tuning information to a second service list stored in the second service list storage unit 124A of the second memory unit 324.

Figure 18:
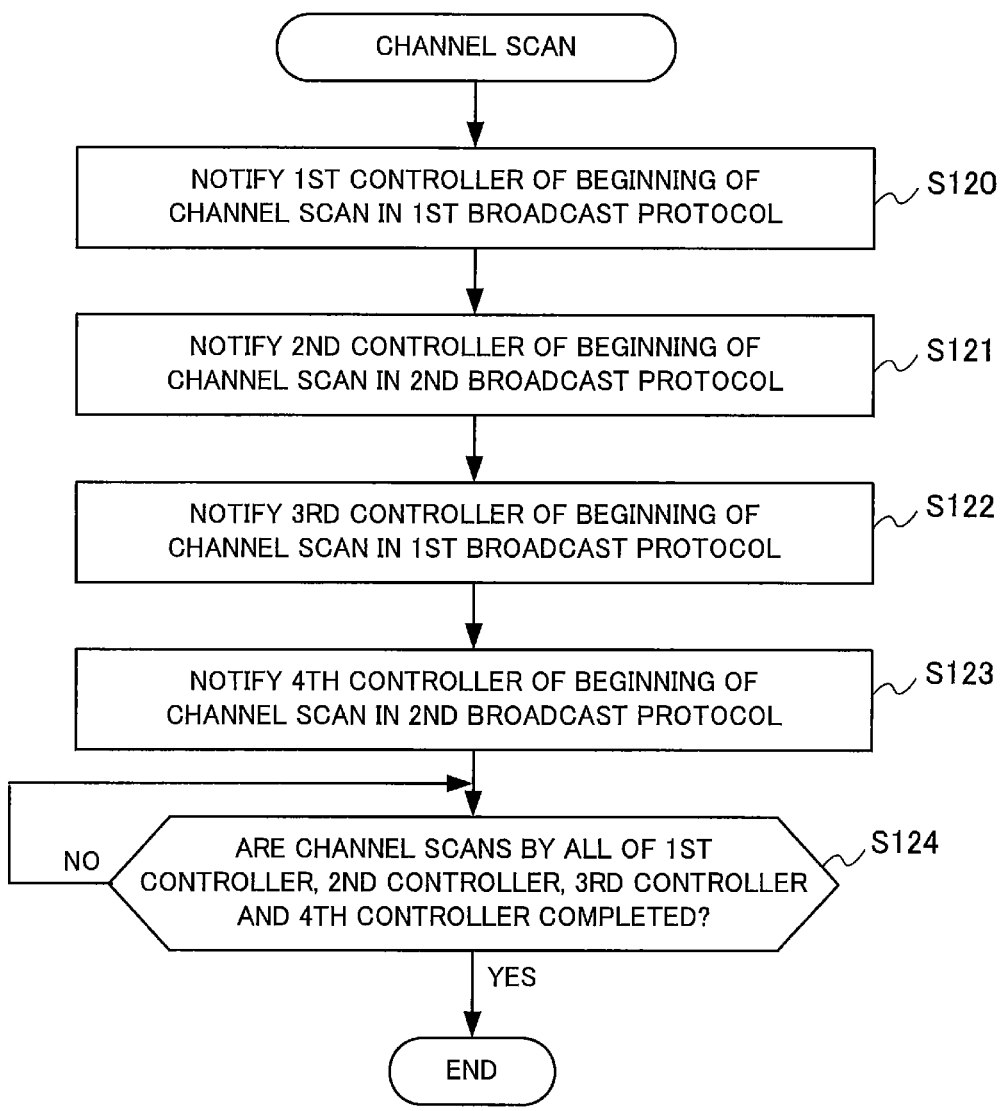
FIG. 18 is a flowchart illustrating processing performed by the UIF processor in the third embodiment when a channel scan is selected by a user operation.

FIG. 18 is a flowchart illustrating processing performed by the UIF processor 334 when a channel scan is selected by a user operation.

When an operation signal indicating a channel scan request is received from the input unit 133, the UIF processor 134 notifies the first controller 315 of the beginning of a channel scan (step S120).

When this notification is received, the first controller 315 starts a first-phase DTMB channel scan. The first-phase DTMB channel scan by the first controller 315 is the same as illustrated in FIG. 7, except that the first controller 315 and third controller 363 divide the channels between them in the first-phase DTMB channel scan in the third embodiment. Accordingly, the first controller 315 decides in step S41 in FIG. 7 whether the third scanned channel list stored in the third scanned channel list storage unit 314E of the first memory unit 314 includes the receiving channel H.

When the first-phase DTMB channel scan ends, the first controller 315 starts a second-phase DTMB channel scan. The second-phase DTMB channel scan by the first controller 315 is the same as illustrated in FIG. 9, except that a fourth scan use channel list stored in the fourth scan use channel list storage unit 324D of the second memory unit 324 is used instead of the second scan use channel list in the processing in steps S80 and S81.

When the second-phase DTMB channel scan ends, the first controller 315 starts a third-phase DTMB channel scan. The third-phase DTMB channel scan by the first controller 315 is the same as illustrated in FIG. 11 except that the first controller 315 and third controller 363 execute the third-phase DTMB channel scan by dividing the channels between them in the third embodiment. For example, the first controller 315 executes a channel scan on channels 49 to 52, and the third controller 363 executes a channel scan on channels 53 to 56. Accordingly, the first controller 315 decides in step S101 in FIG. 11 whether receiving channel M is higher than channel 52. If the receiving channel M is higher than channel 52, the first controller 315 ends the third-phase DTMB channel scan.

The UIF processor 334 next notifies the second controller 325 of the beginning of a channel scan (step S121).

When this notification is received, the second controller 325 starts a first-phase CMMB channel scan. The first-phase CMMB channel scan by the second controller 325 is the same as illustrated in FIG. 8, except that the second controller 325 and fourth controller 373 execute their first-phase CMMB channel scans by dividing the channels between them in the third embodiment. Therefore, the second controller 325 decides in step S61 in FIG. 8 whether the receiving channel I is included in the fourth scanned channel list stored in the fourth scanned channel list storage unit 324E of the second memory unit 324.

When the first-phase CMMB channel scan ends, the second controller 325 starts a second-phase CMMB channel scan. The second-phase CMMB channel scan by the second controller 325 is the same as illustrated in FIG. 10, except that the third scan use channel list stored in the third scan use channel list storage unit 314D of the first memory unit 314 is used, instead of the first scan use channel list, for the processing in steps S90 and S91.

The UIF processor 334 then notifies the third controller 363 of the beginning of a channel scan (step S122).

When this notification is received, the third controller 363 starts a first-phase DTMB channel scan. The first-phase DTMB channel scan by the third controller 363 is the same as illustrated in FIG. 7, except that the first controller 315 and third controller 363 in the third embodiment divide the channels between them in the first-phase DTMB channel scan. For example, the third controller 363 scans channels 22 and above. Accordingly, the third controller 363 specifies '22' instead of '13' as the initial value of the receiving channel H in step S40 in FIG. 7. In step S41 in FIG. 7, the third controller 363 decides whether the receiving channel H is included in the fourth scanned channel list stored in the fourth scanned channel list storage unit 324E of the second memory unit 324.

When the first-phase DTMB channel scan ends, the third controller 363 starts a second-phase DTMB channel scan. The second-phase DTMB channel scan by the third controller 363 is the same as illustrated in FIG. 9.

When the second-phase DTMB channel scan ends, the third controller 363 starts a third-phase DTMB channel scan. The third-phase DTMB channel scan by the third controller 363 is the same as illustrated in FIG. 11, except that the first controller 315 and third controller 363 divide channels between them in the third-phase DTMB channel scans. For example, the first controller 315 scans channels 49 to 52, and the third controller 363 scans channels 53 to 56. Accordingly, the third controller 363 specifies '53' instead of '49' as the initial value of the receiving channel M in step S100 in FIG. 11.

The UIF processor 334 next notifies the fourth controller 373 of the beginning of a CMMB channel scan (step S123).

When this notification is received, the fourth controller 373 starts a first-phase CMMB channel scan. The first-phase CMMB channel scan by the fourth controller 373 is the same as illustrated in FIG. 8, except that the second controller 325 and fourth controller 373 divide the channels between them in the first-phase CMMB channel scans. For example, the fourth controller 373 scans channels up to channel 39. Accordingly, the fourth controller 373 specifies the initial value of the receiving channel I in step S60 as '39' instead of '48'.

When the first-phase CMMB channel scan ends, the fourth controller 373 starts a second-phase CMMB channel scan. The second-phase CMMB channel scan by the fourth controller 373 is the same as illustrated in FIG. 10.

The first controller 315, second controller 325, third controller 363, and fourth controller 373 are notified of the beginning of channel scans as described above, so that DTMB channel scans controlled by the first controller 315 and third controller 363 and CMMB channel scans controlled by the second controller 325 and fourth controller 373 are performed in parallel.

The UIF processor 334 waits until it receives notifications of the completion of both the DTMB channel scans by the first controller 315 and third controller 363 and the CMMB channel scans by the second controller 325 and fourth controller 373 (step S124). When the UIF processor 334 receives these notifications (YES in step S124), the processing ends. At the end of the processing, the UIF processor 334 may generate a video signal for a notification screen indicating the end of the channel scan processing, output the signal through the video combiner 131 to the display unit 152, and have the display unit 152 display the screen.

In FIG. 18, the first controller 315, second controller 325, third controller 363, and fourth controller 373 are notified of the beginning of channel scans in that order, but this order may be different.

Figure 19:
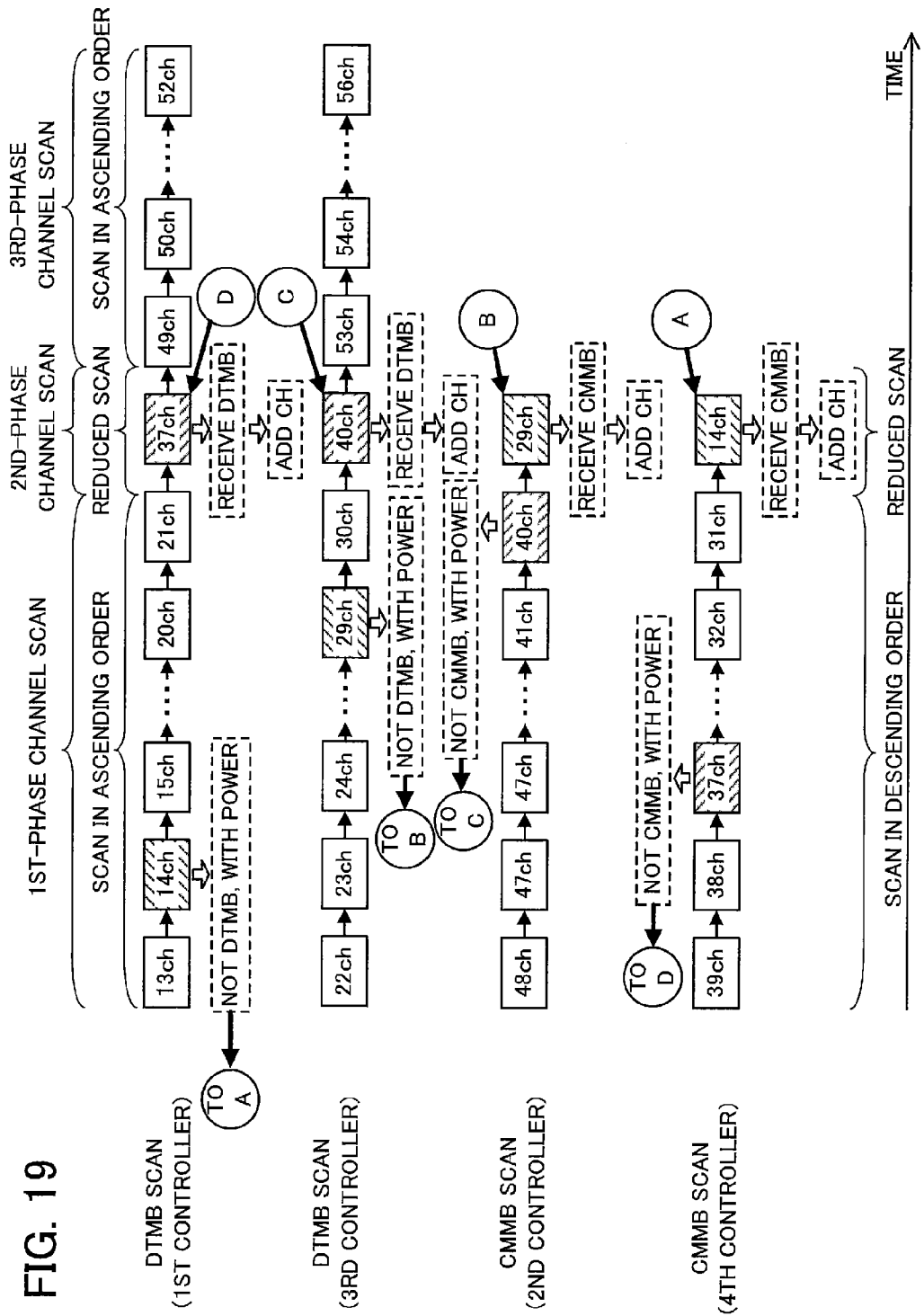
FIG. 19 is a schematic diagram used in describing the channel scan performed by the digital broadcast receiver according to the third embodiment.

FIG. 19 is a schematic diagram that will be used in describing the channel scan performed by the digital broadcast receiver 300. Time advances from left to right in FIG. 19, which shows the state in which a DTMB channel scan and a CMMB channel scan are started simultaneously. The first-phase channel scan includes the first-phase DTMB channel scan and the first-phase CMMB channel scan; the second-phase channel scan includes the second-phase DTMB channel scan and the second-phase CMMB channel scan; and the third-phase channel scan includes the third-phase DTMB channel scan. The first controller 315 and third controller 363 execute the first-phase, second-phase, and third-phase DTMB channel scans by dividing the channels between them, and the second controller 325 and fourth controller 373 execute the first-phase, second-phase, and third-phase CMMB channel scans by dividing the channels between them.

In the first-phase DTMB channel scan, the first controller 315 and third controller 363 execute channel scans by dividing the channels between them. The first controller 315 scans channels 13 to 21 in ascending order, and the third controller 363 scans channels 22 to 30 in ascending order.

In the first-phase CMMB channel scan, the second controller 325 and fourth controller 373 execute channel scans by dividing the channels between them. The second controller 325 scans channels 48 to 40 in descending order, and the fourth controller 373 scans channels 39 to 31 in descending order.

In the first-phase channel scans, the channel numbers of physical channels in which received level of the electromagnetic wave is higher than a predetermined threshold but demodulation failed are added to the corresponding scan use channel lists. For example, after the first-phase DTMB channel, channels 14 and 29 are added to the list. After the first-phase CMMB channel scan, channels 37 and 40 are added to the list.

In the second-phase channel scans, reduced scans are executed. In the second-phase DTMB channel scans, the first controller 315 and third controller 363 respectively scan channels 37 and 40, in which an electromagnetic wave was received with the required power but demodulation was impossible in the first-phase CMMB channel scan. Then, when the electrical signals in these channels are recognized as DTMB signals in the second-phase DTMB channel scans, for example, the tuning information obtained in these channels is added to the first service list.

In the second-phase CMMB channel scans, the second controller 325 and fourth controller 373 respectively scan channels 14 and 29, in which an electromagnetic wave was received with the required power but demodulation was impossible in the first-phase DTMB channel scan. Then, when the electrical signals in these channels are recognized as CMMB signals in the second-phase CMMB channel scans, for example, the tuning information obtained in these channels is added to the second service list.

In the third embodiment, one section including the first tuner 110, first demodulator 111, first demultiplexer 112, and first controller 315 and another section including the third tuner 360, third demodulator 361, third demultiplexer 362, and third controller 363 execute DTMB channel scans by dividing the channels between the two sections. In parallel with the DTMB channel scans, one section including the second tuner 120, second demodulator 121, second demultiplexer 122, and second controller 325 and another section including the fourth tuner 370, fourth demodulator 371, fourth demultiplexer 372, and fourth controller 373 execute CMMB channel scans by dividing the channels between the two sections, but the DTMB channel scans may be executed by a single section and the CMMB channel scans may be executed by two sections that divide the channels between them, or the DTMB channel scans may be executed by two sections that divide the channels divided between them and the CMMB channel scans may be executed by a single section. In those cases, unnecessary components (antennas, tuners, demodulators, demultiplexers, and controllers) are eliminated from the configuration of the digital broadcast receiver 300 illustrated in FIG. 15.

In the digital broadcast receiver 300 in the third embodiment, two controllers execute the first-phase and third-phase DTMB channel scans by dividing the channels between them and execute the first-phase CMMB channel scans by dividing the channels between them. Therefore, the first-phase and third-phase channel scans can be completed in a half of the time required in the first embodiment.

In the digital broadcast receiver 300 in the third embodiment, two controllers execute the second-phase DTMB channel scans by dividing the channels between them, and two other controllers execute the second-phase CMMB channels by dividing the channels between them. Therefore, the second-phase channel scans can also be completed in a half of the time required in the first embodiment.

In the digital broadcast receiver 300 in the third embodiment, the first controller 315 executes the second-phase DTMB channel scan by using the fourth scan use channel list, and the third controller 363 executes the second-phase DTMB channel san by using the second scan use channel list. However, the first controller 315 may use the second scan use channel list, and the third controller 363 may use the fourth-scan use channel list.

In the digital broadcast receiver 300 in the third embodiment, the second controller 325 executes the second-phase CMMB channel scan by using the third scan use channel list, and the fourth controller 373 executes the second-phase CMMB channel scan by using the first scan use channel list. However, the second controller 325 may use the first scan use channel list, and the fourth controller 373 may use the third scan use channel list.

In the first-phase DTMB channel scans in the digital broadcast receiver 300 in the third embodiment, the first controller 315 scans channels in ascending order, starting from channel 13, and the third controller 363 scans channels in ascending order, starting from channel 22. However, the first controller 315 may scan channels in ascending order, starting from channel 22, and the third controller 363 may scan channels in ascending order, starting from channel 13.

In the second-phase CMMB channel scans in the digital broadcast receiver 300 in the third embodiment, the second controller 325 scans channels in descending order, starting from channel 48, and the fourth controller 373 scans channels in descending order, starting from channel 39. However, the second controller 325 may execute channels in descending order, starting from channel 39, and the fourth controller 373 may scan channels in descending order, starting from channel 48.

In the digital broadcast receiver 300 in the third embodiment, the first controller 315 and third controller 363 execute the second-phase and third-phase DTMB channel scans by dividing the channels between them, but one of these two controllers may execute the second-phase DTMB channel scan, and the other controller may execute the third-phase DTMB channel scan in parallel.

Fourth Embodiment

Figure 20:
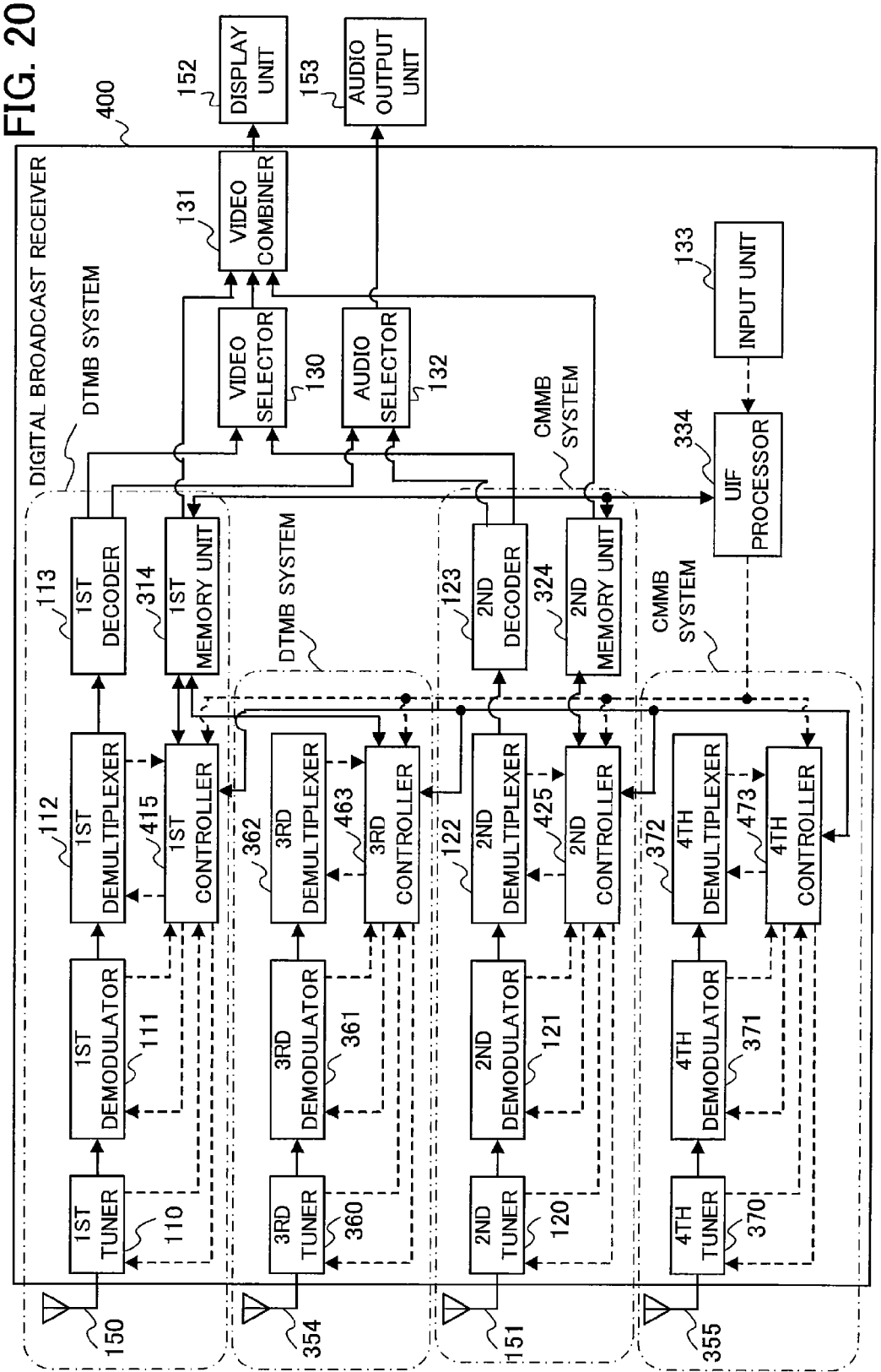
FIG. 20 is a block diagram schematically showing the configuration of a digital broadcast receiver according to a fourth embodiment.

FIG. 20 is a block diagram schematically showing the configuration of a digital broadcast receiver 400 according to a fourth embodiment. As shown in FIG. 20, the digital broadcast receiver 400 includes a first tuner 110, a first demodulator 111, a first demultiplexer 112, a first decoder 113, a first memory unit 314, a first controller 415, a second tuner 120, a second demodulator 121, a second demultiplexer 122, a second decoder 123, a second memory unit 324, a second controller 425, a video selector 130, a video combiner 131, an audio selector 132, an input unit 133, a UIF processor 334, a third tuner 360, a third demodulator 361, a third demultiplexer 362, a third controller 463, a fourth tuner 370, a fourth demodulator 371, a fourth demultiplexer 372, and a fourth controller 473. The digital broadcast receiver 400 in the fourth embodiment differs from the digital broadcast receiver 300 in the third embodiment in regard to the control carried out by the first controller 415, second controller 425, third controller 463, and fourth controller 473. In the third embodiment, when an instruction is given from the user, the UIF processor 334 executes a channel scan. The fourth embodiment differs from the third embodiment in that channel scans are executed constantly in the background while a service is being viewed.

The first controller 415 controls the processing for scanning channels in the first broadcast protocol and the processing for receiving broadcasts in the first broadcast protocol. Here, the first controller 415 executes DTMB channel scans in a first phase, a second phase, and a third phase in the background while a service is being received in the second broadcast protocol. In the first-phase DTMB channel scan, the first controller 415 and third controller 463 execute a channel scan in a predetermined first order on physical channels included in the range of overlap of the frequency band used by broadcasts in the first broadcast protocol and the frequency band used by broadcasts in the second broadcast protocol, by dividing the channels between them. In the second-phase DTMB channel scan, the first controller 415 and third controller 463 scan physical channels in which an electromagnetic wave was received with the power required by the fourth controller 473 but demodulation was impossible in the second broadcast protocol, by dividing the channels between them. In the third-phase DTMB channel scan, the first controller 415 and third controller 463 scan physical channels included in the frequency band used in broadcasts of the first broadcast protocol but not included in the range of overlap of the frequency band used for broadcasts in the first broadcast protocol and the frequency band used for broadcasts in the second broadcast protocol.

The first controller 415 extracts tuning information from first data (PSI and SI) obtained from the first demultiplexer 112 and adds the extracted tuning information to a first service list stored in the first service list storage unit 114A of the first memory unit 314.

The second controller 425 controls the processing for scanning channels in the second broadcast protocol and the processing for receiving broadcasts in the second broadcast protocol. Here, while a service is being received in the first broadcast protocol, the second controller 425 executes CMMB channel scans in a fourth phase and a fifth phase in the background. In the fourth-phase CMMB channel scan, the second controller 425 and fourth controller 473 execute a channel scan in a predetermined second order on physical channels included in the range of overlap of the frequency band used by broadcasts in the first broadcast protocol and the frequency band used by broadcasts in the second broadcast protocol, by dividing the channels between them. The second order is the reverse of the first order used by the first controller 415 in controlling the channel scan. In the fifth-phase CMMB channel scan, the second controller 425 and fourth controller 473 scan physical channels in which the third controller 463 decided that demodulation in the first broadcast protocol was impossible even though the received power requirement was met, dividing the channels between them.

The second controller 425 extracts tuning information from the second data (CIT) obtained from the second demultiplexer 122 and adds the extracted tuning information to a second service list stored in the second service list storage unit 124A of the second memory unit 324.

The third controller 463 controls the processing for scanning channels in the first broadcast protocol and the processing for receiving broadcasts in the first broadcast protocol. Here, if a service is being received in the second broadcast protocol, the third controller 463 according to the fourth embodiment and the first controller 415 may execute DTMB channel scans in a first phase, a second phase, and a third phase in the background, by dividing the channels between them. If a service is being received in the first broadcast protocol, the third controller 463 according to the fourth embodiment may execute DTMB channel scans in a fourth phase, a fifth phase, and a sixth phase, without the help of the first controller 415. In the first-phase DTMB channel scan, the third controller 463 and first controller 415 execute a channel scan in a predetermined first order by dividing between them the physical channels included in the range of overlap of the frequency band used for broadcasts in the first broadcast protocol and the frequency band used for broadcasts in the second broadcast protocol. In the second-phase DTMB channel scan, the third controller 463 and first controller 415 execute a channel scan by dividing between them the physical channels in which an electromagnetic wave was received with the power required by the fourth controller 473 but demodulation was impossible in the second broadcast protocol. In the third-phase DTMB channel scan, the third controller 463 and the first controller 415 execute a channel scan by dividing between them the physical channels included in the frequency band used in broadcasts of the first broadcast protocol but not included in the range of overlap of the frequency band used for broadcasts in the first broadcast protocol and the frequency band used for broadcasts in the second broadcast protocol. In the fourth-phase DTMB channel scan, the third controller 463 executes a channel scan in a predetermined first order on physical channels included in the range of overlap of the frequency band used for broadcasts in the first broadcast protocol and the frequency band used for broadcasts in the second broadcast protocol. In the fifth-phase DTMB channel scan, the third controller 463 executes a channel scan on physical channels in which an electromagnetic wave was received with the power required by the second controller 425 and fourth controller 473 but demodulation was impossible in the second broadcast protocol. In the sixth-phase DTMB channel scan, the third controller 463 executes a channel scan on physical channels included in the frequency band used in broadcasts of the first broadcast protocol but not included in the range of overlap of the frequency band used for broadcasts in the first broadcast protocol and the frequency band used for broadcasts in the second broadcast protocol.

The third controller 463 extracts tuning information from first data (PSI and SI) obtained from the first demultiplexer 112 and adds the extracted tuning information to a first service list stored in the first service list storage unit 114A of the first memory unit 314.

The fourth controller 473 controls the processing for scanning channels in the second broadcast protocol and the processing for receiving broadcasts in the second broadcast protocol. Here, if a service is being received in the second broadcast protocol, the fourth controller 473 according to the fourth embodiment may execute CMMB channel scans in a first phase and a second phase in the background, without the help of the second controller 425. If a service is being received in the first broadcast protocol, the fourth controller 473 according to the fourth embodiment may execute CMMB channel scans in a fourth phase and a fifth phase in the background. In the first-phase CMMB channel scan, the fourth controller 473 executes a channel scan in a predetermined second order on physical channels included in the range of overlap of the frequency band used by broadcasts in the first broadcast protocol and the frequency band used by broadcasts in the second broadcast protocol. The second order is the reverse of the first order used by the first controller 415 in controlling the channel scan. In the second-phase CMMB channel scan, the fourth controller 473 executes a channel scan on physical channels in which an electromagnetic wave was received with the power required by the first controller 415 and third controller 463 but was not an electrical signal in the first broadcast protocol. In the fourth-phase CMMB channel scan, the fourth controller 473 and second controller 425 execute channel scans in a predetermined second order by dividing between them the physical channels included in the range of overlap of the frequency band used by broadcasts in the first broadcast protocol and the frequency band used by broadcasts in the second broadcast protocol. In the fifth-phase CMMB channel scan, the fourth controller 473 and second controller 425 execute channel scans by dividing between them the physical channels in which an electromagnetic wave was received with the power required by the third controller 463 but demodulation was impossible in the first broadcast protocol.

The fourth controller 473 extracts tuning information from second data (CIT) obtained from the fourth demultiplexer 372 and adds the extracted tuning information to a second service list stored in the second service list storage unit 124A of the second memory unit 324.

The digital broadcast receiver 400 configured as described above operates as described below.

If the second tuner 120, second demodulator 121, second demultiplexer 122, and second decoder 123 are receiving and decoding CMMB signals, the following channel scans are executed in the background.

The first controller 415 controls the first tuner 110, first demodulator 111, and first demultiplexer 112 to execute the first-phase DTMB channel scan (a channel scan of channel 13 and subsequent channels, for example). The third controller 463 controls the third tuner 360, third demodulator 361, and third demultiplexer 362 to execute the first-phase DTMB channel scan (a channel scan of channel 22 and subsequent channels, for example). The fourth controller 473 controls the fourth tuner 370, fourth demodulator 371, and fourth demultiplexer 372 to execute the first-phase CMMB channel scan (a channel scan of channel 48 and preceding channels, for example). These three channel scans, which are the first-phase DTMB channel scans by the first controller 415 and third controller 463 and the first-phase CMMB channel scan by the fourth controller 473, are executed in parallel. The band to be scanned is divided among the three sections. The channel numbers of physical channels in which the received level of an electromagnetic wave detected in the first-phase DTMB channel scans executed by the first controller 415 and third controller 463 was higher than a second threshold but demodulation was impossible are recorded in the first scan use channel list and the third scan use channel list. The channel numbers of physical channels in which the received level of an electromagnetic wave detected in the first-phase CMMB channel scan executed by the fourth controller 473 was higher than a first threshold but demodulation was impossible are recorded in the fourth scan use channel list.

Then, the first controller 415 and third controller 463 execute second-phase DTMB channel scans on channels having channel numbers included in the fourth scan use channel list by dividing the channels between them. There is no particular limitation on how the channels are divided. For example, the first controller 415 may scan channels in the order in which they were added to the fourth scan use channel list (in descending order of channel number), and the third controller 463 may scan channels in reverse order in which they were added to the fourth scan use channel list (in ascending order of channel number). In parallel with the channel scans, the fourth controller 473 executes the second-phase CMMB channel scan on channels having channel numbers included in the first scan use channel list and the third scan use channel list.

The first controller 415 and third controller 463 execute third-phase DTMB channel scans on the remaining channels that were not scanned in the first phase or second phase and have not yet been scanned, dividing the channels between them. The division here is the same as in the third embodiment.

If a CMMB signal is being received and decoded, the channel scans described above may be started when the first controller 415, second controller 425, third controller 463, or fourth controller 473 gives an instruction to another controller. The instruction may also be supplied from the UIF processor 334. It is also preferable that the instruction is provided at predetermined timings, such as at regular intervals.

If the first tuner 110, first demodulator 111, second demultiplexer 122, and second decoder 123 are receiving and decoding DTMB signals, the following channel scans are executed in the background.

The third controller 463 controls the third tuner 360, third demodulator 361, and third demultiplexer 362 to execute the fourth-phase DTMB channel scan (a channel scan of channel 13 and subsequent channels, for example). The second controller 425 controls the second tuner 120, second demodulator 121, and second demultiplexer 122 to execute the fourth-phase CMMB channel scan (a channel scan of channel 48 and preceding channels, for example). The fourth controller 473 controls the fourth tuner 370, fourth demodulator 371, and fourth demultiplexer 372 to execute the fourth-phase CMMB channel scan (a channel scan of channel 39 and preceding channels, for example). These three channel scans, which are the fourth-phase DTMB channel scan by the third controller 463 and the fourth-phase CMMB channel scans by the second controller 425 and fourth controller 473, are executed in parallel. The band to be scanned is divided among the three sections. The channel numbers of physical channels in which the received level of an electromagnetic wave detected in the fourth-phase DTMB channel scan executed by the third controller 463 was higher than a second threshold but demodulation was impossible are recorded in the third scan use channel list. The channel numbers of physical channels in which the received level of an electromagnetic wave detected in the fourth-phase CMMB channel scans executed by the second controller 425 and fourth controller 473 was higher than a first threshold but demodulation was impossible are recorded in the second scan use channel list and fourth scan use channel list.

Then, the third controller 463 executes a fifth-phase DTMB channel scan on channels having channel numbers included in the second scan use channel list and fourth scan use channel list. In parallel with the channel scan, the second controller 425 and fourth controller 473 execute fifth-phase CMMB channel scans on channels having channel numbers included in the third scan use channel list by dividing the channels between them. The division of channels is not specified particularly. For example, the second controller 425 may scan channels in the order in which they were added to the third scan use channel list (in ascending order of channel number), and the fourth controller 473 may scan channels in the reverse order of the order in which they were added to the third scan use channel list (in descending order of channel number).

The third controller 463 executes a sixth-phase DTMB channel scan on remaining channels that were not scanned in the first phase or second phase and have not yet been scanned.

If a DTMB signal is being received and decoded, the channel scans as described above may be started when the first controller 415, second controller 425, third controller 463, or fourth controller 473 gives an instruction to another controller. The instruction may also be supplied from the UIF processor 334. It is also preferable that the instruction is provided at predetermined timings, such as at regular intervals.

The digital broadcast receiver 400 according to the fourth embodiment can temporally shorten a channel scan that is executed constantly in the background while a service is being viewed. Therefore, the cycle time of the channel scan that is executed constantly in the background while services are being viewed can be reduced. If the cycle time of the constantly executed channel scan is reduced, then while the user of a moving digital broadcast receiver 400 is viewing services, for example, a more accurate service list of services that can be viewed at the place to which the user moves can be generated. In other words, a long channel scan cycle would result in long intervals between the scanning of any one channel, so there would be long intervals in which changes in the reception state of the channel would not be reflected on the service list. Then when the user selected the service, the reception environment included in the service list might quite possibly have changed, making reception impossible.

With a long channel scan cycle, there is a strong possibility that the service list will become inaccurate when the receiver is moved from one service area to another service area and the channel is switched. In other words, a shorter channel scan cycle in the background makes the service list more accurate, increasing the rate of correct channel selection.

In the digital broadcast receiver 400 according to the fourth embodiment, since quick channel scans can be constantly executed in the background, channel scans can be quickly executed automatically in the background when power is turned on, so a service list can be quickly presented to the user. Further, since the digital broadcast receiver 400 according to the fourth embodiment can create a service list in a short time, a nonvolatile memory for storing the service list becomes unnecessary.

Fifth Embodiment

Although DTMB is used as the first broadcast protocol and CMMB as the second broadcast protocol in the first to fourth embodiments, this is not a limitation. The present invention can be applied whenever the frequency band used by the first broadcast protocol at least partly overlaps the frequency band used by the second broadcast protocol. In the fifth embodiment described below, ATSC (Advanced Television Systems Committee) is used as the first broadcast protocol, and ATSC-M/H (ATSC-Mobile/Handheld) is used as the second broadcast protocol.

Figure 21:
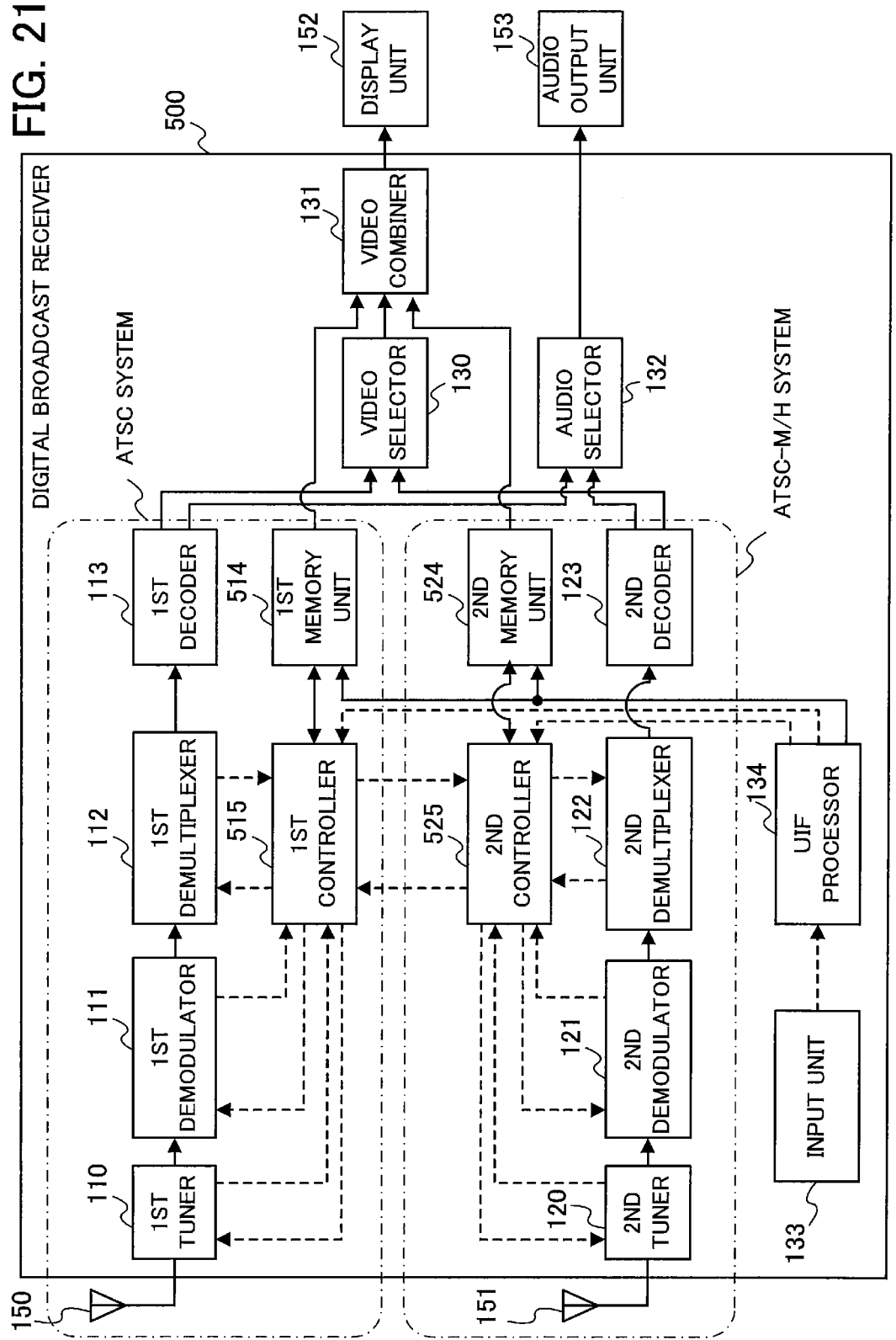
FIG. 21 is a block diagram schematically showing the configuration of a digital broadcast receiver according to a fifth embodiment.

FIG. 21 is a block diagram schematically showing the configuration of a digital broadcast receiver 500 according to a fifth embodiment. As shown in FIG. 21, the digital broadcast receiver 500 includes a first tuner 110, a first demodulator 111, a first demultiplexer 112, a first decoder 113, a first memory unit 514, a first controller 515, a second tuner 120, a second demodulator 121, a second demultiplexer 122, a second decoder 123, a second memory unit 524, a second controller 525, a video selector 130, a video combiner 131, an audio selector 132, an input unit 133, and a UIF processor 134. A first antenna 150 is connected to the first tuner 110. The first antenna 150, first tuner 110, first demodulator 111, first demultiplexer 112, first decoder 113, first memory unit 514, and first controller 515 form an ATSC section for receiving ATSC broadcasts, ATSC being the first broadcast protocol. A second antenna 151 is connected to the second tuner 120. The second antenna 151, second tuner 120, second demodulator 121, second demultiplexer 122, second decoder 123, second memory unit 524, and second controller 525 form an ATSC-M/H section for receiving ATSC-M/H broadcasts, ATSC-M/H being the second broadcast protocol.

The digital broadcast receiver 500 in the fifth embodiment differs from the digital broadcast receiver 100 in the first embodiment in regard to the control and processing in the first controller 515 and second controller 525 and the information stored in the first memory unit 514 and second memory unit 524.

The first memory unit 514 stores information needed to scan the channels in the first broadcast protocol and the second broadcast protocol and information needed to receive services broadcast in the first broadcast protocol.

Figure 22:
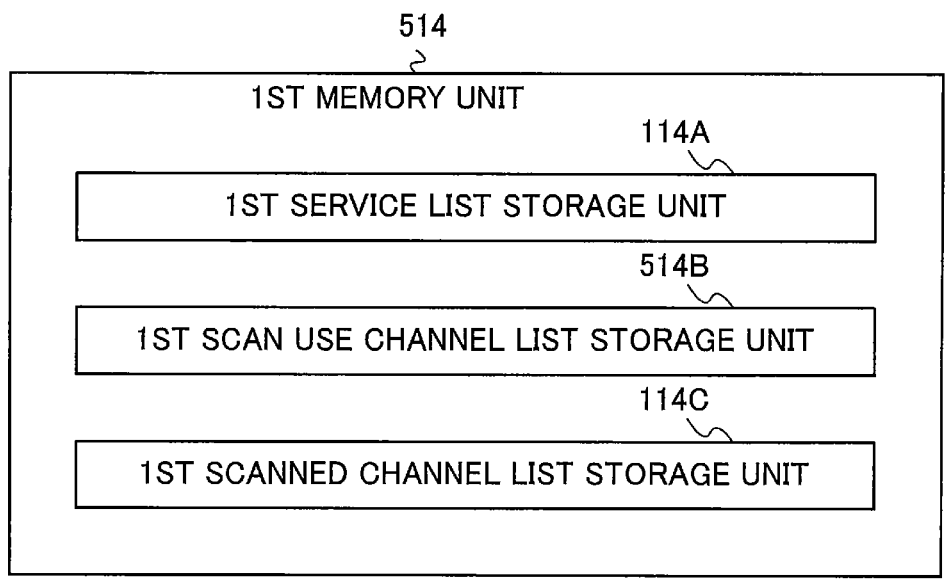
FIG. 22 is a block diagram schematically showing the configuration of the first memory unit in the fifth embodiment.

FIG. 22 is a block diagram schematically showing the configuration of the first memory unit 514. As shown in FIG. 22, the first memory unit 514 includes a first service list storage unit 114A, a first scan use channel list storage unit 514B, and a first scanned channel list storage unit 114C. The first memory unit 514 in the fifth embodiment differs from the first memory unit 114 in the first embodiment in regard to the information stored in the first scan use channel list storage unit 514B.

The first scan use channel list storage unit 514B stores a first scan use channel list which lists identification information (channel numbers, in this case) for identifying physical channels in which the received level of the electromagnetic wave received by the first tuner 110 in a channel scan was higher than a predetermined threshold and the electrical signal generated from the electromagnetic wave could be demodulated by the first demodulator 111. For example, the first scan use channel list includes the channel numbers of physical channels in which the received level of the electromagnetic wave received was higher than a first threshold, the first threshold being the lowest received level at which stable viewing of an ATSC service is possible, and the electrical signal generated from the electromagnetic wave could be demodulated. The first threshold is the value calculated by the above formula (3) or a value selected from the minimum received signal power levels specified in the ATSC standard.

Referring again to FIG. 21, the first controller 515 controls the processing for scanning channels in the first broadcast protocol and the processing for receiving broadcasts in the first broadcast protocol. For example, the first controller 515 may execute an ATSC channel scan in a first phase and a second phase. If the frequency band used for ATSC broadcasts is wider than the frequency band used for ATSC-M/H broadcasts, the first controller 515 may also execute an ATSC channel scan in a third phase.

In the first-phase ATSC channel scan, the first controller 515 executes a channel scan in a predetermined first order on physical channels that have not yet been scanned by the second controller 125, among the physical channels included in the range of overlap of the frequency band used by broadcasts in the first broadcast protocol and the frequency band used by broadcasts in the second broadcast protocol. If a physical channel in which the received level of the electromagnetic wave received was higher than a first threshold and the electrical signal generated from the electromagnetic wave could be demodulated is found in the first-phase ATSC channel scan, the first controller 515 adds the tuning information of the physical channel to a first service list and adds the channel number of the physical channel to the first scan use channel list.

In the second-phase ATSC channel scan, the first controller 515 scans physical channels having channel numbers included in a second scan use channel list. In the third-phase ATSC channel scan, the first controller 515 scans physical channel not included in the range of overlap of the frequency band used for broadcasts in the first broadcast protocol and the frequency band used for broadcasts in the second broadcast protocol.

The second memory unit 524 stores information needed to scan the channels in the first broadcast protocol and the second broadcast protocol and information needed to receive services broadcast in the second broadcast protocol.

Figure 23:
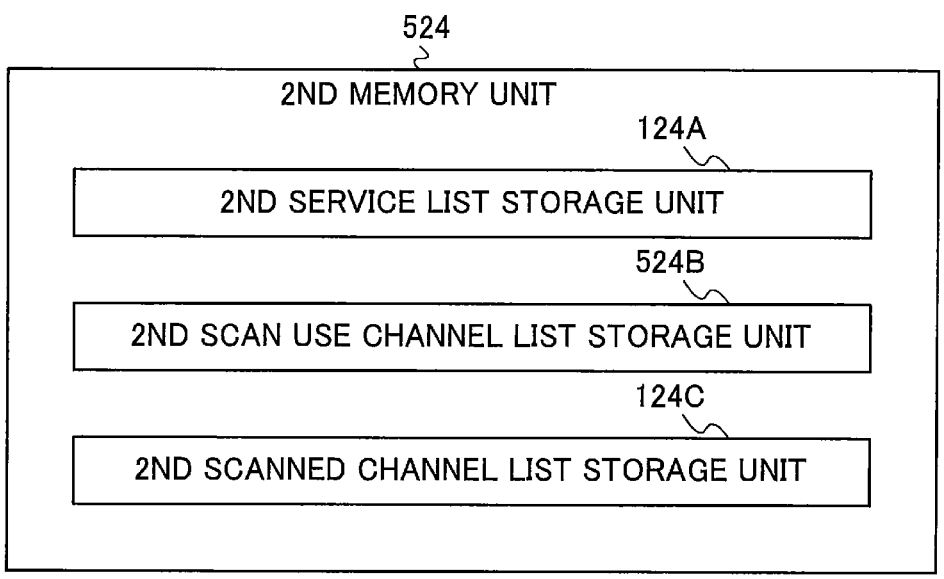
FIG. 23 is a block diagram schematically showing the configuration of the second memory unit in the fifth embodiment.

FIG. 23 is a block diagram schematically showing the configuration of the second memory unit 524. As shown in FIG. 23, the second memory unit 524 includes a second service list storage unit 124A, a second scan use channel list storage unit 524B, and a second scanned channel list storage unit 124C. The second memory unit 524 in the fifth embodiment differs from the second memory unit 124 in the first embodiment in regard to the information stored in the second scan use channel list storage unit 524B.

The second scan use channel list storage unit 524B stores a second scan use channel list which lists identification information (channel numbers, here) for identifying physical channels in which the received level of the electromagnetic wave received by the second tuner 120 in a channel scan was higher than a predetermined second threshold and the electrical signal generated from the electromagnetic wave could be demodulated by the second demodulator 121 and identification information (channel numbers, here) for identifying physical channels in which the received level of the electromagnetic wave received by the second tuner 120 in a channel scan was higher than a predetermined first threshold but the electrical signal generated from the electromagnetic wave could not be demodulated (frame lock was not achieved) by the second demodulator 121.

For example, the second scan use channel list includes the channel numbers of physical channels in which the received level of the electromagnetic wave received in the physical channel was higher than a second threshold, the second threshold being the lowest received level at which stable viewing of an ATSC-M/H service is possible, ATSC-M/H being the second broadcast protocol, and the electrical signal generated from the electromagnetic wave could be demodulated, and the channel numbers of physical channels in which the received level of the electromagnetic wave received in the physical channel was higher than a first threshold, the first threshold being the lowest received level at which stable viewing of an ATSC service is possible, ATSC being the first broadcast protocol, and the electrical signal generated from the electromagnetic wave could not be demodulated.

Here, the second threshold is the value calculated by the above formula (1) or a value selected from the minimum received signal power levels specified in the ATSC-M/H standard.

Referring again to FIG. 21, the second controller 525 controls the processing for scanning channels in the second broadcast protocol and the processing for receiving broadcasts in the second broadcast protocol. For example, the second controller 525 may execute an ATSC-M/H channel scan in a first phase and a second phase.

In the first-phase ATSC-M/H channel scan, the second controller 525 executes a channel scan in a predetermined second order on physical channels that have not yet been scanned by the first controller 515, among the physical channels included in the range of overlap of the frequency band used by broadcasts in the second broadcast protocol and the frequency band used by broadcasts in the first broadcast protocol. The second order is the reverse of the first order used by the first controller 515 in controlling the channel scan. If a physical channel in which the received level of the electromagnetic wave was higher than a second threshold and the electrical signal generated from the electromagnetic wave could be demodulated into the ATSC-M/H broadcast signal is found in the first-phase ATSC-M/H channel scan, the second controller 525 adds the tuning information of the physical channel to a second service list and adds the channel number of the physical channel to the second scan use channel list. If a physical channel in which the received level of the electromagnetic wave was higher than a first threshold and the electrical signal generated from the electromagnetic wave could not be demodulated is found in the first-phase ATSC-M/H channel scan, the second controller 525 further adds the channel number of the physical channel to the second scan use channel list.

In the second-phase ATSC-M/H channel scan, the second controller 525 scans physical channels having channel numbers included in the first scan use channel list.

In the digital broadcast receiver 500 according to the fifth embodiment, configured as described above, the first controller 515 and second controller 525 control channel scans of physical channels included in the range of overlap of the frequency band used by broadcasts in the first broadcast protocol and the frequency band used by broadcasts in the second broadcast protocol as follows. The channels scanned in the first-phase channel scan are divided between the first controller 515 and second controller 525, and the channels scanned in the second-phase channel scan are limited to physical channels that are likely to include corresponding broadcasts. Accordingly, efficient channel scans can be executed, and the channel scan time can be reduced.

The fifth embodiment differs from the first embodiment in that ATSC is used as the first broadcast protocol and ATSC-M/H is used as the second broadcast protocol in the digital broadcast receiver 100. The digital broadcast receiver 200, digital broadcast receiver 300, and digital broadcast receiver 400 in the second to fourth embodiments can also be used by specifying ATSC as the first broadcast protocol and ATSC-M/H as the second broadcast protocol.

In the fifth embodiment, ATSC is used as the first broadcast protocol and ATSC-M/H is used as the second broadcast protocol, but the invention can be applied whenever the frequency band used by the first broadcast protocol overlaps the frequency band used by the second broadcast protocol and in physical channels having identical channel numbers, broadcasts in the first broadcast protocol may be broadcast independently, but broadcasts in the second broadcast protocol are multiplexed together with the broadcasts in the first broadcast protocol. For example, DVB-T (Digital Video Broadcasting-Terrestrial) can be used as the first broadcast protocol, and DVB-H (Digital Video Broadcasting-Handheld) can be used as the second broadcast protocol. Alternatively, DVB-T2 may be used as the first broadcast protocol and DVB-H may be used as the second broadcast protocol. Furthermore, the digital broadcast receivers 100, 200, 300, 400 in the first to fourth embodiments may use DVB-T as the first broadcast protocol and DVB-H as the second broadcast protocol. Alternatively, in those receivers, DVB-T2 may be used as the first broadcast protocol and DVB-H may be used as the second broadcast protocol. Those receivers may also use DVB-T2 as the first broadcast protocol and DVB-T as the second broadcast protocol.

The exemplary digital broadcast receivers 100, 200, 300, 400, 500 in the first to fifth embodiments were shown as television broadcast receivers, but they can also be information recorders/players such as DVD recorders/players and BD recorders/players.

The digital broadcast receivers 100, 200, 300, 400, 500 in the first to fifth embodiments output video and audio signals to the display unit 152 and the audio output unit 153, but they may include these units as internal components used for video and audio output.

The digital broadcast receivers 100, 200, 500 in the first, second, and fifth embodiments may include only at least one of the first antenna 150 and the second antenna 151.

The digital broadcast receivers 300, 400 in the third and fourth embodiments may include only at least one of the first antenna 150, second antenna 151, third antenna 354, and fourth antenna 355.

The first controller 115 in the first and second embodiments adds the channel number of a physical channel in which the received level of the electromagnetic wave was higher than the second threshold but demodulation was impossible in the first broadcast protocol to the first channel list, but the first controller 115 may add the channel number of a physical channel in which demodulation was impossible in the first broadcast protocol to the first channel list, regardless of the received level. The second controller 125 may also add the channel number of a physical channel in which demodulation was impossible in the second broadcast protocol to the second channel list, regardless of the received level.

The first controllers 315, 415 and third controllers 363, 463 in the third and fourth embodiments add the channel number of a physical channel in which the received level of the electromagnetic wave was higher than the second threshold but demodulation was impossible in the first broadcast protocol to the first channel list, but these controllers may add the channel number of a physical channel in which demodulation was impossible in the first broadcast protocol to the first channel list, regardless of the received level. The second controllers 325, 425 and fourth controllers 373, 473 may also add the channel number of a physical channel in which demodulation was impossible in the second broadcast protocol to the second channel list, regardless of the received level.

Sixth Embodiment

In the first to fifth embodiments, the channel scan time is reduced when two sections are used to execute channel scans in two different broadcast protocols. Specific examples in which DVB-T is used as the first broadcast protocol while DVB-H is used as the second broadcast protocol, DVB-T2 is used as the first broadcast protocol while DVB-H is used as the second broadcast protocol, and DVB-T2 is used as the first broadcast protocol while DVB-T is used as the second broadcast protocol were given above. In Europe, however, the DVB-T, DVB-T2, and DVB-H broadcast protocols coexist and use partly overlapping frequency bands. The sixth embodiment illustrates a configuration in which channel scan time is reduced by using two receiving sections to scan channels with three different broadcast protocols.

Figure 24:
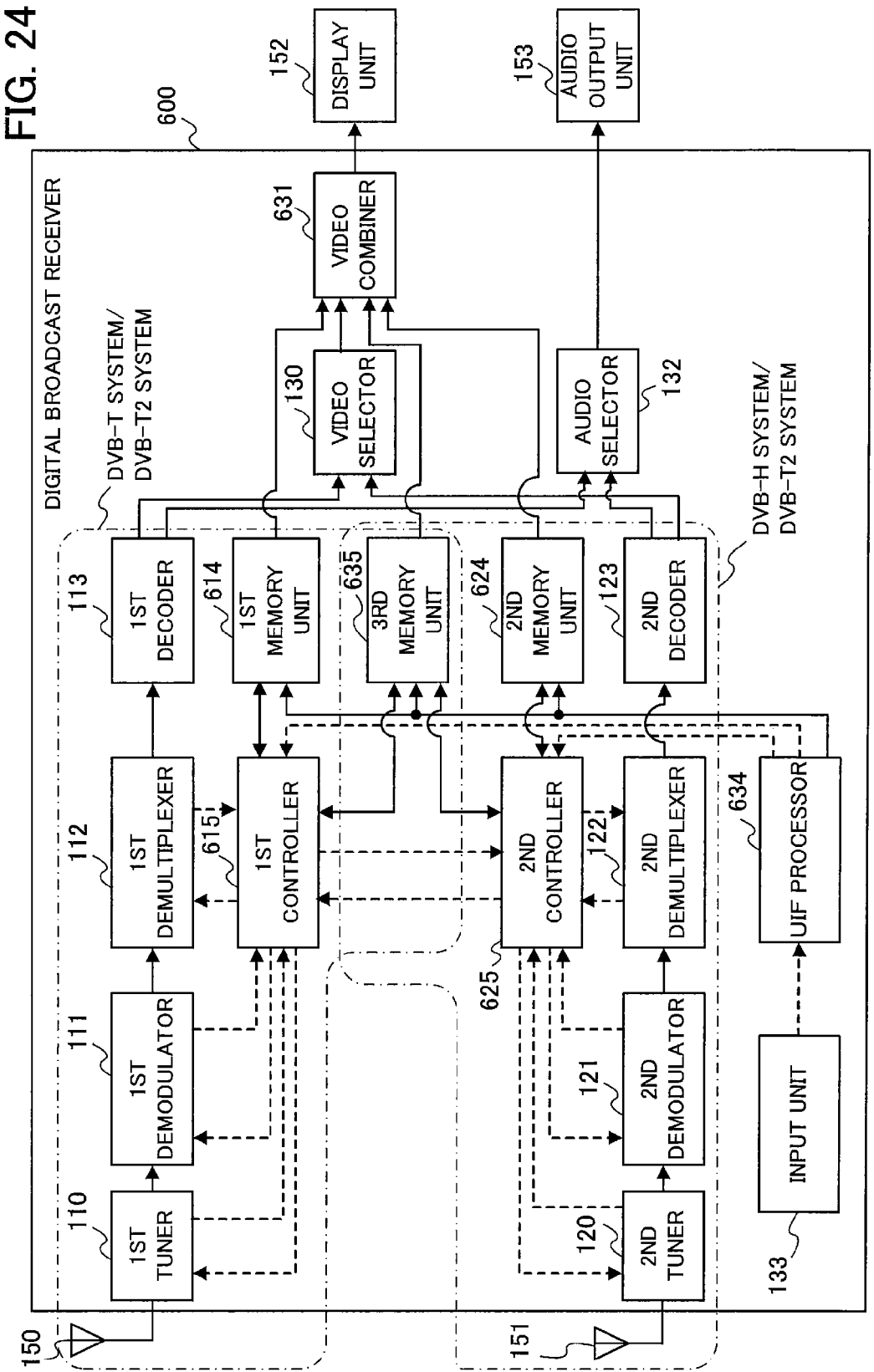
FIG. 24 is a block diagram schematically showing the configuration of a digital broadcast receiver according to a sixth embodiment.

FIG. 24 is a block diagram schematically showing the configuration of a digital broadcast receiver 600 according to the sixth embodiment. As shown in FIG. 24, the digital broadcast receiver 600 includes a first tuner 110, a first demodulator 111, a first demultiplexer 112, a first decoder 113, a first memory unit 614, a first controller 615, a second tuner 120, a second demodulator 121, a second demultiplexer 122, a second decoder 123, a second memory unit 624, a second controller 625, a video selector 130, a video combiner 631, an audio selector 132, an input unit 133, a UIF processor 634, and a third memory unit 635. A first antenna 150 is connected to the first tuner 110; the first antenna 150, first tuner 110, first demodulator 111, first demultiplexer 112, first decoder 113, first memory unit 614, first controller 615, and third memory unit 635 form a DVB-T section and a DVB-T2 section. These sections receive DVB-T broadcasts and DVB-T2 broadcasts, DVB-T being the first broadcast protocol and DVB-T2 being a third broadcast protocol. A second antenna 151 is connected to the second tuner 120; the second antenna 151, second tuner 120, second demodulator 121, second demultiplexer 122, second decoder 123, second memory unit 624, second controller 625, and third memory unit 635 form a DVB-H section and a DVB-T2 section. These sections receive DVB-H broadcasts and DVB-T2 broadcasts, DVB-H being the second broadcast protocol and DVB-T2 being the third broadcast protocol.

The digital broadcast receiver 600 in the sixth embodiment differs from the digital broadcast receiver 100 in the first embodiment in regard to the control and processing in the first controller 615, second controller 625, video combiner 631, and UIF processor 634 and the information stored in the first memory unit 614 and second memory unit 624, and in having the third memory unit 635.

The first memory unit 614 stores information needed to scan the channels in the first broadcast protocol and the second broadcast protocol and information needed to receive services broadcast in the first broadcast protocol.

Figure 25:
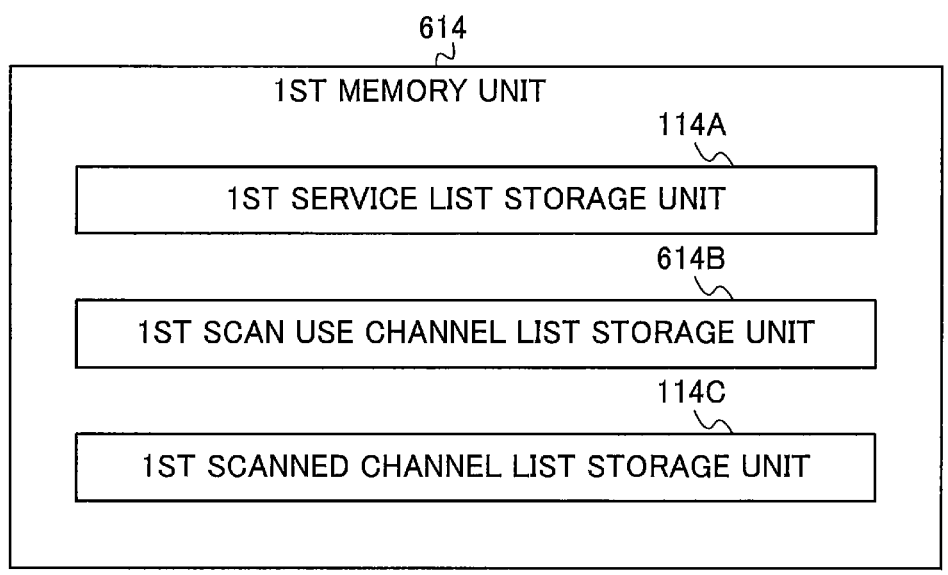
FIG. 25 is a block diagram schematically showing the configuration of the first memory unit in the sixth embodiment.

FIG. 25 is a block diagram schematically showing the configuration of the first memory unit 614. As shown in FIG. 25, the first memory unit 614 includes a first service list storage unit 114A, a first scan use channel list storage unit 614B, and a first scanned channel list storage unit 114C. The first memory unit 614 in the sixth embodiment differs from the first memory unit 114 in the first embodiment in regard to the information stored in the first scan use channel list storage unit 614B.

The first scan use channel list storage unit 614B stores a first scan use channel list which lists identification information (channel numbers, here) for identifying physical channels in which the received level of the electromagnetic wave received by the first tuner 110 in a channel scan is higher than a predetermined threshold but the electrical signal generated from the electromagnetic wave cannot be demodulated (frame lock is not achieved) by the first demodulator 111. For example, the first scan use channel list includes the channel numbers of physical channels in which, when a DVB-T channel scan was executed, DVB-T being the first broadcast protocol, the electrical signal generated from the received electromagnetic wave could not be demodulated by the first demodulator 111 and the received level of the electromagnetic wave was higher than a second threshold, the second threshold being the lowest received level at which stable viewing of a DVB-H service is possible, DVB-H being the second broadcast protocol, and channels in which, when a DVB-T channel scan was executed, DVB-T being the first broadcast protocol, the electrical signal generated from the received electromagnetic wave could not be demodulated by the first demodulator 111 and the received level of the electromagnetic wave was higher than a third threshold, the third threshold being the lowest received level at which stable viewing of a DVB-T2 service is possible, DVB-T2 being the third broadcast protocol.

The second threshold is a value obtained by using the above formula (3) or a value selected from the minimum received signal power levels specified in the DVB-H standard, and indicates the minimum received power level required to receive a service in the second broadcast protocol (here, DVB-H). The third threshold is a value obtained by using the above formula (3) or a value selected from the minimum received signal power levels specified in the DVB-T2 standard, and indicates the minimum received power level required to receive a service in the third broadcast protocol (here, DVB-T2).

The third memory unit 635 stores information needed to scan the channels in the third broadcast protocol and information needed to receive services broadcast in the third broadcast protocol.

Figure 26:
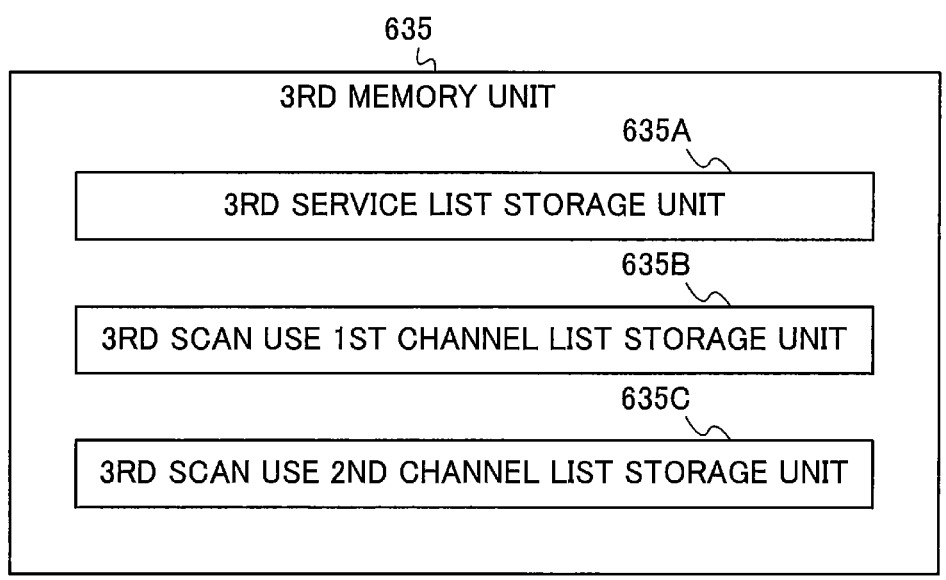
FIG. 26 is a block diagram schematically showing the configuration of the third memory unit in the sixth embodiment.

FIG. 26 is a block diagram schematically showing the configuration of the third memory unit 635. As shown in FIG. 26, the third memory unit 635 includes a third service list storage unit 635A, a third scan use first channel list storage unit 635B, and a third scan use second channel list storage unit 635C. The third memory unit 635 and third scan use second channel list storage unit 635C may be referred to as a third scan use channel list storage unit. The third scan use first channel list stored in the third memory unit 635 and the third scan use second channel list stored in the third scan use second channel list storage unit 635C may be referred to as a third scan use channel list.

The third service list storage unit 635A stores a list of tuning information needed to receive services broadcast in the third broadcast protocol. For example, the third service list storage unit 635A stores a third service list of tuning information on a channel basis, including network information, TS information, and service information extracted by the first controller 615.

The third scan use first channel list storage unit 635B stores a third scan use first channel list which lists identification information (channel numbers, here) for identifying physical channels in which the received level of the electromagnetic wave received by the first tuner 110 in a channel scan is higher than a predetermined threshold but the electrical signal generated from the electromagnetic wave cannot be demodulated (frame lock is not achieved) by the first demodulator 111. For example, the third scan use first channel list includes the channel numbers of physical channels in which, when a DVB-T channel scan was executed in the second phase and third phase, DVB-T being the first broadcast protocol, the electrical signal generated from the received electromagnetic wave could not be demodulated by the first demodulator 111 and the received level of the electromagnetic wave was higher than a third threshold, the third threshold being the lowest received level at which stable viewing of a DVB-T2 service is possible, DVB-T2 being the third broadcast protocol.

The third threshold is the value calculated by the above formula (3) or a value selected from the minimum received signal power levels specified in the DVB-T2 standard, and indicates the minimum received power level required to receive a service in the third broadcast protocol (DVB-T2, here).

The third scan use second channel list storage unit 635C stores a third scan use second channel list which lists identification information (channel numbers, here) for identifying physical channels in which the received level of the electromagnetic wave received by the second tuner 120 in a channel scan is higher than a predetermined threshold but the electrical signal generated from the electromagnetic wave cannot be demodulated (frame lock is not achieved) by the second demodulator 121. For example, the third scan use second channel list includes the channel numbers of physical channels in which, when a DVB-H channel scan was executed in the second phase and the third phase, DVB-H being the second broadcast protocol, the electrical signal generated from the received electromagnetic wave could not be demodulated by the second demodulator 121 and the received level of the electromagnetic wave was higher than a third threshold, the third threshold being the lowest received level at which stable viewing of a DVB-T2 service is possible, DVB-T2 being the third broadcast protocol.

Referring again to FIG. 24, the first controller 615 controls the processing for scanning channels in the first broadcast protocol and the third broadcast protocol and the processing for receiving broadcasts in the first broadcast protocol and the third broadcast protocol. For example, the first controller 615 may execute a DVB-T channel scan in a first phase and a second phase. If the frequency band used for DVB-T broadcasts is wider than the frequency band used for DVB-H broadcasts, the first controller 615 may also execute a DVB-T channel scan in a third phase. The first controller 615 may further execute a DVB-T2 channel scan in a fourth phase.

In the first-phase DVB-T channel scan, the first controller 615 executes a channel scan in a predetermined first order on physical channels that have not yet been scanned by the second controller 625, among the physical channels included in the range of overlap of the frequency band used by broadcasts in the first broadcast protocol and the frequency band used by broadcasts in the second broadcast protocol. In the first-phase DVB-T channel scan, if a physical channel in which the received level of the electromagnetic wave was higher than a first threshold and the electrical signal generated from the electromagnetic wave could be demodulated is found, the first controller 615 adds the tuning information of the physical channel to a first service list and adds the channel number of a physical channel in which the received level of the electromagnetic wave was higher than a second threshold or a third threshold and the electrical signal generated from the electromagnetic wave could not be demodulated to the first scan use channel list.

In the second-phase DVB-T channel scan, the first controller 615 scans physical channels having channel numbers included in a second scan use channel list. If a physical channel in which the received level of the electromagnetic wave was higher than the first threshold and the electrical signal generated from the electromagnetic wave could be demodulated is found, the first controller 615 adds the tuning information of the physical channel to the first service list. The first controller 615 also adds the channel number of a physical channel in which the received level of the electromagnetic wave was higher than a third threshold and the electrical signal generated from the electromagnetic wave could not be demodulated to the third scan use first channel list.

In the third-phase DVB-T channel scan, the first controller 615 scans physical channel not included in the range of overlap of the frequency band used for broadcasts in the first broadcast protocol and the frequency band used for broadcasts in the second broadcast protocol. If a physical channel in which the received level of the electromagnetic wave was higher than the first threshold and the electrical signal generated from the electromagnetic wave could be demodulated is found, the first controller 615 adds the tuning information of the physical channel to the first service list. The first controller 615 also adds the channel number of a physical channel in which the received level of the electromagnetic wave was higher than the third threshold and the electrical signal generated from the electromagnetic wave could not be demodulated to the third scan use first channel list.

In the fourth-phase DVB-T2 channel scan, the first controller 615 scans physical channels having channel numbers included in the third scan use first channel list and the third scan use second channel list. If a physical channel in which the received level of the electromagnetic wave was higher than the third threshold and the electrical signal generated from the electromagnetic wave could be demodulated is found, the first controller 615 adds the tuning information of the physical channel to the third service list.

The second memory unit 624 stores information needed to scan the channels in the second broadcast protocol and the first broadcast protocol and information needed to receive services broadcast in the second broadcast protocol.

Figure 27:
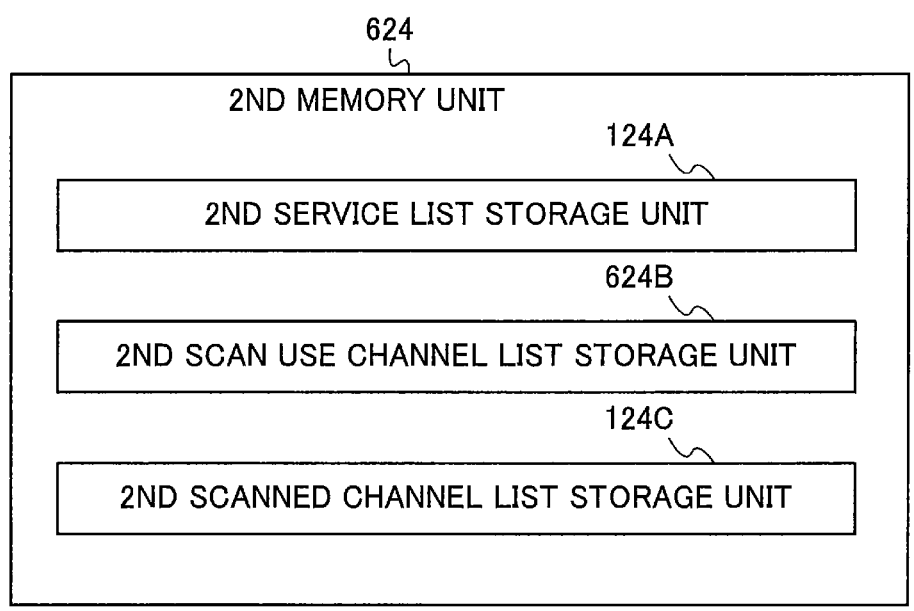
FIG. 27 is a block diagram schematically showing the configuration of the second memory unit in the sixth embodiment.

FIG. 27 is a block diagram schematically showing the configuration of the second memory unit 624. As shown in FIG. 27, the second memory unit 624 includes a second service list storage unit 124A, a second scan use channel list storage unit 624B, and a second scanned channel list storage unit 124C. The second memory unit 624 in the sixth embodiment differs from the first memory unit 114 in the first embodiment in the information stored in the first scan use channel list storage unit 614B.

The second scan use channel list storage unit 624B stores a second scan use channel list which lists identification information (channel numbers, here) for identifying physical channels in which the received level of the electromagnetic wave received by the second tuner 120 in a channel scan is higher than a predetermined threshold but the electrical signal generated from the electromagnetic wave cannot be demodulated (frame lock is not achieved) by the second demodulator 121. For example, the second scan use channel list includes the channel numbers of physical channels in which, when a DVB-H channel scan was executed, DVB-H being the second broadcast protocol, the electrical signal generated from the received electromagnetic wave could not be demodulated by the second demodulator 121 and the received level of the electromagnetic wave was higher than a first threshold, the first threshold being the lowest received level at which stable viewing of a DVB-T service is possible, DVB-T being the first broadcast protocol, and channels in which, when a DVB-H channel scan was executed, DVB-H being the second broadcast protocol, the electrical signal generated from the received electromagnetic wave could not be demodulated by the second demodulator 121 and the received level of the electromagnetic wave received in the physical channel was higher than a third threshold, the third threshold being the lowest received level at which stable viewing of a DVB-T2 service is possible, DVB-T2 being the third broadcast protocol.

The first threshold is a value obtained by using the above formula (3) or a value selected from the minimum received signal power levels specified in the DVB-T standard, and indicates the minimum received power level required to receive a service in the first broadcast protocol (DVB-T, here).

Referring again to FIG. 24, the second controller 625 controls the processing for scanning channels in the second broadcast protocol and the third broadcast protocol and the processing for receiving broadcasts in the second broadcast protocol and the third broadcast protocol. For example, the second controller 625 may execute a DVB-H channel scan in a first phase and a second phase. If the frequency band used for DVB-H broadcasts is wider than the frequency band used for DVB-T broadcasts, the second controller 625 may also execute a DVB-H channel scan in a third phase. The second controller 625 may further execute a DVB-T2 channel scan in a fourth phase.

In the first-phase DVB-H channel scan, the second controller 625 executes a channel scan in a predetermined second order on physical channels that have not yet been scanned by the first controller 615, among the physical channels included in the range of overlap of the frequency band used by broadcasts in the first broadcast protocol and the frequency band used by broadcasts in the second broadcast protocol. The second order is the reverse of the first order used by the first controller 615 in controlling the channel scan. In the first-phase DVB-H channel scan, if a physical channel in which the received level of the electromagnetic wave was higher than a second threshold and the electrical signal generated from the electromagnetic wave could be demodulated is found, the second controller 625 adds the tuning information of the physical channel to the second service list. The second controller 625 also adds the channel number of a physical channel in which the received level of the electromagnetic wave was higher than a first threshold or a third threshold and the electrical signal generated from the electromagnetic wave could not be demodulated to the second scan use channel list.

In the second-phase DVB-H channel scan, the second controller 625 scans physical channels having channel numbers included in the first scan use channel list. If a physical channel in which the received level of the electromagnetic wave was higher than the second threshold and the electrical signal generated from the electromagnetic wave could be demodulated is found, the second controller 625 adds the tuning information of the physical channel to the second service list. The second controller 625 also adds the channel number of a physical channel in which the received level of the electromagnetic wave was higher than a third threshold and the electrical signal generated from the electromagnetic wave could not be demodulated to the third scan use second channel list in the third memory unit 635.

In the third-phase DVB-H channel scan, the second controller 625 scans physical channel not included in the range of overlap of the frequency band used for broadcasts in the first broadcast protocol and the frequency band used for broadcasts in the second broadcast protocol. If a physical channel in which the received level of the electromagnetic wave was higher than the second threshold and the electrical signal generated from the electromagnetic wave could be demodulated is found, the second controller 625 adds the tuning information of the physical channel to the second service list. The second controller 625 also adds the channel number of a physical channel in which the received level of the electromagnetic wave was higher than the third threshold and the electrical signal generated from the electromagnetic wave could not be demodulated to the third scan use second channel list.

In the fourth-phase DVB-T2 channel scan, the second controller 625 scans physical channels included in neither the frequency band used for broadcasts in the first broadcast protocol nor the frequency band used for broadcasts in the second broadcast protocol. If a physical channel in which the received level of the electromagnetic wave was higher than the third threshold and the electrical signal generated from the electromagnetic wave could be demodulated is found, the second controller 625 adds the tuning information of the physical channel to the third service list.

The video combiner 631 combines the video image on the screen indicated by a first service list screen signal, a second service list screen signal, or a third service list screen signal supplied from the UIF processor 634 with the video image of the video signal supplied from the video selector 130 and outputs a combined video signal to the display unit 152. The video combiner 631 may output the video signal of the screen indicated by the first service list screen signal, the second service list screen signal, or the third service list screen signal supplied from the UIF processor 634, instead of the video signal supplied from the video selector 130, to the display unit 152. If none of the first service list screen signal, the second service list screen signal, and the third service list screen signal is supplied from the UIF processor 134, the video combiner 631 outputs the video signal supplied from the video selector 130 to the display unit 152.

The UIF processor 634 receives operation signals from the input unit 133 and gives instructions corresponding to the operation signals to the components of the digital broadcast receiver 100. If an operation signal to display a first service list screen is received from the input unit 133, the UIF processor 634 obtains the first service list stored in the first service list storage unit 114A and generates a screen signal for the first service list screen from the obtained list. The UIF processor 634 then passes the generated screen signal through the first memory unit 614 to the video combiner 631.

If an operation signal to display a second service list screen is received from the input unit 133, the UIF processor 634 obtains the second service list stored in the second service list storage unit 124A and generates a screen signal for the second service list screen from the obtained list. The UIF processor 634 then passes the generated screen signal through the second memory unit 624 to the video combiner 631.

If an operation signal to display a third service list screen is received from the input unit 133, the UIF processor 634 obtains the third service list stored in the third service list storage unit 635A and generates a screen signal for the third service list screen from the obtained list. The UIF processor 634 then passes the generated screen signal through the third memory unit 635 to the video combiner 631.

The operation of the digital broadcast receiver 600 in the sixth embodiment in a channel scan will next be described in detail. When the digital broadcast receiver 600 is initialized, when the broadcast configuration changes, or when the receiver is mounted on a mobile device and moves from one service area to another service area, the digital broadcast receiver 600 in the sixth embodiment performs a channel scan and generates digital broadcast service lists for the DVB-T, DVB-H, and DVB-T2 broadcast protocols.

Figure 28:
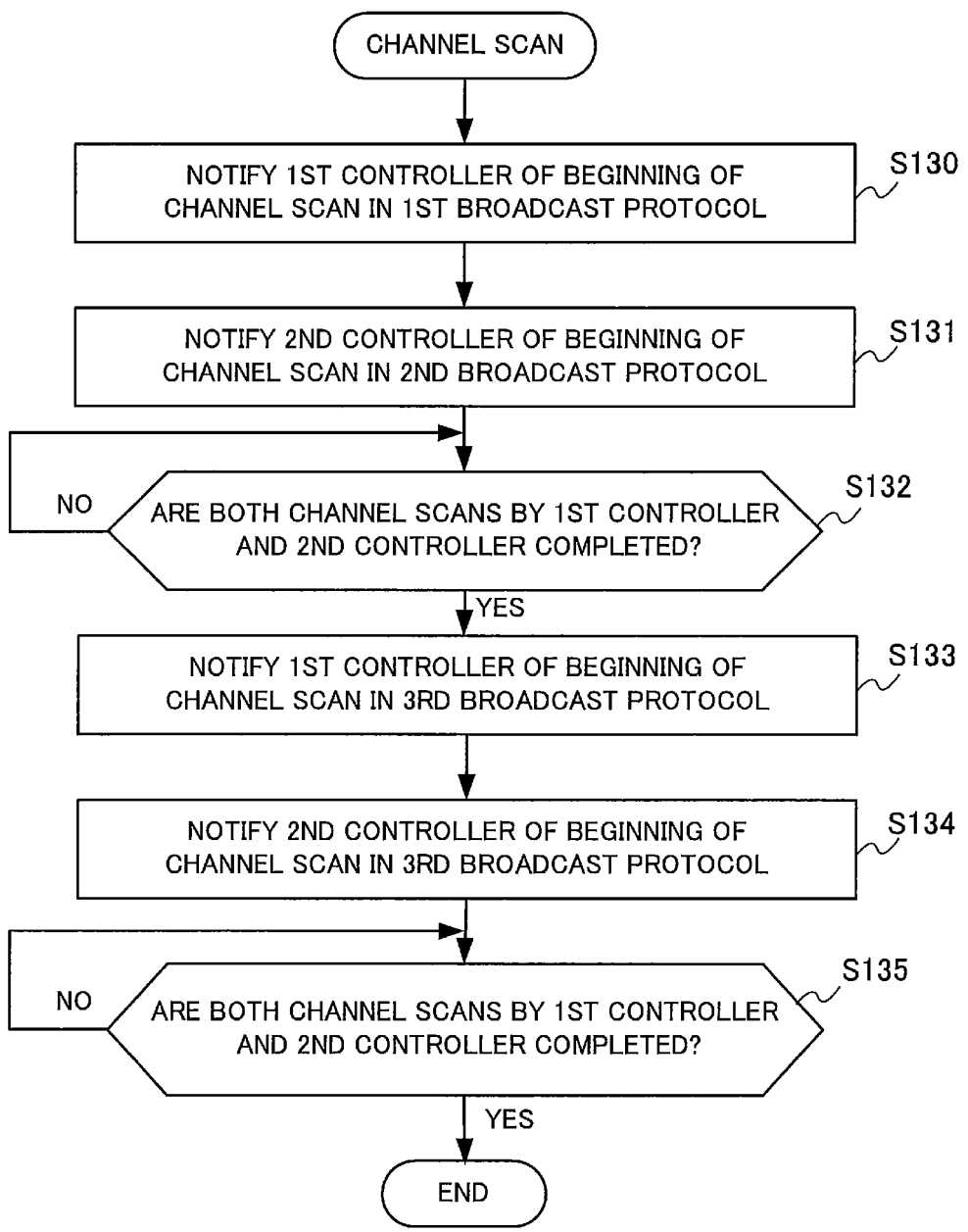
FIG. 28 is a flowchart illustrating processing performed by the UIF processor in the sixth embodiment when a channel scan is selected by a user operation.

FIG. 28 is a flowchart illustrating processing performed by the UIF processor 634 when a channel scan is selected by a user operation.

When an operation signal indicating a channel scan request is received from the input unit 133, the UIF processor 634 notifies the first controller 615 of the beginning of a channel scan in the first broadcast protocol (step S130).

The UIF processor 634 then notifies the second controller 625 of the beginning of a channel scan in the second broadcast protocol (step S131).

When the first controller 615 and second controller 625 are notified of the beginning of channel scans as described above, a DVB-T channel scan controlled by the first controller 615 and a DVB-H channel scan controlled by the second controller 625 are performed in parallel.

The UIF processor 634 waits until it receives notifications of the completion of both the channel scan by the first controller 615 and the channel scan by the second controller 625 (step S132). When these notifications are received (YES in step S132), the UIF processor 634 proceeds to step S133.

In step S133, the UIF processor 634 notifies the first controller 615 of the beginning of a channel scan in the third broadcast protocol.

The UIF processor 634 further notifies the second controller 625 of the beginning of the channel scan in the third broadcast protocol (step S134).

When the first controller 615 and second controller 625 are notified of the beginning of channel scans as described above, a DVB-T2 channel scan controlled by the first controller 615 and a DVB-T2 channel scan controlled by the second controller 625 are performed in parallel.

The UIF processor 634 waits until it receives notifications of the completion of both the channel scan by the first controller 615 and the channel scan by the second controller 625 (step S135). When the UIF processor 634 receives these notifications (YES in step S135), the processing ends. At the end of the processing, the UIF processor 634 may generate a video signal for a notification screen indicating the end of the channel scan processing, output the signal through the video combiner 631 to the display unit 152, and have the display unit 152 display the screen.

In FIG. 28, the second controller 625 is notified of the beginning of the channel scans (step S131, step S134) after the first controller 615 is notified of the beginning of the channel scans (step S130, step S133), but this order may be reversed.

Figure 29:
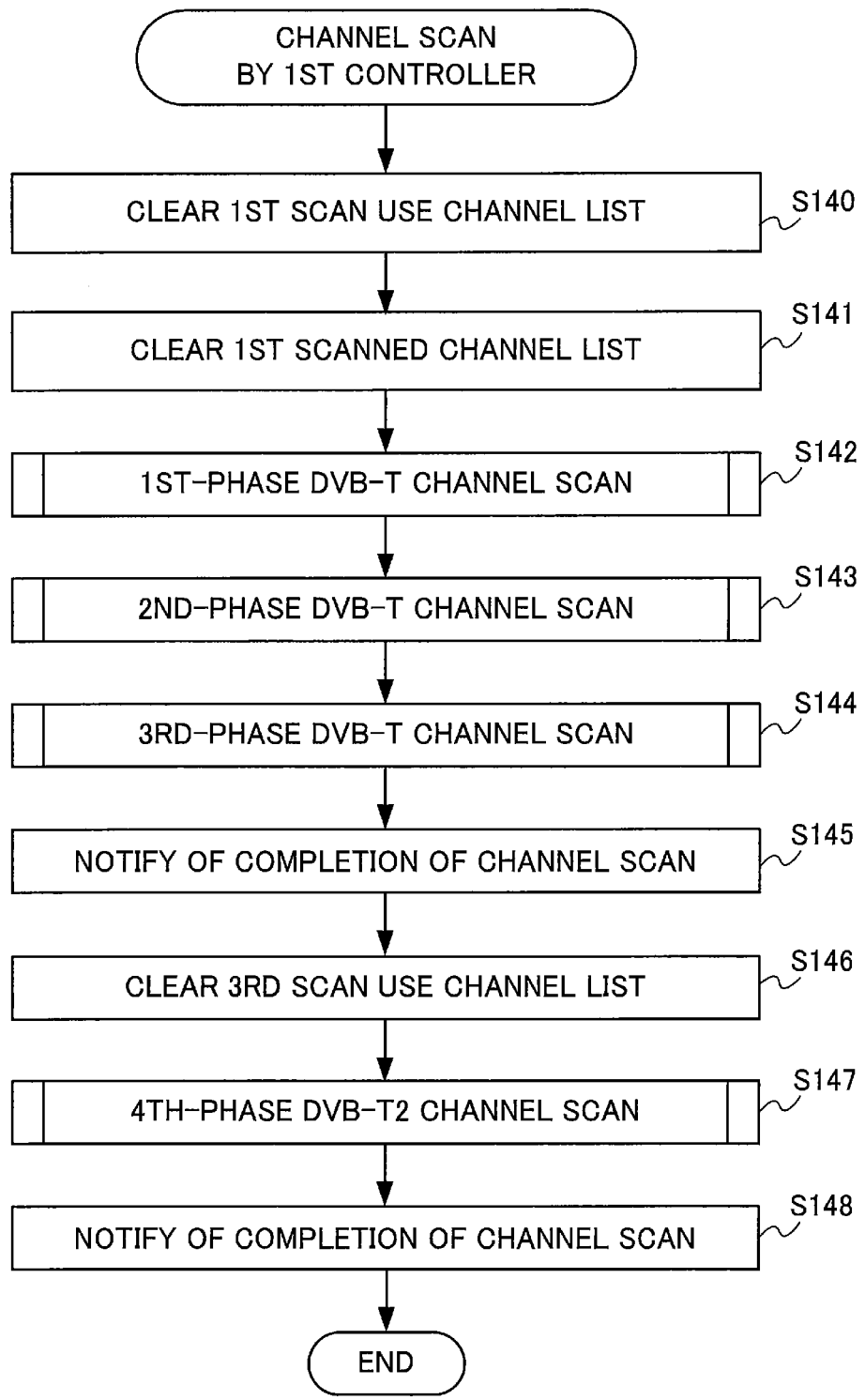
FIG. 29 is a flowchart illustrating channel scan processing performed by the first controller in the sixth embodiment.

FIG. 29 is a flowchart illustrating channel scan processing performed by the first controller 615. The first controller 615 starts the processing illustrated by the flowchart in FIG. 29 when it is notified of the beginning of the channel scan by the UIF processor 634, for example.

The first controller 615 clears (initializes) the first scan use channel list stored in the first scan use channel list storage unit 614B of the first memory unit 614 (step S140). For example, the first controller 615 erases all the channel numbers of physical channels stored in the first scan use channel list.

The first controller 615 then clears the first scanned channel list stored in the first scanned channel list storage unit 114C of the first memory unit 614 (step S141). For example, the first controller 615 erases all the channel numbers of physical channels stored in the first scanned channel list.

Figure 31:
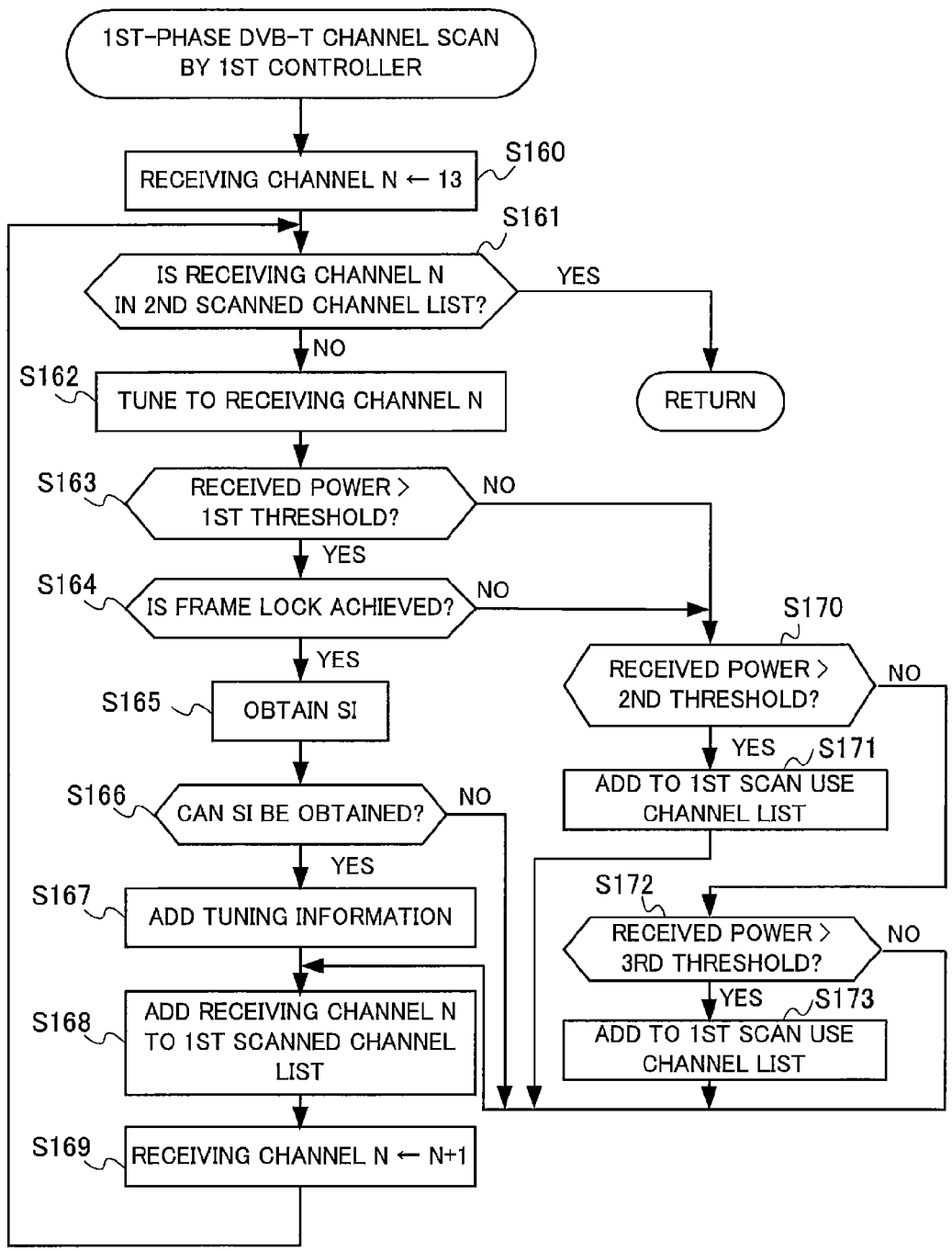
FIG. 31 is a flowchart illustrating a first-phase DVB-T channel scan subroutine performed by the first controller in the sixth embodiment.

The first controller 615 then executes a first-phase DVB-T channel scan (step S142). Details of this subroutine are illustrated in FIG. 31. The first controller 615 here scans the physical channels included in the range of overlap of the frequency band assigned to DVB-T and the frequency band assigned to DVB-H in ascending order, starting from the lowest channel number '13'. Since the frequency bands assigned to DVB-T, DVB-H, DVB-T2 vary from country to country, the number '13' is used provisionally for purposes of description. The first-phase DVB-T channel scan ends when the physical channel selected for the next channel scan has already been scanned by the second controller 625.

Figure 33:
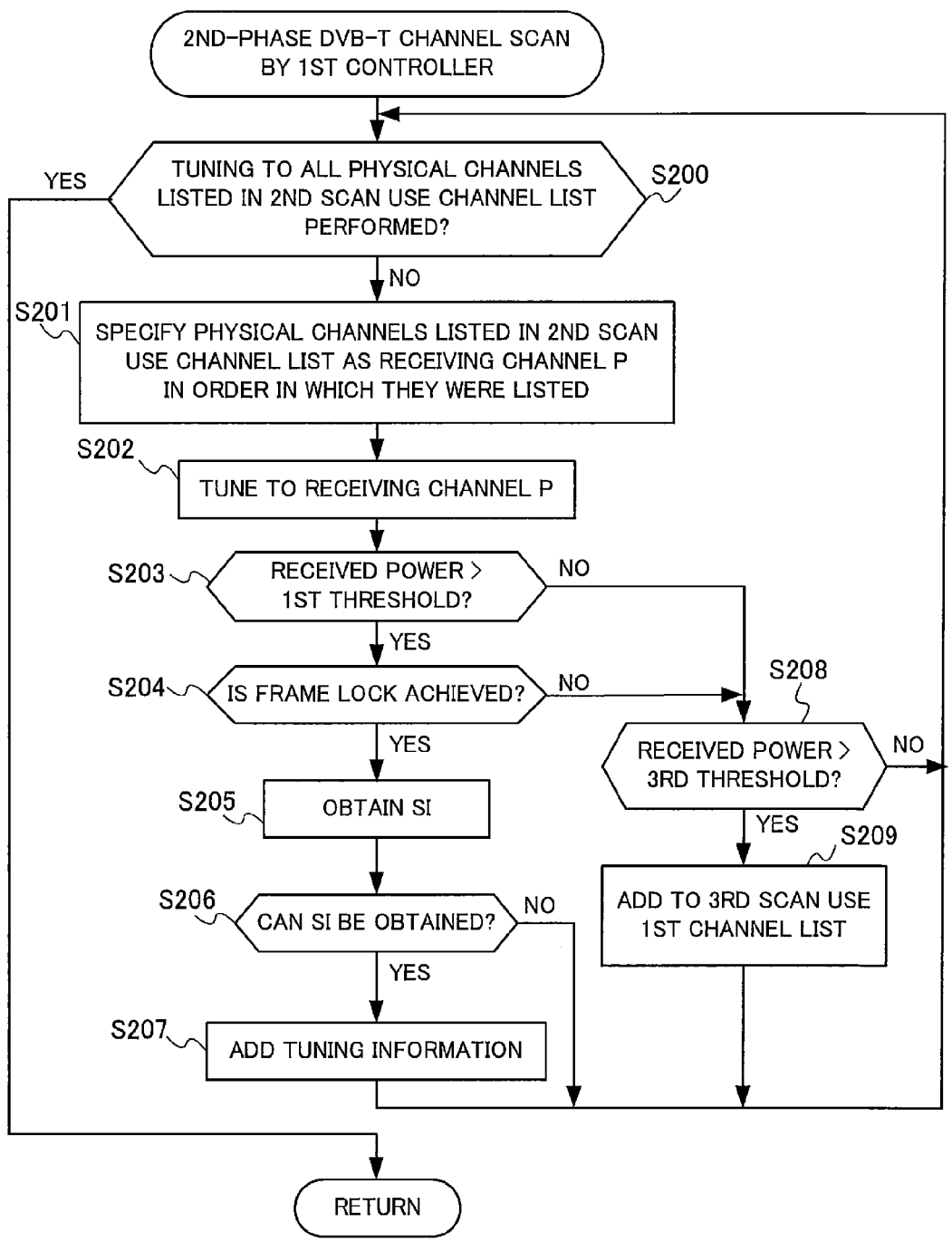
FIG. 33 is a flowchart illustrating a second-phase DVB-T channel scan subroutine performed by the first controller in the sixth embodiment.

The first controller 615 then executes a second-phase DVB-T channel scan (step S143). Details of this subroutine are illustrated in FIG. 33. The first controller 615 here scans the physical channels with channel numbers included in the second scan use channel list obtained from the second controller 625.

Figure 35:
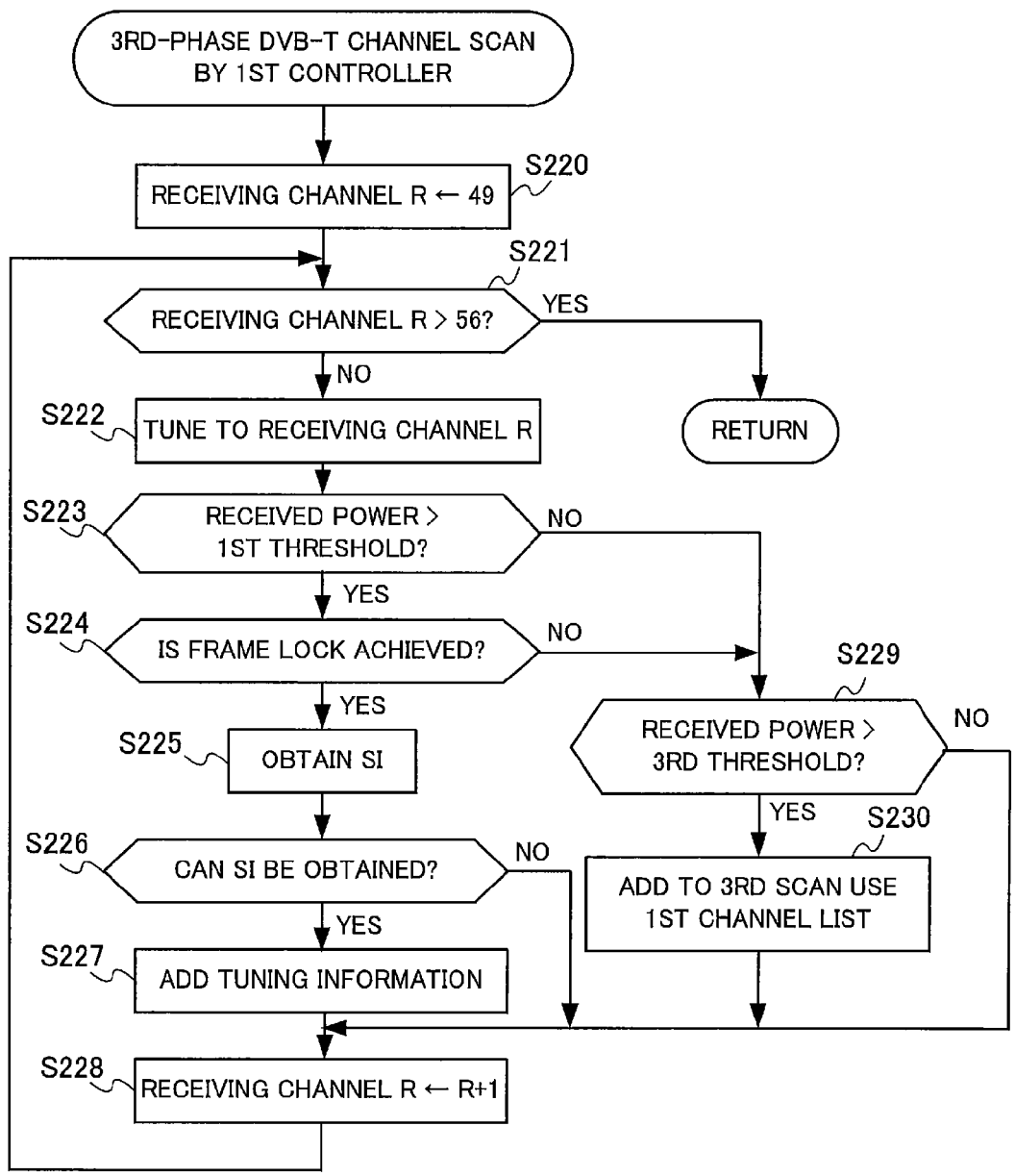
FIG. 35 is a flowchart illustrating a third-phase DVB-T channel scan subroutine performed by the first controller in the sixth embodiment.

The first controller 615 then executes a third-phase DVB-T channel scan (step S144). Details of this subroutine are illustrated in FIG. 35. The first controller 615 here scans the physical channels included in the part of the frequency band assigned to DVB-T that does not overlap the frequency band assigned to DVB-H.

When the third-phase DVB-T channel scan ends, the first controller 615 notifies the UIF processor 634 of the completion of the DVB-T channel scan (step S146).

If a command is received from the UIF processor 634, the first controller 615 then clears (initializes) the third scan use first channel list stored in the third scan use first channel list storage unit 635B of the third memory unit 635 and the third scan use second list stored in the third scan use second channel list storage unit 635C of the third memory unit 635 (step S146). For example, the first controller 615 erases all the channel numbers of physical channels stored in the third scan use first channel list and the third scan use second channel list.

Figure 37:
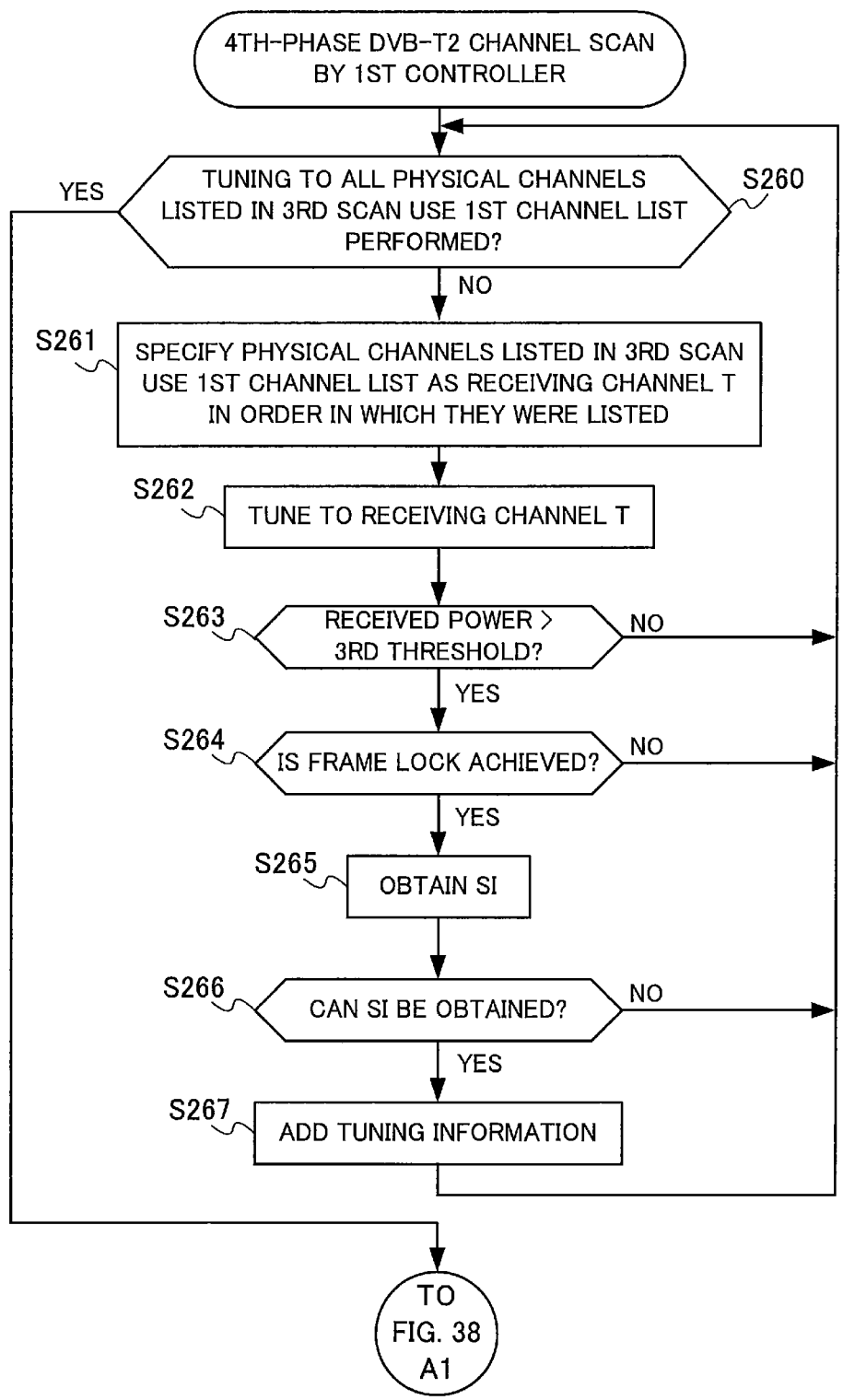
FIG. 37 is a flowchart illustrating a fourth-phase DVB-T2 channel scan subroutine performed by the first controller in the sixth embodiment.
Figure 38:
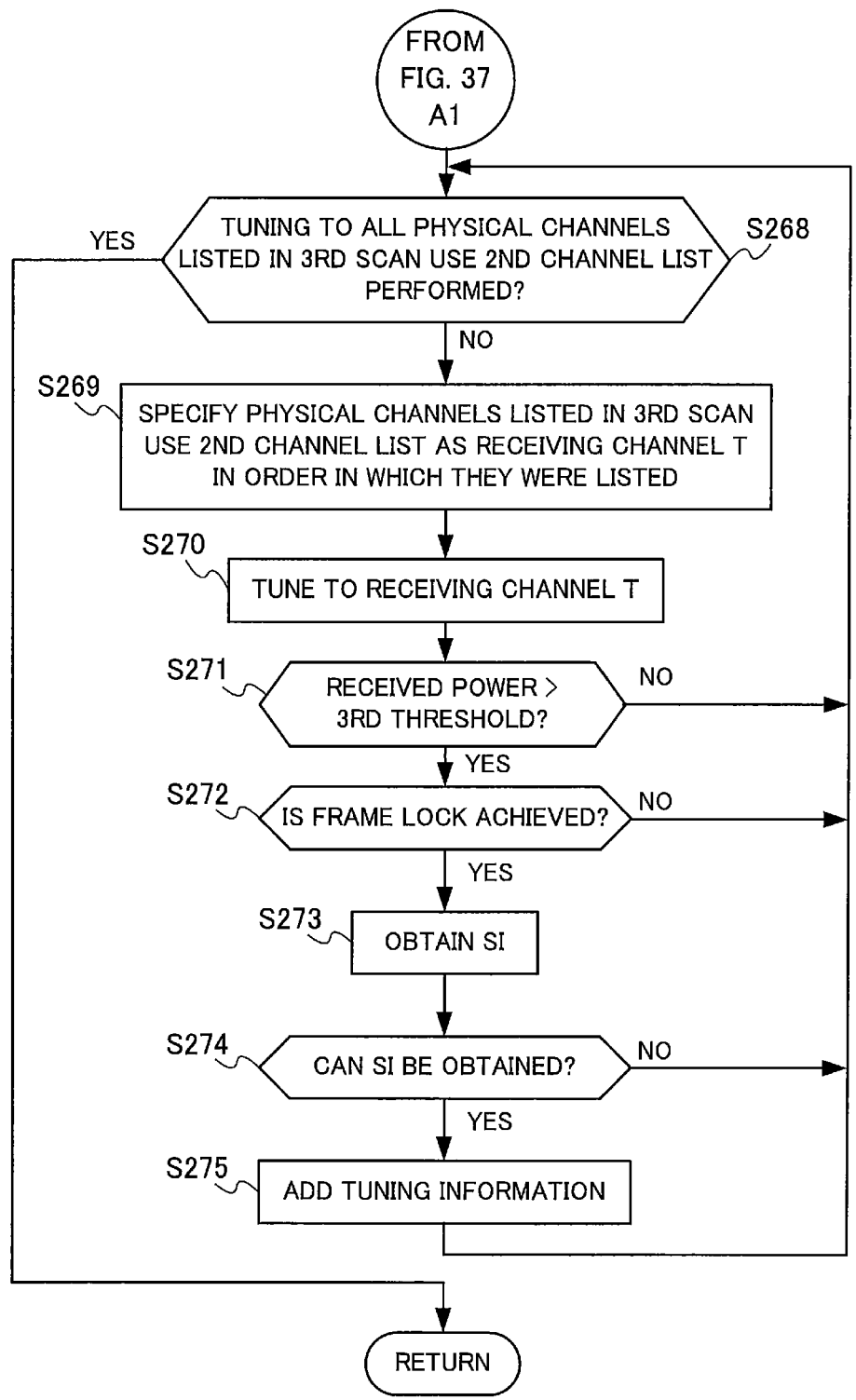
FIG. 38 is a flowchart illustrating a fourth-phase DVB-T2 channel scan subroutine performed by the first controller in the sixth embodiment.

The first controller 615 then executes the fourth-phase DVB-T2 channel scan (step S147). Details of this subroutine are illustrated in FIGS. 37 and 38. The first controller 615 here scans the physical channels with channel numbers included in the third scan use channel list obtained from the third memory unit 635.

When the fourth-phase DVB-T2 channel scan ends, the first controller 615 notifies the UIF processor 634 of the completion of the DVB-T2 channel scan (step S148).

The first controller 615 here clears the third scan use channel list in step S146 in FIG. 29, but the second controller 625 may instead clear the third scan use channel list after, for example, step S155, which will be described later, in FIG. 30.

Figure 30:
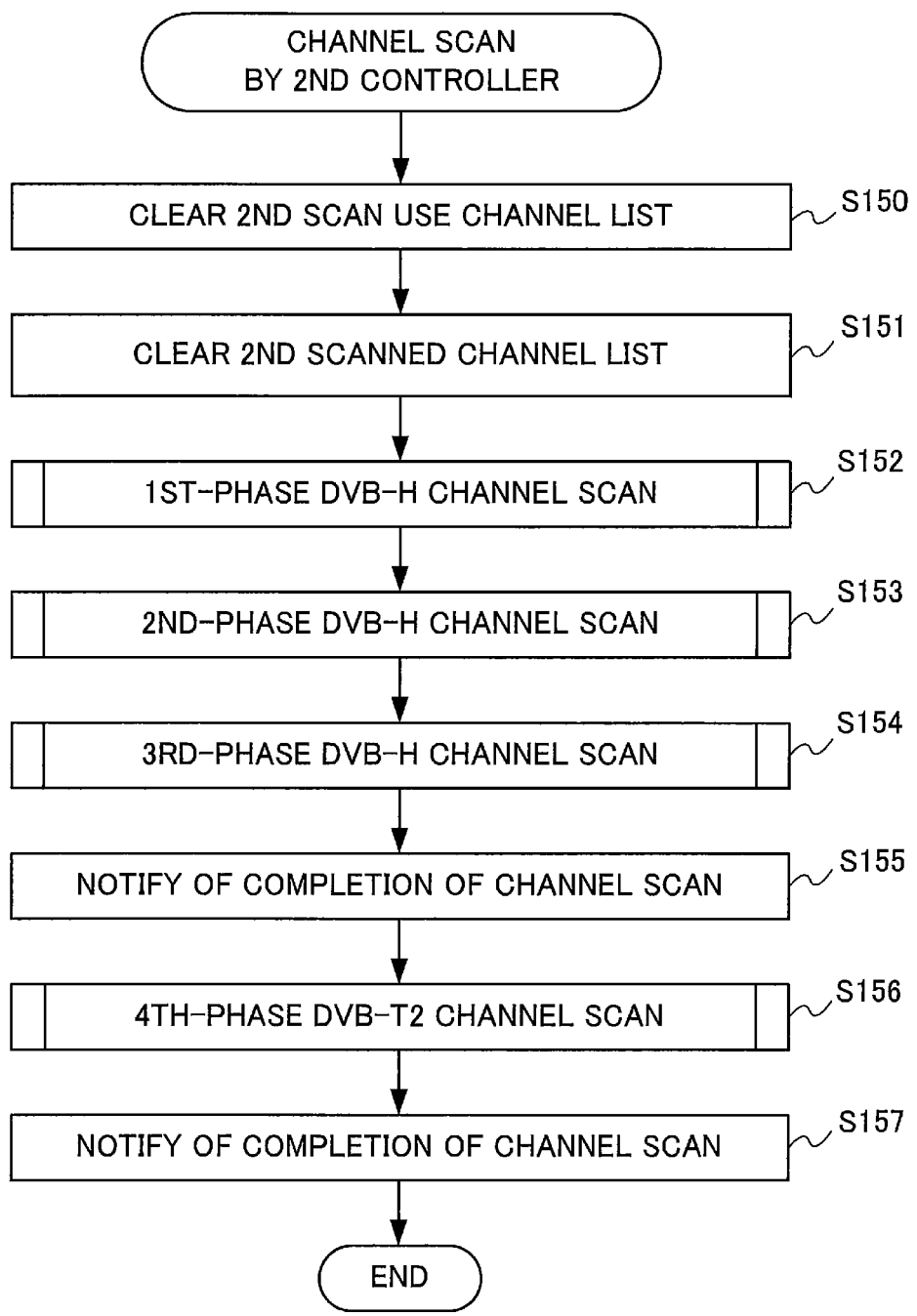
FIG. 30 is a flowchart illustrating channel scan processing performed by the second controller in the sixth embodiment.

FIG. 30 is a flowchart illustrating channel scan processing performed by the second controller 625. The second controller 625 starts the processing illustrated by the flowchart in FIG. 30 when it receives a notification of the beginning of a channel scan from the UIF processor 634, for example.

The second controller 625 clears the second scan use channel list stored in the second scan use channel list storage unit 624B of the second memory unit 624 (step S150). For example, the second controller 625 here erases all the channel numbers of the physical channels stored in the second scan use channel list.

The second controller 625 then clears the second scanned channel list stored in the second scanned channel list storage unit 124C of the second memory unit 624 (step S151). For example, the second controller 625 here erases all the channel numbers of the physical channels stored in the second scanned channel list.

Figure 32:
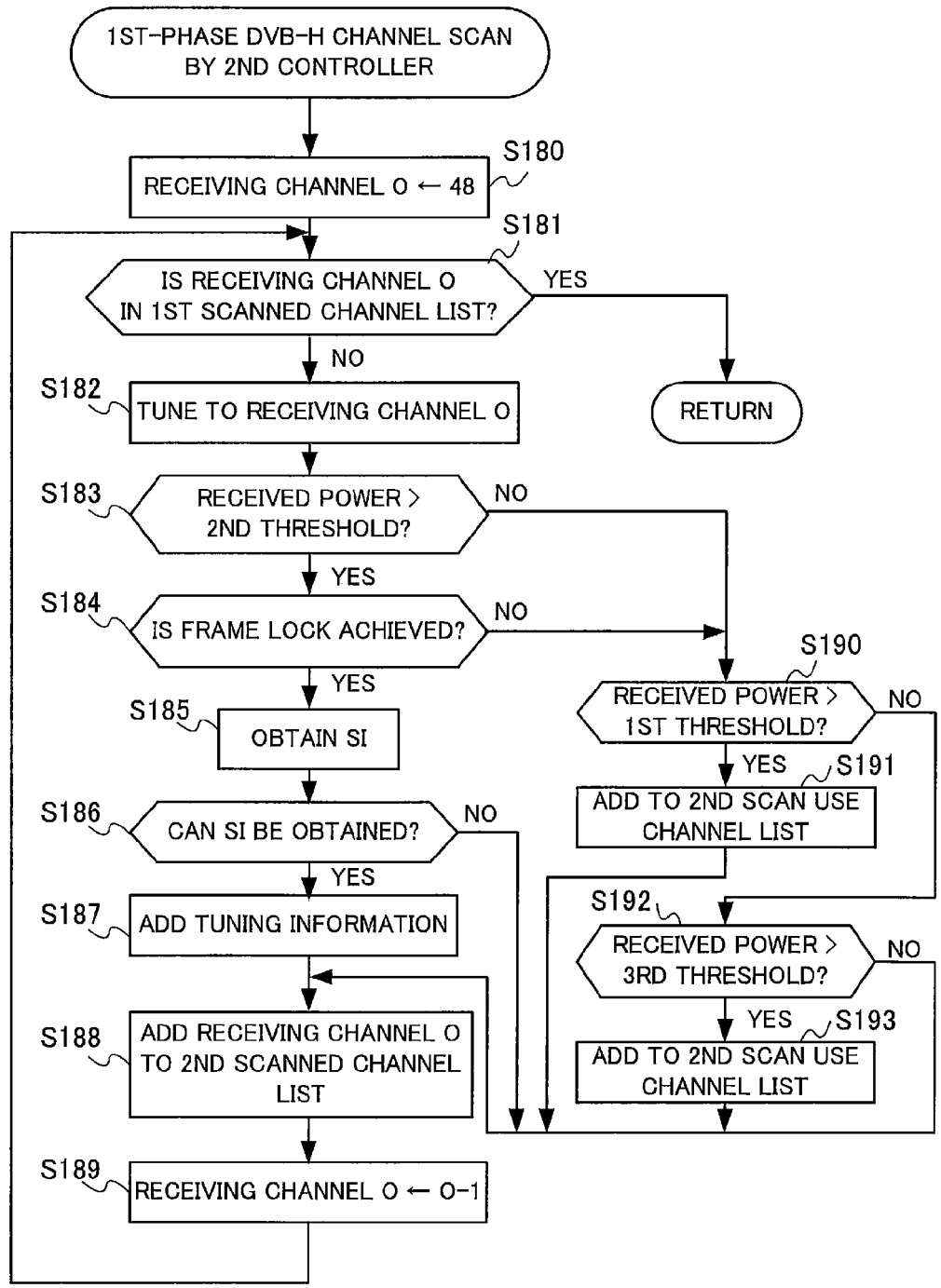
FIG. 32 is a flowchart illustrating a first-phase DVB-H channel scan subroutine performed by the second controller in the sixth embodiment.

The second controller 625 then executes the first-phase DVB-H channel scan (step S152). Details of this subroutine are illustrated in FIG. 32. The second controller 625 here scans physical channels included in the range of overlap of the frequency band assigned to DVB-T and the frequency band assigned to DVB-H in descending order, starting from the highest physical channel number '48'. Since the frequency bands assigned to DVB-T, DVB-H, DVB-T2 vary from country to country, the number '48' is used provisionally for purposes of description. The first-phase DVB-H channel scan ends when the physical channel selected for the next channel scan has already been scanned by the first controller 615.

Figure 34:
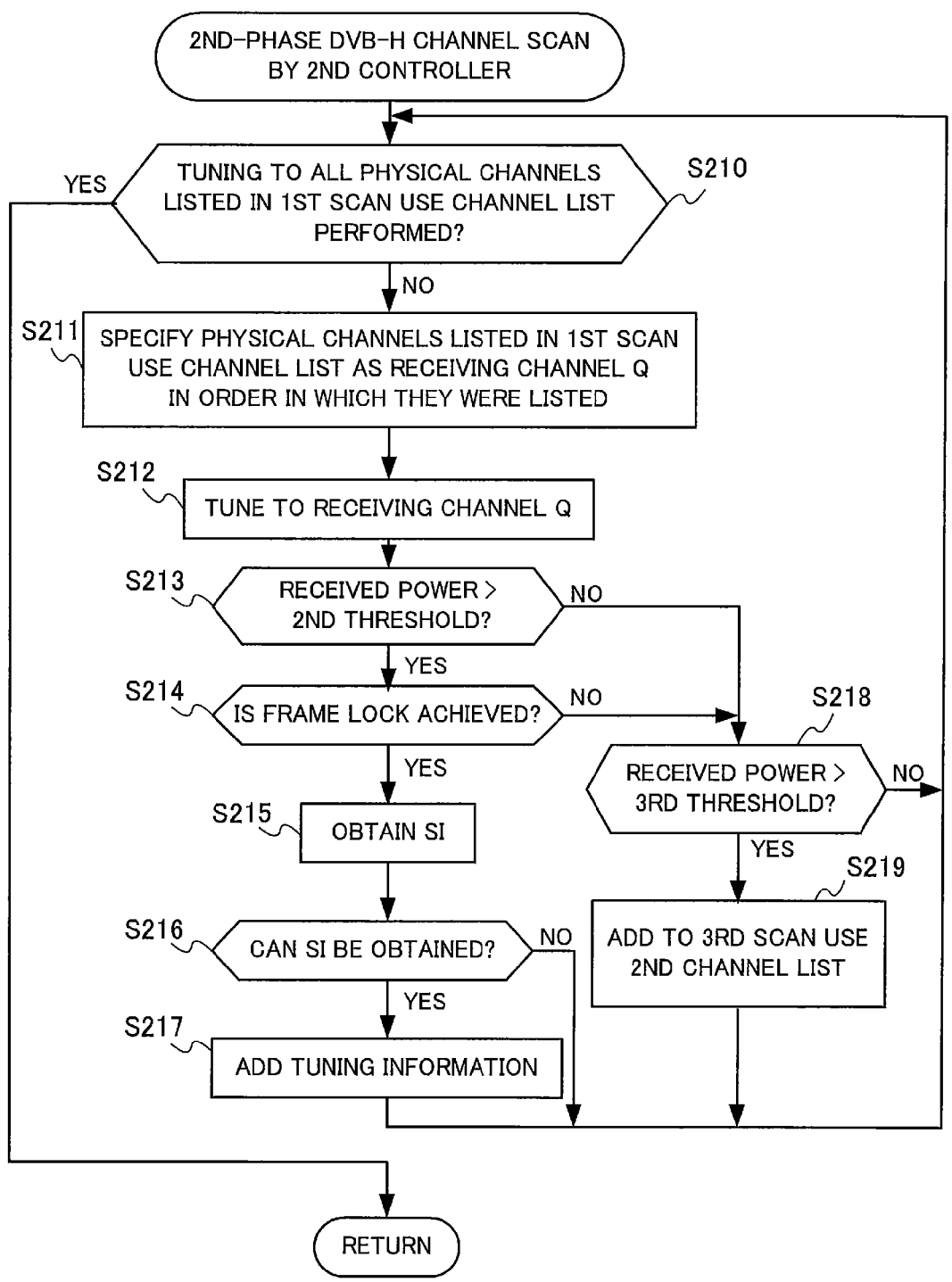
FIG. 34 is a flowchart illustrating a second-phase DVB-H channel scan subroutine performed by the second controller in the sixth embodiment.

The second controller 625 then executes the second-phase DVB-H channel scan (step S153). Details of this subroutine are illustrated in FIG. 34. The second controller 625 here scans the physical channels with channel numbers listed in the first scan use channel list obtained from the first controller 615.

Figure 36:
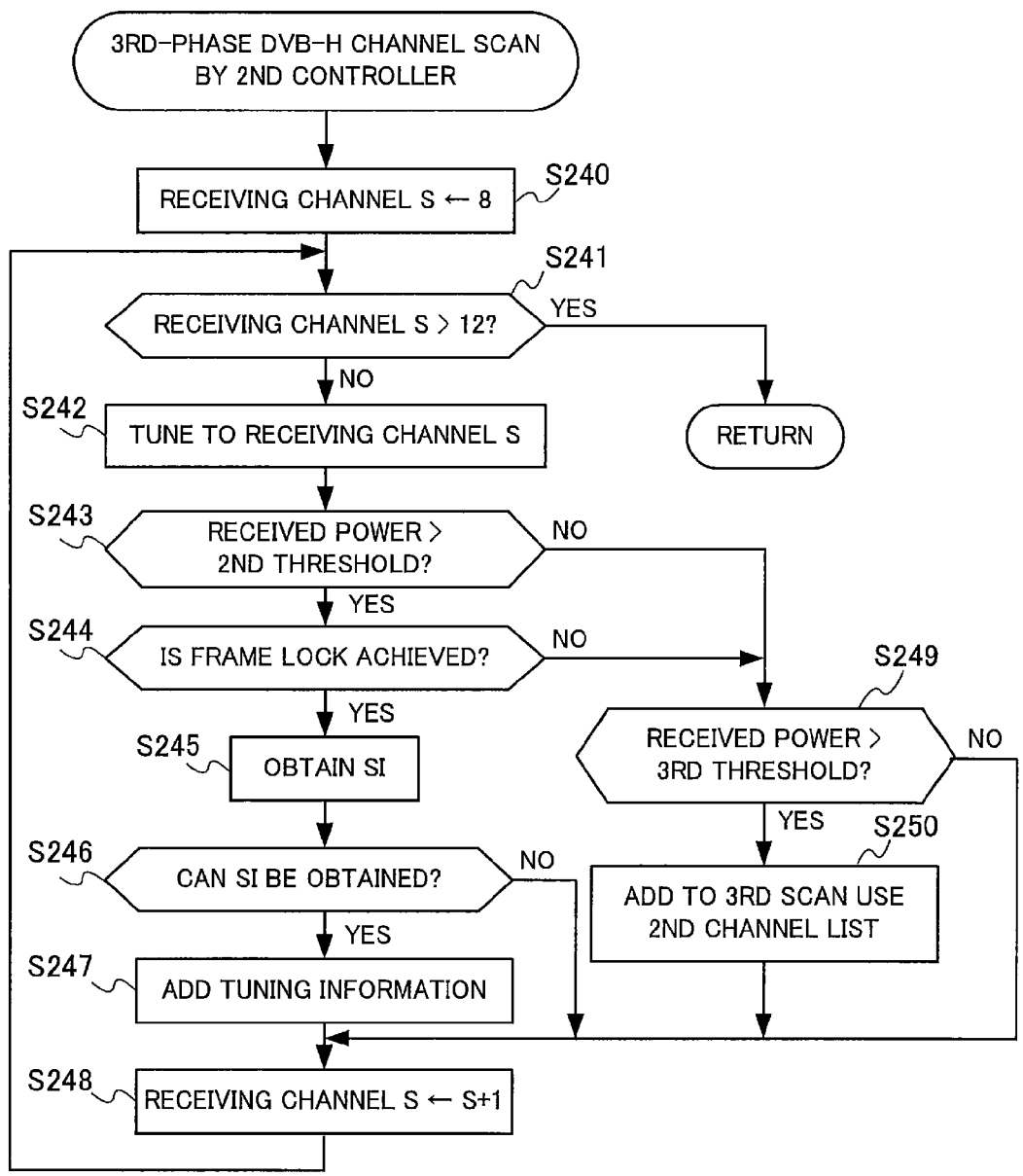
FIG. 36 is a flowchart illustrating a third-phase DVB-H channel scan subroutine performed by the second controller in the sixth embodiment.

The second controller 625 then executes a third-phase DVB-H channel scan (step S154). Details of this subroutine are illustrated in FIG. 36. The second controller 625 here scans the physical channels included in the part of the frequency band assigned to DVB-H that does not overlap the frequency band assigned to DVB-T.

When the third-phase DVB-H channel scan ends, the second controller 625 notifies the UIF processor 634 of the completion of the DVB-H channel scan (step S155).

Figure 39:
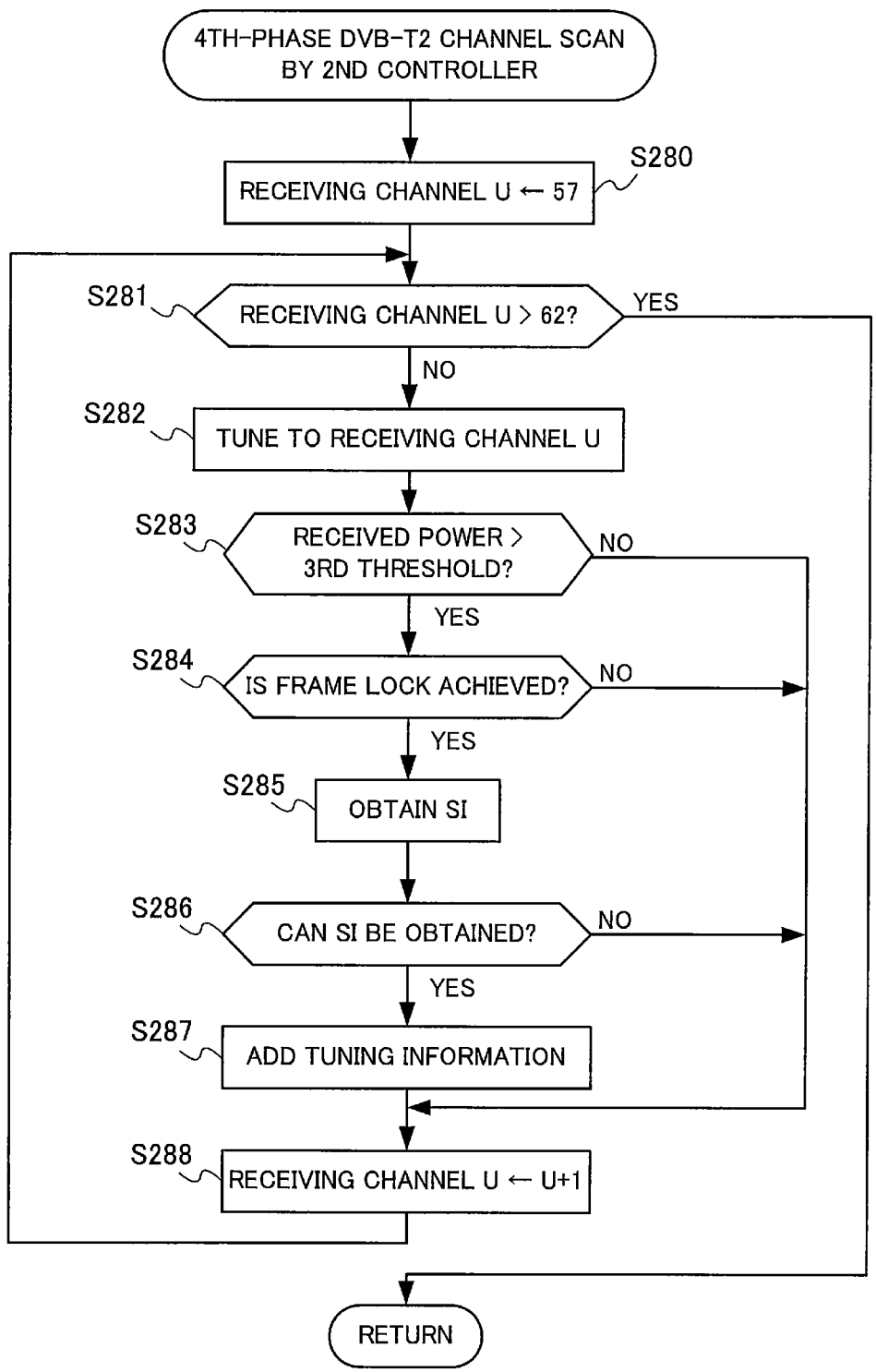
FIG. 39 is a flowchart illustrating a fourth-phase DVB-T2 channel scan subroutine performed by the second controller in the sixth embodiment.

If a command is received from the UIF processor 634, the second controller 625 then executes a fourth-phase DVB-T2 channel scan (step S156). Details of this subroutine are illustrated in FIG. 39. The second controller 625 here scans the physical channels included in the part of the frequency band assigned to DVB-T2 that does not overlap the frequency bands assigned to DVB-T and DVB-H.

When the fourth-phase DVB-T2 channel scan ends, the second controller 625 notifies the UIF processor 634 of the completion of the DVB-T2 channel scan (step S157).

FIG. 31 is a flowchart illustrating the first-phase DVB-T channel scan subroutine performed by the first controller 115. The first controller 615 specifies the lowest channel number '13' as the initial value of a receiving channel variable N that indicates the physical channel to be scanned (step S160).

The first controller 615 then decides whether the receiving channel N to be scanned has already been scanned by the second controller 625 (step S161). For example, the first controller 615 obtains the second scanned channel list stored in the second scanned channel list storage unit 124C of the second memory unit 624 through the second controller 625 and decides whether receiving channel N is listed in the second scanned channel list. If receiving channel N is not included in the second scanned channel list (NO in step S161), the first controller 615 proceeds to step S162. If receiving channel N is included in the second scanned channel list (YES in step S161), the first controller 615 proceeds to step S143 in FIG. 29.

In step S162, the first controller 615 instructs the first tuner 110 to receive an electromagnetic wave in receiving channel N.

The first controller 615 then decides whether the received level of the electromagnetic wave received in the tuned receiving channel N is higher than the first threshold (step S163). The first controller 615 makes this decision by receiving from the first tuner 110 a notification of whether the received level of the electromagnetic wave is higher than the first threshold. If the receiving level of the electromagnetic wave received in receiving channel N is higher than the first threshold (YES in step S163), the first controller 615 proceeds to step S164. If the receiving level of the electromagnetic wave received in receiving channel N is not higher than the first threshold (NO in step S163), the first controller 615 proceeds to step S170. The first threshold indicates the lowest receiving level at which a DVB-T service can be received and audio and video can be output, as described above.

In step S164, the first controller 615 decides whether the first demodulator 111 has successfully demodulated the electrical signal generated from the electromagnetic wave received by the first tuner 110 in receiving channel N. For example, the first controller 615 makes this decision by receiving from the first demodulator 111 a notification of whether it achieved frame lock by performing demodulation processing on the electrical signal. If demodulation succeeded (YES in step S164), the first controller 615 proceeds to step S165. If demodulation failed (NO in step S164), the first controller 615 proceeds to step S170.

If the first demodulator 111 has achieved frame lock, it is highly possible that a TS is being output from the first demodulator 111 to the first demultiplexer 112. The first controller 615 therefore instructs the first demultiplexer 112 to obtain the SI (step S165).

The first controller 615 then decides whether the first demultiplexer 112 has obtained the SI (step S166). If the SI has been successfully obtained (YES in step S166), the first controller 615 proceeds to step S167. If the SI cannot be obtained (NO in step S166), the first controller 615 proceeds to step S168.

In step S167, the first controller 615 adds the tuning information of the service extracted from the SI to the first service list stored in the first service list storage unit 114A of the first memory unit 614.

The first controller 615 then adds the scanned receiving channel N to the first scanned channel list stored in the first scanned channel list storage unit 114C of the first memory unit 614 (step S168).

Since the first controller 615 is scanning the physical channels in ascending order, it increments the receiving channel N by '1' (step S169) and returns to step S161.

After tuning to receiving channel N in step S163, if the received level of the electromagnetic wave is not higher than the first threshold (NO in step S163) or if frame lock is not achieved in step S164 (NO in step S164), the first controller 615 proceeds to step S170.

In step S170, the first controller 615 decides whether the received level of the electromagnetic wave received in receiving channel N is higher than a second threshold. The first controller 615 makes this decision by receiving from the first tuner 110 a notification of whether the received level of the electromagnetic wave is higher than the second threshold. If the received level of the electromagnetic wave received in receiving channel N is higher than the second threshold (YES in step S170), the first controller 615 proceeds to step S171. If the received level of the electromagnetic wave received in receiving channel N is not higher than the second threshold (NO in step S170), the first controller 615 proceeds to step S172.

In step S171, the first controller 615 adds receiving channel N to the first scan use channel list stored in the first scan use channel list storage unit 614B of the first memory unit 614.

In step S172, the first controller 615 decides whether the received level of the electromagnetic wave received in receiving channel N is higher than the third threshold. The first controller 615 makes this decision by receiving from the first tuner 110 a notification of whether the received level of the electromagnetic wave is higher than the third threshold. If the receiving level of the electromagnetic wave received in receiving channel N is higher than the third threshold (YES in step S172), the first controller 615 proceeds to step S173. If the receiving level of the electromagnetic wave received in receiving channel N is not higher than the third threshold (NO in step S172), the first controller 615 proceeds to step S168.

In step S173, the first controller 615 adds receiving channel N to the first scan use channel list stored in the first scan use channel list storage unit 614B of the first memory unit 614.

As described above, the first controller 615 performs the first-phase DVB-T channel scan in ascending order of channel numbers of physical channels, starting from '13'. When the first controller 115 decides in step S161 that the receiving channel N to be scanned has already been scanned by the second controller 625, it ends the first-phase DVB-T channel scan.

In steps S163, S170, and S172 in FIG. 31, the received level is compared with the first threshold, the second threshold, and the third threshold in the first tuner 110. The first controller 615 may obtain the received level of the electromagnetic wave from the first tuner 110 and compare the received level with the first threshold, the second threshold, and the third threshold.

The processing to obtain the SI and add the tuning information to the first service list is performed in steps S165 to S167 in FIG. 31. This processing may be executed at the timing shown in FIG. 31 or may be executed for all the services together after the entire channel scan is completed.

FIG. 32 is a flowchart illustrating the first-phase DVB-H channel scan subroutine performed by the second controller 625. The second controller 625 performs the first-phase DVB-H channel scan in parallel with the first-phase DVB-T channel scan performed by the first controller 615.

The second controller 625 specifies the highest channel number '48' of the physical channels as the initial value of a receiving channel variable O that indicates the physical channel to be scanned (step S180).

The second controller 625 next decides whether the receiving channel O to be scanned has already been scanned by the first controller 615 (step S181). For example, the second controller 625 obtains the first scanned channel list stored in the first scanned channel list storage unit 114C of the first memory unit 614 through the first controller 615 and checks whether receiving channel O is listed in the first scanned channel list. If receiving channel O is not listed in the first scanned channel list (NO in step S181), the second controller 625 proceeds to step S182. If receiving channel O is included in the first scanned channel list (YES in step S181), the second controller 625 proceeds to step S153 in FIG. 30.

In step S182, the second controller 625 instructs the second tuner 120 to receive an electromagnetic wave in receiving channel O.

The second controller 625 then decides whether the received level of the electromagnetic wave received in the tuned receiving channel O is higher than the second threshold (step S183). For example, the second controller 625 makes this decision by receiving from the second tuner 120 a notification of whether the received level of the electromagnetic wave is higher than the second threshold. If the received level of the electromagnetic wave received in receiving channel O is higher than the second threshold (YES in step S183), the second controller 625 proceeds to step S184. If the received level of the electromagnetic wave received in receiving channel O is not higher than the second threshold (NO in step S183), the second controller 625 proceeds to step S190. The second threshold indicates the minimum receiving level at which a DVB-H service can be received and audio and video can be output, as described above.

In step S184, the second controller 625 decides whether the second demodulator 121 has successfully demodulated the electrical signal generated from the electromagnetic wave received by the second tuner 120 in receiving channel O. For example, the second controller 625 makes this decision by receiving from the second demodulator 121 a notification of whether it has achieved frame lock by performing demodulation processing on the electrical signal. If demodulation succeeded (YES in step S184), the second controller 625 proceeds to step S185. If demodulation failed (NO in step S184), the second controller 625 proceeds to step S190.

When the second demodulator 121 has achieved frame lock, it is highly possible that a TS is being output from the second demodulator 121 to the second demultiplexer 122. The second controller 625 therefore instructs the second demultiplexer 122 to obtain SI (step S185).

The second controller 625 then decides whether the second demultiplexer 122 has obtained the SI (step S186). If the SI has been successfully obtained (YES in step S186), the second controller 625 proceeds to step S187. If the SI cannot be obtained (NO in step S186), the second controller 625 proceeds to step S188.

In step S187, the second controller 625 adds the tuning information of services extracted from the SI to the second service list stored in the second service list storage unit 124A of the second memory unit 624.

The second controller 625 then adds the scanned receiving channel O to the second scanned channel list stored in the second scanned channel list storage unit 124C of the second memory unit 624.

Since the second controller 625 is scanning the physical channels in descending order, it decrements the receiving channel O by '1' (step S189) and returns to step S181.

After tuning to receiving channel O in step S183, if the received level of the electromagnetic wave is not higher than the second threshold (NO in step S183) or if frame lock is not achieved (NO in step S184), the second controller 625 proceeds to step S190.

In step S190, the second controller 625 decides whether the received level of the electromagnetic wave received in receiving channel O is higher than the first threshold. For example, the second controller 625 makes this decision by receiving from the second tuner 120 a notification of whether the received level of the electromagnetic wave is higher than the first threshold. If the received level of the electromagnetic wave received in receiving channel O is higher than the first threshold (YES in step S190), the second controller 625 proceeds to step S91. If the received level of the electromagnetic wave received in receiving channel O is not higher than the first threshold (NO in step S190), the second controller 625 proceeds to step S192.

In step S191, the second controller 625 adds receiving channel O to the second scan use channel list stored in the second scan use channel list storage unit 624B of the second memory unit 624.

In step S192, the second controller 625 decides whether the received level of the electromagnetic wave received in receiving channel O is higher than the third threshold. For example, the second controller 625 makes this decision by receiving from the second tuner 120 a notification of whether the received level of the electromagnetic wave is higher than the third threshold. If the received level of the electromagnetic wave received in receiving channel O is higher than the third threshold (YES in step S192), the second controller 625 proceeds to step S193. If the received level of the electromagnetic wave received in receiving channel O is not higher than the third threshold (NO in step S192), the second controller 625 proceeds to step S188.

In step S193, the second controller 625 adds receiving channel O to the second scan use channel list stored in the second scan use channel list storage unit 624B of the second memory unit 624.

The second controller 625 executes the first-phase DVB-H channel scan in descending order of physical channels, starting from the highest channel number '48', as described above. When the second controller 625 decides in step S181 that the receiving channel O to be scanned has already been scanned by the first controller 615, the second controller 625 ends the first-phase DVB-H channel scan.

In steps S183, S190, and S192 in FIG. 32, the second tuner 120 compares the received level with the first threshold, the second threshold, and the third threshold. The second controller 625 may obtain the received level of the electromagnetic wave received in receiving channel O from the second tuner 120 and compare it with the first threshold, the second threshold, or the third threshold.

The processing to obtain the SI and add tuning information to the second service list is performed in steps S185 to S187 in FIG. 32. This processing may be executed at the timing shown in FIG. 32, or may be executed for all the services together after all channel scans are completed.

FIG. 33 is a flowchart illustrating a second-phase DVB-T channel scan subroutine performed by the first controller 615.

The first controller 615 obtains the second scan use channel list stored in the second scan use channel list storage unit 624B of the second memory unit 624 through the second controller 625 and decides whether tuning to all the physical channels with channel numbers listed in the second scan use channel list has been performed (step S200). If tuning to all the physical channels with channel numbers listed in the second scan use channel list has not been performed (NO in step S200), in other words, if the second scan use channel list includes the channel number of a physical channel tuning to which has not been performed, the first controller 615 proceeds to step S201. If tuning to all the physical channels with channel numbers included in the second scan use channel list has been performed (YES in step S200), in other words, if the second scan use channel list does not include the channel number of any physical channel tuning to which has not been performed, the first controller 615 proceeds to step S144 in FIG. 29.

In step S201, the first controller 615 obtains channel numbers from the second scan use channel list in the order in which they were listed (in other words, descending order of channel number) and specifies each channel number as a receiving channel variable P indicating a physical channel. That is, the channel number specified as receiving channel P in step S201 is the highest channel number of the physical channels that are listed in the second scan use channel list and have not yet been specified as receiving channel P in step S201. Although the channel numbers are specified here in the order in which they were listed, the first controller 615 may specify them as receiving channel P in a different order.

The first controller 615 then instructs the first tuner 110 to tune to the frequency corresponding to the physical channel indicated by receiving channel P (step S202).

The first controller 615 then decides whether the received level of the electromagnetic wave received in the tuned receiving channel P is higher than the first threshold (step S203). For example, the first controller 615 makes this decision by receiving from the first tuner 110 a notification of whether the received level of the electromagnetic wave is higher than the first threshold. If the received level of the electromagnetic wave received in receiving channel P is higher than the first threshold (YES in step S203), the first controller 615 proceeds to step S204. If the received level of the electromagnetic wave received in receiving channel P is not higher than the first threshold (NO in step S203), the first controller 615 proceeds to step S208.

In step S204, the first controller 615 decides whether the first demodulator 111 has successfully demodulated the electrical signal generated from the electromagnetic wave received by the first tuner 110 in receiving channel P. For example, the first controller 615 makes this decision by receiving from the first demodulator 111 a notification of whether it has achieved frame lock by performing demodulation processing on the electrical signal. If demodulation succeeded (YES in step S204), the first controller 615 proceeds to step S205. If demodulation failed (NO in step S204), the first controller 615 proceeds to step S208.

If the first demodulator 111 has achieved frame lock, it is highly possible that a TS is being output from the first demodulator 111 to the first demultiplexer 112. The first controller 615 therefore instructs the first demultiplexer 112 to obtain an SI (step S205).

The first controller 615 then decides whether the first demultiplexer 112 has obtained the SI (step S206). If the SI has been successfully obtained (YES in step S206), the first controller 615 proceeds to step S207. If the SI cannot be obtained (NO in step S206), the first controller 615 returns to step S200.

In step S207, the first controller 615 adds the tuning information of services extracted from the SI to the first service list stored in the first service list storage unit 114A of the first memory unit 614.

After tuning to receiving channel P in step S203, if the received level of the electromagnetic wave is not higher than the first threshold (NO in step S203) or if frame lock is not achieved in step S204 (NO in step S204), the first controller 615 proceeds to step S208.

In step S208, the first controller 615 decides whether the received level of the electromagnetic wave received in receiving channel P is higher than a third threshold. The first controller 615 makes this decision by receiving from the first tuner 110 a notification of whether the received level of the electromagnetic wave is higher than the third threshold. If the received level of the electromagnetic wave received in receiving channel P is higher than the third threshold (YES in step S208), the first controller 615 proceeds to step S209. If the received level of the electromagnetic wave received in receiving channel P is not higher than the third threshold (NO in step S208), the first controller 615 returns to step S200.

In step S209, the first controller 615 adds receiving channel P to the third scan use first channel list stored in the third scan use first channel list storage unit 635B of the third memory unit 635.

The first controller 615 executes a channel scan on the physical channels with channel numbers listed in the second scan use channel list, as described above, so an efficient channel scan can be performed.

In steps S203 and S208 in FIG. 33, the received level is compared with the first threshold and the third threshold in the first tuner 110. The first controller 615 may obtain the received level of the electromagnetic wave received in receiving channel P from the first tuner 110 and compare the received level with the first threshold or the third threshold.

The processing to obtain the SI and add the tuning information to the first service list is performed in steps S205 to S207 in FIG. 33. This processing may be executed at the timing shown in FIG. 33 or may be executed for all the services together after the entire channel scan is completed.

FIG. 34 is a flowchart illustrating the second-phase DVB-H channel scan subroutine performed by the second controller 625. The second controller 625 performs the second-phase DVB-H channel scan in parallel with the second-phase DVB-T channel scan performed by the first controller 615.

The second controller 625 obtains the first scan use channel list stored in the first scan use channel list storage unit 614B of the first memory unit 614 through the first controller 615 and decides whether tuning to all the physical channels listed in the first scan use channel list has been performed (step S210). If tuning to all the physical channels listed in the first scan use channel list has not been performed (NO in step S210), in other words, if the first scan use channel list includes a physical channel to which tuning has not been performed, the second controller 625 proceeds to step S211. If tuning to all the physical channels listed in the first scan use channel list has been performed (YES in step S210), in other words, if the first scan use channel list does not include any physical channel to which tuning has not been performed, the second controller 625 proceeds to step S154 in FIG. 30.

In step S211, the second controller 625 obtains channel numbers of physical channels from the first scan use channel list in the order in which they were listed (in other words, ascending order of channel number) and specifies each channel number as a receiving channel Q, where Q is a variable indicating the physical channel. That is, the channel number specified as receiving channel Q in step S211 is the lowest channel number of the physical channels that are listed in the first scan use channel list and have not yet been specified as receiving channel Q in step S211. Although the channel numbers are specified here in the order in which they were listed, they may be specified as the receiving channel Q in a different order.

The second controller 625 then instructs the second tuner 120 to tune to the frequency corresponding to the physical channel indicated by receiving channel Q (step S212).

The second controller 625 then decides whether the received level of the electromagnetic wave received in the tuned receiving channel Q is higher than the second threshold (step S213). For example, the second controller 625 makes this decision by receiving from the second tuner 120 a notification of whether the received level of the electromagnetic wave is higher than the second threshold. If the received level of the electromagnetic wave received in receiving channel Q is higher than the second threshold (YES in step S213), the second controller 625 proceeds to step S214. If the received level of the electromagnetic wave received in receiving channel Q is not higher than the second threshold (NO in step S213), the second controller 625 proceeds to step S218.

In step S214, the second controller 625 decides whether the second demodulator 121 has successfully demodulated the electrical signal generated from the electromagnetic wave received by the second tuner 120 in receiving channel Q. For example, the second controller 625 makes this decision by receiving from the second demodulator 121 a notification of whether it has achieved frame lock by performing demodulation processing on the electrical signal. If demodulation succeeded (YES in step S214), the second controller 625 proceeds to step S215. If demodulation failed (NO in step S214), the second controller 625 proceeds to step S218.

If the second demodulator 121 has achieved frame lock, it is highly possible that a TS is being output from the second demodulator 121 to the second demultiplexer 122. The second controller 625 therefore instructs the second demultiplexer 122 to obtain an SI (step S215).

The second controller 625 then decides whether the second demultiplexer 122 has obtained the SI (step S216). If the SI has been successfully obtained (YES in step S216), the second controller 625 proceeds to step S217. If the SI cannot be obtained (NO in step S216), the second controller 625 returns to step S210.

In step S217, the second controller 625 adds the tuning information of the services extracted from the SI to the second service list stored in the second service list storage unit 124A of the second memory unit 624.

After tuning to receiving channel Q in step S213, if the received level of the electromagnetic wave is not higher than the second threshold (NO in step S213) or if frame lock is not achieved (NO in step S214), the second controller 625 proceeds to step S218.

In step S218, the second controller 625 decides whether the received level of the electromagnetic wave received in receiving channel Q is higher than the third threshold. For example, the second controller 625 makes this decision by receiving from the second tuner 120 a notification of whether the received level of the electromagnetic wave is higher than the third threshold. If the received level of the electromagnetic wave received in receiving channel Q is higher than the third threshold (YES in step S218), the second controller 625 proceeds to step S219. If the received level of the electromagnetic wave received in receiving channel Q is not higher than the third threshold (NO in step S218), the second controller 625 returns to step S210.

In step S219, the second controller 625 adds receiving channel Q to the third scan use second channel list stored in the third scan use second channel list storage unit 635C of the third memory unit 635.

The second controller 625 executes a channel scan on the physical channels with channel numbers listed in the first scan use channel list, as described above, so an efficient channel scan can be performed.

In steps S213 and S218 in FIG. 34, the received level is compared with the second threshold and the third threshold in the second tuner 120. The second controller 625 may obtain the received level of the electromagnetic wave received in receiving channel Q from the second tuner 120 and compare the received level with the second threshold and the third threshold.

The processing to obtain the SI and add the tuning information to the second service list is performed in steps S215 to S217 in FIG. 34. This processing may be executed at the timing shown in FIG. 34 or may be executed for all the services together after the entire channel scan is completed.

FIG. 35 is a flowchart illustrating the third-phase DVB-T channel scan subroutine performed by the first controller 615. Since the DVB-T band in the first broadcast protocol is assumed to range from channel 13 to channel 56, the first controller 615 executes a channel scan on channels 49 to 56, following channel 48, which has already been scanned in the second-phase channel scan, as the third-phase DVB-T channel scan.

Since the first controller 615 performs the channel scan in ascending order, starting from channel 49, it specifies channel number '49' as the initial value of the receiving channel R, where R is a variable indicating the physical channel to be scanned (step S220).

The first controller 615 then decides whether a channel scan up to channel 56 has already been performed (step S221). For example, the first controller 115 makes this decision by checking whether the receiving channel R to be scanned is higher than the highest physical channel number '56' to be scanned. If the channel scan up to channel 56 has not yet been performed (NO in step S221), the first controller 615 proceeds to step S222. If the channel scan up to channel 56 has already been performed (YES in step S221), the first controller 615 proceeds to step S145 in FIG. 29.

In step S222, the first controller 615 instructs the first tuner 110 to tune to the frequency corresponding to the physical channel indicated by receiving channel R.

The first controller 615 then decides whether the received level of the electromagnetic wave received in the tuned receiving channel R is higher than the first threshold (step S223). For example, the first controller 615 makes this decision by receiving from the first tuner 110 a notification of whether the received level of the electromagnetic wave is higher than the first threshold. If the received level of the electromagnetic wave received in receiving channel R is higher than the first threshold (YES in step S223), the first controller 615 proceeds to step S224. If the received level of the electromagnetic wave received in receiving channel R is not higher than the first threshold (NO in step S223), the first controller 615 proceeds to step S229.

In step S224, the first controller 615 decides whether the first demodulator 111 has successfully demodulated the electrical signal generated from the electromagnetic wave received by the first tuner 110 in receiving channel R. For example, the first controller 615 makes this decision by receiving from the first demodulator 111 a notification of whether it has achieved frame lock by performing demodulation processing on the electrical signal. If demodulation succeeded (YES in step S224), the first controller 615 proceeds to step S225. If demodulation failed (NO in step S224), the first controller 615 proceeds to step S229.

If the first demodulator 111 has achieved frame lock, it is highly possible that a TS is being output from the first demodulator 111 to the first demultiplexer 112. The first controller 615 therefore instructs the first demultiplexer 112 to obtain an SI (step S225).

The first controller 615 then decides whether the first demultiplexer 112 has obtained the SI (step S226). If the SI has been successfully obtained (YES in step S226), the first controller 615 proceeds to step S227. If the SI cannot be obtained (NO in step S226), the first controller 615 proceeds to step S228.

In step S227, the first controller 615 adds the tuning information of services extracted from the SI to the first service list stored in the first service list storage unit 114A of the first memory unit 614.

Since the first controller 615 scans the physical channels in ascending order, it increments the receiving channel R by '1' (step S228) and returns to step S221.

After tuning to receiving channel R in step S223, if the received level of the electromagnetic wave is not higher than the first threshold (NO in step S223) or if frame lock is not achieved (NO in step S224), the first controller 615 proceeds to step S229.

In step S229, the first controller 615 decides whether the received level of the electromagnetic wave received in receiving channel R is higher than the third threshold. For example, the second controller 125 makes this decision by receiving from the first tuner 110 a notification of whether the received level of the electromagnetic wave is higher than the third threshold. If the received level of the electromagnetic wave received in receiving channel R is higher than the third threshold (YES in step S229), the first controller 615 proceeds to step S230. If the received level of the electromagnetic wave received in receiving channel R is not higher than the third threshold (NO in step S229), the first controller 615 proceeds to step S228.

In step S230, the first controller 615 adds receiving channel R to the third scan use first channel list stored in the third scan use first channel list storage unit 635B of the third memory unit 635.

The third-phase DVB-T channel scan performed by the first controller 615 scans physical channels in ascending order, starting from channel number '49' as described above. When the first controller 615 decides in step S221 that the receiving channel R to be scanned already exceeds the highest channel number '56', it ends the third-phase DVB-T channel scan.

In steps S223 and S229 in FIG. 35, the received level is compared with the first threshold and third threshold in the first tuner 110. The first controller 615 may obtain the received level of the electromagnetic wave received in receiving channel R from the first tuner 110 and compare the received level with the first threshold and third threshold.

The processing to obtain the SI and add the tuning information to the first service list is performed in steps S225 to S227 in FIG. 35. This processing may be executed at the timing shown in FIG. 35 or may be executed for all the services together after the entire channel scan is completed.

FIG. 36 is a flowchart illustrating the third-phase DVB-H channel scan subroutine performed by the second controller 625. Since the DVB-H band in the second broadcast protocol is assumed to range from channel 8 to channel 48, the second controller 625 executes a channel scan on channels 8 to 12, preceding channel 13, which has already been scanned in the second-phase channel scan, as the third-phase DVB-H channel scan.

Since the second controller 625 performs the channel scan in ascending order, starting from channel 8, it specifies channel number '8' as the initial value of the receiving channel S, where S is a variable indicating the physical channel to be scanned (step S240).

The second controller 625 then decides whether a channel scan up to channel 12 has already been performed (step S241). For example, the second controller 625 makes this decision by checking whether the receiving channel S to be scanned is higher than the highest physical channel number '12' to be scanned. If the channel scan up to channel 12 has not yet been performed (NO in step S241), the second controller 625 proceeds to step S242. If the channel scan up to channel 12 has already been performed (YES in step S241), the second controller 625 proceeds to step S155 in FIG. 30.

In step S242, the second controller 625 instructs the first tuner 110 to tune to the frequency corresponding to the physical channel indicated by receiving channel S.

The second controller 625 then decides whether the received level of the electromagnetic wave received in the tuned receiving channel S is higher than the second threshold (step S243). For example, the second controller 625 makes this decision by receiving from the first tuner 110 a notification of whether the received level of the electromagnetic wave is higher than the second threshold. If the received level of the electromagnetic wave received in receiving channel S is higher than the second threshold (YES in step S243), the second controller 625 proceeds to step S244. If the received level of the electromagnetic wave received in receiving channel S is not higher than the second threshold (NO in step S243), the second controller 625 proceeds to step S249.

In step S244, the second controller 625 decides whether the second demodulator 121 has successfully demodulated the electrical signal generated from the electromagnetic wave received by the second tuner 120 in receiving channel S. For example, the second controller 625 makes this decision by receiving from the second demodulator 121 a notification of whether it has achieved frame lock by performing demodulation processing on the electrical signal. If demodulation succeeded (YES in step S224), the second controller 625 proceeds to step S245. If demodulation failed (NO in step S244), the second controller 625 proceeds to step S249.

If the second demodulator 121 has achieved frame lock, it is highly possible that a TS is being output from the second demodulator 121 to the second demultiplexer 122. The second controller 625 therefore instructs the second demultiplexer 122 to obtain an SI (step S245).

The second controller 625 then decides whether the second demultiplexer 122 has obtained the SI (step S246). If the SI has been successfully obtained (YES in step S246), the second controller 625 proceeds to step S247. If the SI cannot be obtained (NO in step S246), the second controller 625 proceeds to step S248.

In step S247, the second controller 625 adds the tuning information of services extracted from the SI to the second service list stored in the second service list storage unit 124A of the second memory unit 624.

Since the second controller 625 scans the physical channels in ascending order, it increments the receiving channel S by '1' (step S248) and returns to step S241.

After tuning to receiving channel S in step S243, if the received level of the electromagnetic wave is not higher than the second threshold (NO in step S243) or if frame lock is not achieved (NO in step S244), the second controller 625 proceeds to step S249.

In step S249, the second controller 625 decides whether the received level of the electromagnetic wave received in receiving channel S is higher than the third threshold. For example, the second controller 625 makes this decision by receiving from the second tuner 120 a notification of whether the received level of the electromagnetic wave is higher than the third threshold. If the received level of the electromagnetic wave received in receiving channel S is higher than the third threshold (YES in step S249), the second controller 625 proceeds to step S250. If the received level of the electromagnetic wave received in receiving channel S is not higher than the third threshold (NO in step S249), the second controller 625 proceeds to step S248.

In step S250, the second controller 625 adds receiving channel S to the third scan use second channel list stored in the third scan use second channel list storage unit 635C of the third memory unit 635.

The second controller 625 executes the third-phase DVB-H channel scan in ascending order of physical channels, starting from channel number '8', as described above. When the second controller 625 decides in step S241 that the receiving channel S to be scanned already exceeds the highest channel number '12', it ends the third-phase DVB-H channel scan.

In steps S243 and S249 in FIG. 36, the received level is compared with the second threshold and third threshold in the second tuner 120. The second controller 625 may obtain the received level of the electromagnetic wave received in receiving channel S from the second tuner 120 and compare the received level with the second threshold and third threshold.

The processing to obtain the SI and add the tuning information to the second service list is performed in steps S245 to S247 in FIG. 36. This processing may be executed at the timing shown in FIG. 36 or may be executed for all the services together after the entire channel scan is completed.

FIG. 37 and FIG. 38 are flowcharts illustrating a fourth-phase DVB-T2 channel scan subroutine performed by the first controller 615.

The first controller 615 obtains the third scan use first channel list stored in the third scan use first channel list storage unit 635B of the third memory unit 635 through the second controller 125 and decides whether tuning to all the physical channels with channel numbers listed in the third scan use first channel list has been performed (step S260). If tuning to all the physical channels with channel numbers listed in the third scan use first channel list has not been performed (NO in step S260), in other words, if the third scan use first channel list includes the channel number of a physical channel tuning to which has not been performed, the first controller 615 proceeds to step S261. If tuning to all the physical channels with channel numbers included in the third scan use first channel list has been performed (YES in step S260), in other words, if the third scan use first channel list does not include the channel number of any physical channel tuning to which has not been performed, the first controller 615 proceeds to step S268 in FIG. 38.

In step S261, the first controller 615 obtains channel numbers from the third scan use first channel list in the order in which they were listed and specifies each channel number as a receiving channel variable T indicating a physical channel. Although the channel numbers are specified here in the order in which they were listed, the first controller 615 may specify them as receiving channel T in a different order. For example, the channel number specified by the first controller 615 as receiving channel T may be the highest or lowest channel number of the physical channels that are listed in the third scan use first channel list and have not yet been specified as receiving channel T in step S261.

The first controller 615 then instructs the first tuner 110 to tune to the frequency corresponding to the physical channel indicated by receiving channel T (step S262).

The first controller 615 then decides whether the received level of the electromagnetic wave received in the tuned receiving channel T is higher than the third threshold (step S263). For example, the first controller 615 makes this decision by receiving from the first tuner 110 a notification of whether the received level of the electromagnetic wave is higher than the third threshold. If the received level of the electromagnetic wave received in receiving channel T is higher than the third threshold (YES in step S263), the first controller 615 proceeds to step S264. If the received level of the electromagnetic wave received in receiving channel T is not higher than the third threshold (NO in step S263), the first controller 615 returns to step S260.

In step S264, the first controller 615 decides whether the first demodulator 111 has successfully demodulated the electrical signal generated from the electromagnetic wave received by the first tuner 110 in receiving channel T. For example, the first controller 615 makes this decision by receiving from the first demodulator 111 a notification of whether it has achieved frame lock by performing demodulation processing on the electrical signal. If demodulation succeeded (YES in step S264), the first controller 615 proceeds to step S265. If demodulation failed (NO in step S264), the first controller 615 returns to step S260.

If the first demodulator 111 has achieved frame lock, it is highly possible that a TS is being output from the first demodulator 111 to the first demultiplexer 112. The first controller 615 therefore instructs the first demultiplexer 112 to obtain an SI (step S265).

The first controller 615 then decides whether the first demultiplexer 112 has obtained the SI (step S266). If the SI has been successfully obtained (YES in step S266), the first controller 615 proceeds to step S267. If the SI cannot be obtained (NO in step S266), the first controller 615 returns to step S260.

In step S267, the first controller 615 adds the tuning information of services extracted from the SI to the third service list stored in the third service list storage unit 635A of the third memory unit 635.

If the third scan use first channel list does not include the channel number of any physical channel tuning to which has not been performed in step S260, the first controller 615 proceeds to step S268 in FIG. 38.

In step S268 in FIG. 38, the first controller 615 obtains the third scan use second channel list stored in the third scan use second channel list storage unit 635C of the third memory unit 635 and decides whether tuning to all the physical channels with channel numbers listed in the third scan use second channel list has been performed. If tuning to all the physical channels with channel numbers listed in the third scan use second channel list has not been performed (NO in step S268), in other words, if the third scan use second channel list includes the channel number of a physical channel tuning to which has not been performed, the first controller 615 proceeds to step S269. If tuning to all the physical channels with channel numbers included in the third scan use second channel list has been performed (YES in step S268), in other words, if the third scan use second channel list does not include the channel number of any physical channel tuning to which has not been performed, the first controller 615 proceeds to step S148 in FIG. 29.

In step S269, the first controller 615 obtains channel numbers from the third scan use second channel list in the order in which they were listed and specifies each channel number as a receiving channel variable T indicating a physical channel. Although the channel numbers are specified here in the order in which they were listed, the first controller 615 may specify them as receiving channel T in a different order. For example, the channel number specified by the first controller 615 as receiving channel T may be the highest or lowest channel number of the physical channels that are listed in the third scan use second channel list and have not yet been specified as receiving channel T in step S269.

The first controller 615 then instructs the first tuner 110 to tune to the frequency corresponding to the physical channel indicated by receiving channel T (step S270).

The first controller 615 then decides whether the received level of the electromagnetic wave received in the tuned receiving channel T is higher than the third threshold (step S271). For example, the first controller 615 makes this decision by receiving from the first tuner 110 a notification of whether the received level of the electromagnetic wave is higher than the third threshold. If the received level of the electromagnetic wave received in receiving channel T is higher than the third threshold (YES in step S271), the first controller 615 proceeds to step S272. If the received level of the electromagnetic wave received in receiving channel T is not higher than the third threshold (NO in step S271), the first controller 615 returns to step S268.

In step S272, the first controller 615 decides whether the first demodulator 111 has successfully demodulated the electrical signal generated from the electromagnetic wave received by the first tuner 110 in receiving channel T. For example, the first controller 615 makes this decision by receiving from the first demodulator 111 a notification of whether it has achieved frame lock by performing demodulation processing on the electrical signal. If demodulation succeeded (YES in step S272), the first controller 615 proceeds to step S273. If demodulation failed (NO in step S272), the first controller 615 returns to step S268.

If the first demodulator 111 has achieved frame lock, it is highly possible that a TS is being output from the first demodulator 111 to the first demultiplexer 112. The first controller 615 therefore instructs the first demultiplexer 112 to obtain an SI (step S273).

The first controller 615 then decides whether the first demultiplexer 112 has obtained the SI (step S274). If the SI has been successfully obtained (YES in step S274), the first controller 615 proceeds to step S275. If the SI cannot be obtained (NO in step S274), the first controller 615 returns to step S268.

In step S275, the first controller 615 adds the tuning information of services extracted from the SI to the third service list stored in the third service list storage unit 635A of the third memory unit 635.

The first controller 615 executes a channel scan on the physical channels with channel numbers listed in the third scan use channel list, as described above. In other words, the physical channels scanned by the first controller 615 in the fourth-phase DVB-T2 channel scan are limited to physical channels found as a result of the DVB-T and DVB-H channel scans in the second phase and the third phase to have a received electromagnetic wave with the required received power even though demodulation was impossible by the DVB-T or DVB-H protocol, so the need to scan all the physical channels scanned by the first controller 615 and second controller 625 in the channel scans in the first to third phases is eliminated, and an efficient channel scan can be performed.

In step S263 in FIG. 37 and in step S271 in FIG. 38, the received level is compared with the third threshold in the first tuner 110. The first controller 615 may obtain the received level of the electromagnetic wave received in receiving channel T from the first tuner 110 and compare the received level with the third threshold.

The processing to obtain the SI and add the tuning information to the third service list is performed in steps S265 to S267 in FIG. 37 and in steps S273 to S275 in FIG. 38. This processing may be executed at the timing shown in FIG. 37 or FIG. 38 or may be executed for all the services together after the entire channel scan is completed.

FIG. 39 is a flowchart illustrating the fourth-phase DVB-T2 channel scan subroutine performed by the second controller 625. If the DVB-T2 band in the third broadcast protocol is assumed to range from channel 21 to channel 62, the second controller 625 executes a channel scan on channels 57 to 62, following channel 56, which has already been scanned in the third-phase channel scan, as the fourth-phase DVB-T2 channel scan.

Since the second controller 625 performs the channel scan in ascending order, starting from channel 57, it specifies channel number '57' as the initial value of the receiving channel U, where U is a variable indicating the physical channel to be scanned (step S280).

The second controller 625 then decides whether a channel scan up to channel 62 has already been performed (step S281). For example, the second controller 625 makes this decision by checking whether the receiving channel U to be scanned is higher than the highest physical channel number '62' to be scanned. If the channel scan up to channel 62 has not yet been performed (NO in step S281), the second controller 625 proceeds to step S282. If the channel scan up to channel 62 has already been performed (YES in step S281), the second controller 625 proceeds to step S157 in FIG. 30.

In step S282, the second controller 625 instructs the second tuner 120 to tune to the frequency corresponding to the physical channel indicated by receiving channel U.

The second controller 625 then decides whether the received level of the electromagnetic wave received in the tuned receiving channel U is higher than the third threshold (step S283). For example, the second controller 625 makes this decision by receiving from the second tuner 120 a notification of whether the received level of the electromagnetic wave is higher than the third threshold. If the received level of the electromagnetic wave received in receiving channel U is higher than the third threshold (YES in step S283), the second controller 625 proceeds to step S284. If the received level of the electromagnetic wave received in receiving channel U is not higher than the third threshold (NO in step S283), the second controller 625 proceeds to step S288.

In step S284, the second controller 625 decides whether the second demodulator 121 has successfully demodulated the electrical signal generated from the electromagnetic wave received by the second tuner 120 in receiving channel U. For example, the second controller 625 makes this decision by receiving from the second demodulator 121 a notification of whether it has achieved frame lock by performing demodulation processing on the electrical signal. If demodulation succeeded (YES in step S284), the second controller 625 proceeds to step S285. If demodulation failed (NO in step S284), the second controller 625 proceeds to step S288.

If the second demodulator 121 has achieved frame lock, it is highly possible that a TS is being output from the second demodulator 121 to the second demultiplexer 122. The second controller 625 therefore instructs the second demultiplexer 122 to obtain an SI (step S285).

The second controller 625 then decides whether the second demultiplexer 122 has obtained the SI (step S286). If the SI has been successfully obtained (YES in step S286), the second controller 625 proceeds to step S287. If the SI cannot be obtained (NO in step S286), the second controller 625 proceeds to step S288.

In step S287, the second controller 625 adds the tuning information of services extracted from the SI to the third service list stored in the third service list storage unit 635A of the third memory unit 635.

Since the second controller 625 scans the physical channels in ascending order, it increments the receiving channel U by '1' (step S288) and returns to step S281.

The fourth-phase DVB-T2 channel scan performed by the second controller 625 scans physical channels in ascending order, starting from channel number '57' as described above. When the second controller 625 decides in step S281 that the receiving channel U to be scanned already exceeds the highest channel number '62', it ends the fourth-phase DVB-T2 channel scan.

In step S283 in FIG. 39, the received level is compared with the third threshold in the second tuner 120. The second controller 625 may obtain the received level of the electromagnetic wave received in receiving channel U from the second tuner 120 and compare the received level with the third threshold.

The processing to obtain the SI and add the tuning information to the third service list is performed in steps S285 to S287 in FIG. 39. This processing may be executed at the timing shown in FIG. 39 or may be executed for all the services together after the entire channel scan is completed.

Figure 40:
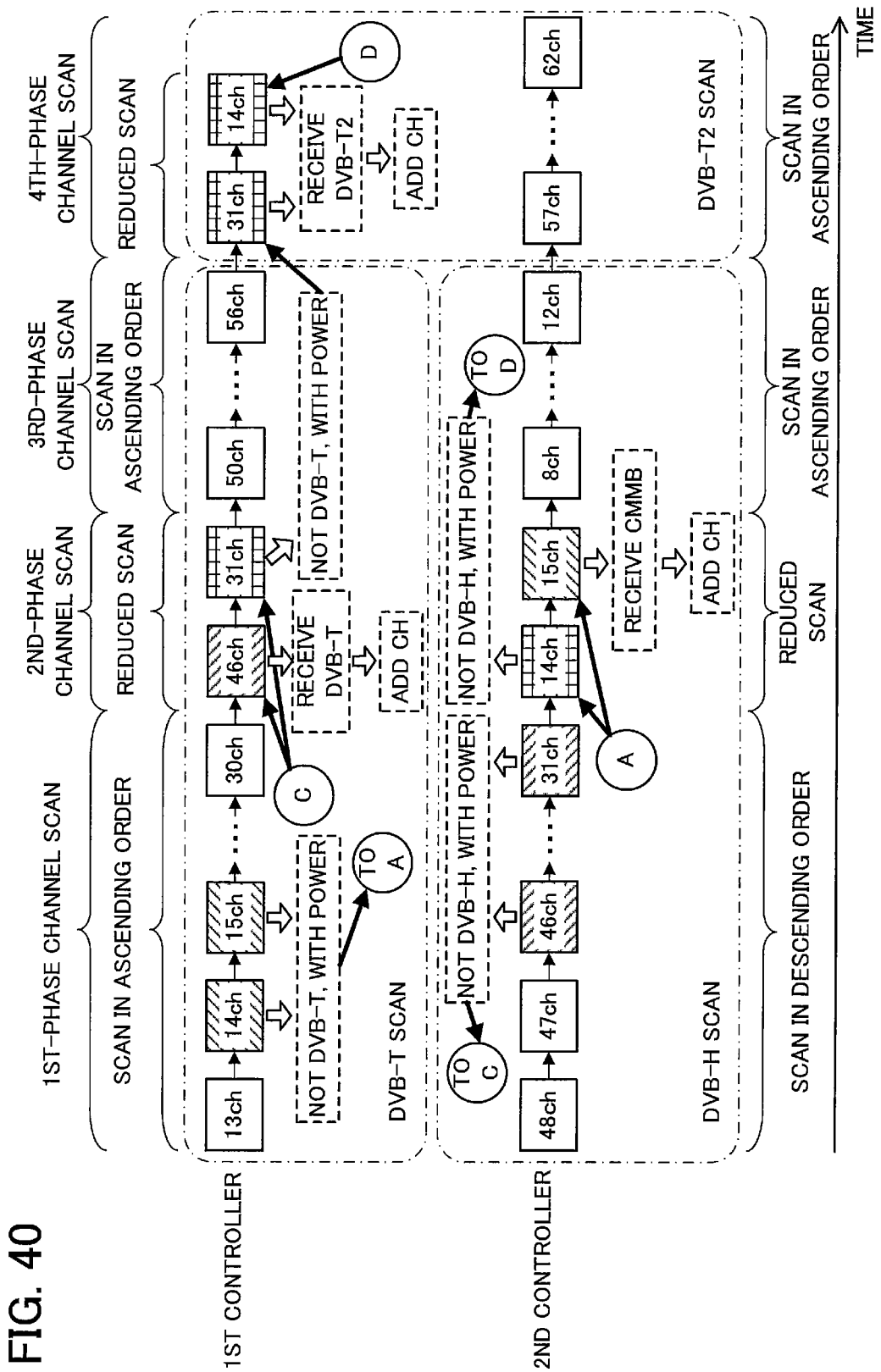
FIG. 40 is a schematic diagram used in describing the channel scan performed by the digital broadcast receiver according to the sixth embodiment.

FIG. 40 is a schematic diagram that will be used in describing the channel scan performed by the digital broadcast receiver 600. Time advances from left to right in FIG. 40, which shows the state in which a DVB-T channel scan and a DVB-H channel scan are started simultaneously. The first-phase channel scan includes the first-phase DVB-T channel scan and the first-phase DVB-H channel scan; the second-phase channel scan includes the second-phase DVB-T channel scan and the second-phase DVB-H channel scan; the third-phase channel scan includes the third-phase DVB-T channel scan and the third-phase DVB-H channel scan; the fourth-phase channel scan includes the DVB-T2 channel scan executed by the first controller 615 and the DVB-T2 channel scan executed by the second controller 625.

In the DVB-T channel scan, the first-phase DVB-T channel scan, second-phase DVB-T channel scan, and third-phase DVB-T channel scan are executed in that order. In the DVB-H channel scan, the first-phase DVB-H channel scan, second-phase DVB-H channel scan, and third-phase DVB-H channel scan are executed in that order. The DVB-T2 channel scan is executed after the third-phase DVB-T channel scan and third-phase DVB-H channel scan end.

In the first-phase DVB-T channel scan, channels are scanned in ascending order, starting from channel 13; in the first-phase DVB-H channel scan, channels are scanned in descending order, starting from channel 48. When the first-phase DVB-T channel scan is completed up to channel 30 and the first-phase CMMB channel scan is completed down to channel 31, the conditions for ending the first-phase channel scans (step S161 in FIG. 31, step S181 in FIG. 32) are satisfied, and the first-phase channel scans have ended.

In the illustrated first-phase DVB-T channel scan, the received level of the electromagnetic wave in channels 14 and 15 is higher than the second threshold or the third threshold, but frame lock was not achieved and demodulation failed. The first controller 615 therefore decides that the received electromagnetic wave is not a DVB-T broadcast wave and adds channels 14 and 15 to the first scan use channel list (step S171 or S173 in FIG. 31).

In the illustrated first-phase DVB-H channel scan, the received level of the electromagnetic wave in channels 46 and 31 is higher than the first threshold or the third threshold, but frame lock was not achieved and demodulation failed. The second controller 625 therefore decides that the received electromagnetic wave is not a DVB-H broadcast wave and adds channels 46 and 31 to the second scan use channel list (step S191 or S193 in FIG. 32).

The channels scanned in the second-phase DVB-T channel scan and the second-phase DVB-H channel scan are limited to the channels in which the received level of the electromagnetic wave was higher than a predetermined threshold and the electrical signal generated from the electromagnetic wave could not be demodulated in the first-phase channel scan in the other protocol. In other words, the channels scanned in the second-phase DVB-T channel scan are channels 46 and 31, which were found in the first-phase DVB-H channel scan to have an electromagnetic wave with a received level higher than the first threshold or the third threshold and the electrical signal generated from the electromagnetic wave could not be demodulated. If a DVB-T broadcast wave is being transmitted in channel 46, the first demodulator 111 can perform demodulation, and the first controller 615 extracts tuning information and adds it to the first service list. The received level of the electromagnetic wave in channel 31 is higher than the third threshold, but frame lock was not achieved and demodulation failed. The first controller 615 therefore decides that the received electromagnetic wave is not a DVB-T broadcast wave and adds channel 31 to the third scan use first channel list.

The channels scanned in the second-phase DVB-H channel scan are channels 14 and 15, which were found in the first-phase DVB-T channel scan to have an electromagnetic wave with a received level higher than the second threshold or the third threshold and the electrical signal generated from the electromagnetic wave could not be demodulated. If a DVB-H broadcast wave is being transmitted in channel 15, the second demodulator 121 can perform demodulation, and the second controller 625 extracts tuning information and adds it to the second service list. The received level of the electromagnetic wave in channel 14 is higher than the third threshold, but frame lock was not achieved and demodulation failed. The second controller 625 therefore decides that the received electromagnetic wave is not a DVB-H broadcast wave and adds channel 14 to the third scan use second channel list.

A characteristic of the second-phase channel scans is that the scanned channels are limited to the channels found in the first-phase channel scan in the other protocol to have electromagnetic waves with received levels higher than given thresholds and the electrical signals generated from the electromagnetic waves could not be demodulated.

In the first-phase and second-phase channel scans, each channel from channel 13 to channel 48 is selected at least once in the DVB-T or DVB-H channel scan. In the third-phase DVB-T channel scan, channels 49 to 56, which have not yet been selected, are scanned. When the channel scan up to channel 56 is completed, the DVB-T channel scan ends. In the third-phase DVB-H channel scan, channels 8 to 12, which have not yet been selected, are scanned. When the channel scan up to channel 12 is completed, the DVB-H channel scan ends.

After the DVB-T and DVB-H channel scans end as described above, a DVB-T2 channel scan, which is the fourth-phase DVB-T2 channel scan, is executed.

The channels scanned in the fourth-phase DVB-T2 channel scan executed by the first controller 615 are limited to the channels which are found in the second-phase and third-phase channel scans to have an electromagnetic wave with a received level higher than a predetermined threshold but in which the electrical signal generated from the electromagnetic wave could not be demodulated. In other words, the scanned channels are limited to channels 31 and 14, in which the received level of the electromagnetic wave was higher than the third threshold but frame lock was not achieved and demodulation failed. If a DVB-T2 broadcast wave is being transmitted in channels 31 and 14, the first demodulator 111 can perform demodulation, and the first controller 615 extracts tuning information and adds it to the third service list.

In the fourth-phase DVB-T2 channel scan executed by the second controller 625, channels 57 to 62, which have not yet been selected, are also scanned, and the second controller 625 extracts tuning information and adds it to the third service list. When the channel scan up to channel 62 is completed, the DVB-T2 channel scan ends.

In the sixth embodiment, the channels scanned by the first controller 615 in the fourth-phase DVB-T2 channel scan are limited to the channels which are found in the second-phase and third-phase channel scans to have an electromagnetic wave with a received level higher than a predetermined threshold but in which the electrical signal generated from the electromagnetic wave could not be demodulated, and the second controller 625 scans channels 57 to 62, which have not yet been selected, but the second controller 625 may scan channels in which demodulation failed and the first controller 615 may scan channels which have not yet been selected. If there is no channel that has not yet been selected, the first controller 615 and second controller 625 may execute a channel scan by dividing between them the channels which are found in the second-phase and third-phase channel scans to have an electromagnetic wave with a received level higher than a predetermined threshold but in which the electrical signal generated from the electromagnetic wave could not be demodulated. For example, the first controller 615 may scan the physical channels included in the third scan use first channel list and the second controller 625 may scan the physical channels in the third scan use second channel list, or vice versa.

In the digital broadcast receiver 600 according to the sixth embodiment, configured as described above, the first controller 615 and second controller 625 control channel scans on physical channels included in the range of overlap of the frequency band used by broadcasts in the first broadcast protocol and the frequency band used by broadcasts in the second broadcast protocol as follows. The channels scanned in the first-phase channel scan are divided between the first controller 615 and the second controller 625, and the channels scanned in the second-phase channel scan are limited to physical channels that are likely to include corresponding broadcasts. In addition, in the digital broadcast receiver 600 according to the sixth embodiment, the fourth-phase channel scan is controlled by the first controller 615 and the second controller 625 to scan physical channels that are likely to include broadcasts in the third broadcast protocol. Accordingly, efficient channel scans can be executed, and the channel scan time can be reduced.

In the digital broadcast receiver 600 according to the sixth embodiment, the first threshold, second threshold, and third threshold are the lowest received levels at which services in the corresponding broadcast protocols can be received. Therefore, physical channels in which received levels are so low that tuning is highly likely to fail can be eliminated from the channels to be scanned in the second phase and the fourth phase, and the channel scan time in the second phase and the fourth phase can be reduced.

Seventh Embodiment

The configuration described in the sixth embodiment uses two receiving sections to execute channel scans in four steps (phases), a first phase to a fourth phase, for three different broadcast protocols. The seventh embodiment is configured to execute channel scans in three steps. Reducing the number of steps simplifies the control operations.

Figure 41:
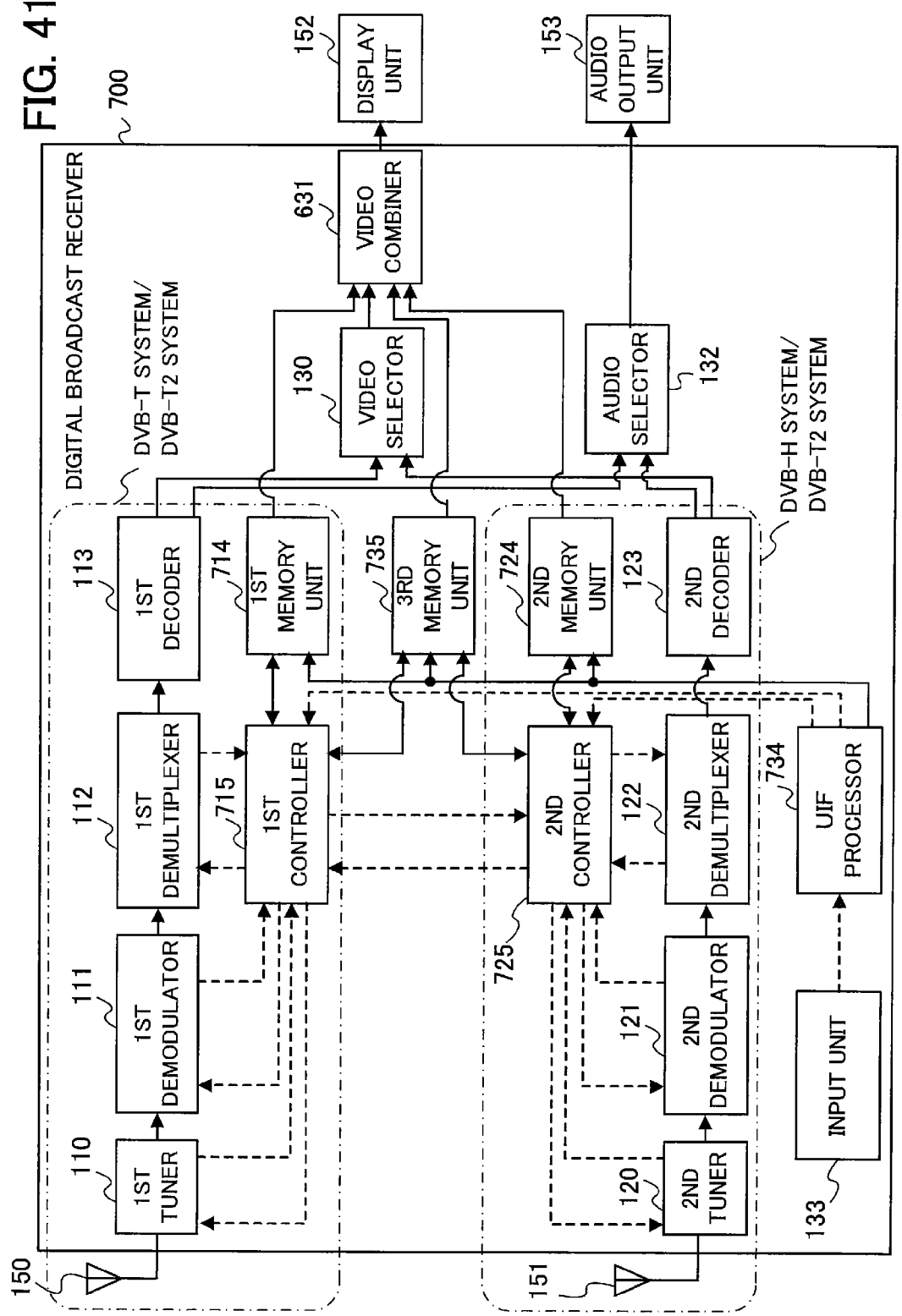
FIG. 41 is a block diagram schematically showing the configuration of a digital broadcast receiver according to a seventh embodiment.

FIG. 41 is a block diagram schematically showing the configuration of a digital broadcast receiver 700 according to the seventh embodiment. As shown in FIG. 41, the digital broadcast receiver 700 includes a first tuner 110, a first demodulator 111, a first demultiplexer 112, a first decoder 113, a first memory unit 714, a first controller 715, a second tuner 120, a second demodulator 121, a second demultiplexer 122, a second decoder 123, a second memory unit 724, a second controller 725, a video selector 130, a video combiner 631, an audio selector 132, an input unit 133, a UIF processor 734, and a third memory unit 735. A first antenna 150 is connected to the first tuner 110; the first antenna 150, first tuner 110, first demodulator 111, first demultiplexer 112, first decoder 113, first memory unit 714, first controller 715, and third memory unit 735 form a DVB-T section and a DVB-T2 section. These sections receive DVB-T broadcasts, DVB-T being the first broadcast protocol, and DVB-T2 broadcasts, DVB-T2 being the third broadcast protocol. A second antenna 151 is connected to the second tuner 120; the second antenna 151, second tuner 120, second demodulator 121, second demultiplexer 122, second decoder 123, second memory unit 724, second controller 725, and third memory unit 735 form a DVB-H section and a DVB-T2 section. These sections receive DVB-H broadcasts, DVB-H being the second broadcast protocol, and DVB-T2 broadcasts, DVB-T2 being the third broadcast protocol.

The digital broadcast receiver 700 in the seventh embodiment differs from the digital broadcast receiver 600 in the sixth embodiment in regard to the control and processing in the first controller 715, second controller 725, and UIF processor 734 and the information stored in the first memory unit 714, second memory unit 724, and third memory unit 735.

The first memory unit 714 stores information needed to scan the channels in the first broadcast protocol and the second broadcast protocol and information needed to receive services broadcast in the first broadcast protocol.

Figure 42:
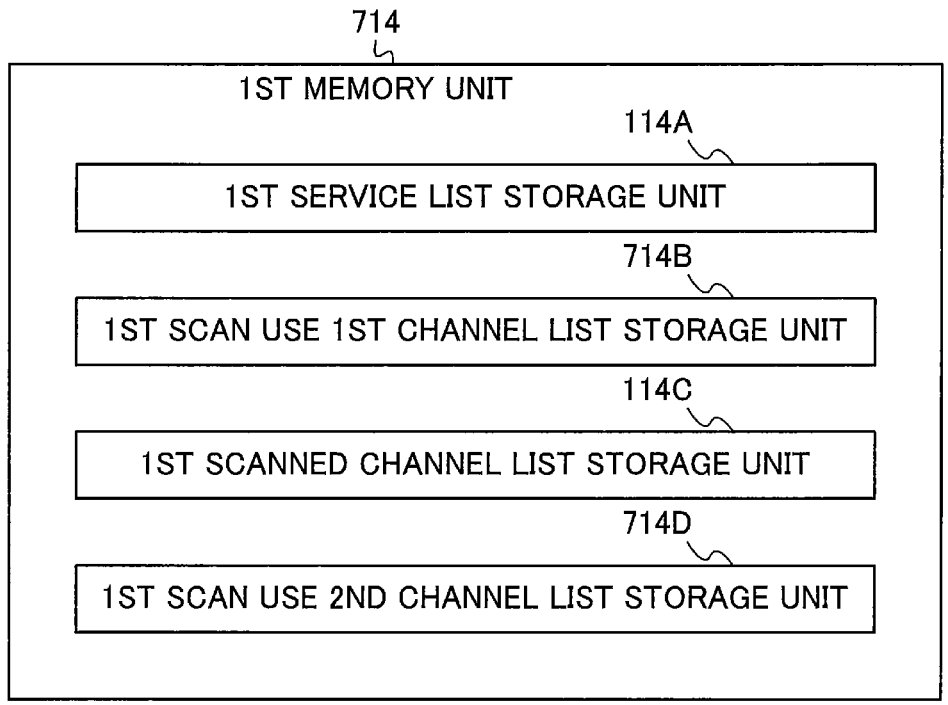
FIG. 42 is a block diagram schematically showing the configuration of the first memory unit in the seventh embodiment.

FIG. 42 is a block diagram schematically showing the configuration of the first memory unit 714. As shown in FIG. 42, the first memory unit 714 includes a first service list storage unit 114A, a first scan use first channel list storage unit 714B, a first scanned channel list storage unit 114C, and the first scan use second channel list storage unit 714D. The first memory unit 714 in the seventh embodiment differs from the first memory unit 614 in the sixth embodiment by including the first scan use first channel list storage unit 714B and the first scan use second channel list storage unit 714D.

The first scan use first channel list storage unit 714B stores a first scan use first channel list which lists identification information (channel numbers, here) for identifying physical channels in which the received level of the electromagnetic wave received by the first tuner 110 in a channel scan is higher than a predetermined threshold but the electrical signal generated from the electromagnetic wave cannot be demodulated (frame lock is not achieved) by the first demodulator 111. For example, the first scan use first channel list includes the channel numbers of physical channels in which, when a DVB-T2 channel scan was executed, DVB-T2 being the third broadcast protocol, the electrical signal generated from the received electromagnetic wave could not be demodulated by the first demodulator 111 and the received level of the electromagnetic wave received in the physical channel was higher than a first threshold, the first threshold being the lowest received level at which stable viewing of a DVB-T service is possible, DVB-T being the first broadcast protocol, and channels in which, when a DVB-T2 channel scan was executed, DVB-T2 being the third broadcast protocol, the electrical signal generated from the received electromagnetic wave could not be demodulated by the first demodulator 111 and the received level of the electromagnetic wave was higher than a second threshold, the second threshold being the lowest received level at which stable viewing of a DVB-H service is possible, DVB-H being the second broadcast protocol.

The first threshold is a value obtained by using the above formula (3) or a value selected from the minimum received signal power levels specified in the DVB-T standard, and indicates the minimum received power level required to receive a service in the first broadcast protocol. The second threshold is a value obtained by using the above formula (3) or a value selected from the minimum received signal power levels specified in the DVB-H standard, and indicates the minimum received power level required to receive a service in the second broadcast protocol.

The first scan use second channel list storage unit 714D stores a first scan use second channel list which lists identification information (channel numbers, here) for identifying physical channels in which the received level of the electromagnetic wave received by the first tuner 110 in a channel scan is higher than a predetermined threshold but the electrical signal generated from the electromagnetic wave cannot be demodulated (frame lock is not achieved) by the first demodulator 111. For example, the first scan use second channel list includes the channel numbers of physical channels in which, when a DVB-T channel scan was executed, DVB-T being the first broadcast protocol, the electrical signal generated from the received electromagnetic wave could not be demodulated by the first demodulator 111 and the received level of the electromagnetic wave was higher than the second threshold, the second threshold being the lowest received level at which stable viewing of a DVB-H service is possible, DVB-H being the second broadcast protocol.

Referring again to FIG. 41, the second memory unit 724 stores information needed to scan the channels in the first broadcast protocol and the second broadcast protocol and information needed to receive services broadcast in the second broadcast protocol.

Figure 43:
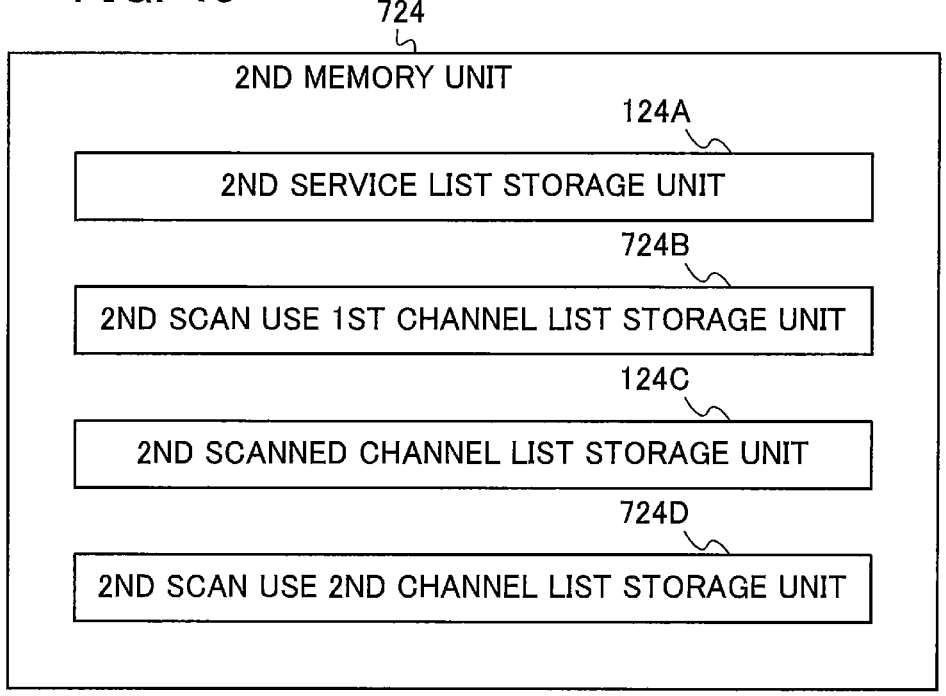
FIG. 43 is a block diagram schematically showing the configuration of the second memory unit in the seventh embodiment.

FIG. 43 is a block diagram schematically showing the configuration of the second memory unit 724. As shown in FIG. 43, the second memory unit 724 includes a second service list storage unit 124A, a second scan use first channel list storage unit 724B, a second scanned channel list storage unit 124C, and a second scan use second channel list storage unit 724D. The second memory unit 724 in the seventh embodiment differs from the second memory unit 624 in the sixth embodiment by including the second scan use channel list storage unit 624B and the second scan use second channel list storage unit 724D.

The second scan use first channel list storage unit 724B stores a second scan use first channel list which lists identification information (channel numbers, here) for identifying physical channels in which the received level of the electromagnetic wave received by the second tuner 120 in a channel scan is higher than a predetermined threshold but the electrical signal generated from the electromagnetic wave cannot be demodulated (frame lock is not achieved) by the second demodulator 121. For example, the second scan use first channel list includes the channel numbers of physical channels in which, when a DVB-T2 channel scan was executed, DVB-T2 being the third broadcast protocol, the electrical signal generated from the received electromagnetic wave could not be demodulated by the second demodulator 121 and the received level of the electromagnetic wave was higher than the first threshold, the first threshold being the lowest received level at which stable viewing of a DVB-T service is possible, DVB-T being the first broadcast protocol, and channels in which, when a DVB-T2 channel scan was executed, DVB-T2 being the third broadcast protocol, the electrical signal generated from the received electromagnetic wave could not be demodulated by the second demodulator 121 and the received level of the electromagnetic wave was higher than the second threshold, the second threshold being the lowest received level at which stable viewing of a DVB-H service is possible, DVB-H being the second broadcast protocol.

The second scan use second channel list storage unit 724D stores a second scan use second channel list which lists identification information (channel numbers, here) for identifying physical channels in which the received level of the electromagnetic wave received by the second tuner 120 in a channel scan is higher than a predetermined threshold but the electrical signal generated from the electromagnetic wave cannot be demodulated (frame lock is not achieved) by the second demodulator 121. For example, the second scan use second channel list includes the channel numbers of physical channels in which, when a DVB-H channel scan was executed, DVB-H being the second broadcast protocol, the electrical signal generated from the received electromagnetic wave could not be demodulated by the second demodulator 121 and the received level of the electromagnetic wave was higher than the first threshold, the first threshold being the lowest received level at which stable viewing of a DVB-T service is possible, DVB-T being the first broadcast protocol.

As shown in FIG. 41, the third memory unit 735 stores information needed to receive services broadcast in the third broadcast protocol.

Figure 44:
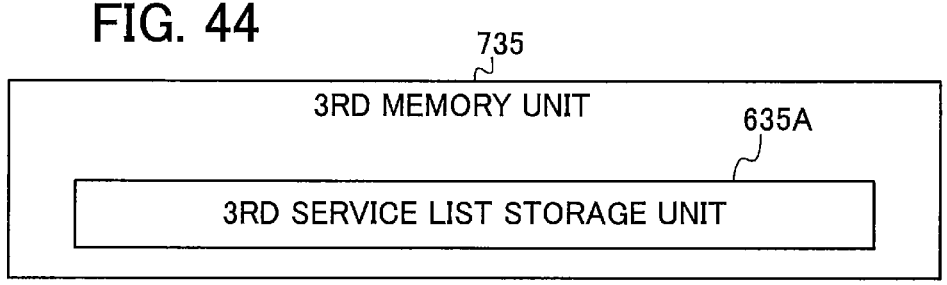
FIG. 44 is a block diagram schematically showing the configuration of the third memory unit in the seventh embodiment.

FIG. 44 is a block diagram schematically showing the configuration of the third memory unit 735. As shown in FIG. 44, the third memory unit 735 includes a third service list storage unit 635A. The third memory unit 735 in the seventh embodiment differs from the third memory unit 635 in the sixth embodiment in that it does not include a third scan use first channel list storage unit 635B and third scan use second channel list storage unit 635C. The third service list storage unit 635A stores a third service list of tuning information on a channel basis, including network information, TS information, and service information extracted by the first controller 615.

Referring again to FIG. 41, the first controller 715 controls the processing for scanning channels in the first broadcast protocol and the third broadcast protocol and the processing for receiving broadcasts in the first broadcast protocol and the third broadcast protocol. For example, the first controller 715 may execute a DVB-T2 channel scan in the first phase and a DVB-T channel scan in the second and third phases.

In the first-phase DVB-T2 channel scan, the first controller 715 executes a channel scan in a predetermined first order on physical channels that have not yet been scanned by the second controller 725, among the physical channels included in the entire range of the frequency band used by broadcasts in the first broadcast protocol, the frequency band used by broadcasts in the second broadcast protocol, and the frequency band used by broadcasts in the third broadcast protocol. In the first-phase DVB-T2 channel scan, if a physical channel in which the received level of the electromagnetic wave is higher than a third threshold and the electrical signal generated from the electromagnetic wave can be demodulated is found, the first controller 715 adds the tuning information of the physical channel to a third service list. The first controller 715 also adds the channel numbers of physical channels in which the received level of the electromagnetic wave is higher than the first threshold or the second threshold and the electrical signal generated from the electromagnetic wave cannot be demodulated to the first scan use first channel list.

In the second-phase DVB-T channel scan, the first controller 715 scans physical channels having channel numbers included in a first scan use first channel list. If a physical channel in which the received level of the electromagnetic wave is higher than the first threshold and the electrical signal generated from the electromagnetic wave can be demodulated is found, the first controller 715 adds the tuning information of the physical channel to the first service list. The first controller 715 also adds the channel numbers of physical channels in which the received level of the electromagnetic wave is higher than the second threshold and the electrical signal generated from the electromagnetic wave cannot be demodulated to the first scan use second channel list.

In the third-phase DVB-T channel scan, the first controller 715 scans physical channels having channel numbers included in the second scan use second channel list. If a physical channel in which the received level of the electromagnetic wave is higher than the first threshold and the electrical signal generated from the electromagnetic wave can be demodulated is found, the first controller 715 adds the tuning information of the physical channel to a first service list.

The second controller 725 controls the processing for scanning channels in the second broadcast protocol and the third broadcast protocol and the processing for receiving broadcasts in the second broadcast protocol and the third broadcast protocol. For example, the second controller 725 may execute a DVB-T2 channel scan in the first phase and a DVB-H channel scan in the second and third phases.

In the first-phase DVB-T2 channel scan, the second controller 725 executes a channel scan in a predetermined second order on physical channels that have not yet been scanned by the first controller 715, among the physical channels included in the entire range of the frequency band used by broadcasts in the first broadcast protocol, the frequency band used by broadcasts in the second broadcast protocol, and the frequency band used by broadcasts in the third broadcast protocol. The second order is the reverse of the first order used by the first controller 715 in controlling the channel scan. In the first-phase DVB-T2 channel scan, if a physical channel in which the received level of the electromagnetic wave is higher than the third threshold and the electrical signal generated from the electromagnetic wave can be demodulated is found, the second controller 725 adds the tuning information of the physical channel to a third service list. The second controller 725 also adds the channel numbers of physical channels in which the received level of the electromagnetic wave is higher than the first threshold or second threshold and the electrical signal generated from the electromagnetic wave cannot be demodulated to the second scan use first channel list.

In the second-phase DVB-H channel scan, the second controller 725 scans physical channels having channel numbers included in a second scan use first channel list. If a physical channel in which the received level of the electromagnetic wave is higher than the second threshold and the electrical signal generated from the electromagnetic wave can be demodulated is found, the second controller 725 adds the tuning information of the physical channel to the second service list. The second controller 725 also adds the channel numbers of physical channels in which the received level of the electromagnetic wave is higher than the first threshold and the electrical signal generated from the electromagnetic wave cannot be demodulated to the second scan use second channel list.

In the third-phase DVB-H channel scan, the second controller 725 scans physical channels having channel numbers included in the first scan use second channel list. If a physical channel in which the received level of the electromagnetic wave is higher than the second threshold and the electrical signal generated from the electromagnetic wave can be demodulated is found, the second controller 725 adds the tuning information of the physical channel to the second service list.

Figure 45:
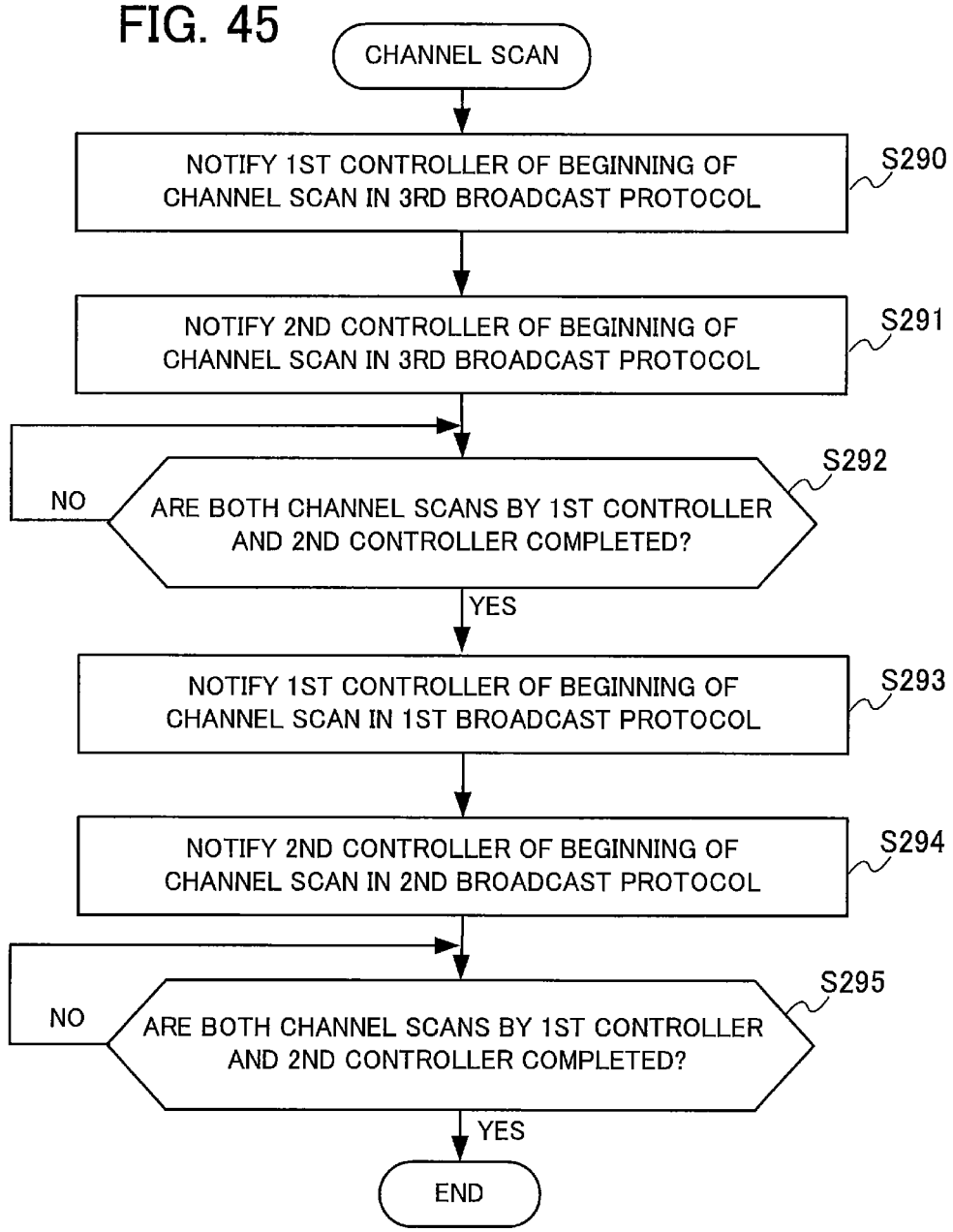
FIG. 45 is a flowchart illustrating processing performed by the UIF processor in the seventh embodiment when a channel scan is selected by a user operation.

The UIF processor 734 performs substantially the same processing as the UIF processor 634 in the sixth embodiment but differs in the processing illustrated in FIG. 45.

The operation of the digital broadcast receiver 700 in the seventh embodiment in a channel scan will next be described in detail. When the digital broadcast receiver 700 is initialized, when the broadcast configuration changes, or when the receiver is mounted on a mobile device and moves from one service area to another service area, the digital broadcast receiver 700 in the seventh embodiment performs a channel scan and generates digital broadcast service lists for the DVB-T, DVB-H, and DVB-T2 broadcast protocols.

FIG. 45 is a flowchart illustrating processing performed by the UIF processor 734 when a channel scan is selected by a user operation.

When an operation signal indicating a channel scan request is received from the input unit 133, the UIF processor 734 notifies the first controller 715 of the beginning of a channel scan in the third broadcast protocol (step S290).

The UIF processor 734 then notifies the second controller 725 of the beginning of a channel scan in the third broadcast protocol (step S291).

When the first controller 715 and second controller 725 are notified of the beginning of channel scans as described above, a DVB-T2 channel scan controlled by the first controller 715 and a DVB-T2 channel scan controlled by the second controller 725 are performed in parallel.

The UIF processor 734 waits until it receives notifications of the completion of both the channel scan by the first controller 715 and the channel scan by the second controller 725 (step S292). When these notifications are received (YES in step S292), the UIF processor 734 proceeds to step S293.

In step S293, the UIF processor 734 notifies the first controller 715 of the beginning of a channel scan in the first broadcast protocol.

The UIF processor 734 further notifies the second controller 725 of the beginning of a channel scan in the second broadcast protocol (step S294).

When the first controller 715 and second controller 725 are notified of the beginning of channel scans as described above, a DVB-T channel scan controlled by the first controller 715 and a DVB-H channel scan controlled by the second controller 725 are performed in parallel.

The UIF processor 734 waits until it receives notifications of the completion of both the channel scan by the first controller 715 and the channel scan by the second controller 725 (step S295). When the UIF processor 734 receives these notifications (YES in step S295), the processing ends. At the end of the processing, the UIF processor 734 may generate a video signal for a notification screen indicating the end of the channel scan processing, output the signal through the video combiner 631 to the display unit 152, and have the display unit 152 display the screen.

In FIG. 45, the second controller 725 is notified of the beginning of the channel scan (step S291 or S294) after the first controller 715 is notified of the beginning of the channel scan (step S290 or S293), but this order may be reversed.

Figure 46:
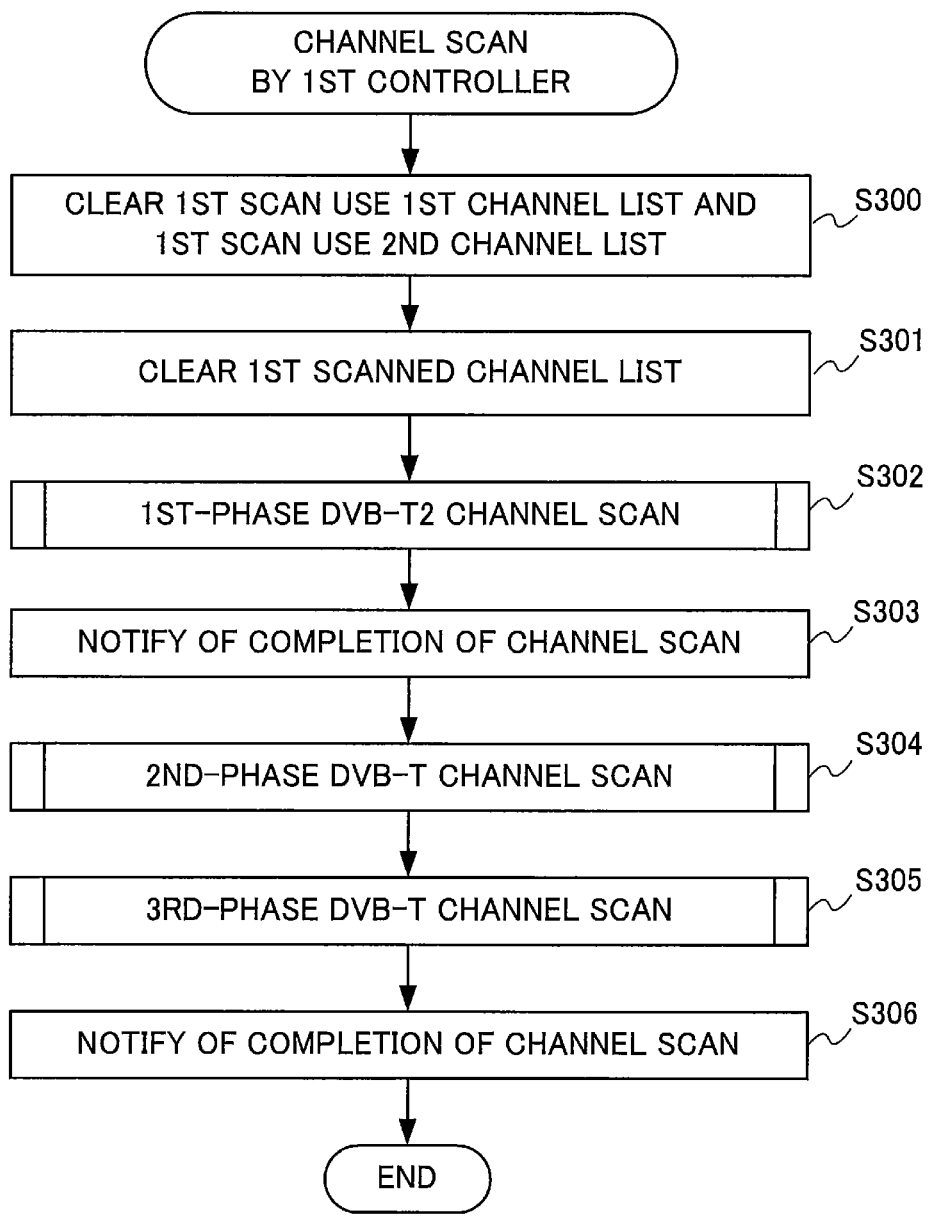
FIG. 46 is a flowchart illustrating channel scan processing performed by the first controller in the seventh embodiment.

FIG. 46 is a flowchart illustrating channel scan processing performed by the first controller 715. The first controller 715 starts the processing illustrated by the flowchart in FIG. 46 when it is notified of the beginning of the channel scan by the UIF processor 734, for example.

The first controller 715 clears (initializes) the first scan use first channel list stored in the first scan use first channel list storage unit 714B of the first memory unit 714 and the first scan use second channel list stored in the first scan use second channel list storage unit 714D (step S300). For example, the first controller 715 erases all the channel numbers of physical channels stored in the first scan use first channel list and the first scan use second channel list.

The first controller 715 clears the first scanned channel list stored in the first scanned channel list storage unit 114C of the first memory unit 714 (step S301). For example, the first controller 715 erases all the channel numbers of physical channels stored in the first scanned channel list.

Figure 48:
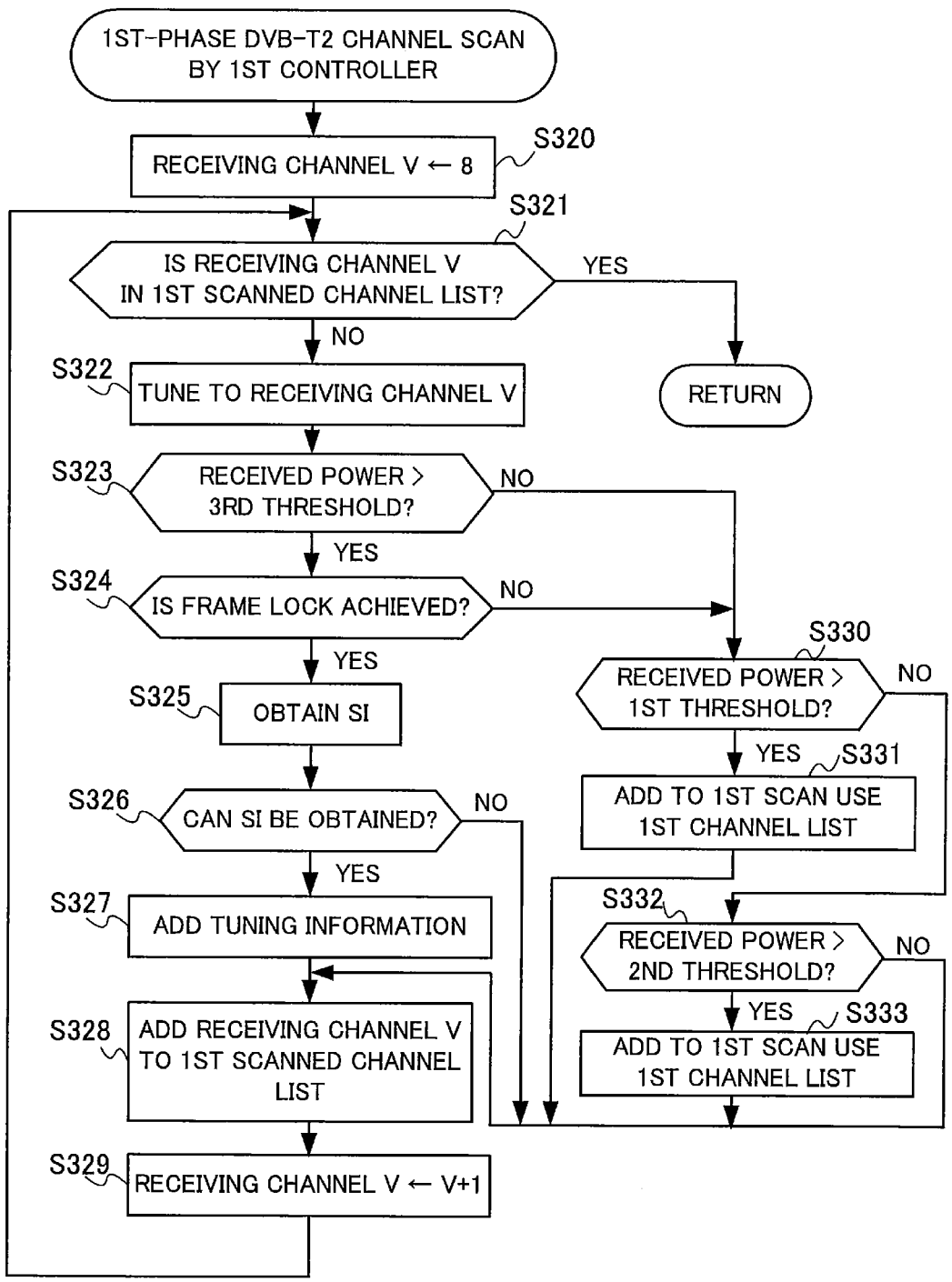
FIG. 48 is a flowchart illustrating a first-phase DVB-T2 channel scan subroutine performed by the first controller in the seventh embodiment.

The first controller 715 then executes a first-phase DVB-T2 channel scan (step S302). Details of this subroutine are illustrated in FIG. 48. The first controller 715 here scans the physical channels included in the entire range of the frequency band assigned to DVB-T, the frequency band assigned to DVB-H, and the frequency band assigned to DVB-T2 in ascending order, starting from the lowest channel number '8'. Since the frequency bands assigned to DVB-T, DVB-H, DVB-T2 vary from country to country, the number '8' is used provisionally for purposes of description. The first-phase DVB-T2 channel scan ends when the physical channel selected for the next channel scan has already been scanned by the second controller 725.

When the first-phase DVB-T2 channel scan ends, the first controller 715 notifies the UIF processor 734 of the completion of the DVB-T2 channel scan (step S303).

Figure 50:
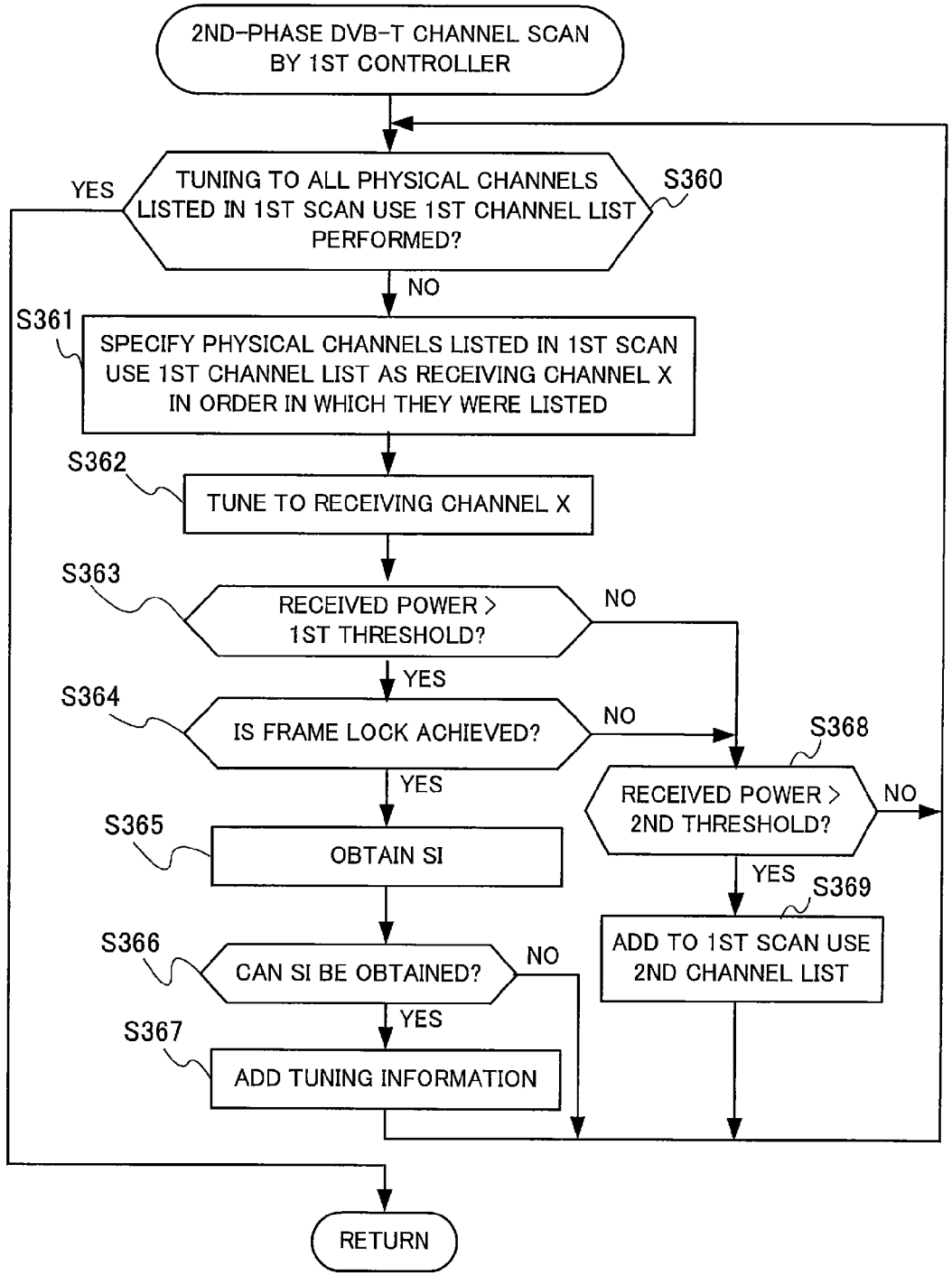
FIG. 50 is a flowchart illustrating a first-phase DVB-T channel scan subroutine performed by the first controller in the seventh embodiment.

Next, when the first controller 715 receives a command from the UIF processor 734, it executes the second-phase DVB-T channel scan when (step S304). Details of this subroutine are illustrated in FIG. 50. The first controller 715 here scans the physical channels with channel numbers included in the first scan use first channel list.

Figure 52:
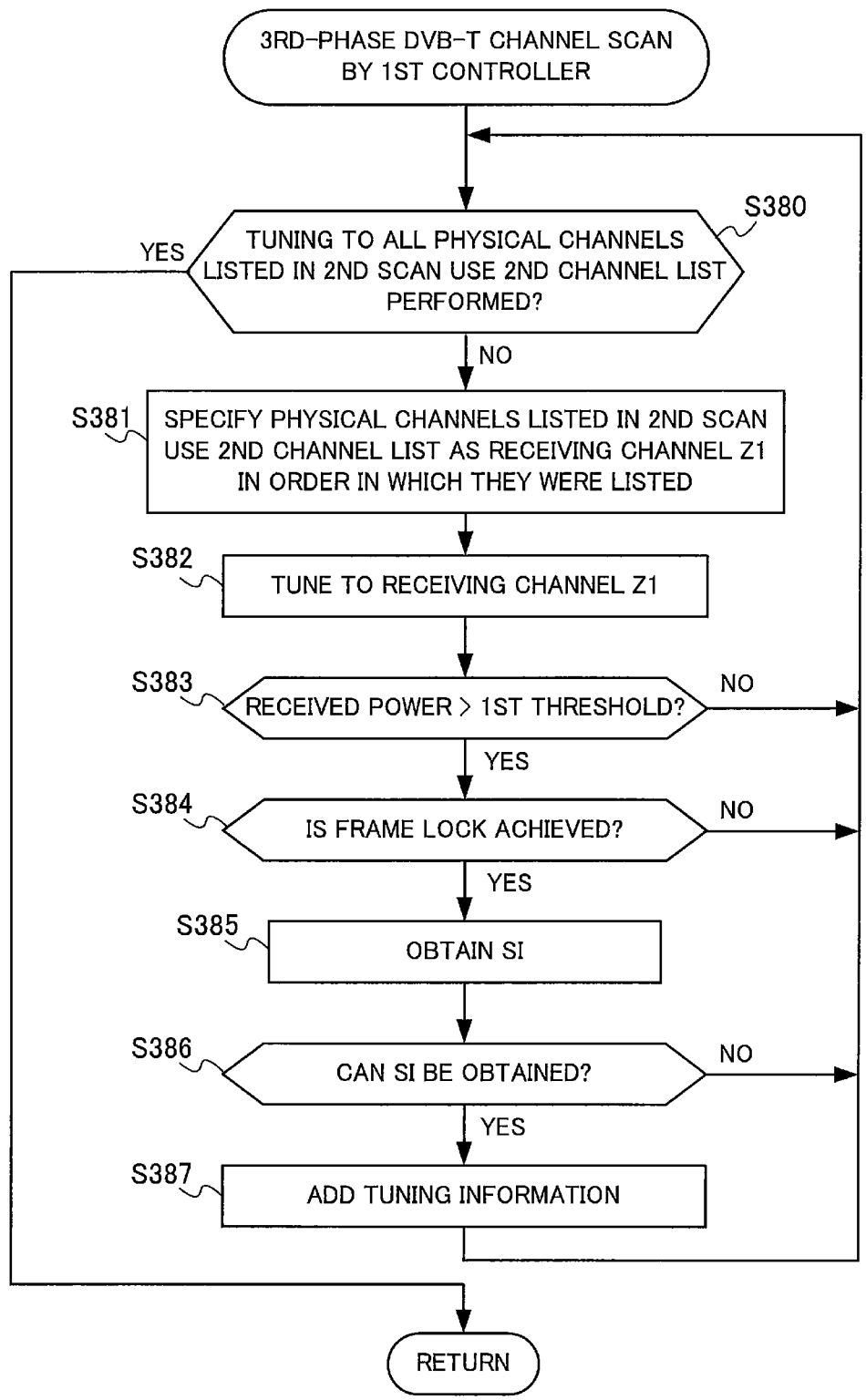
FIG. 52 is a flowchart illustrating a third-phase DVB-T channel scan subroutine performed by the first controller in the seventh embodiment.

The first controller 715 then executes the third-phase DVB-T channel scan (step S305). Details of this subroutine are illustrated in FIG. 52. The first controller 715 here scans the physical channels with channel numbers included in the second scan use second channel list obtained from the second controller 725.

When the third-phase DVB-T channel scan ends, the first controller 715 notifies the UIF processor 734 of the completion of the DVB-T channel scan (step S306).

Figure 47:
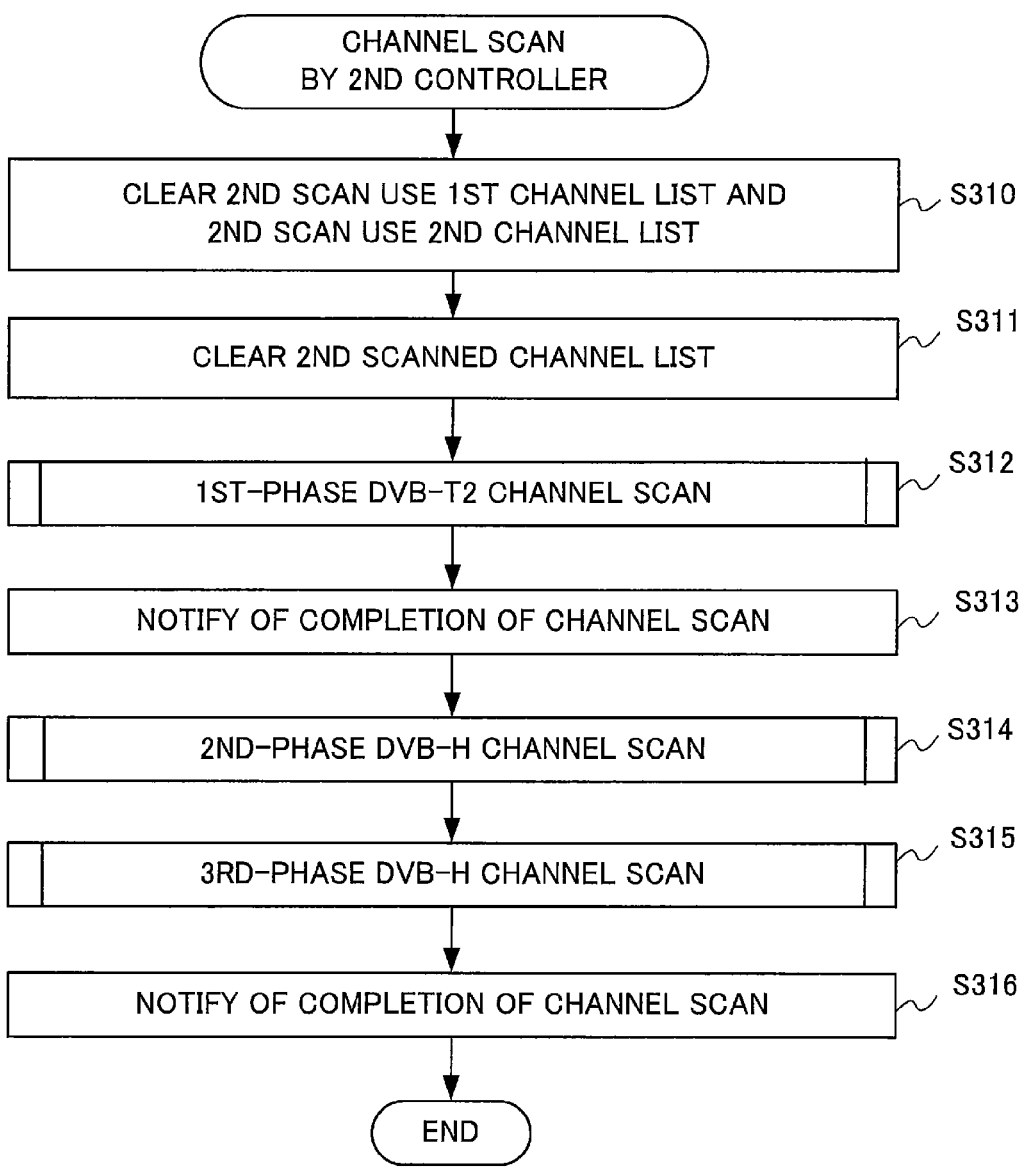
FIG. 47 is a flowchart illustrating channel scan processing performed by the second controller in the seventh embodiment.

FIG. 47 is a flowchart illustrating channel scan processing performed by the second controller 725. The second controller 725 starts the processing illustrated by the flowchart in FIG. 47 when it receives a notification of the beginning of a channel scan from the UIF processor 734, for example.

The second controller 725 clears the second scan use first channel list stored in the second scan use first channel list storage unit 724B and the second scan use second channel list stored in the second scan use second channel list storage unit 724D, of the second memory unit 724 (step S310). For example, the second controller 725 here erases all the channel numbers of the physical channels stored in the second scan use first channel list and the second scan use second channel list.

The second controller 725 then clears the second scanned channel list stored in the second scanned channel list storage unit 124C of the second memory unit 724 (step S311). For example, the second controller 725 here erases all the channel numbers of the physical channels stored in the second scanned channel list.

Figure 49:
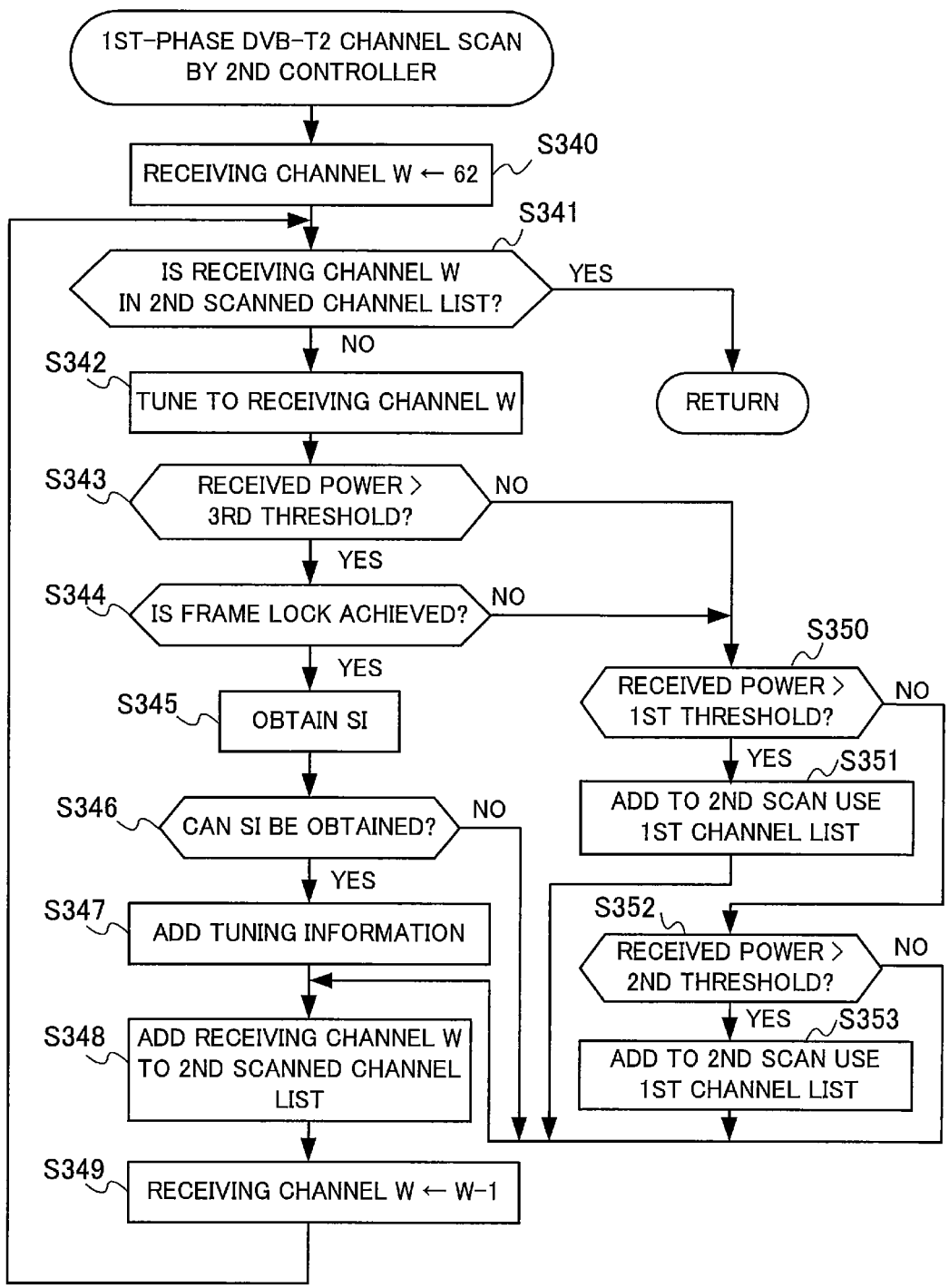
FIG. 49 is a flowchart illustrating a first-phase DVB-T2 channel scan subroutine performed by the second controller in the seventh embodiment.

The second controller 725 then executes the first-phase DVB-T2 channel scan (step S312). Details of this subroutine are illustrated in FIG. 49. The second controller 725 here scans physical channels included in the entire range of the frequency band assigned to DVB-T, the frequency band assigned to DVB-H, and the frequency band assigned to DVB-T2 in descending order, starting from the highest physical channel number '62'. Since the frequency bands assigned to DVB-T, DVB-H, DVB-T2 vary from country to country, the number '62' is used provisionally for purposes of description. The first-phase DVB-T2 channel scan ends when the physical channel selected for the next channel scan has already been scanned by the first controller 715.

When the first-phase DVB-T2 channel scan ends, the second controller 725 notifies the UIF processor 734 of the completion of the DVB-T2 channel scan (step S313).

Figure 51:
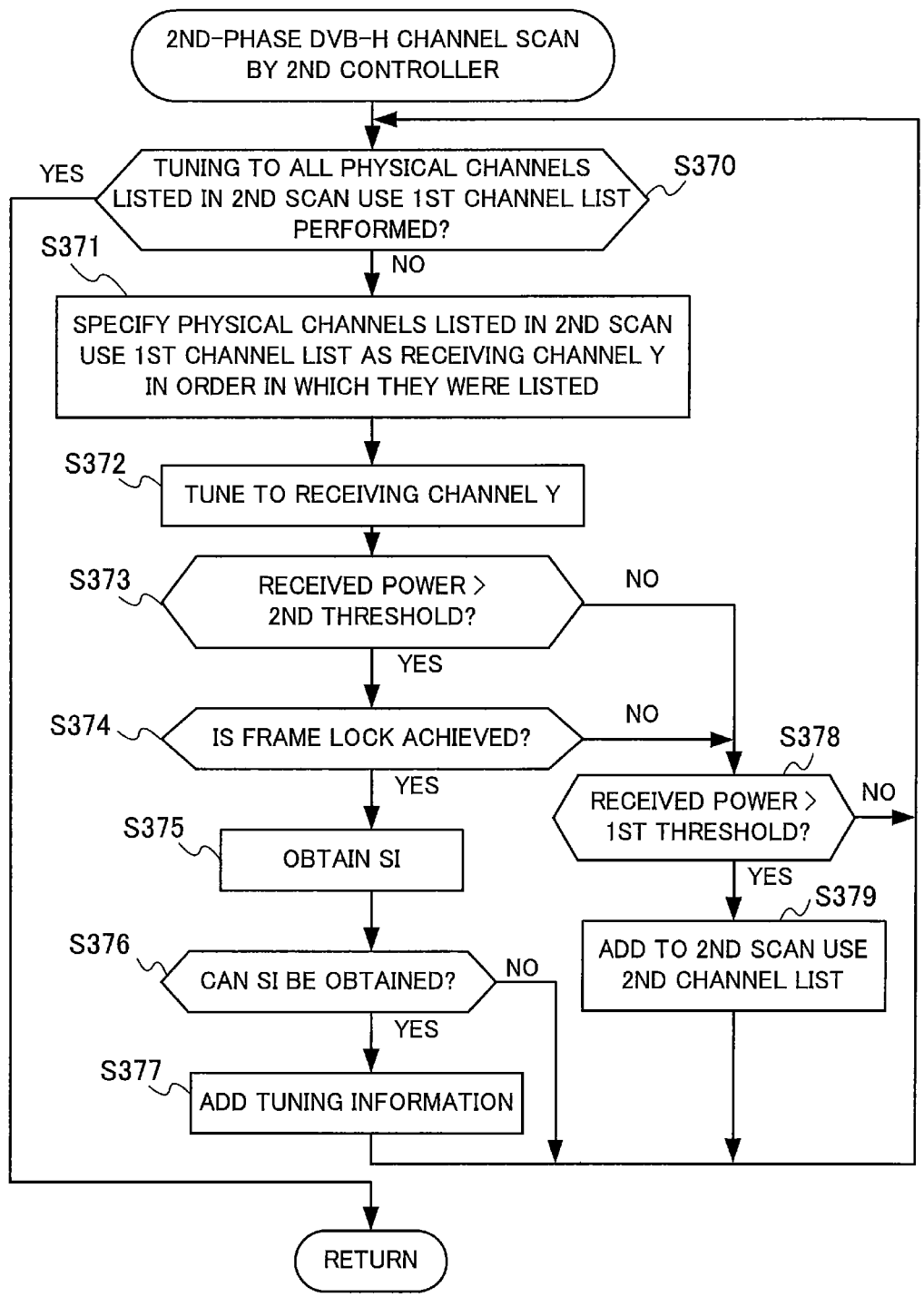
FIG. 51 is a flowchart illustrating a second-phase DVB-H channel scan subroutine performed by the second controller in the seventh embodiment.

Next, when the second controller 725 receives a command from the UIF processor 734, it executes the second-phase DVB-H channel scan (step S314). Details of this subroutine are illustrated in FIG. 51. The second controller 725 here scans the physical channels with channel numbers included in the second scan use first channel list.

Figure 53:
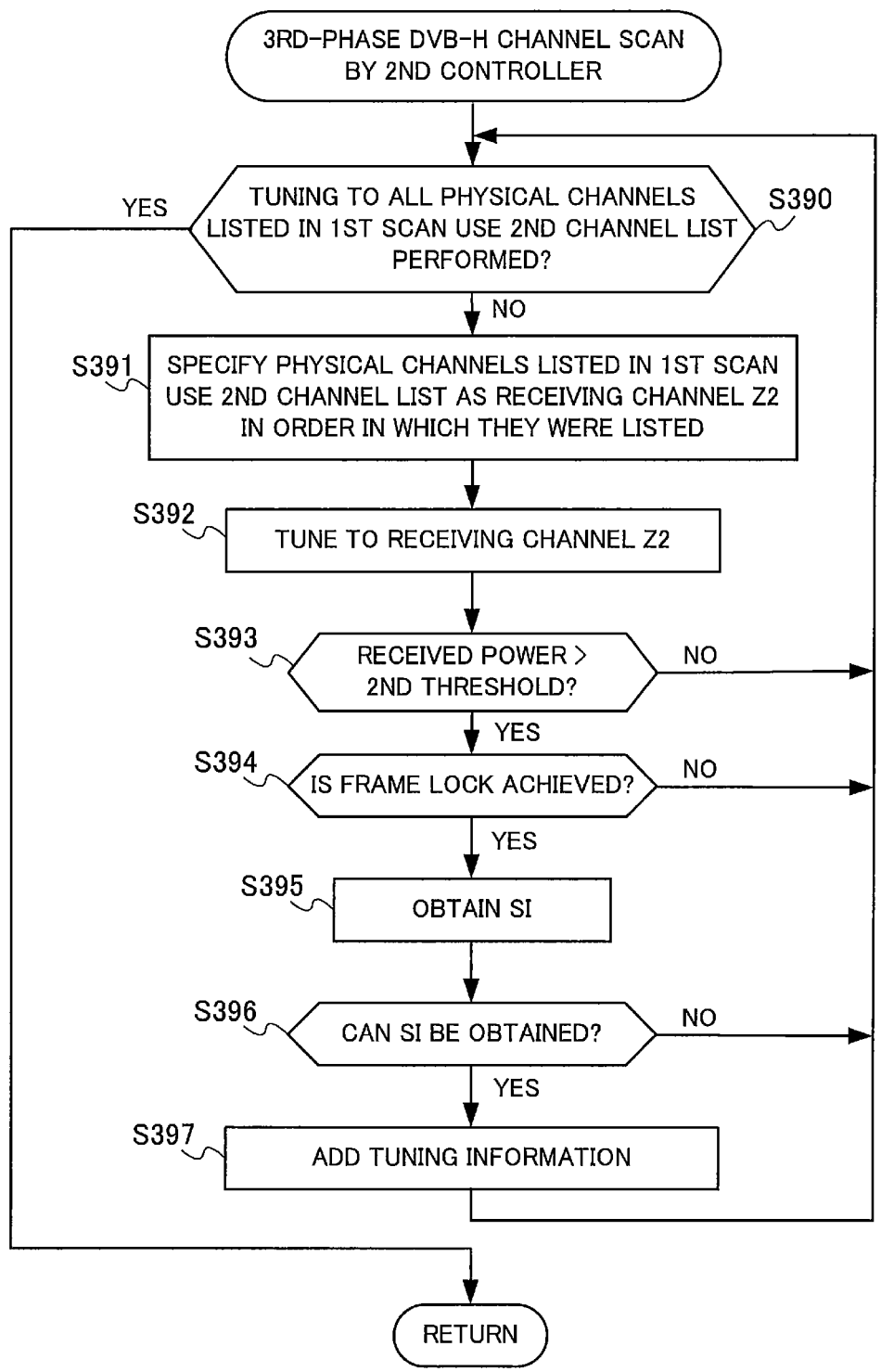
FIG. 53 is a flowchart illustrating a third-phase DVB-H channel scan subroutine performed by the second controller in the seventh embodiment.

The second controller 725 then executes a third-phase DVB-H channel scan (step S315). Details of this subroutine are illustrated in FIG. 53. The second controller 725 here scans the physical channels with channel numbers listed in the first scan use second channel list obtained from the first controller 715.

When the third-phase DVB-H channel scan ends, the second controller 725 notifies the UIF processor 734 of the completion of the DVB-H channel scan (step S316).

FIG. 48 is a flowchart illustrating the first-phase DVB-T2 channel scan subroutine performed by the first controller 715.

The first controller 715 specifies the lowest channel number '8' as the initial value of a receiving channel variable V that indicates the physical channel to be scanned (step S320).

The first controller 715 then decides whether the receiving channel V to be scanned has already been scanned by the second controller 725 (step S321). For example, the first controller 715 obtains the second scanned channel list stored in the second scanned channel list storage unit 124C of the second memory unit 724 through the second controller 725 and decides whether receiving channel V is listed in the second scanned channel list. If receiving channel V is not included in the second scanned channel list (NO in step S321), the first controller 715 proceeds to step S322. If receiving channel V is included in the second scanned channel list (YES in step S321), the first controller 715 proceeds to step S303 in FIG. 46.

In step S322, the first controller 715 instructs the first tuner 110 to receive an electromagnetic wave in receiving channel V.

The first controller 715 then decides whether the received level of the electromagnetic wave received in the tuned receiving channel V is higher than the third threshold (step S323). The first controller 715 makes this decision by receiving from the first tuner 110 a notification of whether the received level of the electromagnetic wave is higher than the third threshold. If the receiving level of the electromagnetic wave received in receiving channel V is higher than the third threshold (YES in step S323), the first controller 715 proceeds to step S324. If the receiving level of the electromagnetic wave received in receiving channel V is not higher than the third threshold (NO in step S323), the first controller 715 proceeds to step S330. The third threshold indicates the lowest receiving level at which a DVB-T2 service can be received and audio and video can be output, as described above.

In step S324, the first controller 715 decides whether the first demodulator 111 has successfully demodulated the electrical signal generated from the electromagnetic wave received by the first tuner 110 in receiving channel V. For example, the first controller 715 makes this decision by receiving from the first demodulator 111 a notification of whether it achieved frame lock by performing demodulation processing on the electrical signal. If demodulation succeeded (YES in step S324), the first controller 715 proceeds to step S325. If demodulation failed (NO in step S324), the first controller 715 proceeds to step S330.

If the first demodulator 111 has achieved frame lock, it is highly possible that a TS is being output from the first demodulator 111 to the first demultiplexer 112. In step S325, the first controller 715 therefore instructs the first demultiplexer 112 to obtain an SI.

The first controller 715 then decides whether the first demultiplexer 112 has obtained the SI (step S326). If the SI has been successfully obtained (YES in step S326), the first controller 715 proceeds to step S327. If the SI cannot be obtained (NO in step S326), the first controller 715 proceeds to step S328.

In step S327, the first controller 715 adds the tuning information of the service extracted from the SI to the first service list stored in the first service list storage unit 114A of the first memory unit 714.

The first controller 715 then adds the scanned receiving channel V to the first scanned channel list stored in the first scanned channel list storage unit 114C of the first memory unit 714 (step S328).

Since the first controller 715 is scanning the physical channels in ascending order, it increments the receiving channel V by '1' (step S329) and returns to step S321.

After tuning to receiving channel V in step S323, if the received level of the electromagnetic wave is not higher than the third threshold (NO in step S323) or if frame lock is not achieved in step S324 (NO in step S324), the first controller 715 proceeds to step S330.

In step S330, the first controller 715 decides whether the received level of the electromagnetic wave received in receiving channel V is higher than the first threshold. The first controller 715 makes this decision by receiving from the first tuner 110 a notification of whether the received level of the electromagnetic wave is higher than the first threshold, for example. If the received level of the electromagnetic wave received in receiving channel V is higher than the first threshold (YES in step S330), the first controller 715 proceeds to step S331. If the received level of the electromagnetic wave received in receiving channel V is not higher than the first threshold (NO in step S330), the first controller 715 proceeds to step S332.

In step S331, the first controller 715 adds receiving channel V to the first scan use first channel list stored in the first scan use first channel list storage unit 714B of the first memory unit 714.

In step S332, the first controller 715 decides whether the received level of the electromagnetic wave received in receiving channel V is higher than the second threshold. The first controller 715 makes this decision by receiving from the first tuner 110 a notification of whether the received level of the electromagnetic wave is higher than the second threshold, for example. If the received level of the electromagnetic wave received in receiving channel V is higher than the second threshold (YES in step S332), the first controller 715 proceeds to step S333. If the received level of the electromagnetic wave received in receiving channel V is not higher than the second threshold (NO in step S332), the first controller 715 proceeds to step S328.

In step S333, the first controller 715 adds receiving channel V to the first scan use first channel list stored in the first scan use first channel list storage unit 714B of the first memory unit 714.

As described above, the first controller 715 performs the first-phase DVB-T2 channel scan in ascending order of channel numbers of physical channels, starting from '8'. When the first controller 715 decides in step S321 that the receiving channel V to be scanned has already been scanned by the second controller 725, it ends the first-phase DVB-T2 channel scan.

In steps S323, S330, and S332 in FIG. 48, the received level is compared with the first threshold, the second threshold, and the third threshold in the first tuner 110. The first controller 715 may obtain the received level of the electromagnetic wave from the first tuner 110 and compare the received level with the first threshold, the second threshold, and the third threshold.

The processing to obtain the SI and add the tuning information to the first service list is performed in steps S325 to S327 in FIG. 48. This processing may be executed at the timing shown in FIG. 48 or may be executed for all the services together after the entire channel scan is completed.

FIG. 49 is a flowchart illustrating the first-phase DVB-T2 channel scan subroutine performed by the second controller 725.

The second controller 725 specifies the highest channel number '62' of the physical channels as the initial value of a receiving channel variable W that indicates the physical channel to be scanned (step S340).

The second controller 725 next decides whether the receiving channel W to be scanned has already been scanned by the first controller 715 (step S341). For example, the second controller 725 obtains the first scanned channel list stored in the first scanned channel list storage unit 114C of the first memory unit 714 through the first controller 715 and checks whether receiving channel W is listed in the first scanned channel list. If receiving channel W is not listed in the first scanned channel list (NO in step S341), the second controller 725 proceeds to step S342. If receiving channel W is included in the first scanned channel list (YES in step S341), the second controller 725 proceeds to step S313 in FIG. 47.

In step S342, the second controller 725 instructs the second tuner 120 to receive an electromagnetic wave in receiving channel W.

The second controller 725 then decides whether the received level of the electromagnetic wave received in the tuned receiving channel W is higher than the third threshold (step S343). For example, the second controller 725 makes this decision by receiving from the second tuner 120 a notification of whether the received level of the electromagnetic wave is higher than the third threshold. If the received level of the electromagnetic wave received in receiving channel W is higher than the third threshold (YES in step S343), the second controller 725 proceeds to step S344. If the received level of the electromagnetic wave received in receiving channel W is not higher than the third threshold (NO in step S343), the second controller 725 proceeds to step S350.

In step S344, the second controller 725 decides whether the second demodulator 121 has successfully demodulated the electrical signal generated from the electromagnetic wave received by the second tuner 120 in receiving channel W. For example, the second controller 725 makes this decision by receiving from the second demodulator 121 a notification of whether it has achieved frame lock by performing demodulation processing on the electrical signal. If demodulation succeeded (YES in step S344), the second controller 725 proceeds to step S345. If demodulation failed (NO in step S344), the second controller 725 proceeds to step S350.

When the second demodulator 121 has achieved frame lock, it is highly possible that a TS is being output from the second demodulator 121 to the second demultiplexer 122. The second controller 725 therefore instructs the second demultiplexer 122 to obtain an SI (step S345).

The second controller 725 then decides whether the second demultiplexer 122 has obtained the SI (step S346). If the SI has been successfully obtained (YES in step S346), the second controller 725 proceeds to step S347. If the SI cannot be obtained (NO in step S346), the second controller 725 proceeds to step S348.

In step S347, the second controller 725 adds the tuning information of services extracted from the SI to the second service list stored in the second service list storage unit 124A of the second memory unit 724.

The second controller 725 then adds the scanned receiving channel W to the second scanned channel list stored in the second scanned channel list storage unit 124C of the second memory unit 724.

Since the second controller 725 is scanning the physical channels in descending order, it decrements the receiving channel W by '1' (step S349) and returns to step S341.

After tuning to receiving channel W in step S343, if the received level of the electromagnetic wave is not higher than the third threshold (NO in step S343) or if frame lock is not achieved (NO in step S344), the second controller 725 proceeds to step S350.

In step S350, the second controller 725 decides whether the received level of the electromagnetic wave received in receiving channel W is higher than the first threshold. For example, the second controller 725 makes this decision by receiving from the second tuner 120 a notification of whether the received level of the electromagnetic wave is higher than the first threshold. If the received level of the electromagnetic wave received in receiving channel W is higher than the first threshold (YES in step S350), the second controller 725 proceeds to step S351. If the received level of the electromagnetic wave received in receiving channel W is not higher than the first threshold (NO in step S350), the second controller 725 proceeds to step S352.

In step S351, the second controller 725 adds receiving channel W to the second scan use first channel list stored in the second scan use first channel list storage unit 724B of the second memory unit 724.

In step S352, the second controller 725 decides whether the received level of the electromagnetic wave received in receiving channel W is higher than the second threshold. For example, the second controller 725 makes this decision by receiving from the second tuner 120 a notification of whether the received level of the electromagnetic wave is higher than the second threshold. If the received level of the electromagnetic wave received in receiving channel W is higher than the second threshold (YES in step S352), the second controller 725 proceeds to step S353. If the received level of the electromagnetic wave received in receiving channel W is not higher than the second threshold (NO in step S352), the second controller 725 proceeds to step S348.

In step S353, the second controller 725 adds receiving channel W to the second scan use first channel list stored in the second scan use first channel list storage unit 724B of the second memory unit 724.

The second controller 725 executes the first-phase DVB-T2 channel scan in descending order of physical channels, starting from the highest channel number '62', as described above. When the second controller 725 decides in step S341 that the receiving channel W to be scanned has already been scanned by the first controller 715, the second controller 725 ends the first-phase DVB-T2 channel scan.

In steps S343, S350, and S352 in FIG. 49, the second tuner 120 compares the received level with the first threshold, the second threshold, and the third threshold. The second controller 725 may obtain the received level of the electromagnetic wave from the second tuner 120 and compare it with the first threshold, the second threshold, and the third threshold.

The processing to obtain the SI and add tuning information to the second service list is performed in steps S345 to S347 in FIG. 49. This processing may be executed at the timing shown in FIG. 49, or may be executed for all the services together after all channel scans are completed.

FIG. 50 is a flowchart illustrating the second-phase DVB-T channel scan subroutine performed by the first controller 715.

The first controller 715 obtains the first scan use first channel list stored in the first scan use first channel list storage unit 714B of the first memory unit 714 and decides whether tuning to all the physical channels listed in the first scan use first channel list has been performed (step S360). If tuning to all the physical channels with channel numbers listed in the first scan use first channel list has not been performed (NO in step S360), in other words, if the first scan use first channel list includes the channel number of a physical channel tuning to which has not been performed, the first controller 715 proceeds to step S361. If tuning to all the physical channels with channel numbers included in the first scan use first channel list has been performed (YES in step S360), in other words, if the first scan use first channel list does not include the channel number of any physical channel tuning to which has not been performed, the first controller 715 proceeds to step S305 in FIG. 46.

In step S361, the first controller 715 obtains channel numbers from the first scan use first channel list in the order in which they were listed (in other words, ascending order of channel number) and specifies each channel number as a receiving channel variable X indicating a physical channel. That is, the channel number specified as receiving channel X in step S361 is the lowest channel number of the physical channels that are listed in the first scan use first channel list and have not yet been specified as receiving channel X in step S361. Although the channel numbers are specified here in the order in which they were listed, they may be specified as receiving channel X in a different order.

The first controller 715 then instructs the first tuner 110 to tune to the frequency corresponding to the physical channel indicated by receiving channel X (step S362).

The first controller 715 then decides whether the received level of the electromagnetic wave received in the tuned receiving channel X is higher than the first threshold (step S363). For example, the first controller 715 makes this decision by receiving from the first tuner 110 a notification of whether the received level of the electromagnetic wave is higher than the first threshold. If the received level of the electromagnetic wave received in receiving channel X is higher than the first threshold (YES in step S363), the first controller 715 proceeds to step S364. If the received level of the electromagnetic wave received in receiving channel X is not higher than the first threshold (NO in step S363), the first controller 715 proceeds to step S368.

In step S364, the first controller 715 decides whether the first demodulator 111 has successfully demodulated the electrical signal generated from the electromagnetic wave received by the first tuner 110 in receiving channel X. For example, the first controller 715 makes this decision by receiving from the first demodulator 111 a notification of whether it has achieved frame lock by performing demodulation processing on the electrical signal. If demodulation succeeded (YES in step S364), the first controller 715 proceeds to step S365. If demodulation failed (NO in step S364), the first controller 715 proceeds to step S368.

If the first demodulator 111 has achieved frame lock, it is highly possible that a TS is being output from the first demodulator 111 to the first demultiplexer 112. The first controller 715 therefore instructs the first demultiplexer 112 to obtain an SI (step S365).

The first controller 715 then decides whether the first demultiplexer 112 has obtained the SI (step S366). If the SI has been successfully obtained (YES in step S366), the first controller 715 proceeds to step S367. If the SI cannot be obtained (NO in step S366), the first controller 715 returns to step S360.

In step S367, the first controller 715 adds the tuning information of services extracted from the SI to the first service list stored in the first service list storage unit 114A of the first memory unit 714.

After tuning to receiving channel X in step S363, if the received level of the electromagnetic wave is not higher than the first threshold (NO in step S363) or if frame lock is not achieved in step S364 (NO in step S364), the first controller 715 proceeds to step S368.

In step S368, the first controller 715 decides whether the received level of the electromagnetic wave received in receiving channel X is higher than the second threshold. For example, the first controller 715 makes this decision by receiving from the first tuner 110 a notification of whether the received level of the electromagnetic wave is higher than the second threshold. If the received level of the electromagnetic wave received in receiving channel X is higher than the second threshold (YES in step S368), the first controller 715 proceeds to step S369. If the received level of the electromagnetic wave received in receiving channel X is not higher than the second threshold (NO in step S368), the first controller 715 returns to step S360.

In step S369, the first controller 715 adds receiving channel X to the first scan use second channel list stored in the first scan use second channel list storage unit 714D of the first memory unit 714.

The first controller 715 executes a channel scan on the physical channels with channel numbers listed in the first scan use second channel list, as described above. In other words, the physical channels scanned by the first controller 715 in the second-phase DVB-T channel scan are limited to physical channels found as a result of the first-phase DVB-T2 channel scan to have a received electromagnetic wave with the required received power even though demodulation was impossible in the DVB-T2 protocol; an efficient channel scan can therefore be performed.

In steps S363 and S368 in FIG. 50, the received level is compared with the first threshold and the second threshold in the first tuner 110. The first controller 715 may obtain the received level of the electromagnetic wave received in receiving channel X from the first tuner 110 and compare the received level with the first threshold and the second threshold.

The processing to obtain the SI and add the tuning information to the first service list is performed in steps S365 to S367 in FIG. 50. This processing may be executed at the timing shown in FIG. 50 or may be executed for all the services together after the entire channel scan is completed.

FIG. 51 is a flowchart illustrating the second-phase DVB-H channel scan subroutine performed by the second controller 725. The second controller 725 performs the second-phase DVB-H channel scan in parallel with the second-phase DVB-T channel scan performed by the first controller 715.

The second controller 725 obtains the second scan use first channel list stored in the second scan use first channel list storage unit 724B of the second memory unit 724 and decides whether tuning to all the physical channels listed in the second scan use first channel list has been performed (step S370). If tuning to all the physical channels listed in the second scan use first channel list has not been performed (NO in step S370), in other words, if the second scan use first channel list includes a physical channel to which tuning has not been performed, the second controller 725 proceeds to step S371. If tuning to all the physical channels listed in the second scan use first channel list has been performed (YES in step S370), in other words, if the second scan use first channel list does not include any physical channel to which tuning has not been performed, the second controller 725 proceeds to step S315 in FIG. 47.

In step S371, the second controller 725 obtains channel numbers of physical channels from the second scan use first channel list in the order in which they were listed (in other words, descending order of channel number) and specifies each channel number as a receiving channel Y, where Y is a variable indicating the physical channel. That is, the channel number specified as receiving channel Y in step S371 is the highest channel number of the physical channels that are listed in the second scan use first channel list and have not yet been specified as receiving channel Y in step S371. Although the channel numbers are specified here in the order in which they were listed, the second controller 725 may specify them as the receiving channel Y in a different order.

The second controller 725 then instructs the second tuner 120 to tune to the frequency corresponding to the physical channel indicated by receiving channel Y (step S372).

The second controller 725 then decides whether the received level of the electromagnetic wave received in the tuned receiving channel Y is higher than the second threshold (step S373). For example, the second controller 725 makes this decision by receiving from the second tuner 120 a notification of whether the received level of the electromagnetic wave is higher than the second threshold. If the received level of the electromagnetic wave received in receiving channel Y is higher than the second threshold (YES in step S373), the second controller 725 proceeds to step S374. If the received level of the electromagnetic wave received in receiving channel Y is not higher than the second threshold (NO in step S373), the second controller 725 proceeds to step S378.

In step S374, the second controller 725 decides whether the second demodulator 121 has successfully demodulated the electrical signal generated from the electromagnetic wave received by the second tuner 120 in receiving channel Y. For example, the second controller 725 makes this decision by receiving from the second demodulator 121 a notification of whether it has achieved frame lock by performing demodulation processing on the electrical signal. If demodulation succeeded (YES in step S374), the second controller 725 proceeds to step S375. If demodulation failed (NO in step S374), the second controller 725 proceeds to step S378.

If the second demodulator 121 has achieved frame lock, it is highly possible that a TS is being output from the second demodulator 121 to the second demultiplexer 122. The second controller 725 therefore instructs the second demultiplexer 122 to obtain an SI (step S375).

The second controller 725 then decides whether the second demultiplexer 122 has obtained the SI (step S376). If the SI has been successfully obtained (YES in step S376), the second controller 725 proceeds to step S377. If the SI cannot be obtained (NO in step S376), the second controller 725 returns to step S370.

In step S377, the second controller 725 adds the tuning information of services extracted from the SI to the second service list stored in the second service list storage unit 124A of the second memory unit 724.

After tuning to receiving channel Y in step S373, if the received level of the electromagnetic wave is not higher than the second threshold (NO in step S373) or if frame lock is not achieved in step S374 (NO in step S374), the second controller 725 proceeds to step S378.

In step S378, the second controller 725 decides whether the received level of the electromagnetic wave received in receiving channel Y is higher than the first threshold. For example, the second controller 725 makes this decision by receiving from the second tuner 120 a notification of whether the received level of the electromagnetic wave is higher than the second threshold. If the received level of the electromagnetic wave received in receiving channel Y is higher than the first threshold (YES in step S378), the second controller 725 proceeds to step S379. If the received level of the electromagnetic wave received in receiving channel Y is not higher than the first threshold (NO in step S378), the second controller 725 returns to step S370.

In step S379, the second controller 725 adds receiving channel Y to the second scan use second channel list stored in the second scan use second channel list storage unit 724D of the second memory unit 724.

The second controller 725 executes a channel scan on the physical channels with channel numbers listed in the second scan use first channel list, as described above. In other words, the physical channels scanned by the second controller 725 in the second-phase DVB-H channel scan are limited to physical channels found as a result of the second-phase DVB-T2 channel scan to have a received electromagnetic wave with the required received power even though demodulation was impossible in the DVB-T2 protocol; an efficient channel scan can therefore be performed.

In steps S373 and S378 in FIG. 51, the received level is compared with the first threshold and the second threshold in the second tuner 120. The second controller 725 may obtain the received level of the electromagnetic wave received in receiving channel Y from the second tuner 120 and compare the received level with the first threshold and the second threshold.

The processing to obtain the SI and add the tuning information to the second service list is performed in steps S375 to S377 in FIG. 51. This processing may be executed at the timing shown in FIG. 50 or may be executed for all the services together after the entire channel scan is completed.

FIG. 52 is a flowchart illustrating the third-phase DVB-T channel scan subroutine performed by the first controller 715.

The first controller 715 obtains the second scan use second channel list stored in the second scan use second channel list storage unit 724D of the second memory unit 724 through the second controller 725 and decides whether tuning to all the physical channels listed in the second scan use second channel list has been performed (step S380). If tuning to all the physical channels listed in the second scan use second channel list has not been performed (NO in step S380), in other words, if the second scan use second channel list includes a physical channel to which tuning has not been performed, the first controller 715 proceeds to step S381. If tuning to all the physical channels listed in the second scan use second channel list has been performed (YES in step S380), in other words, if the second scan use second channel list does not include any physical channel to which tuning has not been performed, the first controller 715 proceeds to step S306 in FIG. 46.

In step S381, the first controller 715 obtains channel numbers from the second scan use second channel list in the order in which they were listed (in other words, descending order of channel number) and specifies each channel number as a receiving channel variable Z1 indicating a physical channel. That is, the channel number specified as receiving channel Z1 in step S381 is the highest channel number of the physical channels that are listed in the second scan use second channel list and have not yet been specified as receiving channel Z1 in step S81. Although the channel numbers are specified here in the order in which they were listed, they may be specified as receiving channel Z1 in a different order.

The first controller 715 then instructs the first tuner 110 to tune to the frequency corresponding to the physical channel indicated by receiving channel Z1 (step S382).

The first controller 715 then decides whether the received level of the electromagnetic wave received in the tuned receiving channel Z1 is higher than the first threshold (step S383). For example, the first controller 715 makes this decision by receiving from the first tuner 110 a notification of whether the received level of the electromagnetic wave is higher than the first threshold. If the received level of the electromagnetic wave received in receiving channel Z1 is higher than the first threshold (YES in step S383), the first controller 715 proceeds to step S384. If the received level of the electromagnetic wave received in receiving channel Z1 is not higher than the first threshold (NO in step S383), the first controller 715 returns to step S380.

In step S384, the first controller 715 decides whether the first demodulator 111 has successfully demodulated the electrical signal generated from the electromagnetic wave received by the first tuner 110 in receiving channel Z1. For example, the first controller 715 makes this decision by receiving from the first demodulator 111 a notification of whether it has achieved frame lock by performing demodulation processing on the electrical signal. If demodulation succeeded (YES in step S384), the first controller 715 proceeds to step S385. If demodulation failed (NO in step S384), the first controller 715 returns to step S380.

If the first demodulator 111 has achieved frame lock, it is highly possible that a TS is being output from the first demodulator 111 to the first demultiplexer 112. The first controller 715 therefore instructs the first demultiplexer 112 to obtain an SI (step S385).

The first controller 715 then decides whether the first demultiplexer 112 has obtained the SI (step S386). If the SI has been successfully obtained (YES in step S386), the first controller 715 proceeds to step S387. If the SI cannot be obtained (NO in step S386), the first controller 715 returns to step S380.

In step S387, the first controller 715 adds the tuning information of services extracted from the SI to the first service list stored in the first service list storage unit 114A of the first memory unit 714.

The first controller 715 executes a channel scan on the physical channels with channel numbers listed in the second scan use second channel list, as described above. In other words, the physical channels scanned by the first controller 715 in the third-phase DVB-T channel scan are limited to physical channels found as a result of the second-phase DVB-H channel scan to have a received electromagnetic wave with the required received power even though demodulation was impossible in the DVB-H system; an efficient channel scan can therefore be performed.

In step S383 in FIG. 52, the received level is compared with the first threshold in the first tuner 110. The first controller 715 may obtain the received level of the electromagnetic wave received in receiving channel Z1 from the first tuner 110 and compare the received level with the first threshold.

The processing to obtain the SI and add the tuning information to the first service list is performed in steps S385 to S387 in FIG. 52. This processing may be executed at the timing shown in FIG. 52 or may be executed for all the services together after the entire channel scan is completed.

FIG. 53 is a flowchart illustrating the third-phase DVB-H channel scan subroutine performed by the second controller 725. The second controller 725 performs the third-phase DVB-H channel scan in parallel with the third-phase DVB-T channel scan performed by the first controller 715.

The second controller 725 obtains the first scan use second channel list stored in the first scan use second channel list storage unit 714D of the first memory unit 714 through the first controller 715 and decides whether tuning to all the physical channels listed in the first scan use second channel list has been performed (step S390). If tuning to all the physical channels listed in the first scan use second channel list has not been performed (NO in step S390), in other words, if the first scan use second channel list includes a physical channel to which tuning has not been performed, the second controller 725 proceeds to step S391. If tuning to all the physical channels listed in the first scan use second channel list has been performed (YES in step S390), in other words, if the first scan use second channel list does not include any physical channel to which tuning has not been performed, the second controller 725 proceeds to step S316 in FIG. 47.

In step S391, the second controller 725 obtains channel numbers of physical channels from the first scan use second channel list in the order in which they were listed (in other words, ascending order of channel number) and specifies each channel number as a receiving channel Z2, where Z2 is a variable indicating the physical channel. That is, the channel number specified as receiving channel Z2 in step S391 is the lowest channel number of the physical channels that are listed in the first scan use second channel list and have not yet been specified as receiving channel Z2 in step S391. Although the channel numbers are specified here in the order in which they were listed, they may be specified as the receiving channel Z2 in a different order.

The second controller 725 then instructs the second tuner 120 to tune to the frequency corresponding to the physical channel indicated by receiving channel Z2 (step S392).

The second controller 725 then decides whether the received level of the electromagnetic wave received in the tuned receiving channel Z2 is higher than the second threshold (step S393). For example, the second controller 725 makes this decision by receiving from the second tuner 120 a notification of whether the received level of the electromagnetic wave is higher than the second threshold. If the received level of the electromagnetic wave received in receiving channel Z2 is higher than the second threshold (YES in step S393), the second controller 725 proceeds to step S394. If the received level of the electromagnetic wave received in receiving channel Z2 is not higher than the second threshold (NO in step S393), the second controller 725 returns to step S390.

In step S394, the second controller 725 decides whether the second demodulator 121 has successfully demodulated the electrical signal generated from the electromagnetic wave received by the second tuner 120 in receiving channel Z2. For example, the second controller 725 makes this decision by receiving from the second demodulator 121 a notification of whether it has achieved frame lock by performing demodulation processing on the electrical signal. If demodulation succeeded (YES in step S394), the second controller 725 proceeds to step S395. If demodulation failed (NO in step S394), the second controller 725 returns to step S390.

If the second demodulator 121 has achieved frame lock, it is highly possible that a TS is being output from the second demodulator 121 to the second demultiplexer 122. The second controller 725 therefore instructs the second demultiplexer 122 to obtain an SI (step S395).

The second controller 725 then decides whether the second demultiplexer 122 has obtained the SI (step S396). If the SI has been successfully obtained (YES in step S396), the second controller 725 proceeds to step S397. If the SI cannot be obtained (NO in step S396), the second controller 725 returns to step S390.

In step S397, the second controller 725 adds the tuning information of services extracted from the SI to the second service list stored in the second service list storage unit 124A of the second memory unit 724.

The second controller 725 executes a channel scan on the physical channels with channel numbers listed in the first scan use second channel list, as described above. In other words, the physical channels scanned by the second controller 125 in the third-phase DVB-H channel scan are limited to physical channels found as a result of the second-phase DVB-T channel scan to have a received electromagnetic wave with the required receiving level even though demodulation was impossible in DVB-T; an efficient channel scan can therefore be performed.

In step S393 in FIG. 53, the received level is compared with the second threshold in the second tuner 120. The second controller 725 may obtain the received level of the electromagnetic wave received in receiving channel Z2 from the second tuner 120 and compare the received level with the second threshold.

The processing to obtain the SI and add the tuning information to the second service list is performed in steps S395 to S397 in FIG. 53. This processing may be executed at the timing shown in FIG. 53 or may be executed for all the services together after the entire channel scan is completed.

Figure 54:
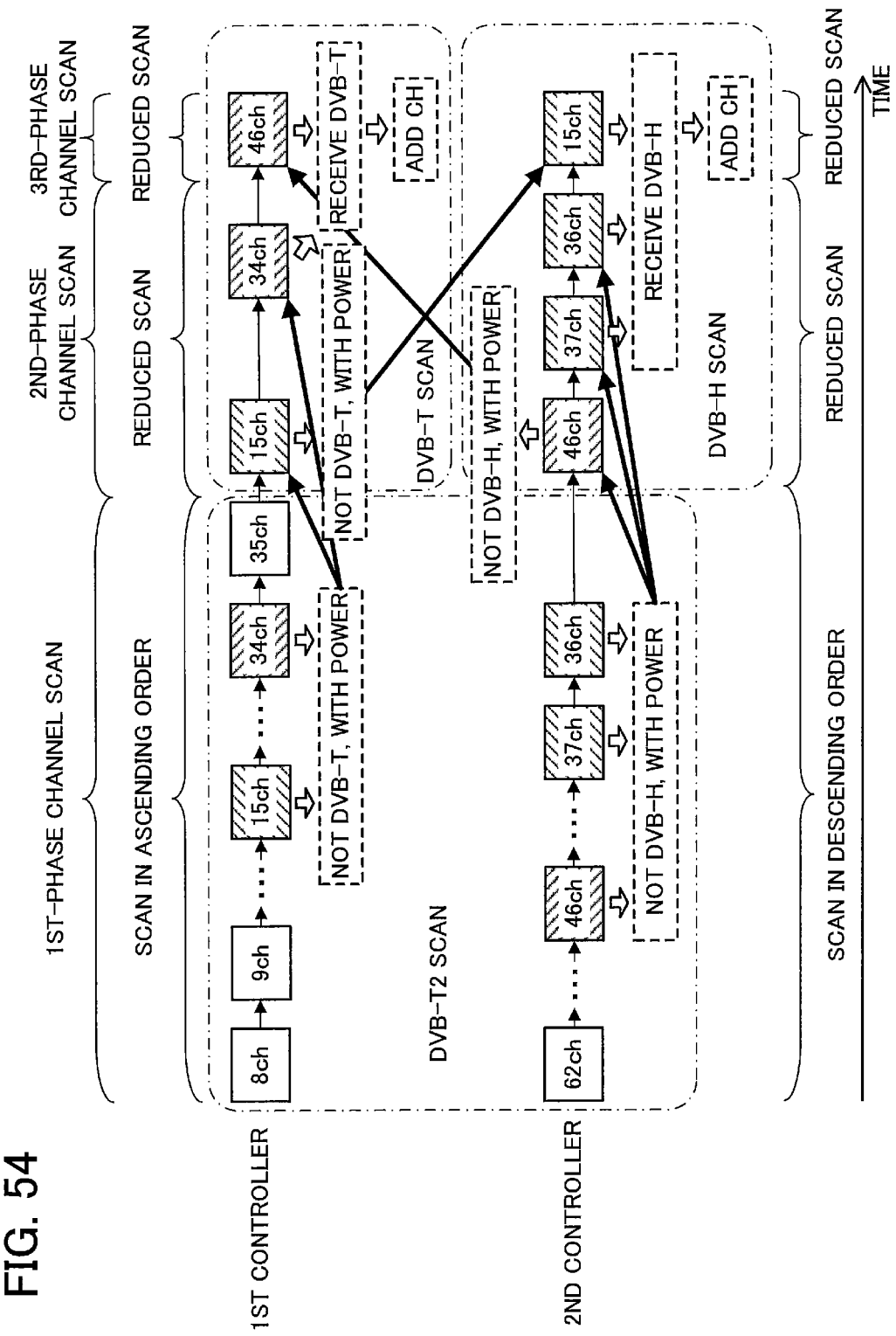
FIG. 54 is a schematic diagram used in describing the channel scan performed by the digital broadcast receiver according to the seventh embodiment.

FIG. 54 is a schematic diagram that will be used in describing the channel scan performed by the digital broadcast receiver 700. Time advances from left to right in FIG. 54, which shows the state in which a DVB-T2 channel scan is performed first, and a DVB-T channel scan and a DVB-H channel scan are next started simultaneously. The first-phase channel scan includes the DVB-T2 channel scan performed by the first controller 715 and the DVB-T2 channel scan performed by the second controller 725; the second-phase channel scan includes the first-phase DVB-T channel scan and the first-phase DVB-H channel scan; and the third-phase channel scan includes the third-phase DVB-T channel scan and the third-phase DVB-H channel scan.

In the DVB-T channel scan, the second-phase DVB-T channel scan and the third-phase DVB-T channel scan are executed in that order. In the DVB-H channel scan, the second-phase DVB-H channel scan, and the third-phase DVB-H channel scan are executed in that order.

In the first-phase DVB-T2 channel scan by the first controller 715, channels are scanned in ascending order, starting from channel 8; in the first-phase DVB-T2 channel scan by the second controller 725, channels are scanned in descending order, starting from channel 62. When the channel scan by the first controller 715 is completed up to channel 35 and the channel scan by the second controller 725 is completed down to channel 36, the conditions for ending the first-phase channel scans (step S321 in FIG. 48, step S341 in FIG. 49) are satisfied, and the first-phase channel scans have ended.

In the first-phase DVB-T2 channel scan by the first controller 715, the received level of the electromagnetic wave in channels 15 and 34 is higher than the first threshold or the second threshold, but frame lock was not achieved and demodulation failed. The first controller 715 therefore decides that the received electromagnetic wave is not a DVB-T2 broadcast wave and adds channels 15 and 34 to the first scan use first channel list (step S331 or S333 in FIG. 48).

In the first-phase DVB-T2 channel scan by the second controller 725, the received level of the electromagnetic wave in channels 46, 37, and 36 is higher than the first threshold or the second threshold, but frame lock was not achieved and demodulation failed. The second controller 725 therefore decides that the received electromagnetic wave is not a DVB-T2 broadcast wave and adds channels 46, 37, and 36 to the second scan use first channel list (step S351 or S353 in FIG. 49).

The channels scanned in the second-phase DVB-T channel scan and the second-phase DVB-H channel scan are limited to the channels found in the first-phase channel scan to have an electromagnetic wave with a received level higher than a predetermined threshold although the electrical signal generated from the electromagnetic wave could not be demodulated.

In other words, the channels scanned in the second-phase DVB-T channel scan are channels 15 and 34, which were found in the first-phase DVB-T2 channel scan to have electromagnetic waves with received levels higher than the first or second threshold although the electrical signals generated from the electromagnetic waves could not be demodulated. If a DVB-T broadcast is being transmitted on channel 34, it can be demodulated by the first demodulator 111, and the first controller 715 extracts its tuning information and adds it to the first service list.

If a DVB-T broadcast wave is being transmitted in channel 34, the first demodulator 111 can perform demodulation, and the first controller 715 extracts tuning information and adds it to the first service list.

The channels scanned in the second-phase DVB-H channel scan are channels 46, 37, and 36, which were found in the first-phase DVB-T2 channel scan to have electromagnetic waves with a received level higher than the first or second threshold although the electrical signals generated from the electromagnetic waves could not be demodulated. If a DVB-H broadcast wave is being transmitted in channels 37 and 36, the second demodulator 121 can perform demodulation, and the second controller 725 extracts tuning information and adds it to the second service list.

A characteristic of the second-phase channel scans is that the scanned channels are limited to the channels found in the first-phase channel scan to have electromagnetic waves with received levels higher than given thresholds although the electrical signals generated from the electromagnetic waves could not be demodulated.

The channels scanned in the third-phase DVB-T channel scan and the third-phase DVB-H channel scan are limited to the channels in which the received level of the electromagnetic wave is higher than a predetermined threshold and the electrical signal generated from the electromagnetic wave could not be demodulated in a second-phase channel scan in another protocol.

In other words, the only channel scanned in the third-phase DVB-T channel scan is channel 46, which was found in the second-phase DVB-H channel scan to have an electromagnetic wave with a received level higher than the first threshold although the electrical signal generated from the electromagnetic wave could not be demodulated. If a DVB-T broadcast wave is being transmitted in channel 46, the first demodulator 111 can perform demodulation, and the first controller 715 extracts tuning information and adds it to the first service list.

The only channel scanned in the third-phase DVB-H channel scan is channel 15, which was found in the second-phase DVB-T channel scan to have an electromagnetic wave with a received level higher than the second threshold although the electrical signal generated from the electromagnetic wave could not be demodulated. If a DVB-H broadcast wave is being transmitted in channel 15, the second demodulator 121 can perform demodulation, and the second controller 725 extracts tuning information and adds it to the second service list.

A characteristic of the third-phase channel scans is that the scanned channels are limited to the channels found in a second-phase channel scan in another protocol to have electromagnetic waves with received levels higher than given thresholds although the electrical signals generated from the electromagnetic waves could not be demodulated.

As described above, the digital broadcast receiver 700 in the seventh embodiment includes a plurality of tuners, demodulators, and demultiplexers conforming to different broadcast protocols, and executes channel scans of the broadcast protocols in parallel, so the time required to execute the channel scans can be reduced.

In the digital broadcast receiver 700 in the seventh embodiment, the first controller 715 and second controller 725 execute channel scans by dividing between the two receiving sections the physical channels included in all of the DVB-T2 frequency band, the DVB-T frequency band, and the DVB-H frequency band in the first-phase channel scans. In the course of the channel scans, the first controller 715 and second controller 725 record the channel numbers of physical channels in which the received level of the electromagnetic wave is higher than a predetermined threshold although the electrical signal generated from the electromagnetic wave cannot be demodulated. Although the number of channels scanned in the DVB-T2 channel scan is greater than it would be if this channel scan were limited to the DVB-T2 frequency band, no channels are left unscanned, so the need to scan unselected frequency bands in the DVB-T and DVB-H channel scans is eliminated, and the channel scan procedure is simplified.

In the digital broadcast receiver 700 in the seventh embodiment, the first controller 715 and second controller 725 execute the first-phase channel scans by dividing the channels between the two receiving sections. Therefore, the channel scan time can be reduced by a maximum factor of two.

In the digital broadcast receiver 700 according to the seventh embodiment, the first controller 715 and second controller 725 control the second-phase channel scans to scan just the physical channels that are likely to include corresponding broadcasts. Accordingly, efficient channel scans can be executed, and the channel scan time can be reduced.

In the digital broadcast receiver 700 according to the seventh embodiment, the first, second, and third thresholds are the lowest received levels at which services in the corresponding broadcast protocols can be received. Therefore, physical channels in which tuning is likely to fail because of the received levels can be eliminated from the channels to be scanned in the second and third phases, and the channel scan time in the second and third phases can be reduced.

Eighth Embodiment

The configuration described in the eighth embodiment uses two receiving sections to execute channel scans in four phases, a first phase to a fourth phase, with four different broadcast protocols.

Figure 55:
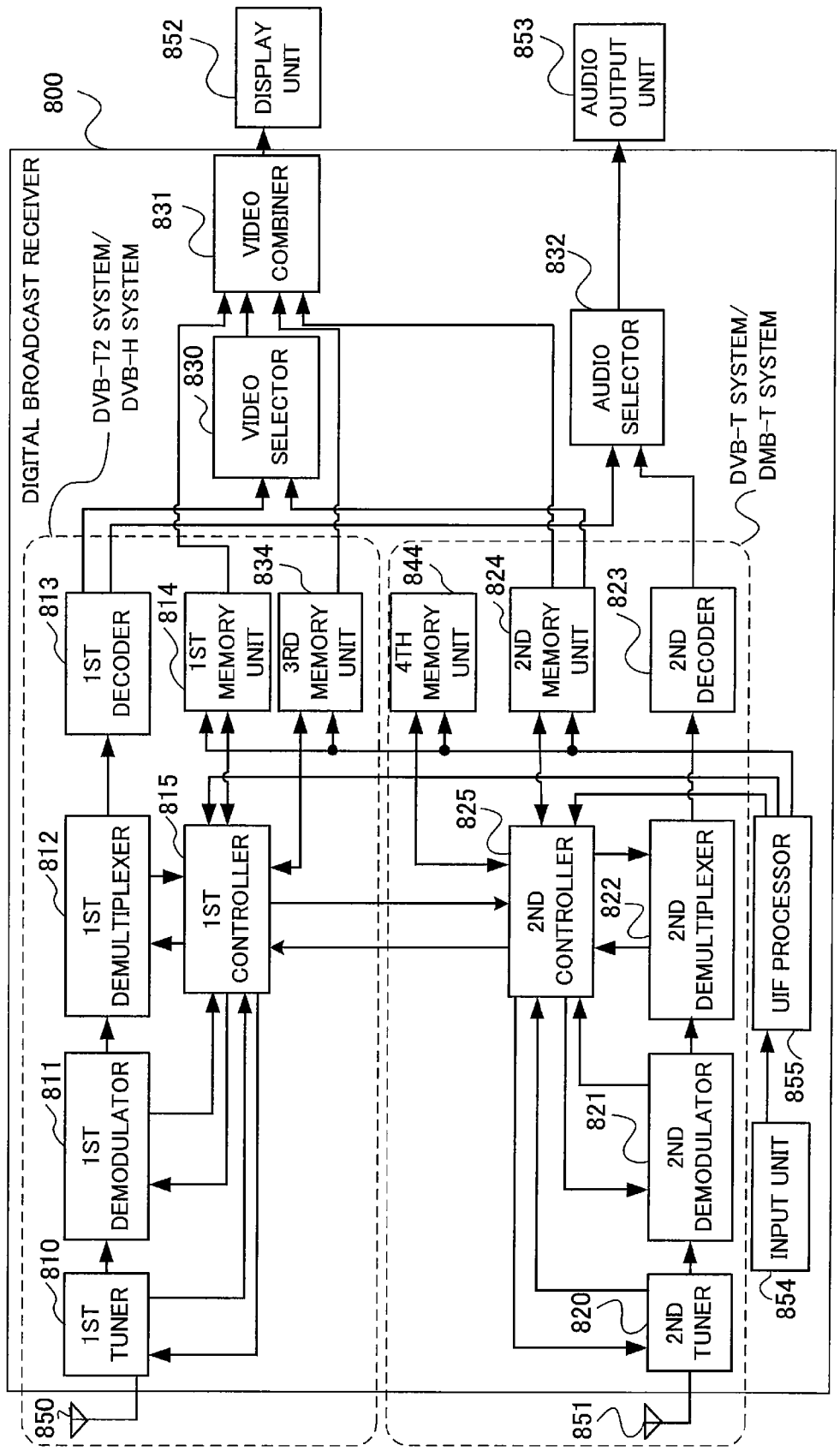
FIG. 55 is a block diagram schematically showing the configuration of a digital broadcast receiver according to an eighth embodiment.

FIG. 55 is a block diagram schematically showing the configuration of a digital broadcast receiver 800 according to the eighth embodiment. As shown in FIG. 55, the digital broadcast receiver 800 includes a first tuner 810, a first demodulator 811, a first demultiplexer 812, a first decoder 813, a first memory unit 814, a first controller 815, a second tuner 820, a second demodulator 821, a second demultiplexer 822, a second decoder 823, a second memory unit 824, a second controller 825, a video selector 830, a video combiner 831, an audio selector 832, an input unit 854, a UIF processor 855, a third memory unit 834, and a fourth memory unit 844. A first antenna 850 is connected to the first tuner 810; the first antenna 850, first tuner 810, first demodulator 811, first demultiplexer 812, first decoder 813, first memory unit 814, first controller 815, and third memory unit 834 form a section that receives DVB-T2 broadcasts, DVB-T2 being the first broadcast protocol, and DVB-H broadcasts, DVB-H being the third broadcast protocol, are received. A second antenna 851 is connected to the second tuner 120; the second antenna 851, second tuner 820, second demodulator 821, second demultiplexer 822, second decoder 823, second memory unit 824, second controller 825, and fourth memory unit 844 form a section that receives DVB-T broadcasts, DVB-T being the second broadcast protocol, and DMB-T broadcasts, DMB-T being the fourth broadcast protocol.

The first memory unit 814 stores information needed to scan the channels in the first broadcast protocol and information needed to receive services broadcast in the first broadcast protocol.

Figure 56:
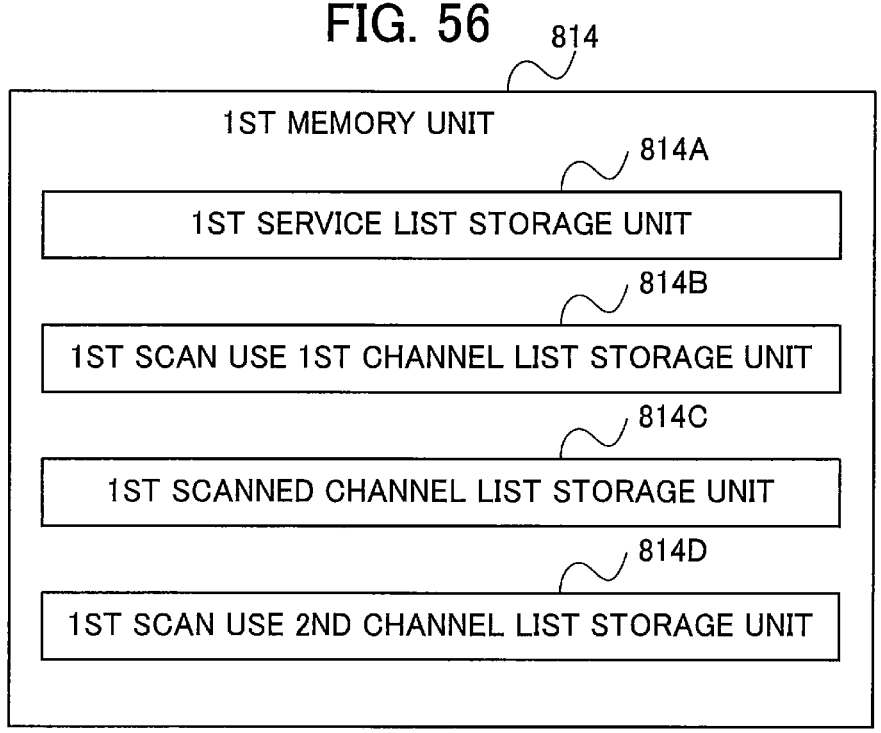
FIG. 56 is a block diagram schematically showing the configuration of the first memory unit in the eighth embodiment.

FIG. 56 is a block diagram schematically showing the configuration of the first memory unit 814. As shown in FIG. 56, the first memory unit 814 includes a first service list storage unit 814A, a first scan use first channel list storage unit 814B, a first scanned channel list storage unit 814C, and a first scan use second channel list storage unit 814D.

The first scan use first channel list storage unit 814B and first scan use second channel list storage unit 814D respectively store a first scan use first channel list and a first scan use second channel list which list identification information (channel numbers, here) for identifying physical channels in which the received level of the electromagnetic wave received by the first tuner 810 in a channel scan is higher than a predetermined threshold but the electrical signal generated from the electromagnetic wave cannot be demodulated (frame lock is not achieved) by the first demodulator 811.

The first scan use first channel list is information stored in the first scan use first channel list storage unit 814B on the basis of the results of scans in the first phase. The first scan use first channel list includes the channel numbers of physical channels in which, when a DVB-T2 channel scan was executed in the first phase, DVB-T2 being the first broadcast protocol, the electrical signal generated from the received electromagnetic wave could not be demodulated by the first demodulator 811 and the received level of the electromagnetic wave was higher than the lowest threshold among a second threshold, a third threshold, and a fourth threshold, the second threshold being the lowest received level at which stable viewing of a DVB-T service is possible, the third threshold being the lowest received level at which stable viewing of a DVB-H service is possible, the fourth threshold being the lowest received level at which stable viewing of a DMB-T service is possible, DVB-T being the second broadcast protocol, DVB-H being the third broadcast protocol, DMB-T being the fourth broadcast protocol.

The first scan use second channel list is information stored in the first scan use first channel list storage unit 814B on the basis of the results of scans in the second phase. The first scan use second channel list includes the channel numbers of physical channels in which, when a DVB-T2 channel scan was executed in the second phase, DVB-T2 being the first broadcast protocol, the electrical signal generated from the received electromagnetic wave could not be demodulated by the first demodulator 811 and the received level of the electromagnetic wave was higher than the lower of a third threshold and a fourth threshold, the third threshold being the lowest received level at which stable viewing of a DVB-H service is possible, the fourth threshold being the lowest received level at which stable viewing of a DMB-T service is possible, DVB-H being the third broadcast protocol, DMB-T being the fourth broadcast protocol.

Referring again to FIG. 56, the second memory unit 824 stores information needed to scan channels in the second broadcast protocol and information needed to receive services broadcast in the second broadcast protocol.

Figure 57:
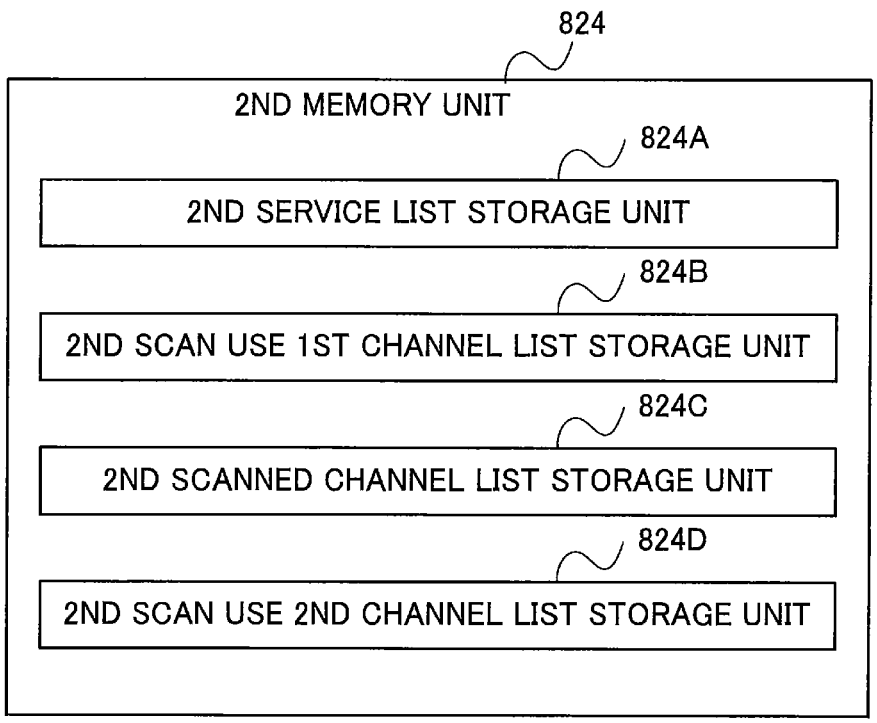
FIG. 57 is a block diagram schematically showing the configuration of the second memory unit in the eighth embodiment.

FIG. 57 is a block diagram schematically showing the configuration of the second memory unit 824. As shown in FIG. 57, the second memory unit 824 includes a second service list storage unit 824A, a second scan use first channel list storage unit 824B, a second scanned channel list storage unit 824C, and a second scan use second channel list storage unit 824D.

The second scan use first channel list storage unit 824B and the second scan use second channel list storage unit 824D respectively store a second scan use first channel list and a second scan use second channel list which list identification information (channel numbers, here) for identifying physical channels in which the received level of the electromagnetic wave received by the second tuner 820 in a channel scan is higher than a predetermined threshold, but the electrical signal generated from the electromagnetic wave cannot be demodulated (frame lock is not achieved) by the second demodulator 821.

The second scan use first channel list is information stored on the basis of the results of scans in the first phase. The file includes the channel numbers of physical channels in which, when a DVB-T channel scan was executed in the first phase, DVB-T being the second broadcast protocol, the electrical signal generated from the received electromagnetic wave could not be demodulated by the second demodulator 821 and the received level of the electromagnetic wave was higher than the lowest threshold among a first threshold, a third threshold, and a fourth threshold, the first threshold being the lowest received level at which stable viewing of a DVB-T2 service is possible, the third threshold being the lowest received level at which stable viewing of a DVB-H service is possible, the fourth threshold being the lowest received level at which stable viewing of a DMB-T service is possible, DVB-T2 being the first broadcast protocol, DVB-H being the third broadcast protocol, DMB-T being the fourth broadcast protocol.

The second scan use second channel list is information stored on the basis of the results of scans in the second phase. The file includes the channel numbers of physical channels in which, when a DVB-T channel scan was executed in the second phase, DVB-T being the second broadcast protocol in the second phase, the electrical signal generated from the received electromagnetic wave could not be demodulated by the second demodulator 821 and the received level of the electromagnetic wave was higher than the lower of the third threshold and the fourth threshold, the third threshold being the lowest received level at which stable viewing of a DVB-H service is possible, the fourth threshold being the lowest received level at which stable viewing of a DMB-T service is possible, DVB-H being the third broadcast protocol, DMB-T being the fourth broadcast protocol.

Referring again to FIG. 55, the third memory unit 834 stores information needed to scan channels in the third broadcast protocol and information needed to receive services broadcast in the third broadcast protocol.

Figure 58:
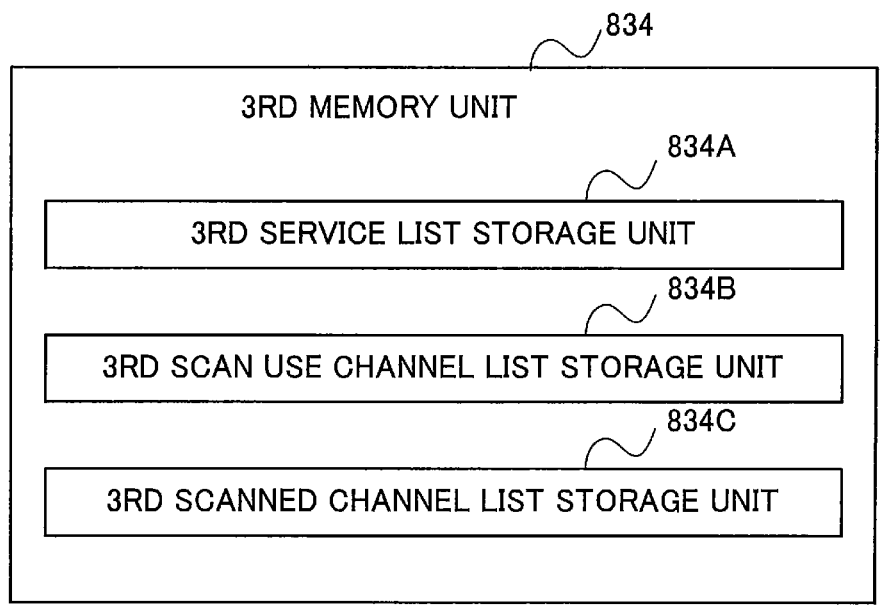
FIG. 58 is a block diagram schematically showing the configuration of the third memory unit in the eighth embodiment.

FIG. 58 is a block diagram schematically showing the configuration of the third memory unit 834. As shown in FIG. 58, the third memory unit 834 includes a third service list storage unit 834A, a third scan use channel list storage unit 834B, and a third scanned channel list storage unit 834C.

The third scan use channel list storage unit 834B stores a third scan use channel list which lists identification information (channel numbers, here) for identifying physical channels in which the received level of the electromagnetic wave received by the first tuner 810 in a channel scan is higher than a predetermined threshold, but the electrical signal generated from the electromagnetic wave cannot be demodulated (frame lock is not achieved) by the first demodulator 811. For example, the third scan use channel list includes the channel numbers of physical channels in which, when a DVB-H channel scan was executed, DVB-H being the third broadcast protocol, the electrical signal generated from the received electromagnetic wave could not be demodulated by the first demodulator 811 and the received level of the electromagnetic wave was higher than a fourth threshold, the fourth threshold being the lowest received level at which stable reception of a DMB-T service is possible, DMB-T being the fourth broadcast protocol.

Referring again to FIG. 55, the fourth memory unit 844 stores information needed to scan channels in the third broadcast protocol and information needed to receive services broadcast in the third broadcast protocol.

Figure 59:
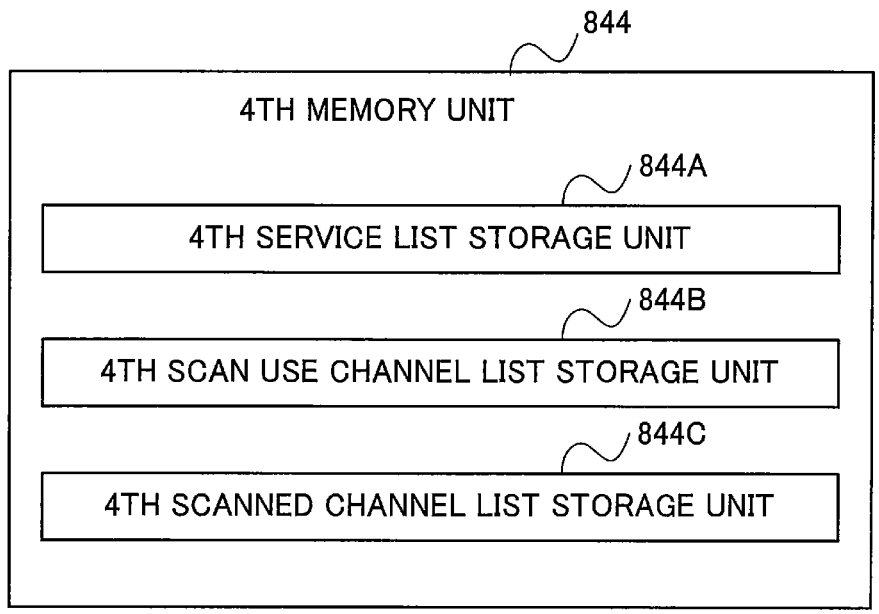
FIG. 59 is a block diagram schematically showing the configuration of the fourth memory unit in the eighth embodiment.

FIG. 59 is a block diagram schematically showing the configuration of the fourth memory unit 844. As shown in FIG. 59, the fourth memory unit 844 includes a fourth service list storage unit 844A, a fourth scan use channel list storage unit 844B, and a fourth scanned channel list storage unit 844C.

The fourth scan use channel list storage unit 844B stores a fourth scan use channel list which lists identification information (channel numbers, here) for identifying physical channels in which the received level of the electromagnetic wave received by the second tuner 820 in a channel scan is higher than a predetermined threshold, but the electrical signal generated from the electromagnetic wave cannot be demodulated (frame lock is not achieved) by the second demodulator 821. For example, the fourth scan use channel list includes the channel numbers of physical channels in which, when a DMB-T channel scan was executed, DMB-T being the fourth broadcast protocol, the electrical signal generated from the received electromagnetic wave could not be demodulated by the second demodulator 821 and the received level of the electromagnetic wave was higher than a third threshold, the third threshold being the lowest received level at which stable reception of a DVB-H service is possible, DVB-H being the third broadcast protocol.

Referring again to FIG. 55, the first controller 815 controls the processing for scanning channels in the first broadcast protocol and the third broadcast protocol and the processing for receiving broadcasts in the first broadcast protocol and the third broadcast protocol. For example, the first controller 815 may execute a DVB-T2 channel scan in the first phase and the second phase and a DVB-H channel scan in the third phase and the fourth phase.

In the first-phase DVB-T2 channel scan, the first controller 815 executes a channel scan in a predetermined first order on physical channels that have not yet been scanned by the second controller 825, among the physical channels included in the entire range of the frequency band used by broadcasts in the first broadcast protocol, the frequency band used by broadcasts in the second broadcast protocol, the frequency band used by broadcasts in the third broadcast protocol, and the frequency band used by broadcasts in the fourth broadcast protocol. In the first-phase DVB-T2 channel scan, if a physical channel in which the received level of the electromagnetic wave was higher than a first threshold and the electrical signal generated from the electromagnetic wave could be demodulated is found, the first controller 815 adds the tuning information of the physical channel to the first service list. The first controller 815 also adds the channel numbers of physical channels in which the received level of the electromagnetic wave was higher than the lowest threshold among the second, third, and fourth thresholds and the electrical signal generated from the electromagnetic wave could not be demodulated to the first scan use first channel list.

In the second-phase DVB-T2 channel scan, the first controller 815 scans physical channels stored in the second scan use first channel list storage unit 824B of the second memory unit 824. If a physical channel in which the received level of the electromagnetic wave was higher than the first threshold and the electrical signal generated from the electromagnetic wave could be demodulated is found, the first controller 815 adds the tuning information of the physical channel to the first service list. The first controller 815 also adds the channel numbers of physical channels in which the received level of the electromagnetic wave was higher than the lower of the third and fourth thresholds and the electrical signal generated from the electromagnetic wave could not be demodulated to the first scan use second channel list.

In the third-phase DVB-H channel scan, the first controller 815 scans physical channels stored in the second scan use first channel list storage unit 824B of the second memory unit 824. If a physical channel in which the received level of the electromagnetic wave was higher than the third threshold and the electrical signal generated from the electromagnetic wave could be demodulated is found, the first controller 815 stores the tuning information of the physical channel in the third service list storage unit 834A in the third memory unit 834. The first controller 815 also adds the channel numbers of physical channels in which the received level of the electromagnetic wave was higher than the fourth threshold and the electrical signal generated from the electromagnetic wave could not be demodulated in the third scan use channel list storage unit 834B of the third memory unit 834.

In the fourth-phase DVB-H channel scan, the first controller 815 scans physical channels stored in the fourth scan use channel list storage unit 844B of the fourth memory unit 844. If a physical channel in which the received level of the electromagnetic wave was higher than the third threshold and the electrical signal generated from the electromagnetic wave could be demodulated is found, the first controller 815 stores the tuning information of the physical channel in the third service list storage unit 834A in the third memory unit 834.

The second controller 825 controls the processing for scanning channels in the second broadcast protocol and the fourth broadcast protocol and the processing for receiving broadcasts in the second broadcast protocol and the fourth broadcast protocol. For example, the second controller 825 may execute a DVB-T channel scan in the first and second phases and a DMB-T channel scan in the third and fourth phases.

In the first-phase DVB-T channel scan, the second controller 825 executes a channel scan in a predetermined second order on physical channels that have not yet been scanned by the first controller 815, among the physical channels included in the entire range of the frequency band used by broadcasts in the first broadcast protocol, the frequency band used by broadcasts in the second broadcast protocol, the frequency band used by broadcasts in the third broadcast protocol, and the frequency band used by broadcasts in the fourth broadcast protocol. The second order is the reverse of the first order used by the first controller 815 in controlling the channel scan. In the first-phase DVB-T channel scan, if a physical channel in which the received level of the electromagnetic wave was higher than the second threshold and the electrical signal generated from the electromagnetic wave could be demodulated is found, the second controller 825 stores the tuning information of the physical channel in the second service list storage unit 824A of the second memory unit 824. The first controller 815 also adds the channel numbers of physical channels in which the received level of the electromagnetic wave was higher than the lowest threshold among the first, third, and fourth thresholds and the electrical signal generated from the electromagnetic wave could not be demodulated to the second scan use first channel list.

In the second-phase DVB-T channel scan, the second controller 825 scans physical channels stored in the first scan use first channel list storage unit 814B of the first memory unit 814. If a physical channel in which the received level of the electromagnetic wave was higher than the second threshold and the electrical signal generated from the electromagnetic wave could be demodulated is found, the second controller 825 stores the tuning information of the physical channel in the second service list storage unit 824A of the second memory unit 824. The second controller 825 also adds the channel numbers of physical channels in which the received level of the electromagnetic wave was higher than the lower of the third and fourth thresholds and the electrical signal generated from the electromagnetic wave could not be demodulated to the second scan use second channel list storage unit 824D of the second memory unit 824.

In the third-phase DMB-T channel scan, the second controller 825 scans physical channels stored in the first scan use first channel list storage unit 814B of the first memory unit 814. If a physical channel in which the received level of the electromagnetic wave was higher than the fourth threshold and the electrical signal generated from the electromagnetic wave could be demodulated is found, the second controller 825 stores the tuning information of the physical channel in the fourth service list storage unit 844A in the fourth memory unit 844. The second controller 825 also adds the channel numbers of physical channels in which the received level of the electromagnetic wave was higher than the third threshold and the electrical signal generated from the electromagnetic wave could not be demodulated to the fourth scan use channel list storage unit 844B of the fourth memory unit 844.

In the fourth-phase DMB-T channel scan, the second controller 825 scans physical channels stored in the third scan use channel list storage unit 834B of the third memory unit 834. If a physical channel in which the received level of the electromagnetic wave was higher than the fourth threshold and the electrical signal generated from the electromagnetic wave could be demodulated is found, the second controller 825 stores the tuning information of the physical channel in the fourth service list storage unit 844A in the fourth memory unit 844.

The operation of the digital broadcast receiver 800 in the eighth embodiment in a channel scan will next be described in detail. When the digital broadcast receiver 800 is initialized, when the broadcast configuration changes, or when the receiver is mounted on a mobile device and moves from one service area to another service area, the digital broadcast receiver 800 in the eighth embodiment performs a channel scan and generates digital broadcast service lists for the DVB-T2, DVB-T, DVB-H, and DMB-T broadcast protocols.

Figure 60:
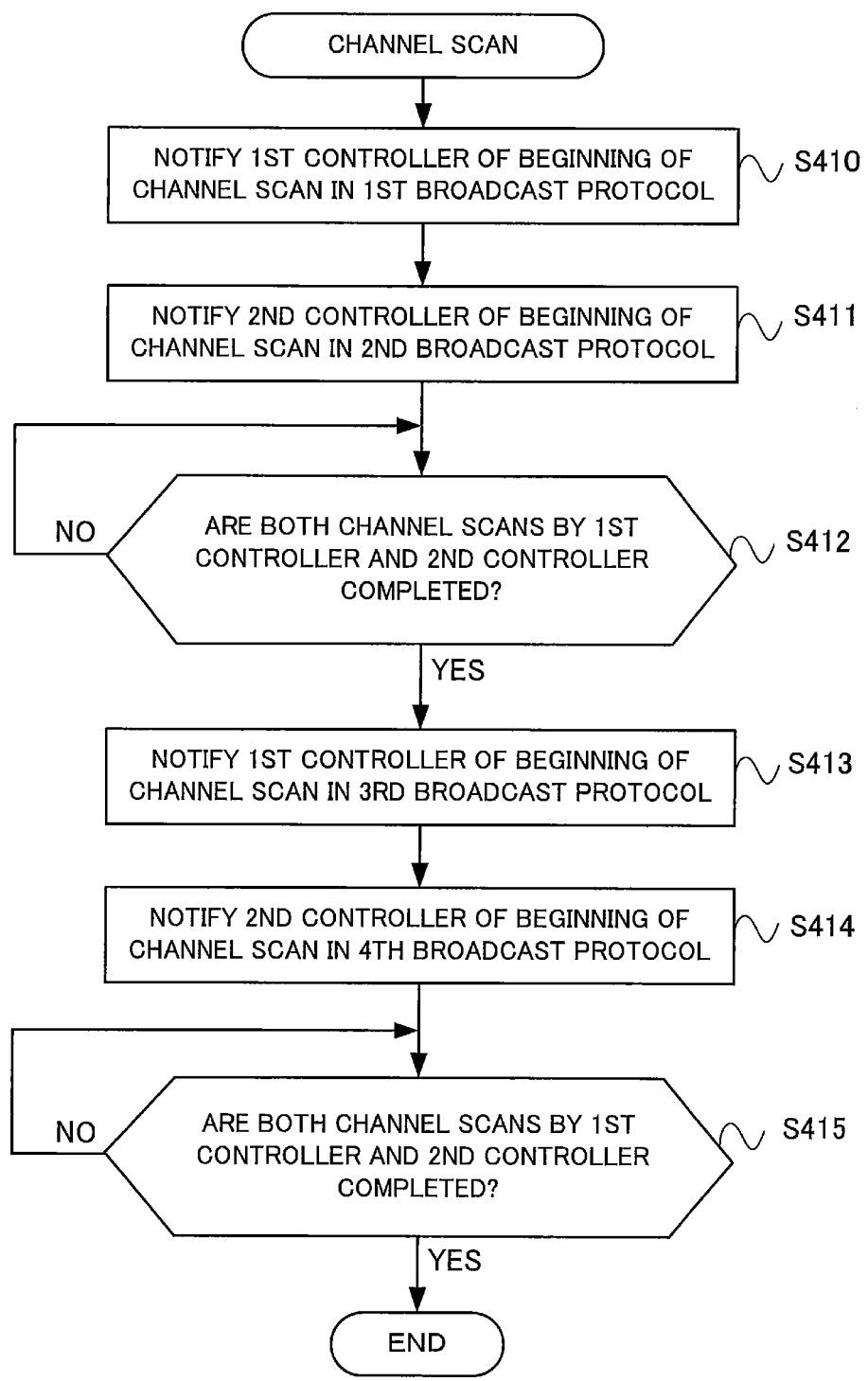
FIG. 60 is a flowchart illustrating processing performed by the UIF processor in the eighth embodiment when a channel scan is selected by a user operation.

FIG. 60 is a flowchart illustrating processing performed by the UIF processor 855 when a channel scan is selected by a user operation.

When an operation signal indicating a channel scan request is received from the input unit 854, the UIF processor 855 notifies the first controller 815 of the beginning of a channel scan in the first broadcast protocol (step S410).

The UIF processor 855 then notifies the second controller 825 of the beginning of a channel scan in the first broadcast protocol (step S411).

When the first controller 815 and second controller 825 are notified of the beginning of channel scans as described above, a DVB-T2 channel scan controlled by the first controller 815 and a DVB-T channel scan controlled by the second controller 825 are performed in parallel.

The UIF processor 855 waits until it receives notifications of the completion of both the channel scan by the first controller 815 and the channel scan by the second controller 825 (step S412). When these notifications are received (YES in step S412), the UIF processor 855 proceeds to step S413.

In step S413, the UIF processor 855 notifies the first controller 815 of the beginning of a channel scan in the third broadcast protocol (step S413).

The UIF processor 855 further notifies the second controller 825 of the beginning of a channel scan in the fourth broadcast protocol (step S414).

When the first controller 815 and second controller 825 are notified of the beginning of channel scans as described above, a DVB-H channel scan controlled by the first controller 815 and a DMB-T channel scan controlled by the second controller 825 are performed in parallel.

The UIF processor 855 waits until it receives notifications of the completion of both the channel scan by the first controller 815 and the channel scan by the second controller 825 (step S415). When the UIF processor 855 receives these notifications (YES in step S415), the processing ends. At the end of the processing, the UIF processor 855 may generate a video signal for a notification screen indicating the end of the channel scan processing, output the signal through the video combiner 831 to the display unit 852, and have the display unit 852 display the screen.

In FIG. 60, the second controller 825 is notified of the beginning of the channel scan (step S411 or S414) after the first controller 815 is notified of the beginning of the channel scan (step S410 or S413), but this order may be reversed.

Figure 61:
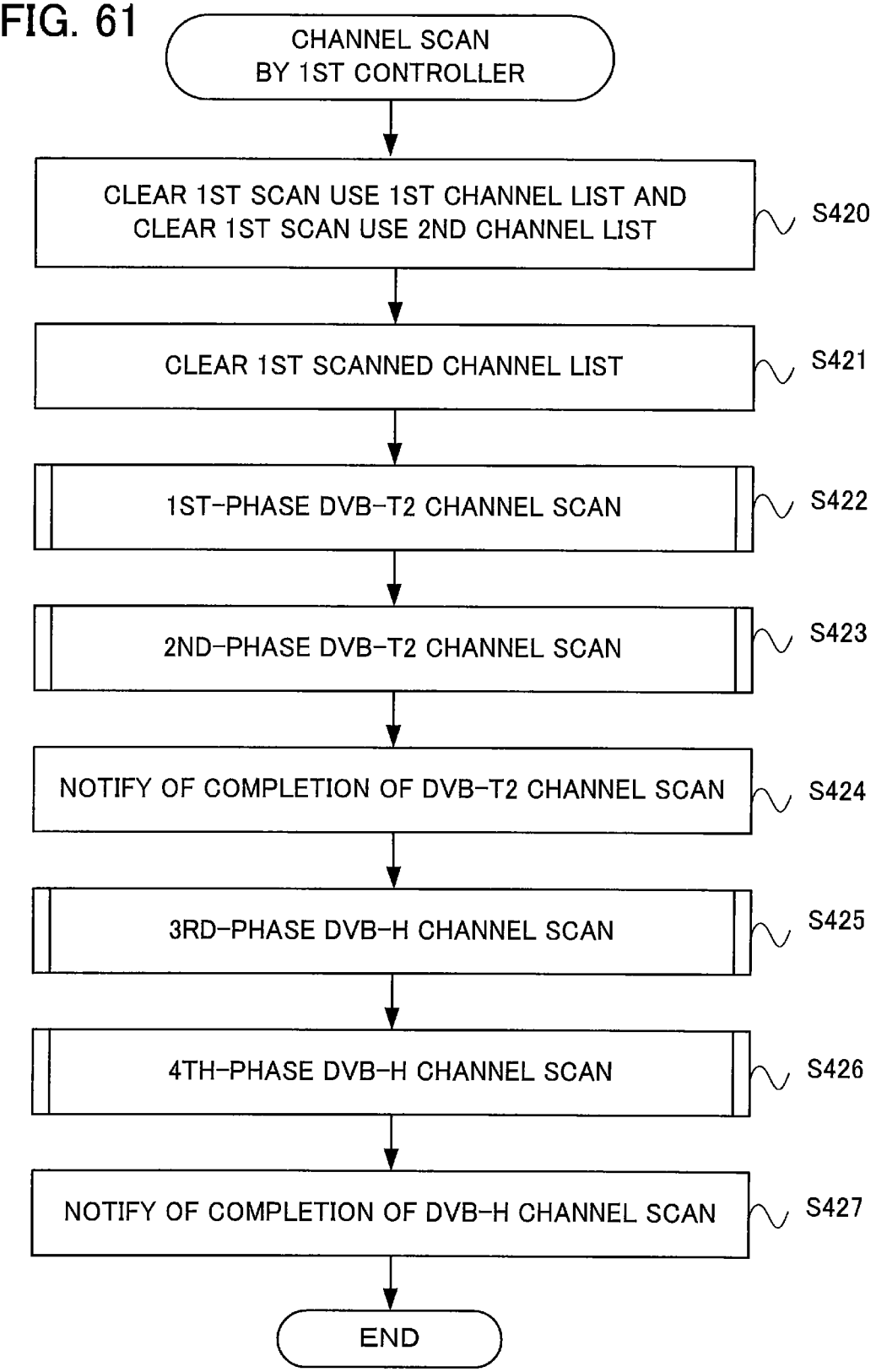
FIG. 61 is a flowchart illustrating channel scan processing performed by the first controller in the eighth embodiment.

FIG. 61 is a flowchart illustrating channel scan processing performed by the first controller 815. The first controller 815 starts the processing illustrated by the flowchart in FIG. 61 when it is notified of the beginning of the channel scan by the UIF processor 855, for example.

The first controller 815 clears (initializes) the first scan use first channel list stored in the first scan use first channel list storage unit 814B of the first memory unit 814 and the first scan use second channel list stored in the first scan use second channel list storage unit 814D (step S420). For example, the first controller 815 erases all the channel numbers of physical channels stored in the first scan use channel list.

The first controller 815 then clears the first scanned channel list stored in the first scanned channel list storage unit 814C of the first memory unit 814 (step S421). For example, the first controller 815 erases all the channel numbers of physical channels stored in the first scanned channel list.

The first controller 815 then executes a first-phase DVB-T2 channel scan (step S422). In this subroutine, the first controller 815 scans the physical channels included in the entire range of the frequency band assigned to DVB-T2, the frequency band assigned to DVB-T, the frequency band assigned to DVB-H, and the frequency band assigned to DMB-T in ascending order, starting from the lowest channel number '13'. Since the frequency bands assigned to DVB-T2, DVB-T, DVB-H, and DMB-T vary from country to country, the number '13' is used provisionally for purposes of description. The first-phase DVB-T2 channel scan ends when the physical channel selected for the next channel scan has already been scanned by the second controller 825.

The first controller 815 then executes the second-phase DVB-T2 channel scan (step S423). The first controller 815 here scans the physical channels with channel numbers included in the second scan use first channel list obtained from the second controller 825.

When the second-phase DVB-T2 channel scan ends, the first controller 815 notifies the UIF processor 855 of the completion of the DVB-T2 channel scan (step S424).

Next, when the first controller 815 receives a command from the UIF processor 855, it executes the third-phase DVB-H channel scan (step S425). The first controller 815 here scans the physical channels with channel numbers included in the second scan use second channel list.

The first controller 815 next executes the fourth-phase DVB-H channel scan (step S426). The first controller 815 here scans the physical channels with channel numbers included in the fourth scan use second channel list obtained from the second controller 825.

When the fourth-phase DVB-H channel scan ends, the first controller 815 notifies the UIF processor 855 of the completion of the DVB-H channel scan (step S427).

Figure 62:
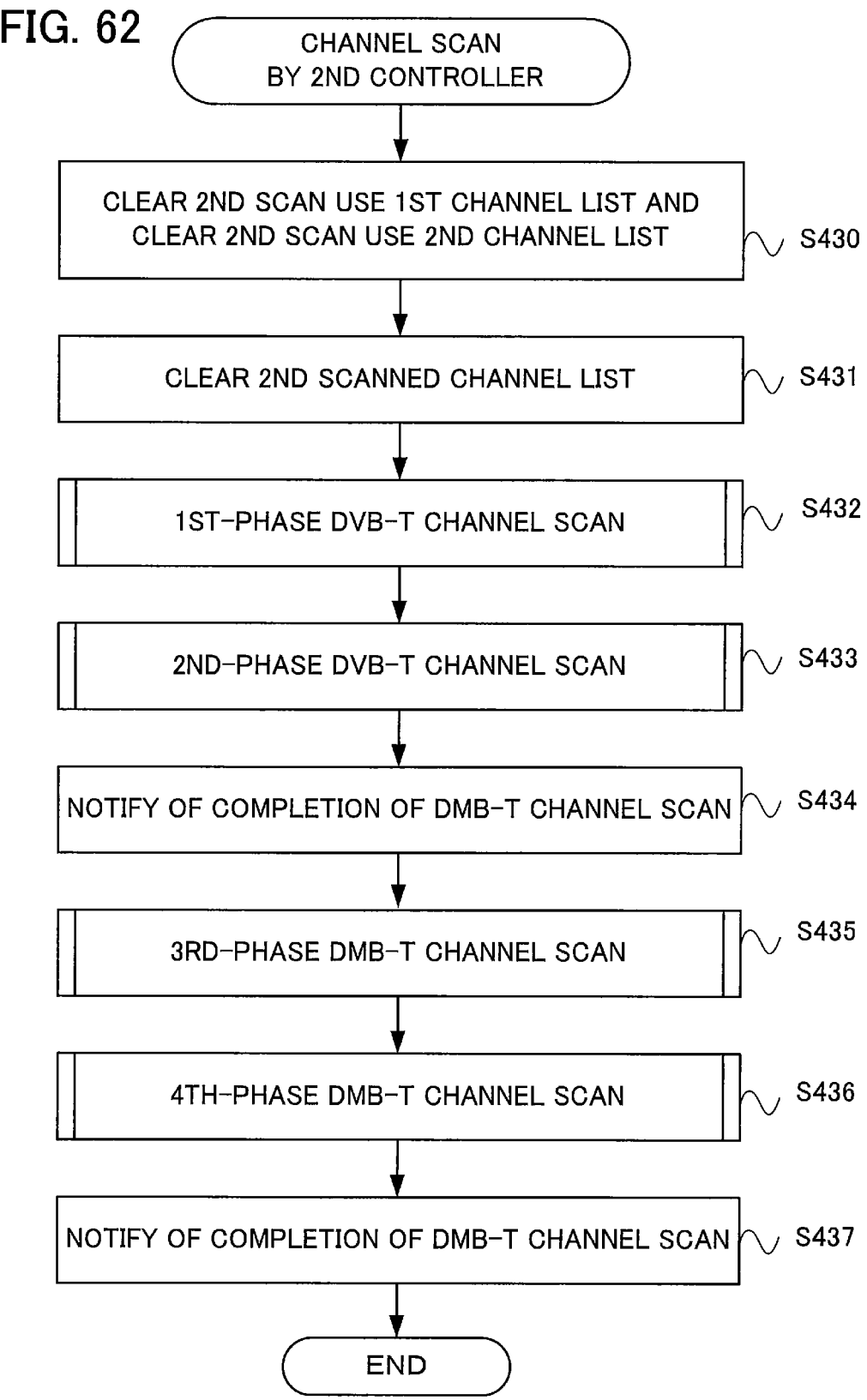
FIG. 62 is a flowchart illustrating channel scan processing performed by the second controller in the eighth embodiment.

FIG. 62 is a flowchart illustrating channel scan processing performed by the second controller 825. The second controller 825 starts the processing illustrated by the flowchart in FIG. 62 when it is notified of the beginning of the channel scan by the UIF processor 855, for example.

The second controller 825 clears the second scan use first channel list stored in the second scan use first channel list storage unit 824B of the second memory unit 824 and the second scan use second channel list stored in the second scan use second channel list storage unit 824D (step S430). For example, the second controller 825 here erases all the channel numbers of the physical channels stored in the second scan use first channel list and the second scan use second channel list.

The second controller 825 then clears the second scanned channel list stored in the second scanned channel list storage unit 824C of the second memory unit 824 (step S431). For example, the second controller 825 here erases all the channel numbers of the physical channels stored in the second scanned channel list.

The second controller 825 then executes the first-phase DVB-T channel scan (step S432). The second controller 825 here scans physical channels included in the entire range of the frequency band assigned to DVB-T2, the frequency band assigned to DVB-T, the frequency band assigned to DVB-H, and the frequency band assigned to DMB-T in descending order, starting from the highest physical channel number '64'. Since the frequency bands assigned to DVB-T2, DVB-T, DVB-H, and DMB-T vary from country to country, the number '64' is used provisionally for purposes of description. The first-phase DVB-T channel scan ends when the physical channel selected for the next channel scan has already been scanned by the first controller 815.

The second controller 825 then executes the second-phase DVB-T channel scan (step S433). The second controller 825 here scans the physical channels with channel numbers listed in the first scan use second channel list obtained from the first controller 815.

When the second-phase DVB-T channel scan ends, the second controller 825 notifies the UIF processor 855 of the completion of the DVB-T channel scan (step S433).

The second controller 825 then executes the third-phase DMB-T channel scan (step S435). The second controller 825 here scans the physical channels with channel numbers listed in the first scan use second channel list obtained from the first controller 815.

The second controller 825 next executes the fourth-phase DMB-T channel scan (step S436). The second controller 825 here scans the physical channels with channel numbers listed in the third scan use channel list obtained from the first controller 815.

When the fourth-phase DMB-T channel scan ends, the second controller 825 notifies the UIF processor 855 of the completion of the DMB-T channel scan (step S437).

The first controller 815 executes a channel scan in the second phase on the physical channels with channel numbers listed in the first scan use second channel list, as described above. In other words, the physical channels scanned by the first controller 815 in the second-phase DVB-T channel scan are limited to physical channels found as a result of the first-phase DVB-T2 channel scan to have a received electromagnetic wave with the required received power that could not be demodulated as a DVB-T2 signal; an efficient channel scan can therefore be performed.

The second controller 825 executes a channel scan in the second phase on the physical channels with channel numbers listed in the second scan use first channel list, as described above. In other words, the physical channels scanned by the second controller 825 in the second-phase DVB-T channel scan are limited to physical channels found as a result of the first-phase DVB-T2 channel scan to have a received electromagnetic wave with the required received power that could not be demodulated as a DVB-T2 signal; an efficient channel scan can therefore be performed.

The first controller 815 executes a channel scan in the third phase on the physical channels with channel numbers listed in the second scan use second channel list, as described above. In other words, the physical channels scanned by the first controller 815 in the third-phase DVB-T channel scan are limited to physical channels found as a result of the second-phase DVB-T channel scan to have a received electromagnetic wave with the required received power that could not be demodulated as a DVB-T signal; an efficient channel scan can therefore be performed.

The second controller 825 executes a channel scan in the third phase on the physical channels with channel numbers listed in the first scan use second channel list, as described above. In other words, the physical channels scanned by the second controller 825 in the third-phase DMB-T channel scan are limited to physical channels found as a result of the second-phase DVB-T2 channel scan to have a received electromagnetic wave with the required received power that could not be demodulated as a DVB-T2 signal; an efficient channel scan can therefore be performed.

The first controller 815 executes a channel scan in the fourth phase on the physical channels with channel numbers listed in the fourth scan use channel list, as described above. In other words, the physical channels scanned by the first controller 815 in the fourth-phase DVB-H channel scan are limited to physical channels found as a result of the third-phase DMB-T channel scan to have a received electromagnetic wave with the required received power that could not be demodulated as a DMB-T signal; an efficient channel scan can therefore be performed.

The second controller 825 executes a channel scan in the fourth phase on the physical channels with channel numbers listed in the third scan use channel list, as described above. In other words, the physical channels scanned by the second controller 825 in the fourth-phase DMB-T channel scan are limited to physical channels found as a result of the third-phase DVB-H channel scan to have a received electromagnetic wave with the required received power that could not be demodulated as a DVB-H signal; an efficient channel scan can therefore be performed.

Figure 63:
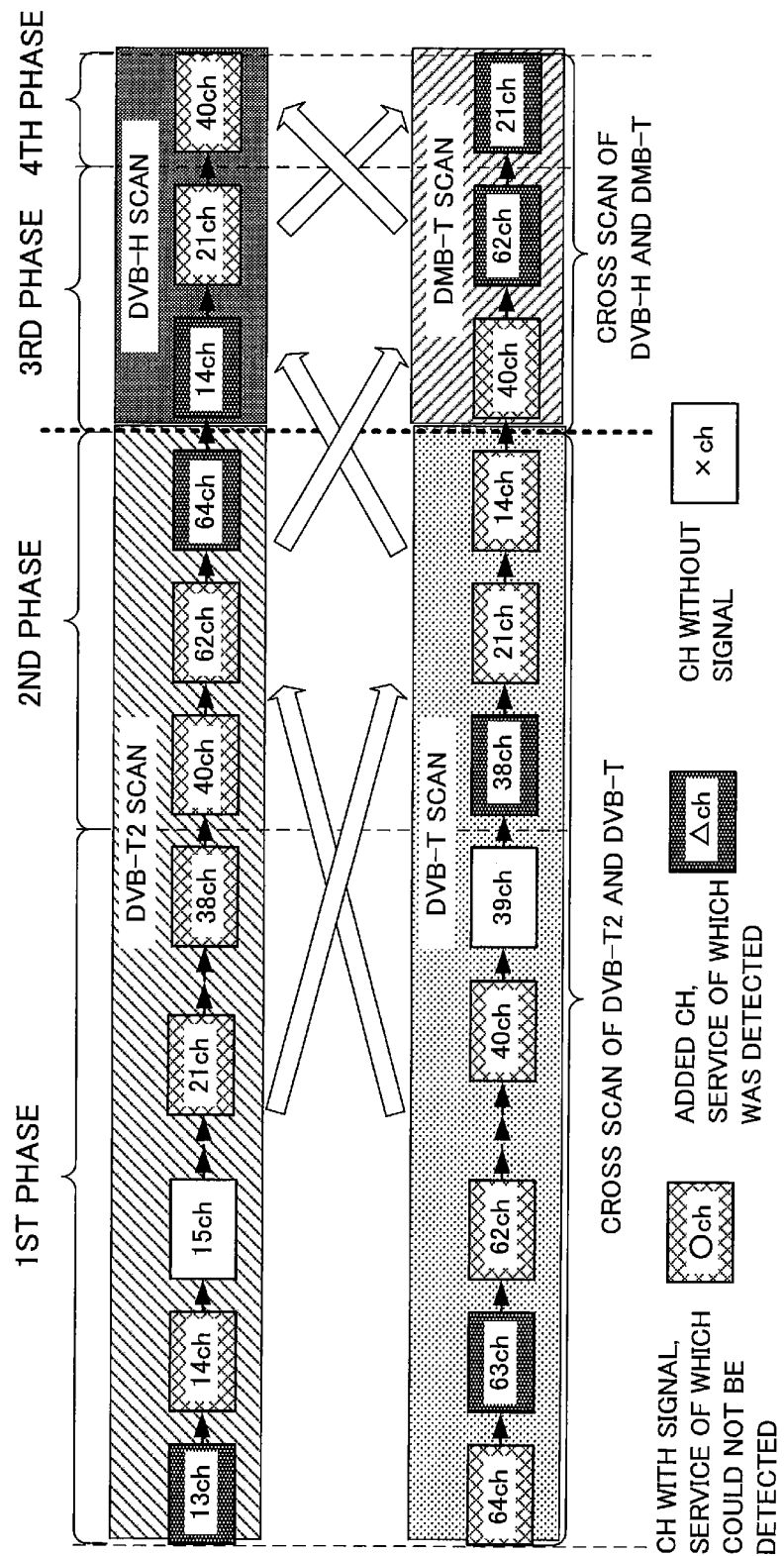
FIG. 63 is a schematic diagram used in describing the channel scan performed by the digital broadcast receiver according to the eighth embodiment.

FIG. 63 is a schematic diagram that will be used in describing the channel scan performed by the digital broadcast receiver 800. Time advances from left to right in FIG. 63, which shows the state in which a DVB-T2 channel scan and a DVB-T channel scan are performed and then a DVB-H channel scan and a DMB-T channel scan are started simultaneously. The first-phase channel scan and the second-phase channel scan include the DVB-T2 channel scan performed by the first controller 815 and the DVB-T channel scan performed by the second controller 825. The third-phase channel scan and the fourth-phase channel scan include the DVB-H channel scan performed by the first controller 815 and the DMB-T channel scan performed by the second controller 825.

In the first-phase DVB-T2 channel scan performed by the first controller 815, channels are scanned in ascending order, starting from channel 13. In the first-phase DVB-T channel scan performed by the second controller 825, channels are scanned in descending order, starting from channel 64. When the channel scan by the first controller 815 is completed up to channel 38 and the channel scan by the second controller 825 is completed down to channel 39, the conditions for ending the first-phase channel scans are satisfied, and the first-phase channel scans have ended.

In the illustrated first-phase DVB-T2 channel scan by the first controller 815, the received level of the electromagnetic wave in channel 14 and channel 38 is higher than the lowest threshold among the first, second, third, and fourth thresholds, but frame lock was not achieved and demodulation failed. The first controller 815 cannot detect a service and therefore decides that the received electromagnetic wave is not a DVB-T2 broadcast wave and adds channel 14, channel 21, and channel 38 to the first scan use first channel list.

In the first-phase DVB-T channel scan by the second controller 825, the received level of the electromagnetic wave in channel 64, channel 62, and channel 40 is higher than the lowest threshold among the first, second, third, and fourth thresholds, but frame lock was not achieved and demodulation failed. The second controller 825 cannot detect a service and therefore decides that the received electromagnetic wave is not a DVB-T broadcast wave and adds channel 64, channel 62, and channel 40 to the second scan use first channel list.

The channels scanned in the second-phase DVB-T2 channel scan and the second-phase DVB-T channel scan are limited to the channels in which the received level of the electromagnetic wave is higher than a predetermined threshold and the electrical signal generated from the electromagnetic wave could not be demodulated in a first-phase channel scan in another protocol. In other words, the only channels scanned in the second-phase DVB-T2 channel scan are channel 40, channel 62, and channel 64, which were found in the first-phase DVB-T channel scan to have an electromagnetic wave with a received level higher than the lowest threshold among the first, second, third, and fourth thresholds and the electrical signal generated from the electromagnetic wave could not be demodulated and a service could not be detected. If a DVB-T2 broadcast wave is being transmitted in channel 64, the first demodulator 811 can perform demodulation, and the first controller 815 extracts tuning information, detects a service, and adds it to the first service list.

The only channels scanned in the second-phase DVB-T channel scan are channel 14, channel 21, and channel 38, which were found in the first-phase DVB-T2 channel scan to have an electromagnetic wave with a received level higher than the lowest threshold among the first, second, third, and fourth thresholds and the electrical signal generated from the electromagnetic wave could not be demodulated. If a DVB-H broadcast wave is being transmitted in channel 38, the second demodulator 821 can perform demodulation, and the second controller 825 extracts tuning information, detects a service, and adds it to the second service list.

A characteristic of the second-phase channel scans is that the scanned channels are limited to the channels found in the first-phase channel scan to have electromagnetic waves with received levels higher than given thresholds although the electrical signals generated from the electromagnetic waves could not be demodulated and services could not be detected.

The channels scanned in the third-phase DVB-H channel scan and the third-phase DMB-T channel scan are limited to the channels in which the received level of the electromagnetic wave is higher than a predetermined threshold and the electrical signal generated from the electromagnetic wave could not be demodulated in a second-phase channel scan in another protocol. In other words, the only channels scanned in the third-phase DVB-H channel scan are channel 14 and channel 21, which were found in the second-phase DVB-T channel scan to have an electromagnetic wave with a received level higher than the lowest threshold among the second, third, and fourth thresholds and the electrical signal generated from the electromagnetic wave could not be demodulated. If a DVB-H broadcast wave is being transmitted in channel 14, the first demodulator 811 can perform demodulation, and the first controller 815 extracts tuning information, detects a service, and adds it to the third service list.

The only channels scanned in the third-phase DMB-T channel scan are channel 40 and channel 62, which were found in the second-phase DVB-T2 channel scan to have an electromagnetic wave with a received level higher than the lowest threshold among the first, third, and fourth thresholds and the electrical signal generated from the electromagnetic wave could not be demodulated and a service could not be detected. If a DMB-T broadcast wave is being transmitted in channel 62, the second demodulator 821 can perform demodulation, and the second controller 825 extracts tuning information, detects a service, and adds it to the third service list.

A characteristic of the third-phase channel scans is that the scanned channels are limited to the channels found in a second-phase channel scan in another protocol to have electromagnetic waves with received levels higher than given thresholds although the electrical signals generated from the electromagnetic waves could not be demodulated.

The channels scanned in the fourth-phase DVB-H channel scan and the fourth-phase DMB-T channel scan are limited to the channels in which the received level of the electromagnetic wave is higher than a predetermined threshold and the electrical signal generated from the electromagnetic wave could not be demodulated in a second-phase channel scan in another protocol. In other words, the only channel scanned in the fourth-phase DVB-H channel scan is channel 40, which was found in the third-phase DMB-T channel scan to have an electromagnetic wave with a received level higher than the lower of the third and fourth thresholds and the electrical signal generated from the electromagnetic wave could not be demodulated. If a DVB-H broadcast wave is being transmitted in channel 40, the first demodulator 811 can perform demodulation, and the first controller 815 extracts tuning information, detects a service, and adds it to the third service list.

The only channel scanned in the fourth-phase DMB-T channel scan is channel 21, which was found in the third-phase DVB-H channel scan to have an electromagnetic wave with a received level higher than the lower of the third and fourth thresholds and the electrical signal generated from the electromagnetic wave could not be demodulated. If a DMB-T broadcast wave is being transmitted in channel 21, the second demodulator 821 can perform demodulation, and the second controller 825 extracts tuning information, detects a service, and adds it to the fourth service list.

A characteristic of the fourth-phase channel scans is that the scanned channels are limited to the channels found in a third-phase channel scan in another protocol to have electromagnetic waves with received levels higher than given thresholds although the electrical signals generated from the electromagnetic waves could not be demodulated.

As described above, the digital broadcast receiver 800 in the eighth embodiment includes a plurality of tuners, demodulators, and demultiplexers conforming to different broadcast protocols, and executes channel scans of the broadcast protocols in parallel, so the time required to execute the channel scans can be reduced.

In the digital broadcast receiver 800 in the eighth embodiment, the first controller 815 and second controller 825 execute channel scans by dividing between the two receiving sections the physical channels included in all of the DVB-T2 frequency band, the DVB-T frequency band, the DVB-H frequency band, and the DMB-T frequency band in the first-phase channel scans. In the course of the channel scans, the first controller 815 and second controller 825 record the channel numbers of physical channels in which the received level of the electromagnetic wave is higher than a predetermined threshold although the electrical signal generated from the electromagnetic wave cannot be demodulated and a service cannot be detected. Although the number of channels scanned in the DVB-T2 channel scan is greater than it would be if this channel scan were limited to the DVB-T2 frequency band, no channels are left unscanned, so the need to scan unselected frequency bands in the DVB-T2, DVB-T, DVB-H, and DMB-T channel scans in the second half of the procedure is eliminated, and the channel scan procedure is simplified.

In the digital broadcast receiver 800 in the eighth embodiment, the first controller 815 and second controller 825 execute the first-phase channel scans by dividing the channel scans in the entire band between the two receiving sections, and narrow the channels to be scanned in the second to fourth phases down to channels in which it is likely that the received level is higher than a predetermined threshold. Therefore, the channel scan time can be reduced in comparison with a system in which the entire band is scanned in each of the four broadcast protocols or a system in which the entire band is divided between the two sections and scanned in each of the four broadcast protocols.

In the digital broadcast receiver 800 according to the eighth embodiment, the first, second, third, and fourth thresholds are the lowest received levels at which services in the corresponding broadcast protocols can be received. Therefore, physical channels in which tuning is likely to fail because of the received levels can be eliminated from the channels to be scanned in the second, third, and fourth phases, and the channel scan time in the second, third, and fourth phases can be reduced.

In the channel scans in the second, third, and fourth phases, the first controller 815 and second controller 825 of the digital broadcast receiver 800 in the eighth embodiment operate with reference to the scan use channel lists obtained as a result of scans by the other controller (cross scan method), sharing the same basic operation sequence. The algorithm is simple and scales readily to larger numbers of broadcast protocols, provided the number is even.

Ninth Embodiment

Like the eighth embodiment, the ninth embodiment uses two receiving sections to execute channel scans in four phases, a first phase to a fourth phase, with four different broadcast protocols. The configuration of a digital broadcast receiver in the ninth embodiment is substantially the same as the configuration in the eighth embodiment, except for the operations performed by the first controller 815 and second controller 825 in the third and fourth phases. In the third phase, the first controller 815 and the second controller 825 execute channel scans in the third broadcast protocol, which is their common broadcast protocol. This operation will be referred to as a double scan. In the fourth phase, the first controller 815 and the second controller 825 execute a double scan in the fourth broadcast protocol.

Figure 64:
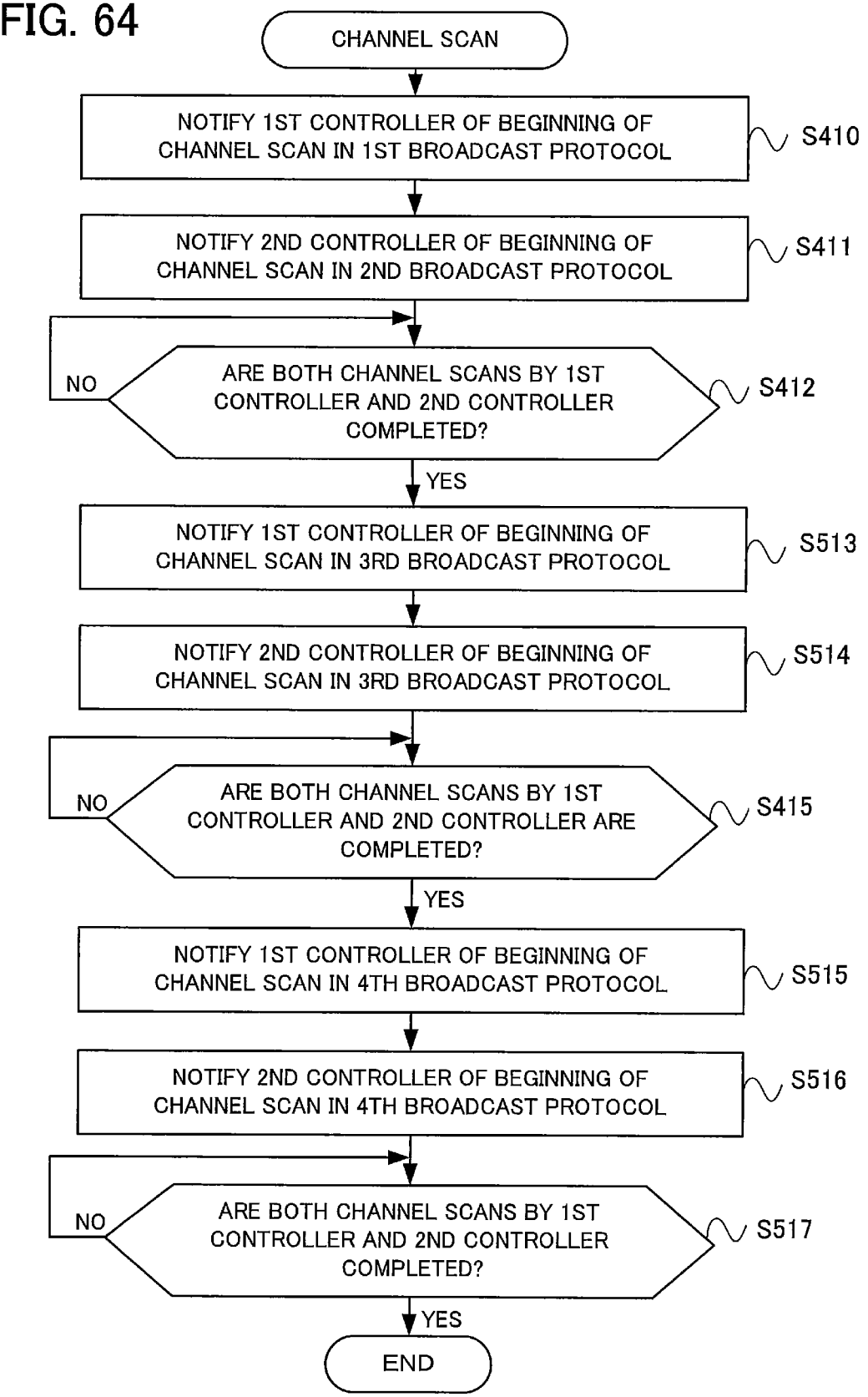
FIG. 64 is a flowchart illustrating processing performed by the UIF processor in the ninth embodiment when a channel scan is selected by a user operation.

FIG. 64 is a flowchart illustrating processing performed by the UIF processor 855 when a channel scan is selected by a user operation. The channel scan processing differs from the processing illustrated by the flowchart in the eighth embodiment in steps S513, S514, S515, S516.

When an operation signal indicating a channel scan request is received from the input unit 854, the UIF processor 855 notifies the first controller 815 of the beginning of a channel scan in the first broadcast protocol (step S410).

The UIF processor 855 then notifies the second controller 825 of the beginning of a channel scan in the first broadcast protocol (step S411).

When the first controller 815 and second controller 825 are notified of the beginning of channel scans as described above, a DVB-T2 channel scan controlled by the first controller 815 and a DVB-T channel scan controlled by the second controller 825 are performed in parallel.

The UIF processor 855 waits until it receives notifications of the completion of both the channel scan by the first controller 815 and the channel scan by the second controller 825 (step S412). When these notifications are received (YES in step S412), the UIF processor 855 proceeds to step S413.

In step S513, the UIF processor 855 notifies the first controller 815 of the beginning of a channel scan in the third broadcast protocol (step S513).

The UIF processor 855 further notifies the second controller 825 of the beginning of a channel scan in the third broadcast protocol (step S514).

When the first controller 815 and second controller 825 are simultaneously notified of the beginning of channel scans in the third broadcast protocol, which is their common broadcast protocol, as described above, a DVB-H channel scan controlled by the first controller 815 and a DVB-H channel scan controlled by the second controller 825 are performed in parallel.

The UIF processor 855 waits until it receives notifications of the completion of both the channel scan by the first controller 815 and the channel scan by the second controller 825 (step S415). When the UIF processor 855 receives these notifications (YES in step S415), the UIF processor 855 notifies the first controller 815 and the second controller 825 of the beginning of channel scans in the fourth broadcast protocol (steps S515, S516).

The UIF processor 855 waits until it receives notifications of the completion of both the channel scan by the first controller 815 and the channel scan by the second controller 825 (step S517). When the UIF processor 855 receives these notifications (YES in step S517), the processing ends.

At the end of the processing, the UIF processor 855 may generate a video signal for a notification screen indicating the end of the channel scan processing, output the signal through the video combiner 831 to the display unit 852, and have the display unit 852 display the screen.

At the end of channel scans in the corresponding broadcast protocols in steps S412 and S415, the UIF processor 855 may generate a video signal for a notification screen indicating the end of the channel scan processing in a specific broadcast protocol, output the signal through the video combiner 831 to the display unit 852, and have the display unit 852 display the screen.

In FIG. 64, the second controller 825 is notified of the beginning of the channel scan (step S411 or steps S514, S516) after the first controller 815 is notified of the beginning of the channel scan (step S410 or steps S513, S515), but this order may be reversed.

Figure 65:
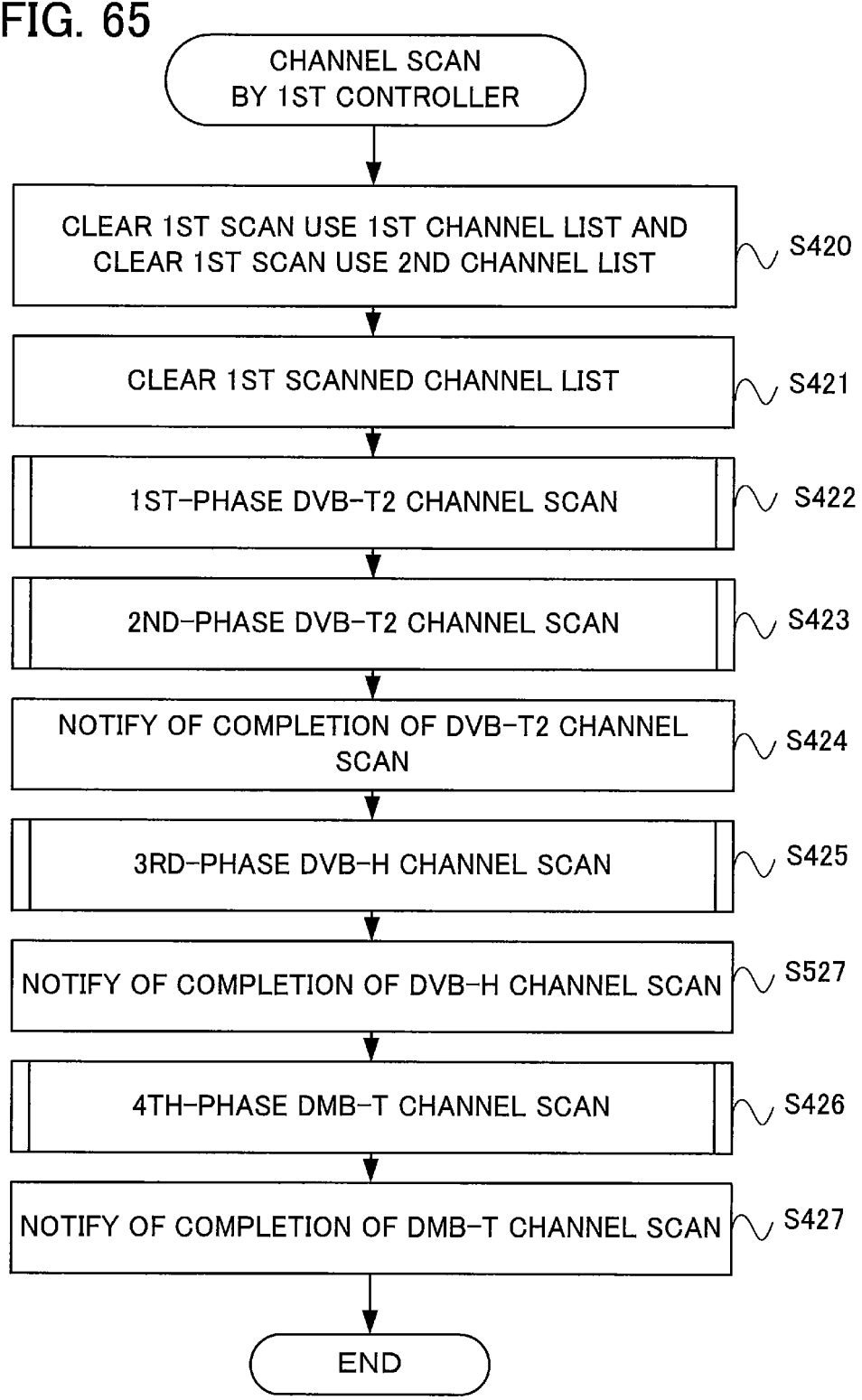
FIG. 65 is a flowchart illustrating channel scan processing performed by the first controller in the ninth embodiment.

FIG. 65 is a flowchart illustrating channel scan processing performed by the first controller 815. The first controller 815 starts the processing illustrated by the flowchart in FIG. 65 when it is notified of the beginning of the channel scan by the UIF processor 855, for example.

The first controller 815 clears (initializes) the first scan use first channel list stored in the first scan use first channel list storage unit 814B of the first memory unit 814 and the first scan use second channel list stored in the first scan use second channel list storage unit 814D (step S420). For example, the first controller 815 erases all the channel numbers of physical channels stored in the first scan use channel list.

The first controller 815 then clears the first scanned channel list stored in the first scanned channel list storage unit 814C of the first memory unit 814 (step S421). For example, the first controller 815 erases all the channel numbers of physical channels stored in the first scanned channel list.

The first controller 815 then executes a first-phase DVB-T2 channel scan (step S422). In this subroutine, the first controller 815 scans the physical channels included in the entire range of the frequency band assigned to DVB-T2, the frequency band assigned to DVB-T, the frequency band assigned to DVB-H, and the frequency band assigned to DMB-T in ascending order, starting from the lowest channel number '13'. Since the frequency bands assigned to DVB-T2, DVB-T, DVB-H, and DMB-T vary from country to country, the number '13' is used provisionally for purposes of description. The first-phase DVB-T2 channel scan ends when the physical channel selected for the next channel scan has already been scanned by the second controller 825.

The first controller 815 then executes the second-phase DVB-T2 channel scan (step S423). The first controller 815 here scans the physical channels with channel numbers included in the second scan use first channel list obtained from the second controller 825.

When the second-phase DVB-T2 channel scan ends, the first controller 815 notifies the UIF processor 855 of the completion of the DVB-T2 channel scan (step S424).

Next, when the first controller 815 receives a command from the UIF processor 855, it executes a third-phase DVB-H channel scan (step S425). The first controller 815 here scans the physical channels with channel numbers included in the second scan use second channel list. The second controller 825 also executes a third-phase DVB-H channel scan simultaneously.

When the third-phase DVB-H channel scan ends, the first controller 815 notifies the UIF processor 855 of the completion of the DVB-H channel scan (step S527).

Next, when the first controller 815 receives a command from the UIF processor 855, it executes the fourth-phase DMB-T channel scan (step S426). The first controller 815 here scans the physical channels with channel numbers included in the fourth scan use channel list obtained from the second controller 825.

When the fourth-phase DMB-T channel scan ends, the first controller 815 notifies the UIF processor 855 of the completion of the DMB-T channel scan (step S427).

Figure 66:
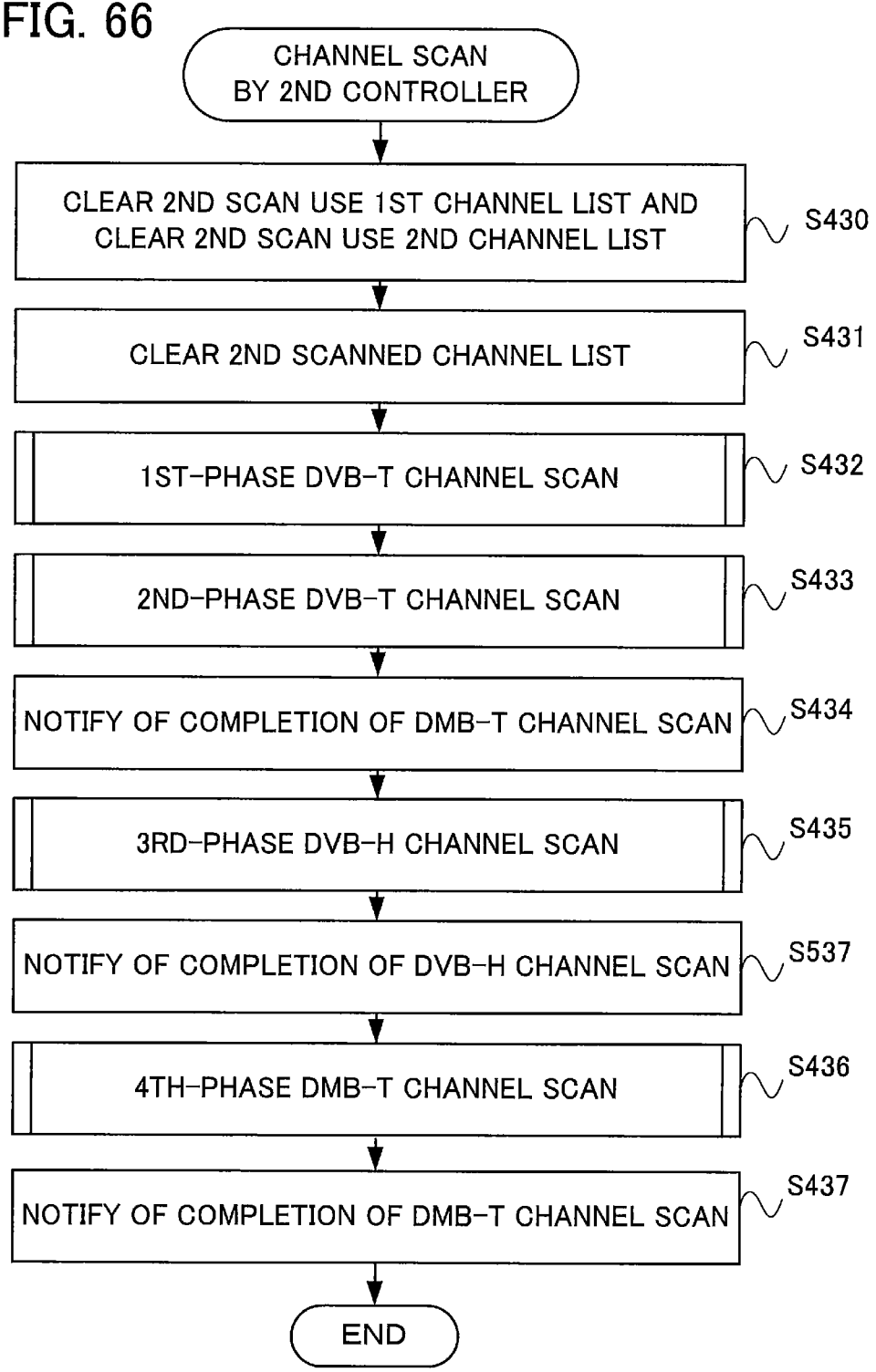
FIG. 66 is a flowchart illustrating channel scan processing performed by the second controller in the ninth embodiment.

FIG. 66 is a flowchart illustrating channel scan processing performed by the second controller 825. The second controller 825 starts the processing illustrated by the flowchart in FIG. 66 when it is notified of the beginning of the channel scan by the UIF processor 855, for example.

The second controller 825 clears (initializes) the second scan use first channel list stored in the second scan use first channel list storage unit 824B of the second memory unit 824 and the second scan use second channel list stored in the second scan use second channel list storage unit 814D (step S420). For example, the second controller 825 erases all the channel numbers of the physical channels stored in the first scan use channel list.

The second controller 825 then clears the second scanned channel list stored in the second scanned channel list storage unit 824C of the second memory unit 824 (step S431). For example, the second controller 825 here erases all the channel numbers of the physical channels stored in the second scanned channel list.

The second controller 825 then executes the first-phase DVB-T channel scan (step S432). In this subroutine, the second controller 825 scans physical channels included in the entire range of the frequency band assigned to DVB-T2, the frequency band assigned to DVB-T, the frequency band assigned to DVB-H, and the frequency band assigned to DMB-T in descending order, starting from the highest physical channel number '64'. Since the frequency bands assigned to DVB-T2, DVB-T, DVB-H, and DMB-T vary from country to country, the number '64' is used provisionally for purposes of description. The first phase DVB-T channel scan ends when the physical channel selected for the next channel scan has already been scanned by the first controller 815.

The second controller 825 then executes the second-phase DVB-T channel scan (step S433). The second controller 825 here scans the physical channels with channel numbers listed in the first scan use first channel list obtained from the first controller 815.

When the second-phase DVB-T channel scan ends, the second controller 825 notifies the UIF processor 855 of the completion of the DVB-T channel scan (step S434).

Next, when the second controller 825 receives a command from the UIF processor 855, it executes a third-phase DVB-H channel scan (step S435). The second controller 825 here scans the physical channels with channel numbers included in the first scan use second channel list. The first controller 815 also executes a third-phase DVB-H channel scan simultaneously.

When the third-phase DVB-H channel scan ends, the second controller 825 notifies the UIF processor 855 of the completion of the DVB-H channel scan (step S537).

Next, when the second controller 825 receives a command from the UIF processor 855, it executes the fourth-phase DMB-T channel scan (step S436). The second controller 825 here scans the physical channels with channel numbers included in the third scan use channel list obtained from the first controller 815.

When the fourth-phase DMB-T channel scan ends, the second controller 825 notifies the UIF processor 855 of the completion of the DMB-T channel scan (step S437).

Figure 67:
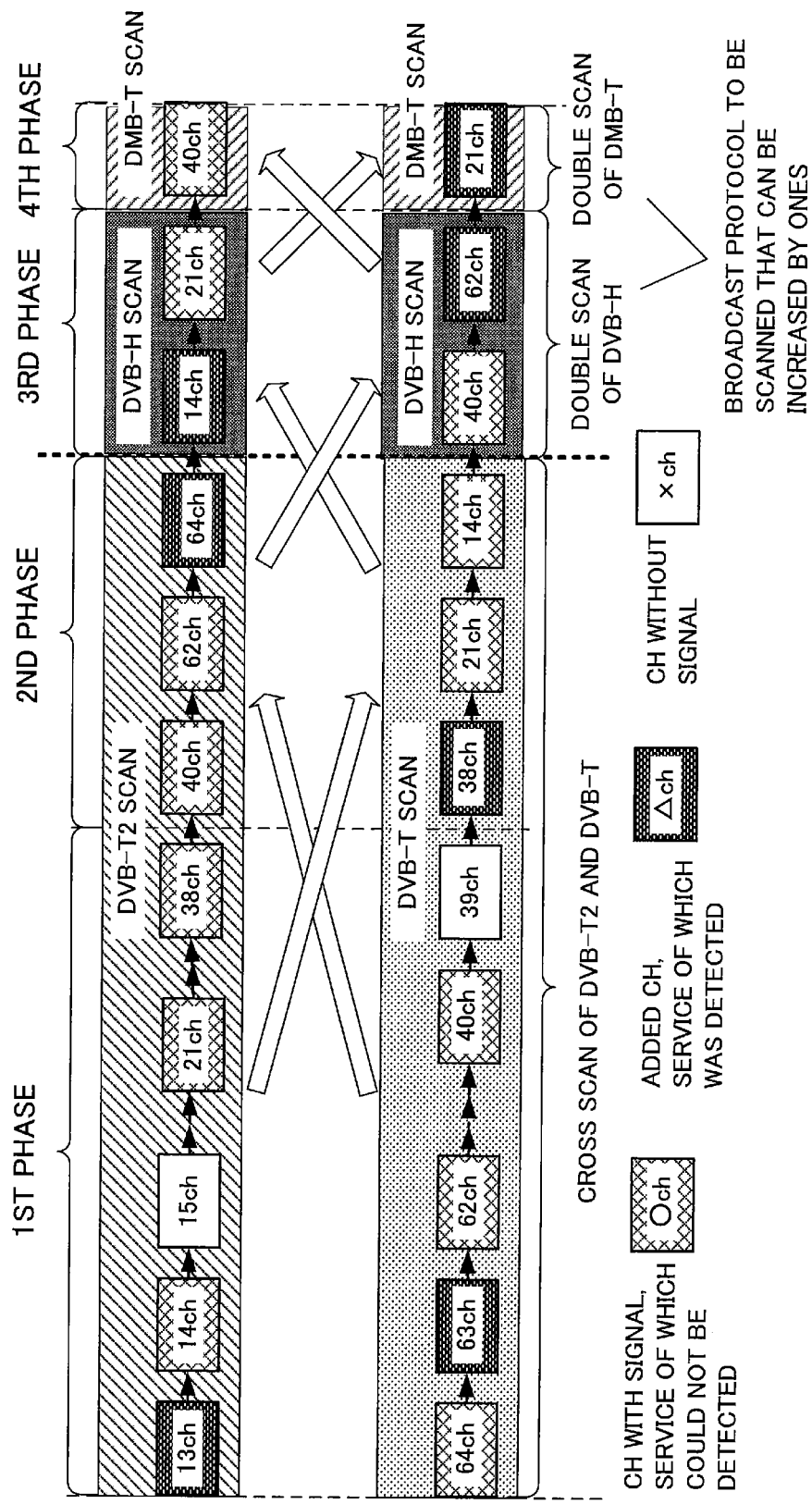
FIG. 67 is a schematic diagram used in describing the channel scan performed by the digital broadcast receiver according to the ninth embodiment.

FIG. 67 is a schematic diagram used in describing the channel scan performed by the digital broadcast receiver 800. The operation in the first phase and the second phase in FIG. 67 is the same as the operation in the eighth embodiment in FIG. 63.

The channels scanned in the third-phase DVB-H channel scan are limited to the channels in which the received level of the electromagnetic wave is higher than a predetermined threshold and the electrical signal generated from the electromagnetic wave could not be demodulated in a second-phase channel scan in another protocol. In other words, the only channels scanned in the third-phase DVB-H channel scan by the first controller 815 are channel 14 and channel 21, which were found in the second-phase DVB-T channel scan to have an electromagnetic wave with a received level higher than the lowest threshold among the second, third, and fourth thresholds and the electrical signal generated from the electromagnetic wave could not be demodulated. If a DVB-H broadcast wave is being transmitted in channel 14, the first demodulator 811 can perform demodulation, and the first controller 815 extracts tuning information, detects a service, and adds it to the third service list.

The only channels scanned in the third-phase DVB-H channel scan by the first controller 815 are channel 40 and channel 62, which were found in the second-phase DVB-T2 channel scan to have an electromagnetic wave with a received level higher than the lowest threshold among the first, third, and fourth thresholds although the electrical signal generated from the electromagnetic wave could not be demodulated and a service could not be detected. If a DVB-H broadcast wave is being transmitted in channel 62, the second demodulator 821 can perform demodulation, and the second controller 825 extracts tuning information, detects a service, and adds it to the fourth service list.

A characteristic of the third-phase channel scans is that the scanned channels are limited to the channels found in a second-phase channel scan in another protocol to have electromagnetic waves with received levels higher than given thresholds although the electrical signals generated from the electromagnetic waves could not be demodulated.

The channels scanned in the fourth-phase DMB-T channel scan by the first controller 815 and the fourth-phase DMB-T channel scan by the second controller 825 are limited to the channels in which the received level of the electromagnetic wave is higher than a predetermined threshold and the electrical signal generated from the electromagnetic wave could not be demodulated in a third-phase channel scan in another protocol. In other words, the only channel scanned in the fourth-phase DMB-T channel scan by the first controller 815 is channel 40, which was found in the third-phase DVB-H channel scan by the second controller 825 to have an electromagnetic wave with a received level higher than the lower of the third and fourth thresholds and the electrical signal generated from the electromagnetic wave could not be demodulated. If a DMB-T broadcast wave is being transmitted in channel 40, the first demodulator 811 can perform demodulation, and the first controller 815 extracts tuning information, detects a service, and adds it to the third service list.

The only channel scanned in the fourth-phase DMB-T channel scan by the second controller 825 is channel 21, which was found in the third-phase DVB-H channel scan by the first controller 815 to have an electromagnetic wave with a received level higher than the lower of the third and fourth thresholds and the electrical signal generated from the electromagnetic wave could not be demodulated. If a DMB-T broadcast wave is being transmitted in channel 21, the second demodulator 821 can perform demodulation, and the second controller 825 extracts tuning information, detects a service, and adds it to the fourth service list.

A characteristic of the fourth-phase channel scans is that the scanned channels are limited to the channels found in a third-phase channel scan in another protocol to have electromagnetic waves with received levels higher than given thresholds although the electrical signals generated from the electromagnetic waves could not be demodulated.

As described above, the digital broadcast receiver 800 in the ninth embodiment includes a plurality of tuners, demodulators, and demultiplexers conforming to different broadcast protocols, and executes channel scans of the broadcast protocols in parallel, so the time required to execute the channel scans can be reduced.

In the digital broadcast receiver 800 in the ninth embodiment, in the first-phase channel scan the first controller 815 and second controller 825 execute a channel scan of all physical channels included in the DVB-T2, DVB-T, DVB-H, and DMB-T frequency bands, dividing the channels between them and recording the channel numbers of physical channels in which the received level of the electromagnetic wave is higher than a predetermined threshold although the electrical signal generated from the electromagnetic wave cannot be demodulated and a service cannot be detected. Although the number of channels scanned in the DVB-T2 channel scan is greater than it would be if this channel scan were limited to the DVB-T2 frequency band, no channels are left unscanned, so the need to scan unselected frequency bands in the DVB-T2, DVB-T, DVB-H, and DMB-T channel scans is eliminated, and the channel scan procedure is simplified.

In the digital broadcast receiver 800 in the ninth embodiment, the first controller 815 and second controller 825 execute a channel scan of the entire band in the first phase, dividing the channels between them; then in the second to fourth phases they narrow the set of channels to be scanned down to channels in which it is likely that a broadcast signal stronger than a predetermined threshold level can be received. Therefore, the channel scan time can be reduced in comparison with a system in which the entire band is scanned in each of the four broadcast protocols or a system in which the entire band is divided between two sections and scanned in each of the four broadcast protocols.

In the digital broadcast receiver 800 according to the ninth embodiment, the first, second, third, and fourth thresholds are the lowest received levels at which services in the corresponding broadcast protocols can be received. Therefore, physical channels in which tuning is likely to fail because of the received level can be eliminated from the channels to be scanned in the second, third, and fourth phases, and the channel scan time in the second, third, and fourth phases can be reduced.

The digital broadcast receiver 800 according to the ninth embodiment scans channels in four broadcast protocols. In the third phase and each subsequent phase, the first controller 815 and second controller 825 scan a single broadcast protocol, both sections cooperating in the scan. Therefore, odd numbers of broadcast protocols greater than two can be supported easily. The digital broadcast receiver 800 in the ninth embodiment is particularly efficient in scanning odd numbers of broadcast protocols, and can reduce the scan time in comparison with the eighth embodiment.

In the ninth embodiment, since the channel scan of one broadcast protocol ends at the end of the second phase and each subsequent phase, the broadcast protocols can be added to the service list and displayed in the order in which their scans end in each phase.

DESCRIPTION OF REFERENCE CHARACTERS

100, 200, 300, 400, 500, 600, 700: digital broadcast receiver, 110: first tuner, 111: first demodulator, 112: first demultiplexer, 113: first decoder, 114, 314, 514, 614, 714: first memory unit, 114A: first service list storage unit, 114B, 514B, 614B: first scan use channel list storage unit, 714B: first scan use first channel list storage unit, 114C: first scanned channel list storage unit, 314D: third scan use channel list storage unit, 714D: first scan use second channel list storage unit, 314E: third scanned channel list storage unit, 115, 315, 415, 515, 615, 715: first controller, 120: second tuner, 121: second demodulator, 122: second demultiplexer, 123: second decoder, 124, 324, 524, 624, 724: second memory unit, 124A: second service list storage unit, 124B, 524B, 624B: second scan use channel list storage unit, 724B: second scan use first channel list storage unit, 124C: second scanned channel list storage unit, 324D: fourth scan use channel list storage unit, 724D: second scan use second channel list storage unit, 324E: fourth scanned channel list storage unit, 125, 325, 425, 525, 625, 725: second controller, 130: video selector, 131, 631, 731: video combiner, 132: audio selector, 133: input unit, 134, 234, 334, 634, 734: user interface processor, 635, 735: third memory unit, 635A: third service list storage unit, 635B: third scan use first channel list storage unit, 635C: third scan use second channel list storage unit, 150: first antenna, 151: second antenna, 152: display unit, 153: audio output unit, 354: third antenna, 355: fourth antenna, 360: third tuner, 361: third demodulator, 362: third demultiplexer, 363, 463: third controller, 370: fourth tuner, 371: fourth demodulator, 372: fourth demultiplexer, 373, 473: fourth controller, 800: digital broadcast receiver, 810: first tuner, 811: first demodulator, 812: first demultiplexer, 813: first decoder, 814A: first service list storage unit, 814B: first scan use first channel list storage unit, 814C: first scanned channel list storage unit, 814D: first scan use second channel list storage unit, 815: first controller, 820: second tuner, 821: second demodulator, 822: second demultiplexer, 823: second decoder, 824A: second service list storage unit, 824B: second scan use first channel list storage unit, 824C: second scanned channel list storage unit, 824D: second scan use second channel list storage unit, 825 second controller, 830: video selector, 831: video combiner, 832: audio selector, 834: third memory unit, 834A: third service list storage unit, 834B: third scan use channel list storage unit, 834C: third scanned channel list storage unit, 844: fourth memory unit, 844A: fourth service list storage unit, 844B: fourth scan use channel list storage unit, 844C: fourth scanned channel list storage unit, 850: first antenna, 851: second antenna, 852: display unit, 853: audio output unit, 854: input unit, 855: UIF processor.

What is claimed is:

1. A digital broadcast receiver for receiving broadcasts in a first broadcast protocol and a second broadcast protocol that use a plurality of frequency bands in which at least one or more frequency bands are overlapping frequency bands, the digital broadcast receiver comprising:
  a first tuner for receiving an electromagnetic wave and generating an electrical signal from the electromagnetic wave;
  a first demodulator for demodulating the electrical signal obtained from the first tuner and generating a first digital signal conforming to the first broadcast protocol;
  a first demultiplexer for separating first data including tuning information from the first digital signal;
  a first controller for controlling the first tuner, the first demodulator, and the first demultiplexer and executing a channel scan in the first broadcast protocol;
  a second tuner for receiving an electromagnetic wave and generating an electrical signal from the electromagnetic wave;
  a second demodulator for demodulating the electrical signal obtained from the second tuner and generating a second digital signal conforming to the second broadcast protocol;
  a second demultiplexer for separating second data including tuning information from the second digital signal; and
  a second controller for controlling the second tuner, the second demodulator, and the second demultiplexer and executing a channel scan in the second broadcast protocol; wherein
  the first controller and the second controller divide between them a plurality of channels included in the overlapping frequency band of the first broadcast protocol and the second broadcast protocol and execute channel scans in parallel as a first phase channel scan;
  in the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present;
  in the first phase channel scan, the second controller executes a channel scan in the second broadcast protocol and generates, from information indicating reception status from the second tuner and the second demodulator, a second scan use channel list indicating channels in which a broadcast wave not belonging to the second broadcast protocol is likely to be present; and
  after the first phase channel scan, the first controller executes a channel scan in the first broadcast protocol on the channels indicated in the second scan use channel list, and the second controller executes a channel scan in the second broadcast protocol on the channels indicated in the first scan use channel list.

2. The digital broadcast receiver of claim 1, wherein:
  in the first phase channel scan, the first controller adds, to the first scan use channel list, channels in which digital signals in the first broadcast protocol could not be demodulated despite the presence, in the electrical signal generated from the electromagnetic wave received by the first tuner, of a received level equal to or greater than a predetermined threshold value; and
  in the first phase channel scan, the second controller adds, to the second scan use channel list, channels in which digital signals in the second broadcast protocol could not be demodulated despite the presence, in the electrical signal generated from the electromagnetic wave received by the first tuner, of a received level equal to or greater than a predetermined threshold value.

3. The digital broadcast receiver of claim 1, wherein:
  in the first phase channel scan, the first controller scans the plurality of channels included in the overlapping frequency band of the first broadcast protocol and the second broadcast protocol in ascending order of channel number;
  in the first phase channel scan, the second controller scans the plurality of channels included in the overlapping frequency band of the first broadcast protocol and the second broadcast protocol in descending order of channel number; and
  the first controller and the second controller each terminate the first phase channel scan when the channel to be scanned has already been scanned by the other controller among the first controller and the second controller.

4. The digital broadcast receiver of claim 1, further comprising:
  an input unit for receiving input of commands; and
  a user interface processor for executing processing corresponding to the commands; wherein
  by executing channel scans, the first and second controllers create service lists from the tuning information; and the user interface processor generates, and outputs to a display unit, screen signals for a service list screen for receiving input of a service selected from the service list created from either the channel scan of channels included in the frequency band used by the first broadcast protocol or the channel scan of channels included in the frequency band used by the second broadcast protocol, whichever finished first, enabling the service to be selected by the input unit through the service list screen.

5. A digital broadcast receiver for receiving broadcasts in a first broadcast protocol and a second broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal conforming to the first broadcast protocol;

a first demultiplexer for separating first data including tuning information from the first digital signal generated by the first demodulator;

a first controller for controlling the first tuner, the first demodulator, and the first demultiplexer and executing a channel scan in the first broadcast protocol;

a second tuner for receiving an electromagnetic wave and generating an electrical signal from the electromagnetic wave;

a second demodulator for demodulating the electrical signal obtained from the second tuner and generating a second digital signal conforming to the second broadcast protocol;

a second demultiplexer for separating second data including tuning information from the second digital signal generated by the second demodulator; and a second controller for controlling the second tuner, the second demodulator, and the second demultiplexer and executing a channel scan in the second broadcast protocol;

a third tuner for receiving an electromagnetic wave and generating an electrical signal from the electromagnetic wave;

a third demodulator for demodulating the electrical signal obtained from the third tuner and generating a first digital signal conforming to the first broadcast protocol;

a third demultiplexer for separating first data including tuning information from the first digital signal generated by the third demodulator; and a third controller for controlling the third tuner, the third demodulator, and the third demultiplexer and executing a channel scan in the first broadcast protocol;

a fourth tuner for receiving an electromagnetic wave and generating an electrical signal from the electromagnetic wave;

a fourth demodulator for demodulating the electrical signal obtained from the fourth tuner and generating a second digital signal conforming to the second broadcast protocol;

a fourth demultiplexer for separating second data including tuning information from the second digital signal generated by the fourth demodulator; and a fourth controller for controlling the fourth tuner, the fourth demodulator, and the fourth demultiplexer and executing a channel scan in the second broadcast protocol; wherein the first controller, the second controller, the third controller, and the fourth controller divide among them a plurality of channels included in the overlapping frequency band of the first broadcast protocol and the second broadcast protocol and execute channel scans in parallel as a first phase channel scan;

in the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present;

in the first phase channel scan, the second controller executes a channel scan in the second broadcast protocol and generates, from information indicating reception status from the second tuner and the second demodulator, a second scan use channel list indicating channels in which a broadcast wave not belonging to the second broadcast protocol is likely to be present;

in the first phase channel scan, the third controller executes a channel scan in the first broadcast protocol and generates a third scan use channel list indicating channels in which a broadcast wave not belonging to the first broadcast protocol is likely to be present, from information indicating reception status from the third tuner and the third demodulator;

in the first phase channel scan, the fourth controller executes a channel scan in the second broadcast protocol and generates a fourth scan use channel list indicating channels in which a broadcast wave not belonging to the second broadcast protocol is likely to be present, from information indicating reception status from the fourth tuner and the fourth demodulator; and after the first phase channel scan, the first controller and the third controller divide between them the channels indicated in the second scan use channel list and the fourth scan use channel list and execute a channel scan in the first broadcast protocol, and the second controller and the fourth controller divide between them the channels indicated in the first scan use channel list and the third scan use channel list and execute a channel scan in the second broadcast protocol.

6. A digital broadcast receiver for receiving broadcasts in a first broadcast protocol and a second broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal conforming to the first broadcast protocol;

a first demultiplexer for separating first data including tuning information from the first digital signal generated by the first demodulator;

a first controller for controlling the first tuner, the first demodulator, and the first demultiplexer and executing a channel scan in the first broadcast protocol;

a second tuner for receiving an electromagnetic wave and generating an electrical signal from the electromagnetic wave;

a second demodulator for demodulating the electrical signal obtained from the second tuner and generating a second digital signal conforming to the second broadcast protocol;

a second demultiplexer for separating second data including tuning information from the second digital signal generated by the second demodulator; and a second controller for controlling the second tuner, the second demodulator, and the second demultiplexer and executing a channel scan in the second broadcast protocol;

a third tuner for receiving an electromagnetic wave and generating an electrical signal from the electromagnetic wave;

a third demodulator for demodulating the electrical signal obtained from the third tuner and generating a first digital signal conforming to the first broadcast protocol;

a third demultiplexer for separating first data including tuning information from the first digital signal generated by the third demodulator; and a third controller for controlling the third tuner, the third demodulator, and the third demultiplexer and executing a channel scan in the first broadcast protocol;

a fourth tuner for receiving an electromagnetic wave and generating an electrical signal from the electromagnetic wave;

a fourth demodulator for demodulating the electrical signal obtained from the fourth tuner and generating a second digital signal conforming to the second broadcast protocol;

a fourth demultiplexer for separating second data including tuning information from the second digital signal generated by the fourth demodulator; and a fourth controller for controlling the fourth tuner, the fourth demodulator, and the fourth demultiplexer and executing a channel scan in the second broadcast protocol; wherein when the second tuner, the second demodulator, and the second demultiplexer are being used to receive a service broadcast in the second broadcast protocol, the first controller, the third controller, and the fourth controller divide among them a plurality of channels included in the overlapping frequency band of the first broadcast protocol and the second broadcast protocol and execute parallel channel scans as a first phase channel scan, in the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present, in the first phase channel scan, the third controller executes a channel scan in the first broadcast protocol and generates a third scan use channel list indicating channels in which a broadcast wave not belonging to the first broadcast protocol is likely to be present, from information indicating reception status from the third tuner and the third demodulator, in the first phase channel scan, the fourth controller executes a channel scan in the second broadcast protocol and generates a fourth scan use channel list indicating channels in which a broadcast wave not belonging to the second broadcast protocol is likely to be present, from information indicating reception status from the fourth tuner and the fourth demodulator, and after the first phase channel scan, the first controller and the third controller divide between them the channels indicated in the fourth scan use channel list and execute a channel scan in the first broadcast protocol, and the fourth controller executes a channel scan in the second broadcast protocol the channels indicated in the first scan use channel list and the third scan use channel list; and when the first tuner, the first demodulator, and the first demultiplexer are being used to receive a service broadcast in the first broadcast protocol, the second controller, the third controller, and the fourth controller divide among them a plurality of channels included in the overlapping frequency band of the first broadcast protocol and the second broadcast protocol and execute parallel channel scans as a fourth phase channel scan, in the fourth phase channel scan, the second controller executes a channel scan in the second broadcast protocol and generates, from information indicating reception status from the second tuner and the second demodulator, a second scan use channel list indicating channels in which a broadcast wave not belonging to the second broadcast protocol is likely to be present;

in the fourth phase channel scan, the third controller executes a channel scan in the first broadcast protocol and generates a third scan use channel list indicating channels in which a broadcast wave not belonging to the first broadcast protocol is likely to be present, from information indicating reception status from the third tuner and the third demodulator, in the fourth phase channel scan, the fourth controller executes a channel scan in the second broadcast protocol and generates a fourth scan use channel list indicating channels in which a broadcast wave not belonging to the second broadcast protocol is likely to be present, from information indicating reception status from the fourth tuner and the fourth demodulator, and after the fourth phase channel scan, the third controller executes a channel scan in the first broadcast protocol on the channels indicated in the second scan use channel list and the fourth scan use channel list, and the second controller and the fourth controller divide between them the channels indicated in the third scan use channel list and execute a channel scan in the second broadcast protocol.

7. A digital broadcast receiver for receiving broadcasts in a first broadcast protocol and a second broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal conforming to the first broadcast protocol;

a first demultiplexer for separating first data including tuning information from the first digital signal;

a first controller for controlling the first tuner, the first demodulator, and the first demultiplexer and executing a channel scan in the first broadcast protocol;

a second tuner for receiving an electromagnetic wave and generating an electrical signal from the electromagnetic wave;

a second demodulator for demodulating the electrical signal obtained from the second tuner and generating a second digital signal conforming to the second broadcast protocol;

a second demultiplexer for separating second data including tuning information from the second digital signal; and a second controller for controlling the second tuner, the second demodulator, and the second demultiplexer and executing a channel scan in the second broadcast protocol; wherein the first controller and the second controller divide between them a plurality of channels included in the overlapping frequency band of the first broadcast protocol and the second broadcast protocol and execute channel scans in parallel as a first phase channel scan;

in the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present;

in the first phase channel scan, the second controller executes a channel scan in the second broadcast protocol and generates a second scan use channel list indicating channels in which the electrical signal generated from the electromagnetic wave received by the second tuner could be demodulated and, from information indicating reception status from the second tuner and the second demodulator, channels in which a broadcast wave not belonging to the second broadcast protocol is likely to be present; and after the first phase channel scan, the first controller executes a channel scan in the first broadcast protocol on the channels indicated in the second scan use channel list, and the second controller executes a channel scan in the second broadcast protocol on the channels indicated in the first scan use channel list.

8. The digital broadcast receiver of claim 7, wherein the second controller restricts the channels stored in the second scan use channel list to channels in which the electromagnetic wave received by the second tuner has a received level exceeding a first threshold value.

9. A digital broadcast receiver for receiving broadcasts in a first broadcast protocol, a second broadcast protocol, and a third broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal;

a first demultiplexer for separating first data including tuning information from the first digital signal;

a first controller for controlling the first tuner, the first demodulator, and the first demultiplexer and executing channel scans in the first broadcast protocol and the third broadcast protocol;

a second tuner for receiving an electromagnetic wave and generating an electrical signal from the electromagnetic wave;

a second demodulator for demodulating the electrical signal obtained from the second tuner and generating a second digital signal;

a second demultiplexer for separating second data including tuning information from the second digital signal; and a second controller for controlling the second tuner, the second demodulator, and the second demultiplexer and executing channel scans in the second broadcast protocol and the third broadcast protocol; wherein the first controller and the second controller divide between them a plurality of channels included in the overlapping frequency band of the first broadcast protocol and the second broadcast protocol and execute the channel scan in the first broadcast protocol and the channel scan in the second broadcast protocol in parallel as a first phase channel scan;

in the first phase channel scan, the first controller executes a channel scan in the first broadcast protocol and generates, from information indicating reception status from the first tuner and the first demodulator, a first scan use channel list indicating channels in which a broadcast wave not belonging to the first broadcast protocol is likely to be present;

in the first phase channel scan, the second controller executes a channel scan in the second broadcast protocol and generates, from information indicating reception status from the second tuner and the second demodulator a second scan use channel list indicating channels in which a broadcast wave not belonging to the second broadcast protocol is likely to be present; and as channel scans after the first phase channel scan, the first controller executes a channel scan in the first broadcast protocol on the channels indicated in the second scan use channel list, and generates, from information indicating reception status from the first tuner and the first demodulator, a third scan use first channel list indicating channels identified as channels in which a broadcast wave not belonging to the first broadcast protocol is likely to be present, the second controller executes a channel scan in the second broadcast protocol on the channels indicated in the first scan use channel list, and generates, from information indicating reception status from the second tuner and the second demodulator, a third scan use second channel list indicating channels identified as channels in which a broadcast wave not belonging to the second broadcast protocol is likely to be present, and at least one of the first controller and the second controller executes a channel scan in the third broadcast protocol on the channels indicated in the third scan use first channel list and the third scan use second channel list.

10. The digital broadcast receiver of claim 9, wherein:

in the first phase channel scan, the first controller scans the plurality of channels included in the overlapping frequency band of the first broadcast protocol and the second broadcast protocol in ascending order of channel number;

in the first phase channel scan, the second controller scans the plurality of channels included in the overlapping frequency band of the first broadcast protocol and the second broadcast protocol in descending order of channel number; and the first controller and the second controller each terminate the first phase channel scan when the channel to be scanned has already been scanned by the other controller among the first controller and the second controller.

11. A digital broadcast receiver for receiving broadcasts in a first broadcast protocol, a second broadcast protocol, and a third broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal;

a first demultiplexer for separating first data including tuning information from the first digital signal;

a first controller for controlling the first tuner, the first demodulator, and the first demultiplexer and executing channel scans in the first broadcast protocol and the third broadcast protocol;

a second tuner for receiving an electromagnetic wave and generating an electrical signal from the electromagnetic wave;

a second demodulator for demodulating the electrical signal obtained from the second tuner and generating a second digital signal;

a second demultiplexer for separating second data including tuning information from the second digital signal; and a second controller for controlling the second tuner, the second demodulator, and the second demultiplexer and executing channel scans in the second broadcast protocol and the third broadcast protocol; wherein the first controller and the second controller divide between them a plurality of channels included in one of the frequency bands of the first broadcast protocol, the second broadcast protocol, and the third broadcast protocol and execute channel scans in parallel in the third broadcast protocol as a first phase channel scan;

in the first phase channel scan, the first controller executes a channel scan in the third broadcast protocol and generates, from information indicating reception status from the first tuner and the first demodulator, a first scan use first channel list indicating channels in which a broadcast wave not belonging to the third broadcast protocol is likely to be present, and in the first phase channel scan, the second controller executes a channel scan in the third broadcast protocol and generates, from information indicating reception status from the second tuner and the second demodulator, a second scan use first channel list indicating channels in which a broadcast wave not belonging to the third broadcast protocol is likely to be present; and as a second phase channel scan, the first controller executes a channel scan in the first broadcast protocol on the channels indicated in the first scan use first channel list, and generates, from information indicating reception status from the first tuner and the first demodulator, a first scan use second channel list indicating channels identified as channels in which a broadcast wave not belonging to the first broadcast protocol is likely to be present, and the second controller executes a channel scan in the second broadcast protocol on the channels indicated in the second scan use first channel list, and generates, from information indicating reception status from the second tuner and the second demodulator, a second scan use second channel list indicating channels identified as channels in which a broadcast wave not belonging to the second broadcast protocol is likely to be present; and as a third-phase channel scan, the first controller executes the channel scan in the first broadcast protocol on the channels indicated in the second scan use second channel list, and the second controller executes the channel scan in the second broadcast protocol on the channels indicated in the first scan use second channel list.

12. The digital broadcast receiver of claim 11, wherein:

in the first phase channel scan, the first controller scans the plurality of channels included in one of the frequency bands of the first broadcast protocol, the second broadcast protocol, and the third broadcast protocol in ascending order of channel number;

in the first phase channel scan, the second controller scans the plurality of channels included in one of the frequency bands of the first broadcast protocol, the second broadcast protocol, and the third broadcast protocol in descending order of channel number; and the first controller and the second controller each terminate the first phase channel scan when the channel to be scanned has already been scanned by the other controller among the first controller and the second controller.

13. A digital broadcast receiver for receiving broadcasts in a first broadcast protocol, a second broadcast protocol, a third broadcast protocol, and a fourth broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal;

a first demultiplexer for separating third data and first data including tuning information from the first digital signal;

a first controller for controlling the first tuner, the first demodulator, and the first demultiplexer and executing channel scans in the first broadcast protocol and the third broadcast protocol;

a second tuner for receiving an electromagnetic wave and generating an electrical signal from the electromagnetic wave;

a second demodulator for demodulating the electrical signal obtained from the second tuner and generating a second digital signal;

a second demultiplexer for separating third data and second data including tuning information from the second digital signal; and a second controller for controlling the second tuner, the second demodulator, and the second demultiplexer and executing channel scans in the second broadcast protocol and the fourth broadcast protocol; wherein the first controller and the second controller divide between them a plurality of channels included in the overlapping frequency bands of the first broadcast protocol, the second broadcast protocol, the third broadcast protocol, and the fourth broadcast protocol and execute a channel scan in the first broadcast protocol and a channel scan in the second broadcast protocol in parallel as a first phase channel scan;

in the first phase channel scan, the first controller executes the channel scan in the first broadcast protocol and generates, from information indicating reception status from the first tuner and the first demodulator, a first scan use first channel list indicating channels in which a broadcast wave not belonging to the first broadcast protocol is likely to be present, and in the first phase channel scan, the second controller executes the channel scan in the second broadcast protocol and generates, from information indicating reception status from the second tuner and the second demodulator, a second scan use first channel list indicating channels in which a broadcast wave not belonging to the second broadcast protocol is likely to be present;

as a second phase channel scan, the first controller executes a channel scan in the first broadcast protocol on the channels indicated in the second scan use first channel list, and generates, from information indicating reception status from the first tuner and the first demodulator, a first scan use second channel list indicating channels identified as channels in which a broadcast wave not belonging to the first broadcast protocol is likely to be present, and the second controller executes a channel scan in the second broadcast protocol on the channels indicated in the first scan use first channel list, and generates, from information indicating reception status from the second tuner and the second demodulator, a second scan use second channel list indicating channels identified as channels in which a broadcast wave not belonging to the second broadcast protocol is likely to be present;

as a third-phase channel scan, the first controller executes a channel scan in the third broadcast protocol on the channels indicated in the second scan use second channel list, and generates, from information indicating reception status from the first tuner and the first demodulator, a third scan use channel list indicating channels identified as channels in which a broadcast wave not belonging to the third broadcast protocol is likely to be present, and the second controller executes a channel scan in the fourth broadcast protocol on the channels indicated in the first scan use second channel list, and generates, from information indicating reception status from the second tuner and the second demodulator, a fourth scan use channel list indicating channels identified as channels in which a broadcast wave not belonging to the fourth broadcast protocol is likely to be present; and as a fourth-phase channel scan, the first controller executes a channel scan in the third broadcast protocol on the channels indicated in the fourth scan use channel list, and the second controller executes a channel scan in the fourth broadcast protocol on the channels indicated in the third scan use channel list.

14. A digital broadcast receiver for receiving broadcasts in a first broadcast protocol, a second broadcast protocol, a third broadcast protocol, and a fourth broadcast protocol that use a plurality of frequency bands in which at least one or more frequency bands are overlapping frequency bands, the digital broadcast receiver comprising:

a first tuner for receiving an electromagnetic wave and generating an electrical signal from the electromagnetic wave;

a first demodulator for demodulating the electrical signal obtained from the first tuner and generating a first digital signal;

a first demultiplexer for separating third data and first data including tuning information from the first digital signal;

a first controller for controlling the first tuner, the first demodulator, and the first demultiplexer and executing channel scans in the first broadcast protocol and the third broadcast protocol;

a second tuner for receiving an electromagnetic wave and generating an electrical signal from the electromagnetic wave;

a second demodulator for demodulating the electrical signal obtained from the second tuner and generating a second digital signal;

a second demultiplexer for separating third data and second data including tuning information from the second digital signal; and a second controller for controlling the second tuner, the second demodulator, and the second demultiplexer and executing channel scans in the second broadcast protocol and the fourth broadcast protocol; wherein the first controller and the second controller divide between them a plurality of channels included in the overlapping frequency bands of the first broadcast protocol, the second broadcast protocol, the third broadcast protocol, and the fourth broadcast protocol and execute a channel scan in the first broadcast protocol and a channel scan in the second broadcast protocol in parallel as a first phase channel scan;

in the first phase channel scan, the first controller executes a channel scan in the first broadcast protocol and generates, from information indicating reception status from the first tuner and the first demodulator, a first scan use first channel list indicating channels in which a broadcast wave not belonging to the first broadcast protocol is likely to be present, and in the first phase channel scan, the second controller executes a channel scan in the second broadcast protocol and generates, from information indicating reception status from the second tuner and the second demodulator, a second scan use first channel list indicating channels in which a broadcast wave not belonging to the second broadcast protocol is likely to be present;

as a second phase channel scan, the first controller executes a channel scan in the first broadcast protocol on the channels indicated in the second scan use first channel list, and generates, from information indicating reception status from the first tuner and the first demodulator, a first scan use second channel list indicating channels identified as channels in which a broadcast wave not belonging to the first broadcast protocol is likely to be present, and the second controller executes a channel scan in the second broadcast protocol on the channels indicated in the first scan use first channel list, and generates, from information indicating reception status from the second tuner and the second demodulator, a second scan use second channel list indicating channels identified as channels in which a broadcast wave not belonging to the second broadcast protocol is likely to be present;

as a third-phase channel scan, the first controller executes a channel scan in the third broadcast protocol on the channels indicated in the second scan use second channel list, and generates, from information indicating reception status from the first tuner and the first demodulator, a third scan use channel list indicating channels identified as channels in which a broadcast wave not belonging to the third broadcast protocol is likely to be present, and the second controller executes a channel scan in the third broadcast protocol on the channels indicated in the first scan use second channel list, and generates, from information indicating reception status from the second tuner and the second demodulator, a fourth scan use channel list indicating channels identified as channels in which a broadcast wave not belonging to the third broadcast protocol is likely to be present; and as a fourth-phase channel scan, the first controller executes a channel scan in the fourth broadcast protocol on the channels indicated in the fourth scan use channel list, and the second controller executes a channel scan in the fourth broadcast protocol on the channels indicated in the third scan use channel list.

\* \* \* \* \*